US010252726B2

(12) United States Patent
Emura et al.

(10) Patent No.: US 10,252,726 B2
(45) Date of Patent: Apr. 9, 2019

(54) DRIVING ASSISTANCE METHOD, AND DRIVING ASSISTANCE DEVICE, DRIVING CONTROL DEVICE, VEHICLE, DRIVING ASSISTANCE PROGRAM, AND RECORDING MEDIUM USING SAID METHOD

(71) Applicant: Panasonic Intellectual Property Management Co., Ltd., Osaka (JP)

(72) Inventors: Koichi Emura, Kanagawa (JP); Masanaga Tsuji, Osaka (JP); Toshiya Mori, Osaka (JP); Wataru Nakai, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/565,887

(22) PCT Filed: Apr. 15, 2016

(86) PCT No.: PCT/JP2016/002049
§ 371 (c)(1),
(2) Date: Oct. 11, 2017

(87) PCT Pub. No.: WO2016/170764
PCT Pub. Date: Oct. 27, 2016

(65) Prior Publication Data
US 2018/0093676 A1 Apr. 5, 2018

(30) Foreign Application Priority Data

Apr. 21, 2015 (JP) .................................. 2015-087069
May 14, 2015 (JP) .................................. 2015-099474
(Continued)

(51) Int. Cl.
*B60W 50/08* (2012.01)
*B60W 30/182* (2012.01)
(Continued)

(52) U.S. Cl.
CPC ............. *B60W 50/10* (2013.01); *B60K 35/00* (2013.01); *B60K 37/06* (2013.01); *B60R 16/02* (2013.01);
(Continued)

(58) Field of Classification Search
CPC .. B60W 50/085; B60W 30/09; B60W 30/182; B60W 50/10; B60W 50/08;
(Continued)

(56) References Cited

U.S. PATENT DOCUMENTS 5,612,686 A * 3/1997 Takano .................. B60Q 9/008
180/169
6,553,296 B2 * 4/2003 Breed ..................... B60R 25/25
180/271
(Continued)

FOREIGN PATENT DOCUMENTS

DE 102011121948 A1 6/2013
EP 1997705 A1 12/2008
(Continued)

OTHER PUBLICATIONS

International Search Report of PCT application No. PCT/JP2016/002049 dated Jul. 5, 2016.
(Continued)

Primary Examiner — Tuan C To
(74) Attorney, Agent, or Firm — Seed IP Law Group LLP

(57) ABSTRACT

The driving assistance device acquires, from an autonomous driving controller that determines an action of a vehicle during autonomous driving of the vehicle, action information indicating a first action that the vehicle is caused to execute. The driving assistance device acquires, from a detector that detects a surrounding situation and a travel state of the vehicle, detection information indicating a detection result. The driving assistance device determines a
(Continued)

second action which is executable in place of the first action, based on the detection information. The driving assistance device generates a first image representing the first action and a second image representing the second action. The driving assistance device outputs the first image and the second image to a notification device such that the first image and the second image are displayed within a fixed field of view of a driver of the vehicle.

19 Claims, 60 Drawing Sheets

(30) Foreign Application Priority Data

| Jun. 12, 2015 | (JP) | ................................ | 2015-119139 |
|---|---|---|---|
| Dec. 24, 2015 | (JP) | ................................ | 2015-252668 |
| Dec. 24, 2015 | (JP) | ................................ | 2015-252669 |
| Dec. 24, 2015 | (JP) | ................................ | 2015-252670 |
| Dec. 24, 2015 | (JP) | ................................ | 2015-252671 |
| Dec. 24, 2015 | (JP) | ................................ | 2015-252672 |
| Dec. 24, 2015 | (JP) | ................................ | 2015-252673 |
| Dec. 24, 2015 | (JP) | ................................ | 2015-252674 |

(51) Int. Cl.

| G06F 3/048 | (2013.01) |
|---|---|
| G05D 1/02 | (2006.01) |
| B60W 30/09 | (2012.01) |
| B60W 50/10 | (2012.01) |
| B60W 50/14 | (2012.01) |
| B60K 35/00 | (2006.01) |
| B60K 37/06 | (2006.01) |
| B60R 16/02 | (2006.01) |
| G01C 21/36 | (2006.01) |
| B60W 40/09 | (2012.01) |
| G01C 21/34 | (2006.01) |
| G05D 1/00 | (2006.01) |
| G08G 1/0968 | (2006.01) |
| B60W 30/18 | (2012.01) |
| G06K 9/00 | (2006.01) |
| G08G 1/0962 | (2006.01) |
| B60W 50/00 | (2006.01) |

(52) U.S. Cl.
CPC .......... *B60W 30/09* (2013.01); *B60W 30/182* (2013.01); *B60W 30/18163* (2013.01); *B60W 40/09* (2013.01); *B60W 50/08* (2013.01); *B60W 50/085* (2013.01); *B60W 50/14* (2013.01); *G01C 21/3484* (2013.01); *G01C 21/3605* (2013.01); *G01C 21/3617* (2013.01); *G05D 1/0061* (2013.01); *G05D 1/0088* (2013.01); *G05D 1/0223* (2013.01); *G05D 1/0257* (2013.01); *G06F 3/048* (2013.01); *G06K 9/00288* (2013.01); *G06K 9/00671* (2013.01); *G06K 9/00791* (2013.01); *G06K 9/00832* (2013.01); *G08G 1/0962* (2013.01); *G08G 1/096888* (2013.01); *B60K 2350/1084* (2013.01); *B60K 2350/965* (2013.01); *B60W 2050/0079* (2013.01); *B60W 2050/0089* (2013.01); *B60W 2050/146* (2013.01); *B60W 2520/10* (2013.01); *B60W 2540/04* (2013.01); *B60W 2540/10* (2013.01); *B60W 2540/12* (2013.01); *B60W 2540/18* (2013.01); *B60W 2540/20* (2013.01); *B60W 2550/10* (2013.01); *B60W 2720/10* (2013.01); *G05D 2201/0213* (2013.01)

(58) Field of Classification Search
CPC .......... B60W 50/14; B60W 30/18163; B60W 2050/0079; B60W 2050/205; B60W 2050/0089; B60W 2050/146; B60W 2520/10; B60W 2540/04; B60W 2540/10; B60W 2540/12; B60W 2540/18; B60W 2540/20; B60W 2550/10; B60W 2720/10; G05D 1/0257; G05D 1/0061; G05D 1/0088; G05D 1/0223; G05D 2201/0213; G06F 3/048; B60K 35/00; B60K 37/06; B60K 2350/1084; B60K 2350/965; B60R 16/02; G01C 21/3484; G01C 21/3605; G01C 21/3617; G06K 9/00288; G06K 9/00671; G06K 9/00791; G06K 9/00832; G08G 1/0962; G08G 1/096888

See application file for complete search history.

(56) References Cited

U.S. PATENT DOCUMENTS

| 8,352,110 | B1 * | 1/2013 | Szybalski | .............. B62D 1/286 |
|---|---|---|---|---|
| | | | | 701/23 |
| 9,274,525 | B1 * | 3/2016 | Ferguson | .............. G05D 1/0274 |
| 9,308,917 | B2 * | 4/2016 | Oh | .......................... B60W 30/16 |
| 9,395,192 | B1 * | 7/2016 | Silver | .............. G06K 9/00798 |
| 9,789,904 | B2 * | 10/2017 | Jecker | ................... B62D 15/025 |
| 9,804,597 | B1 * | 10/2017 | Ferguson | .............. G05D 1/0088 |
| 10,065,503 | B2 * | 9/2018 | Tauchi | ....................... B60R 1/00 |
| 2008/0258888 | A1 * | 10/2008 | Kubota | ...................... B60R 1/00 |
| | | | | 340/436 |
| 2013/0131906 | A1 * | 5/2013 | Green | ................... G05D 1/0055 |
| | | | | 701/23 |
| 2013/0147945 | A1 * | 6/2013 | Watanabe | .......... B62D 15/0295 |
| | | | | 348/118 |
| 2013/0179023 | A1 | 7/2013 | Schmidt | |
| 2013/0302756 | A1 | 11/2013 | Takeuchi et al. | |
| 2014/0244070 | A1 * | 8/2014 | Inagaki | ............... B62D 15/0285 |
| | | | | 701/1 |
| 2015/0127208 | A1 * | 5/2015 | Jecker | ................... B62D 15/025 |
| | | | | 701/23 |
| 2016/0231743 | A1 | 8/2016 | Bendewald et al. | |
| 2017/0106750 | A1 * | 4/2017 | Tauchi | ....................... B60R 1/00 |

FOREIGN PATENT DOCUMENTS

| EP | 2669109 A1 | 12/2013 |
|---|---|---|
| EP | 2806411 A1 | 11/2014 |
| JP | 2004-034917 A | 2/2004 |
| JP | 3583873 B2 | 11/2004 |
| JP | 2005-067483 A | 3/2005 |
| JP | 2007-198853 A | 8/2007 |
| JP | 2010-211380 A | 9/2010 |
| JP | 2012-113631 A | 6/2012 |
| WO | 2015/049231 A1 | 4/2015 |

OTHER PUBLICATIONS

Extended European Search Report, dated Mar. 6, 2018, for the related European Patent Application No. 16782788.0-1012 / 3269610, 8 pages.

Extended European Search Report, dated May 9, 2018, for the related European Patent Application No. 16782797.1-1012 / 3272613, 6 pages.

Extended European Search Report, dated May 28, 2018, for the related European Patent Application No. 16782787.2.

* cited by examiner

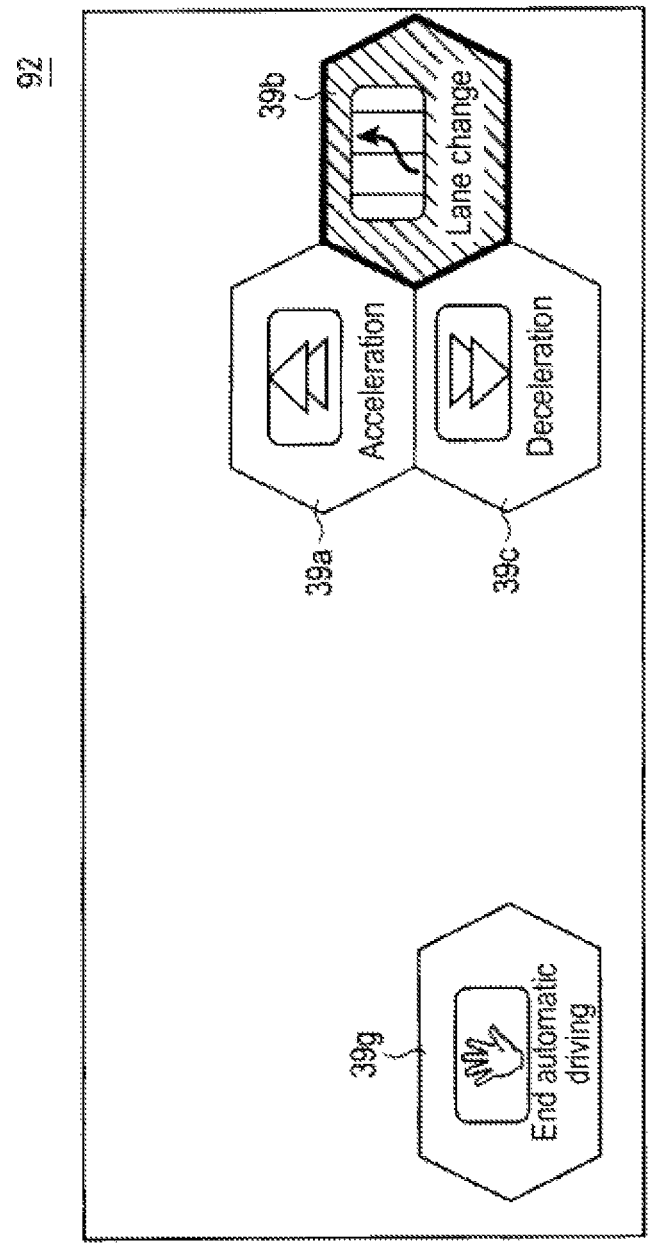

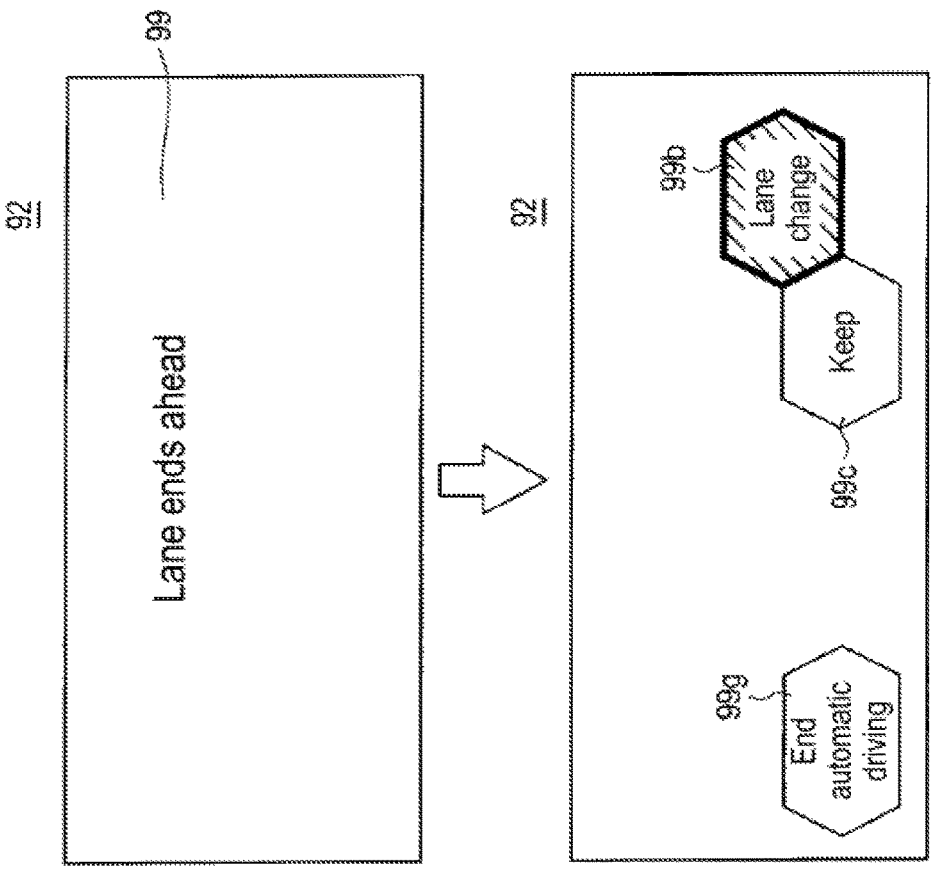
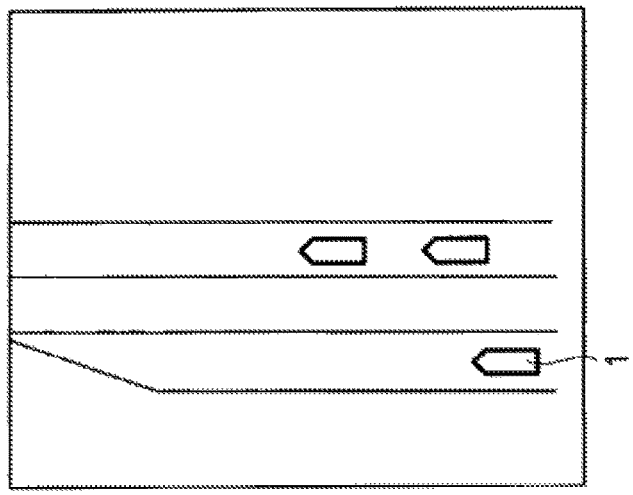

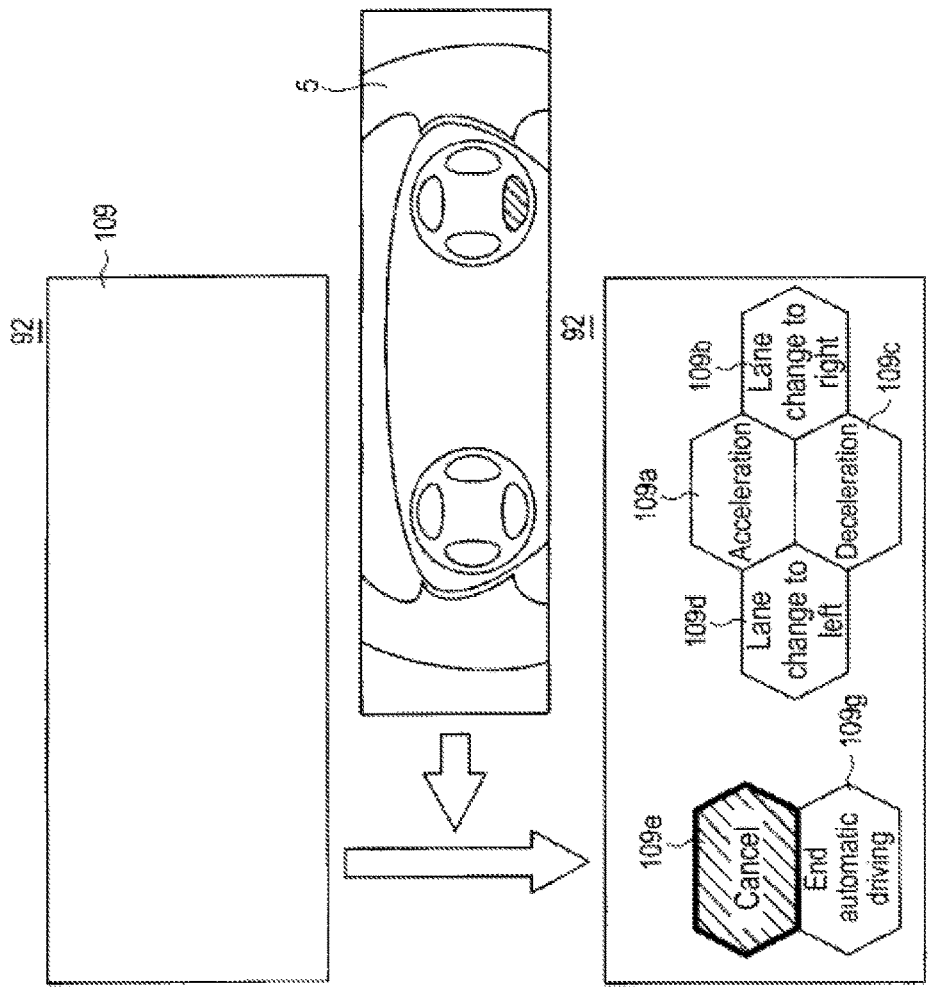
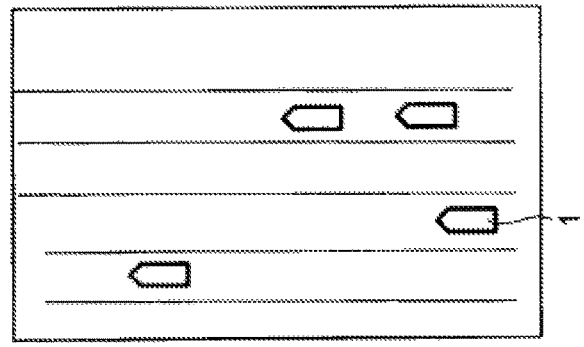

FIG. 16

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Driver x | 3 | 1 | 5 | 2 | 2 | 1 | ... |
| Driver y | 9 | 1 | 2 | 0 | 0 | 0 | ... |

FIG. 17

| | Travel environment | Approaching to merging lane | | | There is low-speed vehicle ahead | | | ... |
|---|---|---|---|---|---|---|---|---|
| | Behavior | Deceleration | Acceleration | Lane change | Follow | Overtake | Lane change | ... |
| Model A | Driver a | 3 | 1 | 5 | 1 | 1 | 5 | ... |
| Model A | Driver b | 4 | 2 | 7 | 2 | 0 | 3 | ... |
| Model A | Driver c | 3 | 2 | 2 | 1 | 2 | 8 | ... |
| Model B | Driver d | 5 | 2 | 2 | 5 | 2 | 2 | ... |
| Model B | Driver e | 7 | 2 | 2 | 5 | 0 | 3 | ... |
| Model B | Driver f | 5 | 2 | 5 | 4 | 1 | 1 | ... |
| | ... | ... | ... | ... | ... | ... | ... | ... |

FIG. 18

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Model A | 3.3 | 1.7 | 4.6 | 1.3 | 1 | 5.3 | ... |
| Model B | 5.7 | 2 | 3 | 4.7 | 1 | 2 | ... |

FIG. 19

| Travel environment | Approaching to merging lane | There is low-speed vehicle ahead | ... |
|---|---|---|---|
| Model A | Lane change | Lane change | ... |
| Model B | Deceleration | Follow | ... |

FIG. 20

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Driver a | 3 | 1 | 5 | 1 | 1 | 5 | ... |
| Driver b | 4 | 2 | 7 | 2 | 0 | 3 | ... |
| Driver c | 3 | 2 | 2 | 1 | 2 | 8 | ... |
| Driver d | 5 | 2 | 2 | 5 | 2 | 2 | ... |
| Driver e | 7 | 2 | 2 | 5 | 0 | 3 | ... |
| Driver f | 5 | 2 | 5 | 4 | 1 | 1 | ... |
| ... | ... | ... | ... | ... | ... | ... | ... |

Model of driver y

FIG. 21

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Model of driver y | 5 | 2 | 2 | 3.7 | 1.3 | 4.3 | ... |

FIG. 22

| | Behavior | Fellow passenger | Speed | Steering | Brake | Accelerator | ... | Number of times |
|---|---|---|---|---|---|---|---|---|
| Driver x | Lane change | None | 8 | 4 | 6 | 8 | ... | 80 |
| | Lane change | 1 adult and 2 children | 3 | 3 | 4 | 3 | ... | 40 |
| | Overtake | 1 adult | 5 | 7 | 5 | 5 | ... | 60 |
| | ... | ... | ... | ... | ... | ... | ... | ... |
| Driver y | Lane change | ... | ... | ... | ... | ... | ... | ... |
| | Overtake | ... | ... | ... | ... | ... | ... | ... |
| | ... | ... | ... | ... | ... | ... | ... | ... |
| ... | ... | ... | ... | ... | ... | ... | ... | ... |

FIG. 27

Driver x

| History | Behavior | Host vehicle information | Leading vehicle information | | | Environmental parameters | | | | | | | | | Location information | | |
|---|---|---|---|---|---|---|---|---|---|---|---|---|---|---|---|---|---|
| | | | | | | Adjacent lane information | | | | | | Merging lane information | | | | | |
| | | | | | | Adjacent following vehicle | | | Adjacent leading vehicle | | | | | | | | |
| | | Va | Vba | DRba | RSb | Vca | Dca | Rca | Vda | Dda | Rda | DRda | Vma | Dma | Rma | Travel lane | Distance to merging point | |
| (a) | Deceleration | 4 | 1 | 2 | 5 | 4 | 2 | 2 | 3 | 3 | 1 | 3 | 0 | 0 | 0 | 2 | 0 | ... |
| (b) | Lane change | 3 | 2 | 5 | 4 | 2 | 2 | 1 | 0 | 0 | 0 | 10 | 1 | 2 | 3 | 1 | 4 | ... |
| (c) | Deceleration | 3 | 2 | 5 | 4 | 3 | 1 | 3 | 3 | 1 | 3 | 2 | 2 | 2 | 2 | 1 | 4 | ... |
| ... | ... | ... | ... | ... | ... | ... | ... | ... | ... | ... | ... | ... | ... | ... | ... | ... | ... | ... |

FIG. 28A

| Behavior | Host vehicle information | Leading vehicle information | | | Adjacent lane information | | | | | | | Merging lane information | | | Location information | | |
|---|---|---|---|---|---|---|---|---|---|---|---|---|---|---|---|---|---|
| | | | | | Adjacent following vehicle | | | Adjacent leading vehicle | | | | | | | | | |
| | Va | Vba | DRba | RSb | Vca | Dca | Rca | Vda | Dda | Rda | DRda | Vma | Dma | Rma | Travel lane | Distance to merging point | ... |
| ??? | 3 | 3 | 5 | 4 | 1 | 2 | 1 | 0 | 0 | 0 | 9 | 1 | 2 | 3 | 1 | 4 | ... |

FIG. 28B

| History | Behavior | Host vehicle information | Leading vehicle information | | | Adjacent lane information | | | | | | | Merging lane information | | | Location information | | |
|---|---|---|---|---|---|---|---|---|---|---|---|---|---|---|---|---|---|---|
| | | | | | | Adjacent following vehicle | | | Adjacent leading vehicle | | | | | | | | | |
| | | Va | Vba | DRba | RSb | Vca | Dca | Rca | Vda | Dda | Rda | DRda | Vma | Dma | Rma | Travel lane | Distance to merging point | ... |
| (d) | Deceleration | 4 | 1 | 2 | 5 | 4 | 2 | 2 | 3 | 3 | 1 | 3 | 0 | 0 | 0 | 1 | 0 | ... |
| (e) | Lane change | 3 | 2 | 5 | 4 | 2 | 2 | 1 | 0 | 0 | 0 | 10 | 1 | 2 | 3 | 1 | 4 | ... |
| (f) | Deceleration | 3 | 2 | 5 | 4 | 3 | 1 | 3 | 3 | 1 | 3 | 2 | 2 | 2 | 2 | 1 | 4 | ... |
| ... | ... | ... | ... | ... | ... | ... | ... | ... | ... | ... | ... | ... | ... | ... | ... | ... | ... | ... |

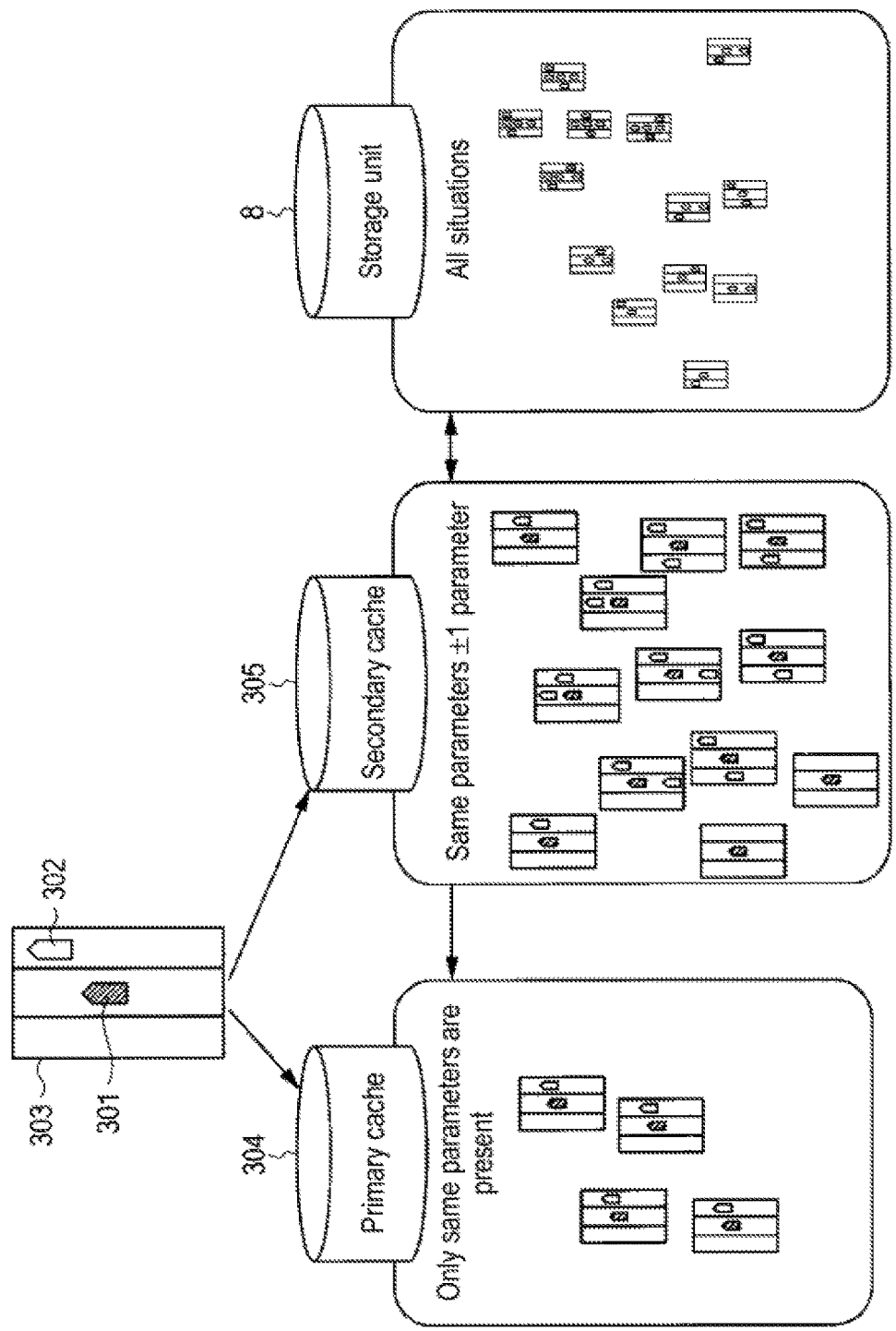

| | ① | ② | ③ | ④ | ⑤ | ⑥ | ⑦ | ⑧ | ⑨ | ... |
|---|---|---|---|---|---|---|---|---|---|---|
| Acceleration | 0 | 0 | 3 | 1 | 5 | 1 | 2 | 1 | 1 | 1 |
| Deceleration | 2 | 1 | 0 | 1 | 3 | 5 | 3 | 1 | 0 | 0 |
| Lane change | 0 | 0 | 0 | 2 | 3 | 2 | 0 | 0 | 0 | 0 |
| Overtake | 0 | 0 | 0 | 0 | 0 | 0 | 2 | 3 | 5 | 3 |

FIG. 34
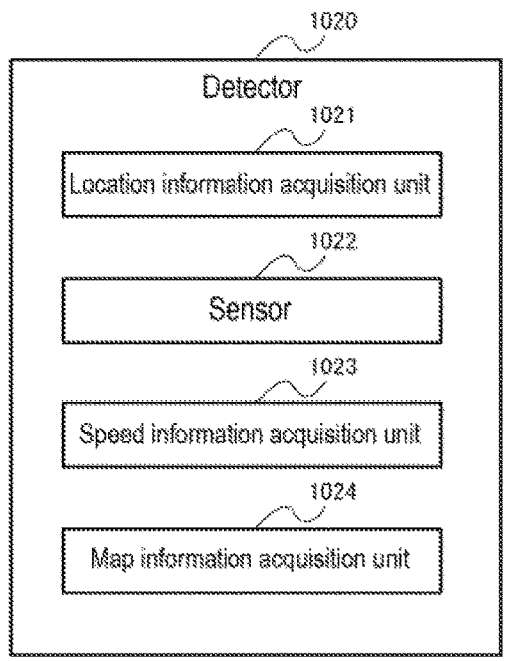
FIG. 35
| | Current action | Planned action | Remaining time |
|---|---|---|---|
| (Example) | Lane change to right | Acceleration | 10 seconds |
FIG. 36
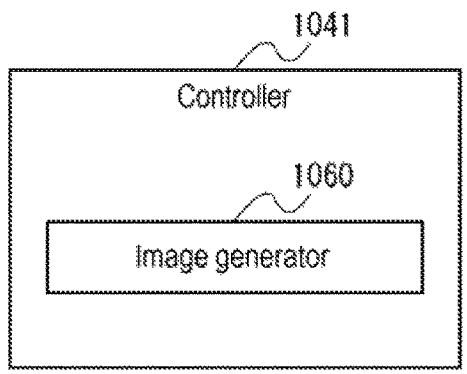

FIG. 43

| History | Action | Host vehicle information | Leading vehicle information | | | Environmental parameters | | | | | | | | | |
|---|---|---|---|---|---|---|---|---|---|---|---|---|---|---|---|
| | | | | | | Adjacent lane information | | | | | | Merging lane information | | | Location information |
| | | | | | | Adjacent following vehicle | | | Adjacent leading vehicle | | | | | | |
| | | Va | Vba | DRha | RSb | Vca | Dca | Rca | Vda | Dda | Rda | DRda | Vma | Dma Rma | Travel lane | Distance to merging point |
| (d) | Deceleration | 4 | 1 | 2 | 5 | 4 | 2 | 2 | 3 | 3 | 1 | 3 | 0 | 0 | 0 | 1 | 0 |
| (e) | Lane change | 3 | 2 | 5 | 4 | 2 | 2 | 1 | 0 | 0 | 0 | 10 | 1 | 2 | 3 | 1 | 4 |
| (f) | Lane change to right → acceleration → lane change to left | 3 | 2 | 5 | 4 | 3 | 1 | 3 | 3 | 1 | 3 | 2 | 2 | 2 | 2 | 1 | 4 |
| ... | ... | ... | ... | ... | ... | ... | ... | ... | ... | ... | ... | ... | ... | ... | ... | ... |

1070

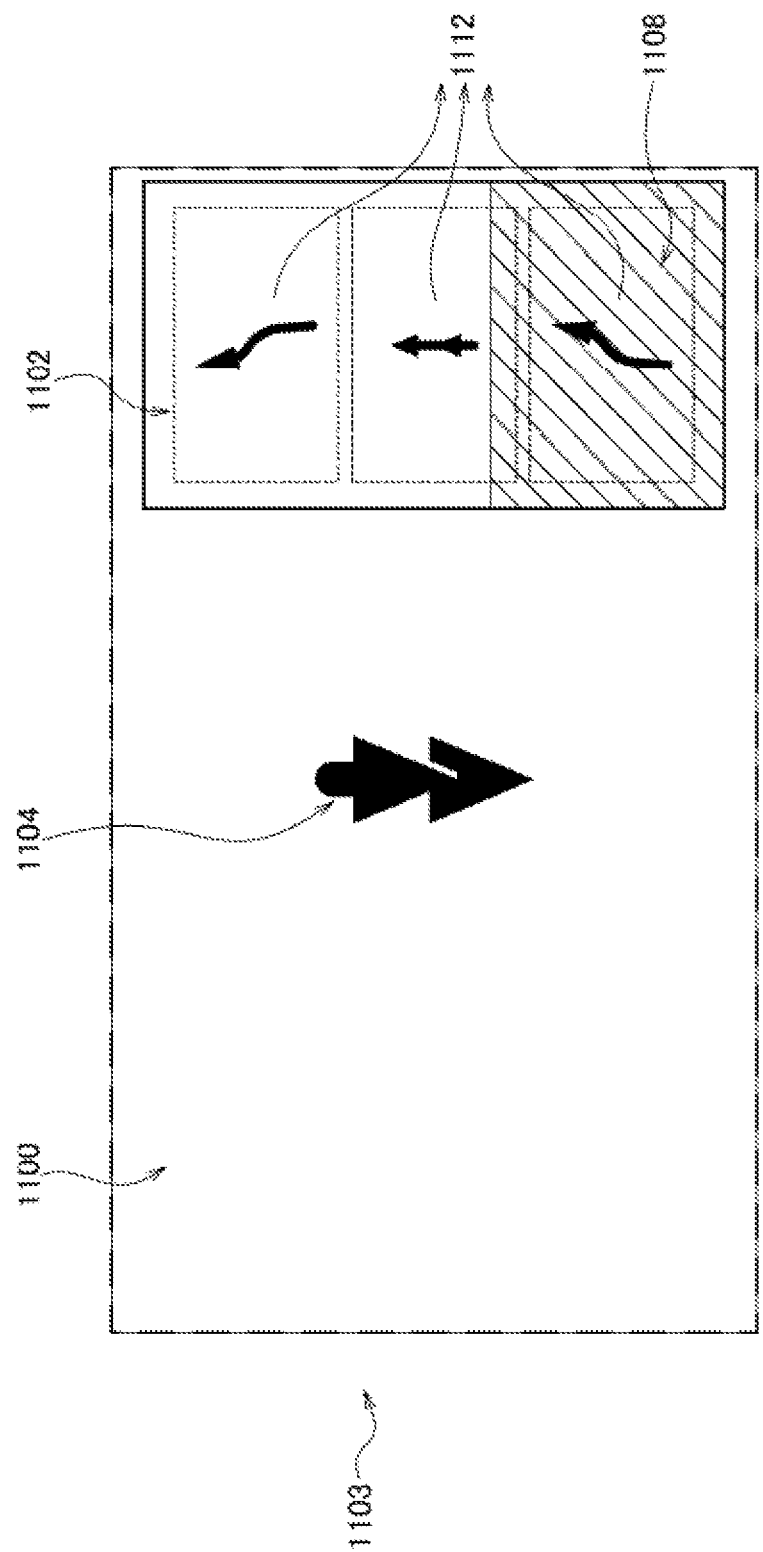

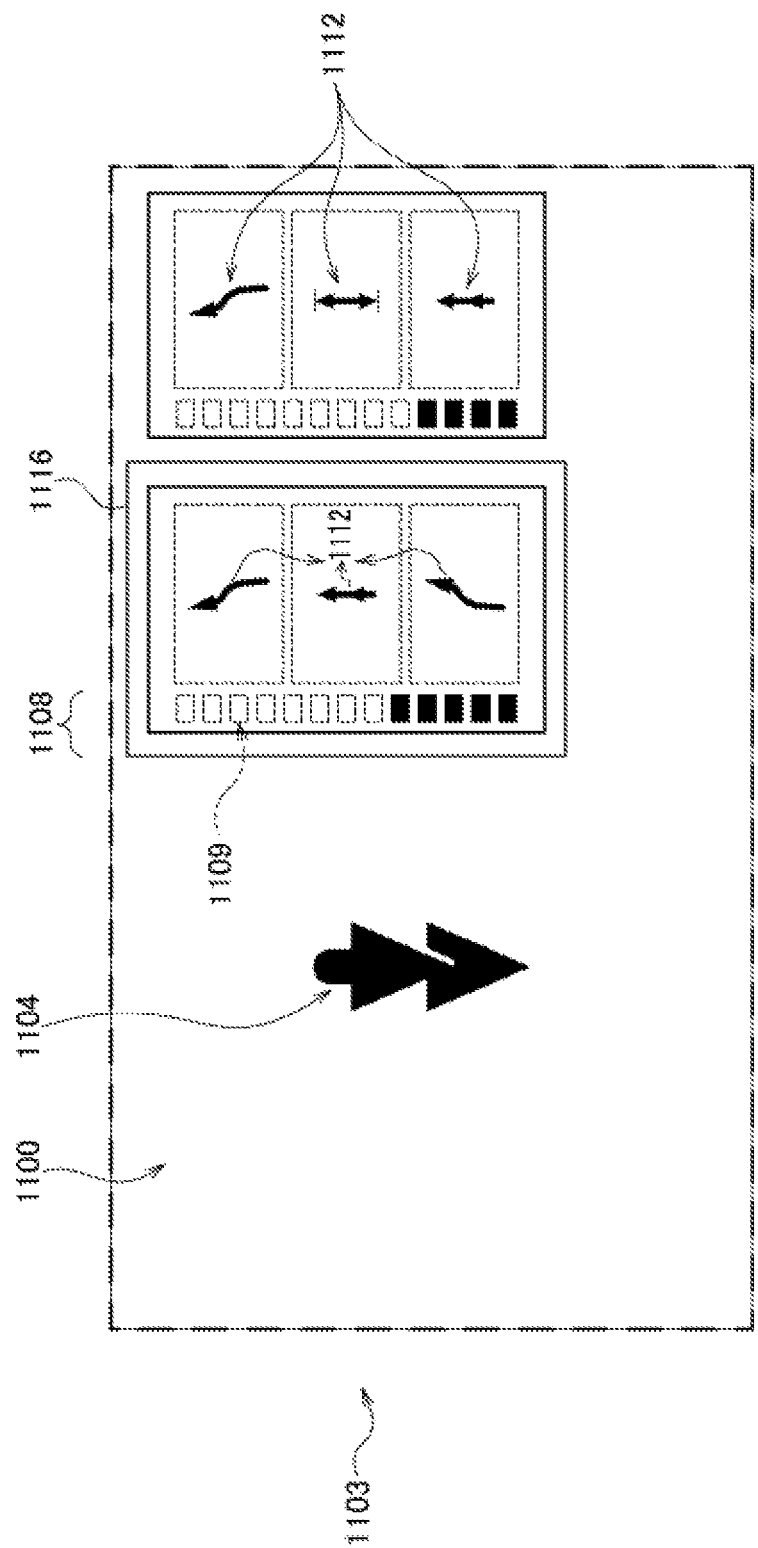

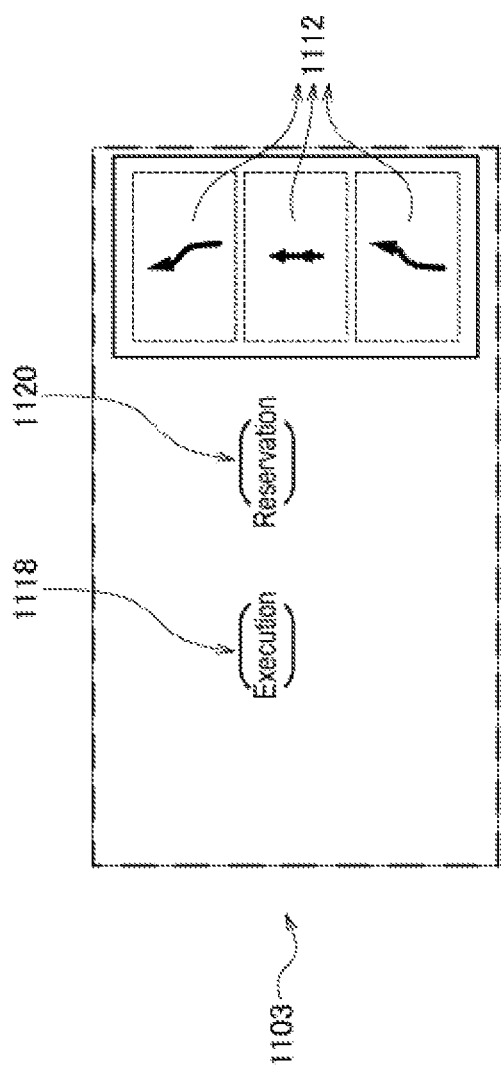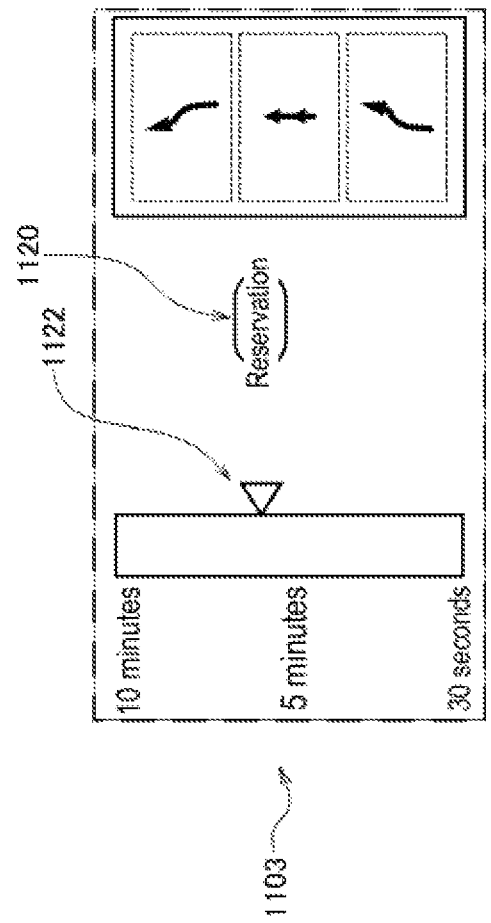

DRIVING ASSISTANCE METHOD, AND DRIVING ASSISTANCE DEVICE, DRIVING CONTROL DEVICE, VEHICLE, DRIVING ASSISTANCE PROGRAM, AND RECORDING MEDIUM USING SAID METHOD

This application is a U.S. national stage application of the PCT International Application No. PCT/JP2016/002049 filed on Apr. 15, 2016, which claims the benefit of foreign priority of Japanese patent application No. 2015-087069, 2015-099474, 2015-119139, filed on Apr. 21, 2015, May 14, 2015 and Jun. 12, 2015, and Japanese patent application No. 2015-252668, 2015-252669, 2015-252670, 2015-252671, 2015-252672, 2015-252673 and 2015-252674 filed on Dec. 24, 2015, the contents all of which are incorporated herein by reference.

TECHNICAL FIELD

The present invention relates to a vehicle, a driving assistance method applied to the vehicle, and a driving assistance device, a driving control device, and a driving assistance program using the driving assistance method.

BACKGROUND ART

Recently, there have been proposed various technologies relating to a vehicle which can be driven in a manual driving mode in which a driver oneself drives the vehicle or in an autonomous driving mode in which a portion of or all of driving operations are autonomously performed, or technologies relating to a fully automated self-driving vehicle, based on a surrounding situation of the vehicle or a travel state (for example, the speed of the vehicle or control information such as steering, acceleration, braking, turn signal indicator, or actuator) of the vehicle, and these technologies have been put into practical use.

For example, PTL 1 discloses a travel control device configured to, when performing, on a host vehicle, autonomous steering control or autonomous acceleration/deceleration control, allow a driver to visually recognize the operating state of the autonomous steering control or the autonomous acceleration/deceleration control.

CITATION LIST

Patent Literature

PTL 1: Unexamined Japanese Patent Publication No. 2005-67483

SUMMARY OF THE INVENTION

The present invention provides a driving assistance method in full autonomous driving or limited autonomous driving, and a driving assistance device, a driving control device, a vehicle, and a driving assistance program using such a driving assistance method.

A driving assistance device according to one aspect of the present invention includes an action information input unit, a detection information input unit, a candidate determination unit, an image generator, and an image output unit. The action information input unit acquires, from an autonomous driving controller that determines an action of a vehicle during autonomous driving of the vehicle, action information indicating a first action that the vehicle is caused to execute. The detection information input unit acquires, from a detector that detects a surrounding situation and a travel state of the vehicle, detection information indicating a detection result. The candidate determination unit determines a second action that the vehicle can be caused to execute after the first action indicated by the action information. The image generator generates a first image representing the first action indicated by the action information and a second image representing the second action. The image output unit outputs the first image and the second image to a display in the vehicle.

Another aspect of the present invention provides a driving control device. This device includes an autonomous driving controller, a detection information input unit, a candidate determination unit, an image generator, and an image output unit. The autonomous driving controller determines an action of a vehicle during autonomous driving of the vehicle. The detection information input unit acquires, from a detector that detects a surrounding situation and a travel state of the vehicle, detection information indicating a detection result. The candidate determination unit determines a second action that the vehicle can be caused to execute after a first action that the autonomous driving controller causes the vehicle to execute. The image generator generates a first image representing the first action and a second image representing the second action. The image output unit outputs the first image and the second image to a display in the vehicle.

Still another aspect of the present invention provides a vehicle. This vehicle includes an autonomous driving controller, a detection information input unit, a candidate determination unit, an image generator, and an image output unit. The autonomous driving controller determines an action of the vehicle during autonomous driving of the vehicle. The detector detects a surrounding situation and a travel state of the vehicle. The detection information input unit acquires detection information indicating a detection result. The candidate determination unit determines a second action that the vehicle can be caused to execute after a first action that the autonomous driving controller causes the vehicle to execute. The image generator generates a first image representing the first action and a second image representing the second action. The image output unit outputs the first image and the second image to a display in the vehicle such that the first image and the second image are displayed within a fixed field of view of a driver of the vehicle.

Yet another aspect of the present invention provides a driving assistance method. This method which is executed by a computer includes a step of acquiring action information, a step of acquiring detection information, a determining step, a step of generating an image, and a step of outputting the image to a display. In the step of acquiring action information, action information indicating a first action that a vehicle is caused to execute is acquired from an autonomous driving controller that determines an action of the vehicle during autonomous driving of the vehicle. In the step of acquiring detection information, detection information indicating a detection result is acquired from a detector that detects a surrounding situation and a travel state of the vehicle. In the determining step, a second action that the vehicle can be caused to execute after the first action indicated by the action information is determined based on the detection information. In the step of generating an image, a first image representing the first action indicated by the action information and a second image representing the second action are generated. In the step of outputting an image to a display, the first image and the second image are output to a display in the vehicle such that the first image and the second image are displayed within a fixed field of view of a driver of the vehicle.

Any desired combinations of the above described components and modifications of the features of the present invention in devices, systems, methods, computer programs, a non-transitory computer-readable recording media containing the computer programs, a vehicle having mounted thereto the present device, or other entities are still effective as other aspects of the present invention.

According to the present invention, information can appropriately be transmitted to an occupant from a vehicle so as to enable comfortable autonomous driving in which a vehicle operation and a driver's operation are difficult to be incompatible with each other in full autonomous driving or limited autonomous driving.

BRIEF DESCRIPTION OF DRAWINGS

FIG. 3 is a view illustrating another example of a display on the notification unit according to the first exemplary embodiment.

FIG. 9A is a view for describing a fourth example of a travel environment according to the first exemplary embodiment.

FIG. 9B is a view for describing display control for the fourth example of a travel environment according to the first exemplary embodiment.

FIG. 10A is a view for describing a fifth example of a travel environment according to the first exemplary embodiment.

FIG. 10B is a view for describing display control for the fifth example of a travel environment according to the first exemplary embodiment.

FIG. 16 is a diagram for describing one example of a travel history according to a fourth exemplary embodiment.

FIG. 17 is a diagram illustrating a method for constructing a clustering-type driver model according to the fourth exemplary embodiment.

FIG. 18 is a diagram illustrating one example of the constructed clustering-type driver model according to the fourth exemplary embodiment.

FIG. 19 is a diagram illustrating another example of the constructed clustering-type driver model according to the fourth exemplary embodiment.

FIG. 20 is a diagram illustrating a method for constructing an individually-adapted-type driver model according to the fourth exemplary embodiment.

FIG. 21 is a diagram illustrating one example of the constructed individually-adapted-type driver model according to the fourth exemplary embodiment.

FIG. 22 is a diagram for describing one example of a driving characteristic model according to the fourth exemplary embodiment.

FIG. 27 is a diagram for describing one example of a travel history according to the fourth exemplary embodiment.

FIG. 28A is a diagram illustrating a method for using a driver model in a modification of the driver model according to the fourth exemplary embodiment.

FIG. 28B is a diagram illustrating a method for using a driver model in the modification of the driver model according to the fourth exemplary embodiment.

FIG. 30 is a diagram illustrating one example of a method for generating a cache in the modification of the driver model according to the fourth exemplary embodiment.

FIG. 34 is a block diagram illustrating a detailed configuration of a detector in FIG. 32.

FIG. 35 is a diagram illustrating action information input from an autonomous driving control device according to the fifth exemplary embodiment of the present invention.

FIG. 36 is a block diagram illustrating a detailed configuration of a controller in a driving assistance device according to the fifth exemplary embodiment.

FIG. 43 is diagram schematically illustrating statistical information accumulated in a statistical information accumulation unit according to the sixth exemplary embodiment.

FIG. 49 is a view illustrating one example of an autonomous driving information screen according to the seventh exemplary embodiment of the present invention.

FIG. 52 is a view illustrating one example of an autonomous driving information screen according to the seventh exemplary embodiment.

FIG. 55A is a view illustrating one example of an autonomous driving information screen according to the seventh exemplary embodiment.

FIG. 55B is a view illustrating one example of an autonomous driving information screen according to the seventh exemplary embodiment.

DESCRIPTION OF EMBODIMENTS

Prior to describing exemplary embodiments of the present invention, problems of a conventional device will be briefly described. During autonomous driving (including both full autonomous driving and limited autonomous driving), a driver relies on a vehicle to autonomously drive, so that a trust relationship between the vehicle and the driver is significantly important, and it is necessary to transmit appropriate information between the vehicle and the driver (occupant). In PTL 1, a driver is notified of only a current operating state.

There arises a first problem in which the driver has a large amount of anxiety, if he/she is notified of only a current behavior (operating state or control content) of the vehicle and not notified of a behavior that the vehicle is about to perform (for example, a control content, such as a lane change, acceleration, or deceleration, which is about to be performed by the vehicle particularly before merging, before entering an intersection, when an emergency vehicle is close to the vehicle, or when nearby vehicles around the vehicle are about to do or have done a certain action), during autonomous driving.

In addition, there is a second problem as follows. During full autonomous driving, it is highly likely that the driver takes actions other than monitoring driving. Therefore, even when only the current operating state is suddenly displayed, the driver is unable to recognize the current surrounding situation of the vehicle or the travel state of the vehicle, and even if the driver tries to issue a driving instruction by his/her own will, he/she is unable to promptly respond, and he/she cannot smoothly give an instruction to the vehicle.

There is also a third problem in which the driver is notified of only the current operating state, and even if the driver tries to directly and manually drive the vehicle, the driving mode is not promptly switched from the autonomous driving to the manual driving.

In addition, there is a fourth problem as follows. Even if the vehicle takes the same action by the driver or an occupant, a timing of the action or an operation amount is different for each person, and it is likely to be deviated from a sense of the driver when the driver actually manually drives the vehicle. In the worst case, an unnecessary intervention performed by the driver may be induced during autonomous driving.

Hereinafter, exemplary embodiments of the present invention will be described in detail with reference to the drawings. Note that each of the exemplary embodiments described below is only illustrative, and does not limit the present invention.

First Exemplary Embodiment

Figure 1:
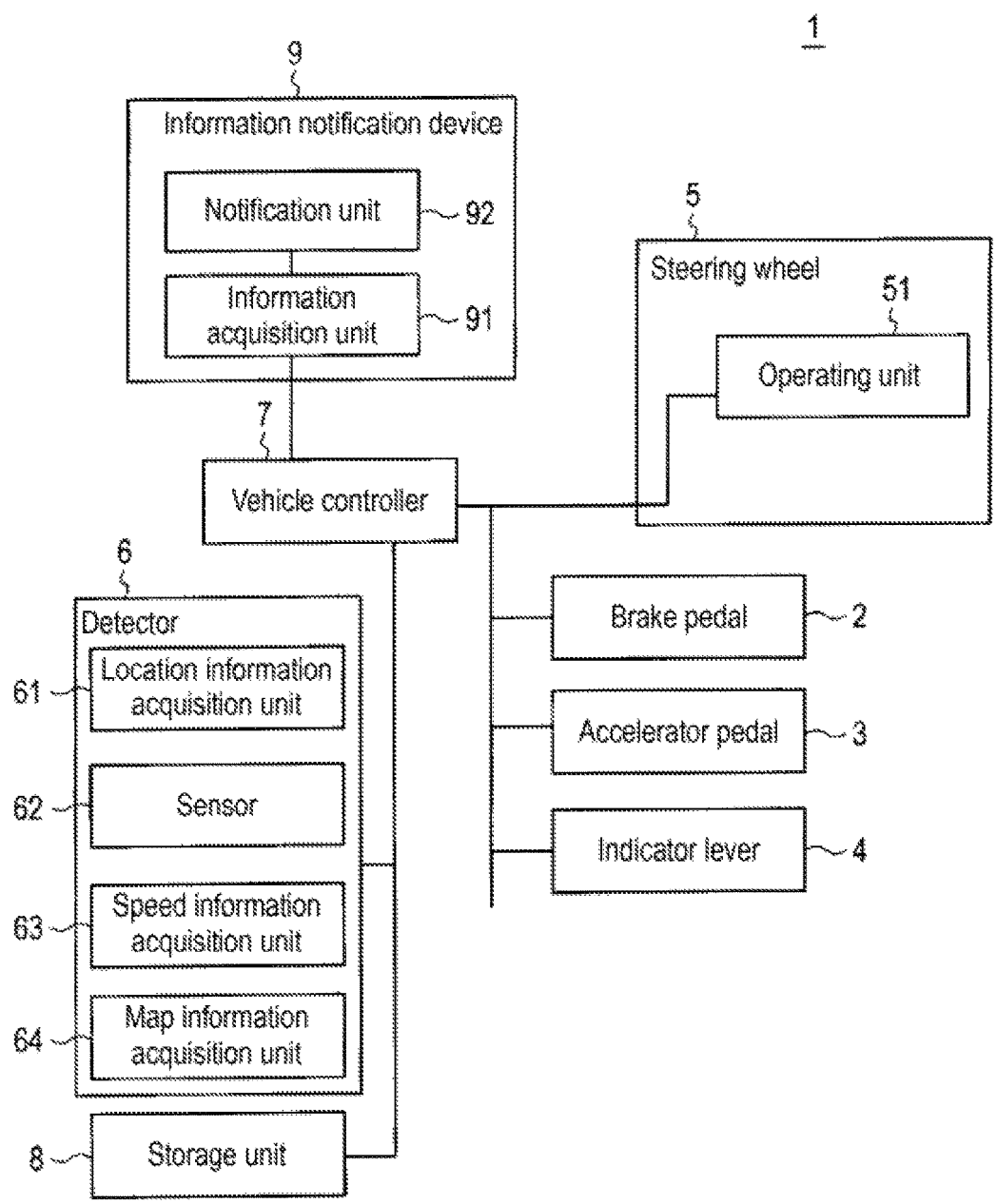
FIG. 1 is a block diagram illustrating a configuration of a main part of a vehicle including an information notification device according to a first exemplary embodiment of the present invention.

FIG. 1 is a block diagram illustrating a configuration of a main part of vehicle 1 including an information notification device according to the first exemplary embodiment of the present invention. Vehicle 1 enables all of or a portion of driving control autonomously without requiring an operation by a driver.

Vehicle 1 includes brake pedal 2, accelerator pedal 3, indicator lever 4, steering wheel 5, detector 6, vehicle controller 7, storage unit 8, and information notification device 9.

Brake pedal 2 receives a brake operation performed by the driver to decelerate vehicle 1. Brake pedal 2 may also receive a result of control performed by vehicle controller 7, and vary in an amount corresponding to the degree of deceleration of vehicle 1. Accelerator pedal 3 receives an acceleration operation performed by the driver to accelerate vehicle 1. Accelerator pedal 3 may also receive a control result by vehicle controller 7, and vary in an amount corresponding to the degree of acceleration of vehicle 1. Indicator lever 4 receives a lever operation performed by the driver to turn on an unillustrated turn indicator of vehicle 1. Indicator lever 4 may also receive a result of control performed by vehicle controller 7 to bring indicator lever 4 into a state corresponding to the indicated direction of vehicle 1 and turn on the unillustrated turn indicator of vehicle 1.

Steering wheel 5 receives a steering operation performed by the driver to change the travel direction of vehicle 1. Steering wheel 5 may also receive a result of control performed by vehicle controller 7, and vary in an amount corresponding to the change in the travel direction of vehicle 1. Steering wheel 5 is provided with operating unit 51.

Operating unit 51 is provided on a front face (face facing the driver) of steering wheel 5, and receives an input operation from the driver. Operating unit 51 is a device such as a button, a touch panel, or a grip sensor, for example. Operating unit 51 outputs the information about the input operation received from the driver to vehicle controller 7.

Detector 6 detects a travel state of vehicle 1 and a surrounding situation of vehicle 1. Then, detector 6 outputs information about the detected travel state and the surrounding situation to vehicle controller 7.

Detector 6 includes location information acquisition unit 61, sensor 62, speed information acquisition unit 63, and map information acquisition unit 64.

Location information acquisition unit 61 acquires, as the information about the travel state, information about the location of vehicle 1 by a global positioning system (GPS) or the like.

Sensor 62 detects the surrounding situation of vehicle 1, that is, the location of a nearby vehicle present around vehicle 1 and the determination of whether the other vehicle is a leading vehicle or not from information about the location of this vehicle and lane position information, a time to collision (TTC) from the speed of the nearby vehicle and the speed of vehicle 1, or an obstacle present around vehicle 1.

Speed information acquisition unit 63 acquires, as information about the travel state, information about the speed or the travel direction of vehicle 1 by an unillustrated speed sensor or the like.

Map information acquisition unit 64 acquires, as information about the surrounding situation of vehicle 1, map information around vehicle 1 such as the road on which vehicle 1 is traveling, a merging point with a nearby vehicle on the road, the lane in which vehicle 1 is currently traveling, a position of an intersection, or the like.

Note that sensor 62 includes a millimeter-wave radar, a laser radar, a camera, or a combination thereof.

Storage unit 8 is a storage device such as a read only memory (ROM), a random access memory (RAM), a hard disk drive, or a solid state drive (SSD), and stores a correspondence between the travel environment at present and a candidate of a behavior that can be performed next (after a lapse of a first predetermined time).

The travel environment at present is an environment determined based on the location of vehicle 1, the road on which vehicle 1 is traveling, the location and speed of a nearby vehicle present around vehicle 1, for example. Notably, for example, whether vehicle 1 is now accelerating or decelerating, and in addition, even a possibility of collision with a nearby vehicle after one second because of the nearby vehicle cutting in front of vehicle 1 may also be determined, according to the location or speed of the nearby vehicle, based on not only momentary data but also data before and after the moment. Thus, the action of the nearby vehicle can be predicted, whereby the travel environment can be recognized in more detail with higher accuracy. The behavior candidate is a candidate of a behavior that can be performed next by vehicle 1 (after a lapse of the first predetermined time) in response to the travel environment at present.

For example, storage unit 8 stores in advance three behavior candidates which are acceleration of vehicle 1, deceleration of vehicle 1, and lane change of vehicle 1 to the right, in association with a travel environment in which there is a merging lane ahead on the lane in which vehicle 1 is traveling, there is a vehicle merging from the left side of the lane, and it is possible to change lanes to the right relative to the lane in which vehicle 1 is traveling.

Storage unit 8 also stores in advance, in association with a travel environment in which a vehicle traveling in front of vehicle 1 in the same lane of vehicle 1 (hereinafter such a vehicle will be referred to as a "leading vehicle") is traveling with the speed lower than the speed of vehicle 1, and it is possible to change the lane to the adjacent lane, three behavior candidates which are a travel mode for overtaking the leading vehicle, a travel mode for changing the lane to the adjacent lane, and a travel mode for decelerating vehicle 1 to follow the leading vehicle.

In addition, storage unit 8 may store the priority order of each of the behavior candidates. For example, storage unit 8 may store the number of times each behavior has been actually used for the same previous travel environment, and may store such that the most frequently used behavior has a higher priority order.

Vehicle controller 7 can be implemented as a part of a large scale integration (LSI) circuit or an electronic control unit (ECU) controlling the vehicle, for example. Vehicle controller 7 controls the vehicle based on information about the travel state and the surrounding situation acquired from detector 6, and controls brake pedal 2, accelerator pedal 3, indicator lever 4, and information notification device 9 according to the result of the vehicle control. Note that the target to be controlled by vehicle controller 7 is not limited to those described above.

Firstly, vehicle controller 7 determines the travel environment at present based on the information about the travel state and the surrounding situation. Conventionally proposed various methods can be used for this determination.

For example, vehicle controller 7 determines the travel environment at present to be "a travel environment in which there is a merging lane ahead on the lane in which vehicle 1 is traveling, there is a vehicle merging from the left side of the lane, and it is possible to change the lane to the right relative to the lane in which vehicle 1 is traveling", based on the information about the travel state and the surrounding situation.

Further, vehicle controller 7 determines, for example, that the time sequence of the travel environment is a "travel environment in which a vehicle traveling in front of vehicle 1 in the same lane of vehicle 1 is traveling with the speed lower than the speed of vehicle 1, and it is possible to change the lane to the adjacent lane", based on the information about the travel state and the surrounding situation.

Vehicle controller 7 causes notification unit 92 of information notification device 9 to provide notification regarding information pertaining to the travel environment indicating the travel state and the surrounding situation. Vehicle controller 7 also reads, from storage unit 8, behavior candidates that can be performed next by vehicle 1 (after a lapse of the first predetermined time) in response to the determined travel environment.

Vehicle controller 7 determines which is the most suitable for the current travel environment from among the read behavior candidates, and sets the behavior most suitable for the current travel environment as a first behavior. Notably, the first behavior may be the same as the behavior the vehicle 1 is currently doing, that is, vehicle 1 may continue the current behavior. Then, vehicle controller 7 sets, as a second behavior (different from the behavior to be performed), the behavior candidate executable by the driver other than the first behavior in the current travel environment.

For example, vehicle controller 7 may set the most suitable behavior as the first behavior using a conventional technology for determining the most suitable behavior based on the information about the travel state and the surrounding situation.

Alternatively, vehicle controller 7 may set, from among a plurality of behavior candidates, a predefined behavior as the most suitable behavior, or vehicle controller 7 may store in storage unit 8 the information about the last selected behavior, and determine this behavior as the most suitable behavior. Alternatively, vehicle controller 7 may store in storage unit 8 the number of times each behavior has been previously selected, and determine the most frequently selected behavior as the most suitable behavior.

Then, vehicle controller 7 causes notification unit 92 of information notification device 9 to provide notification regarding the information about the first behavior and the second behavior. Note that, when vehicle controller 7 determines that there is no second behavior, vehicle controller 7 causes notification unit 92 to provide notification regarding only the first behavior.

It is to be noted that vehicle controller 7 may cause notification unit 92 to simultaneously provide notifications regarding the information about the first behavior and the second behavior and the information about the travel state and the surrounding situation.

In addition, vehicle controller 7 acquires information about the operation received by operating unit 51 from the driver. Vehicle controller 7 determines whether or not operating unit 51 has received an operation within a second predetermined time after the notification regarding the first behavior and the second behavior. This operation corresponds to an operation for selecting one of behaviors included in the second behavior, for example.

When operating unit 51 has not received an operation within the second predetermined time, vehicle controller 7 controls the vehicle such that the vehicle executes the first behavior, and controls brake pedal 2, accelerator pedal 3, and indicator lever 4 according to the vehicle control result.

When operating unit 51 has received an operation within the second predetermined time, vehicle controller 7 performs the control corresponding to the received operation.

Information notification device 9 acquires various information items pertaining to travel of vehicle 1 from vehicle controller 7, and provides notification regarding the acquired information. Information notification device 9 includes information acquisition unit 91 and notification unit 92.

Information acquisition unit 91 acquires various information items pertaining to travel of vehicle 1 from vehicle controller 7. For example, when determining that vehicle controller 7 may update the behavior of vehicle 1, information acquisition unit 91 acquires the information about the first behavior and the second behavior from vehicle controller 7.

Then, information acquisition unit 91 temporarily stores the acquired information in an unillustrated storage unit, and reads the stored information from the storage unit and outputs the read information to notification unit 92 as needed.

Notification unit 92 notifies the driver of the information pertaining to travel of vehicle 1. Notification unit 92 may be a display for displaying information, such as a light emitting element, e.g., a light emitting diode (LED), provided on a car navigation system, a head-up display, a center display, steering wheel 5, or a pillar in the vehicle interior. Notification unit 92 may be a speaker for notifying the driver of information by converting the information into a voice/sound. Notification unit 92 may be a vibrator provided on a position (for example, a seat for the driver, steering wheel 5, and the like) where the driver can sense the vibration. In addition, notification unit 92 may be a combination of these elements.

In the following description, notification unit 92 is for transmitting information, and corresponds to notification device 1002 in FIG. 32 described later.

In this case, notification unit 92 is a head up display (HUD), a liquid crystal display (LCD), a head-mounted display or a helmet-mounted display (HMD), smart glasses, and other exclusive displays. HUD may be a windshield of vehicle 1, or a glass surface or a plastic surface (for example, combiner) separately provided, for example. Further, the windshield may be a front windscreen, or a side windscreen, or a rear windscreen of vehicle 1, for example.

In addition, the HUD may be a transmissive display provided on the surface or the inside of the windshield. Herein, the transmissive display is a transmissive organic electroluminescence (EL) display or a transparent display using a glass that emits light when being irradiated with light of a specific wavelength. The driver can visually recognize the display on the transmissive display while viewing a background. As described above, notification unit 92 may be a display medium that transmits light. In any case, an image is displayed on notification unit 92.

Notification unit 92 notifies the driver of the information pertaining to travel acquired from vehicle controller 7 through information acquisition unit 91. For example, notification unit 92 notifies the driver of the information about the first behavior and the second behavior acquired from vehicle controller 7.

Hereinafter, a specific display content and an operation performed on operating unit 51 will be described.

Figure 2B:
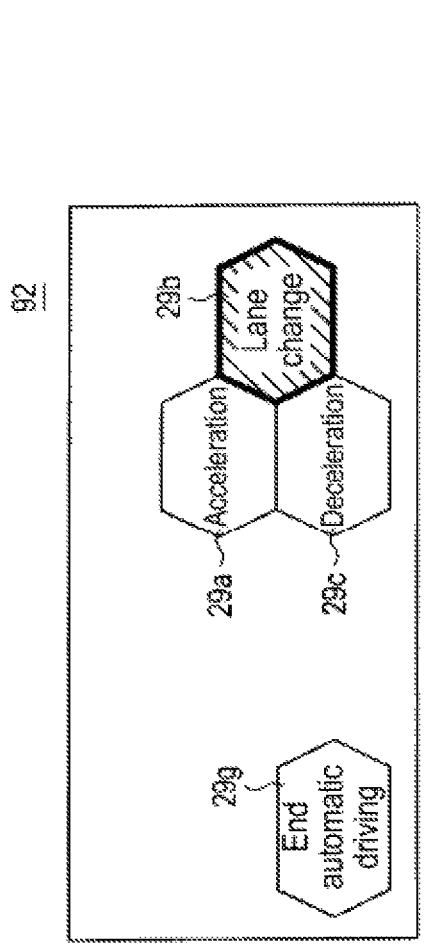
FIG. 2B is a view for describing a display on a notification unit relative to the first example of a travel environment according to the first exemplary embodiment.
Figure 2C:
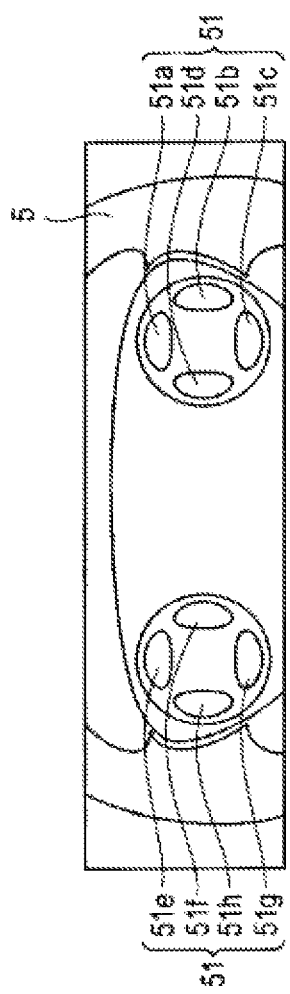
FIG. 2C is a view for describing an operation on an operating unit relative to the first example of a travel environment according to the first exemplary embodiment.
Figure 2A:
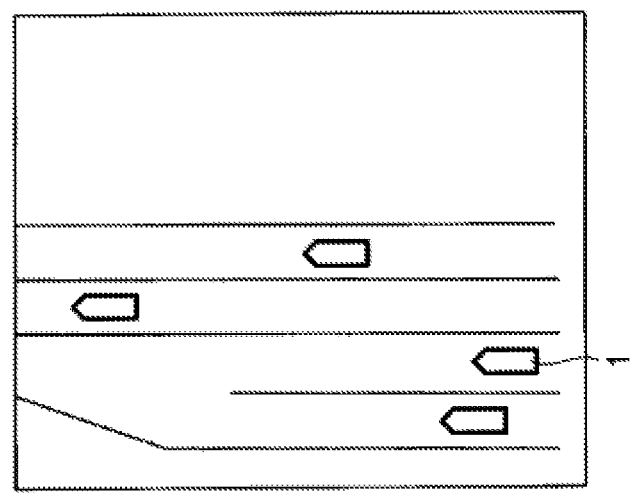
FIG. 2A is a view for describing a first example of a travel environment according to the first exemplary embodiment.

FIGS. 2A to 2C are views for describing a first example of a travel environment, a display on notification unit 92 for the first example, and an operation to operating unit 51.

FIG. 2A is an overhead view illustrating the travel environment of vehicle 1. Specifically, FIG. 2A illustrates a travel environment in which there is a merging lane ahead on the lane in which vehicle 1 is traveling, there is a vehicle merging from the left side of the lane, and it is possible to change lanes to the right relative to the lane in which vehicle 1 is traveling.

Vehicle controller 7 determines that the travel environment is the one illustrated in FIG. 2A based on the information about the travel state and the surrounding situation. Note that vehicle controller 7 may generate the overhead view illustrated in FIG. 2A, and may cause notification unit 92 to provide notification regarding the generated overhead view in addition to the information about the first behavior and the second behavior.

FIG. 2B illustrates one example of the display on notification unit 92 in response to the travel environment illustrated in FIG. 2A. In a display range of notification unit 92, options involved with the behavior of vehicle 1 are displayed on the right, and information for switching from autonomous driving to manual driving is displayed on the left.

The first behavior is "lane change" displayed in highlighted display region 29b in display regions 29a to 29c and 29g. The second behavior is "acceleration" and "deceleration" respectively displayed in display regions 29a and 29c. In addition, "end autonomous driving" indicating that the driving mode is switched from autonomous driving to manual driving is displayed in display region 29g.

FIG. 2C illustrates one example of operating unit 51 provided on steering wheel 5. Operating unit 51 includes operation buttons 51a to 51d provided on the right side of steering wheel 5 and operation buttons 51e to 51h provided on the left side of steering wheel 5. Note that the number, shape, and other conditions of operating units 51 provided to steering wheel 5 are not limited to those described above.

In the present exemplary embodiment, display regions 29a to 29c illustrated in FIG. 2B correspond to operation buttons 51a to 51c, respectively, and display region 29g corresponds to operation button 51g.

In this configuration, when selecting any one of contents displayed in each display region, the driver presses the operation button corresponding to each display region. For example, to select the behavior of "acceleration" displayed in display region 29a, the driver presses operation button 51a.

Although only character information is displayed in each display region in FIG. 2B, a symbol or an icon involved with drive of the vehicle may be displayed as described next. According to this configuration, the driver can recognize the display content at a glance.

FIG. 3 is a view illustrating another example of a display on notification unit 92. As illustrated in FIG. 3, character information and symbols indicating the information are both displayed in display regions 39a to 39c and 39g. Note that only symbols may be displayed.

Next, a display control flow will be described, using a specific travel environment as one example.

Figure 4:
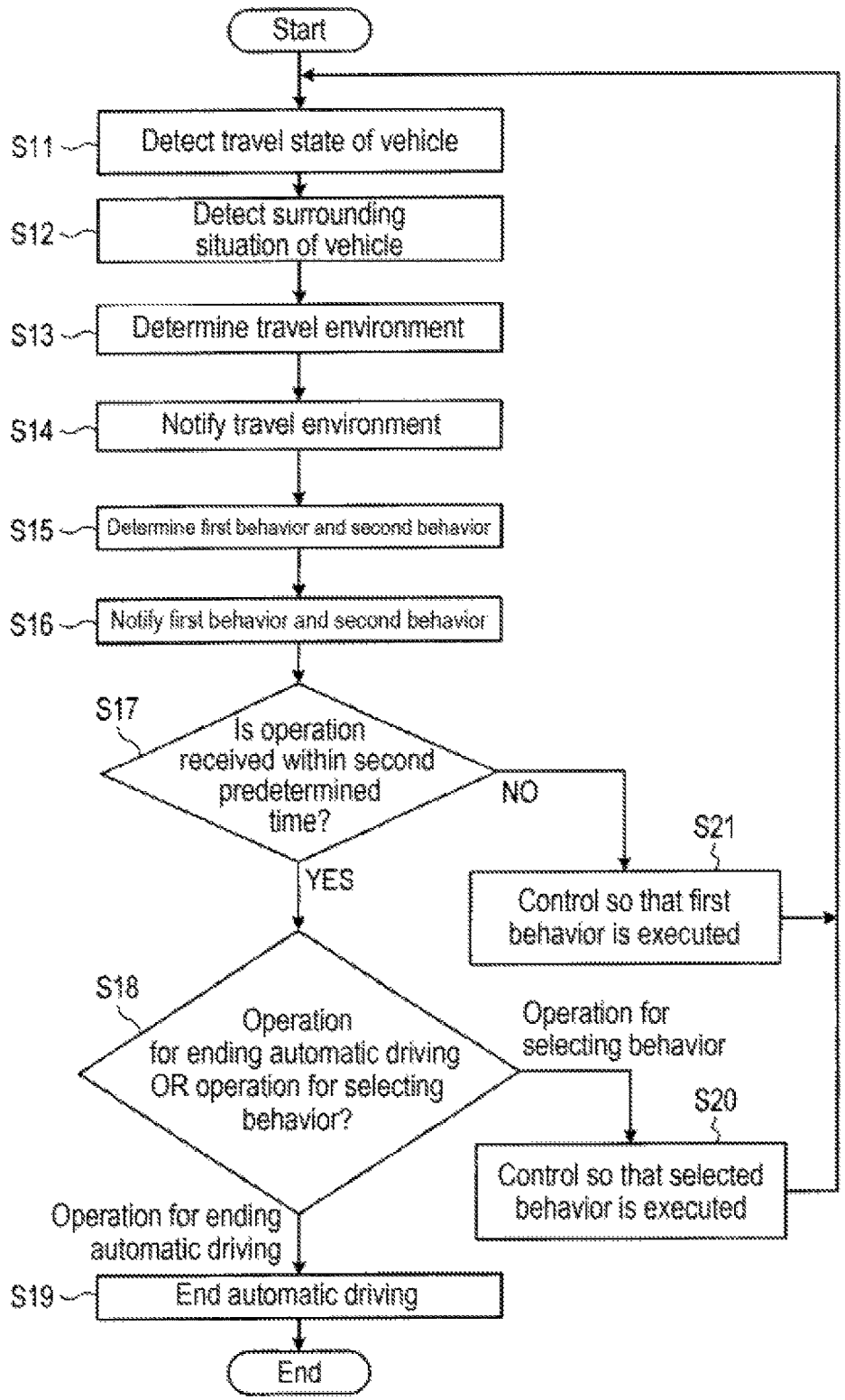
FIG. 4 is a flowchart illustrating a procedure of an information notification process according to the first exemplary embodiment.
Figure 5B:
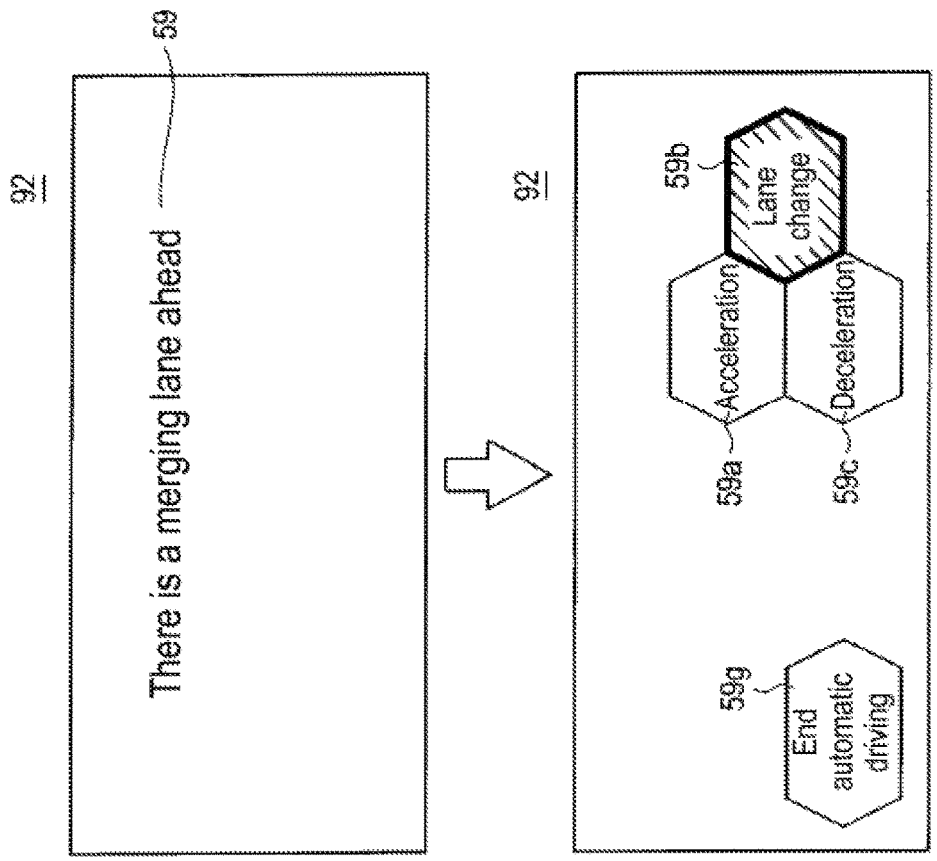
FIG. 5B is a view for describing display control for the first example of a travel environment according to the first exemplary embodiment.
Figure 5A:
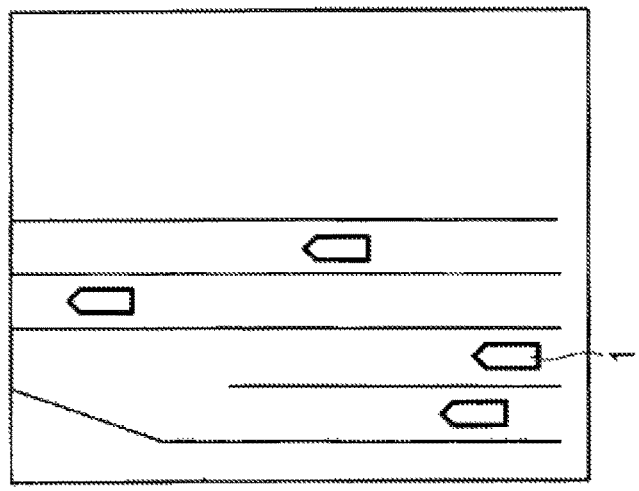
FIG. 5A is a view for describing the first example of a travel environment according to the first exemplary embodiment.

FIG. 4 is a flowchart illustrating a procedure of an information notification process according to the present exemplary embodiment. FIG. 5A is a view illustrating the first example of the travel environment, and FIG. 5B is a view illustrating display control for this environment.

As illustrated in FIG. 4, detector 6 detects the travel state of the vehicle (step S11). Then, detector 6 detects the surrounding situation of the vehicle (step S12). Detector 6 outputs to vehicle controller 7 the information about the travel state of the vehicle and the surrounding situation of the vehicle which have been detected.

Next, vehicle controller 7 determines the travel environment at present based on the information about the travel state and the surrounding situation (step S13). In the example in FIG. 5A, vehicle controller 7 determines the travel environment at present to be "a travel environment in which there is a merging lane ahead on the lane in which vehicle 1 is traveling, there is a vehicle merging from the left side of the lane, and it is possible to change lanes to the right relative to the lane in which vehicle 1 is traveling".

Then, vehicle controller 7 causes notification unit 92 of information notification device 9 to provide notification regarding the information about the determined travel environment (step S14). In the example in FIG. 5B, vehicle controller 7 outputs the information about the determined travel environment to information acquisition unit 91. Notification unit 92 acquires the information about the travel environment from information acquisition unit 91, and displays the acquired information as character information 59. Notably, vehicle controller 7 may cause a speaker or the like to notify the driver, with a voice/sound, of the information about the travel environment, instead of causing notification unit 92 to display the information about the travel environment. Accordingly, the information can reliably be transmitted to the driver, even if the driver does not see or fails to see the display or a monitor.

Next, vehicle controller 7 determines whether or not there is a possibility of updating the behavior for the determined travel environment. When determining that there is a possibility of updating, vehicle controller 7 then determines the first behavior and the second behavior (step S15). Whether or not there is a possibility of updating the behavior for the travel environment is determined based on whether or not the travel environment has been changed. Conceivable behaviors to be executed after the updating include decelerating the vehicle because of a possibility of collision between the vehicle and a nearby vehicle or the like, changing the speed when a leading vehicle disappears in adaptive cruise control (ACC), and changing lanes when the adjacent lane is vacant, for example. Whether or not to perform updating is determined using the conventional technology.

In this case, vehicle controller 7 reads, from storage unit 8, the behavior candidates that can be performed next by vehicle 1 (after a lapse of the first predetermined time) in response to the determined travel environment. Then, vehicle controller 7 determines which is the most suitable for the current travel environment from among the read behavior candidates, and sets the behavior most suitable for the current travel environment as a first behavior. Thereafter, vehicle controller 7 sets the behavior candidates excluding the first behavior as the second behavior.

In the example in FIG. 5B, vehicle controller 7 reads, from storage unit 8, three behavior candidates which are acceleration of vehicle 1, deceleration of vehicle 1, and lane change of vehicle 1 to the right. Then, vehicle controller 7 determines that the lane change of vehicle 1 to the right is the most suitable behavior based on the speed of the vehicle merging from the left and the condition of the right lane of vehicle 1, and sets this behavior as the first behavior. Thereafter, vehicle controller 7 sets the behavior candidates excluding the first behavior as the second behavior.

Next, vehicle controller 7 causes notification unit 92 of information notification device 9 to provide notification regarding the first behavior and the second behavior (step S16). In the example in FIG. 5B, notification unit 92 displays character information of "lane change" which is the information about the first behavior in display region 59b in a highlighted manner, and displays "acceleration" and "deceleration", which are the information about the second behavior, in display regions 59a and 59c, respectively.

Next, vehicle controller 7 determines whether or not operating unit 51 receives an operation from the driver within a second predetermined time (step S17).

For example, vehicle controller 7 sets, as the first predetermined time, the time from when vehicle controller 7 determines that the travel environment at present is the one illustrated in FIG. 5A until vehicle 1 reaches the merging point. Vehicle controller 7 then sets a second predetermined time shorter than the first predetermined time as a time in which the operation for the behavior to be executed next before the merging point can be received.

When operating unit 51 has received the operation from the driver within the second predetermined time (YES in step S17), vehicle controller 7 determines whether the received operation is an operation for ending autonomous driving or a behavior selecting (in other words, updating) operation (step S18).

As described with reference to FIG. 2C, each of the display regions of notification unit 92 corresponds to a corresponding one of the operation buttons of operating unit 51. When selecting "end autonomous driving" in FIG. 5B, the driver presses operation button 51g illustrated in FIG. 2C. When performing behavior selection, the driver presses any one of operation buttons 51a to 51c illustrated in FIG. 2C.

When the operation received by operating unit 51 is an operation for ending autonomous driving (that is, when the depression of operation button 51g is detected), vehicle controller 7 ends autonomous driving (step S19). When the operation received by operating unit 51 is the operation for behavior selection (that is, the depression of any one of operation buttons 51a to 51c is detected), vehicle controller 7 controls vehicle 1 such that vehicle 1 performs the behavior corresponding to the depressed operation button (step S20).

When operating unit 51 has not received any operation performed by the driver within the second predetermined time (NO in step S17), vehicle controller 7 controls vehicle 1 such that vehicle 1 performs the first behavior (step S21).

Figure 6B:
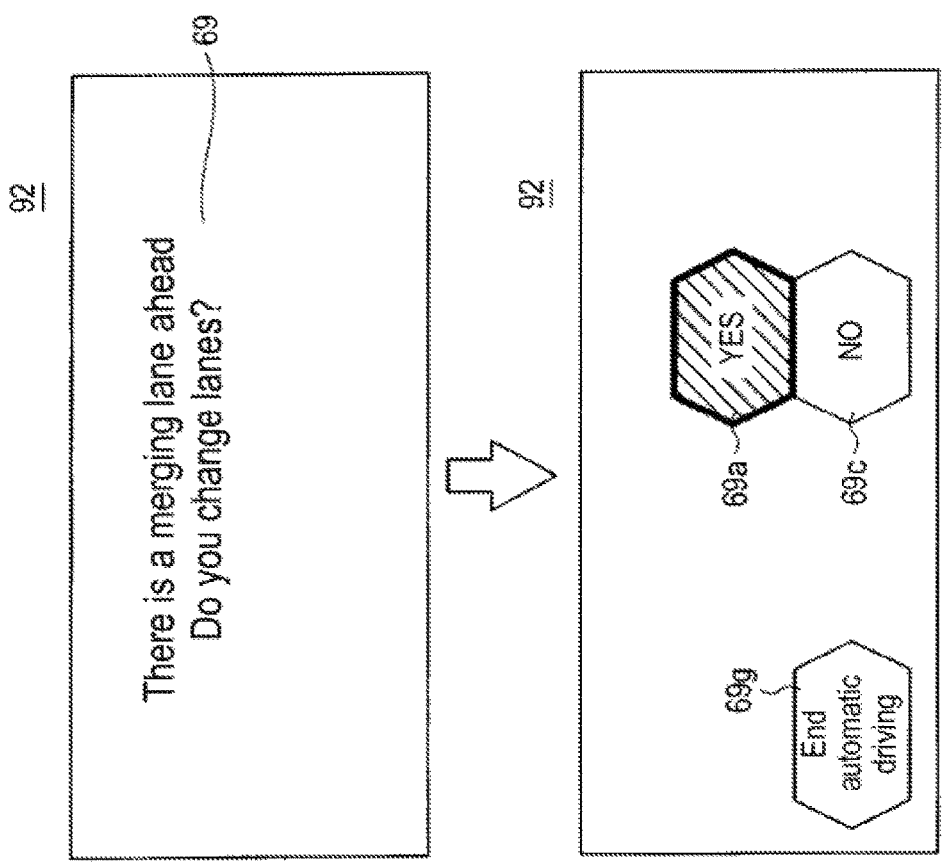
FIG. 6B is a view for describing another display control for the first example of a travel environment according to the first exemplary embodiment.
Figure 6A:
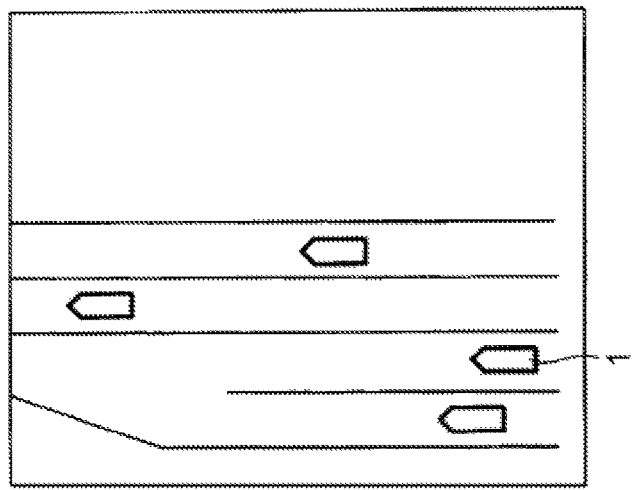
FIG. 6A is a view for describing the first example of a travel environment according to the first exemplary embodiment.

FIG. 6A is a view illustrating the first example of the travel environment, and FIG. 6B is a view illustrating another display control for this environment. FIG. 6A is similar to FIG. 5A, but the display control in FIG. 6B is different from the display control in FIG. 5B.

As in the case described with reference to FIG. 5B, vehicle controller 7 reads, from storage unit 8, three behavior candidates which are acceleration of vehicle 1, deceleration of vehicle 1, and lane change of vehicle 1 to the right, in response to the travel environment illustrated in FIG. 6A.

In this case, it is supposed that storage unit 8 stores the lane change of vehicle 1 to the right as the behavior with the highest priority.

In this case, vehicle controller 7 causes notification unit 92 to provide notification regarding the information about the travel environment and the information about the first behavior. In FIG. 6B, vehicle controller 7 creates character information 69 indicating the information about the travel environment and the information about the first behavior, and causes notification unit 92 to display character information 69.

Then, vehicle controller 7 displays, in display regions 69a and 69c, displays for encouraging the driver to determine whether to use the first behavior. Vehicle controller 7 also displays, in display region 69g, the display of "end autonomous driving" indicating that the driving is switchable from autonomous driving to manual driving.

In this case, vehicle controller 7 displays "YES" corresponding to using the first behavior in a highlighted manner. Which one of "YES" and "NO" is displayed in a highlighted manner may be set in advance, the last selected option may be displayed in a highlighted manner, or storage unit 8 may store the number of times each behavior has been previously selected and notification unit 92 may display the most frequently selected behavior in a highlighted manner.

By learning the previously selected behavior in this way, vehicle controller 7 can appropriately notify the driver of information. In addition, the display to be displayed on notification unit 92 can be less than the display in FIG. 5B, whereby the burden on the driver can be reduced.

Figure 7A:
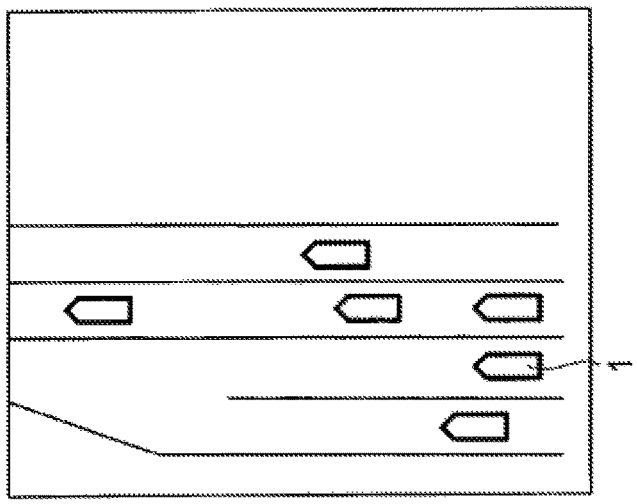
FIG. 7A is a view for describing a second example of a travel environment according to the first exemplary embodiment.
Figure 7B:
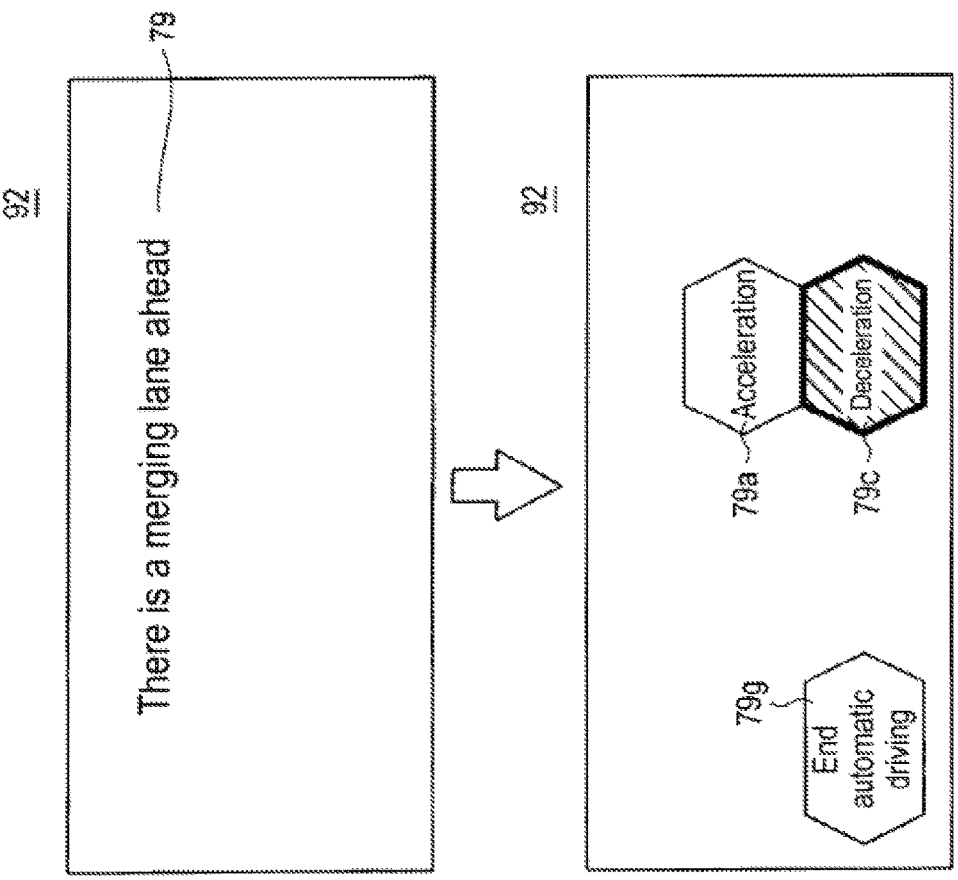
FIG. 7B is a view for describing display control for the second example of a travel environment according to the first exemplary embodiment.

FIG. 7A is a view illustrating a second example of the travel environment, and FIG. 7B is a view illustrating display control for this environment. FIG. 7A is an overhead view illustrating the travel environment. The travel environment illustrated in FIG. 7A is similar to those in FIGS. 5A and 6A in that there is a merging lane ahead, but different from those in FIGS. 5A and 6A in that there is a traveling vehicle on the right of vehicle 1. In such a case, vehicle controller 7 determines that it is impossible to change lanes.

When determining that the travel environment of vehicle 1 is the one illustrated in FIG. 7A, vehicle controller 7 causes notification unit 92 to display information about the determined travel environment as character information 79 as illustrated in FIG. 7B.

Further, vehicle controller 7 selects only acceleration of vehicle 1 and deceleration of vehicle 1 from among three behavior candidates read from storage unit 8, which are acceleration of vehicle 1, deceleration of vehicle 1, and lane change of vehicle 1 to the right, because the lane change of vehicle 1 to the right is impossible.

In addition, vehicle controller 7 predicts that vehicle 1 becomes too close to the merging vehicle if vehicle 1 is traveling with the current speed, and determines that the deceleration of vehicle 1 is the most suitable behavior, that is, the first behavior.

In this case, which is the most suitable behavior among the three behavior candidates is determined using a conventional technology for determining the most suitable behavior based on the information about the travel state and the surrounding situation. Alternatively, which is the most suitable behavior may be determined in advance, or vehicle controller 7 may store the information about the last selected behavior in storage unit 8, and determine this behavior as the most suitable behavior. Alternatively, vehicle controller 7 may store in storage unit 8 the number of times each behavior has been previously selected, and determine the most frequently selected behavior as the most suitable behavior.

Thereafter, vehicle controller 7 displays "deceleration" in display region 79c as the first behavior, and displays "acceleration" in display region 79a as the second behavior. Vehicle controller 7 also displays, in display region 79g, the display of "end autonomous driving" indicating that the driving is switched from autonomous driving to manual driving.

With this display control, vehicle controller 7 can notify the driver of the behavior most suitable for the travel environment as the first behavior according to the travel environment.

The information about the first behavior may be disposed on an upper side, the information about the second behavior may be disposed on a lower side, and functions of selecting the first behavior and the second behavior may be assigned to operation buttons 51a and 51c, respectively. Alternatively, the information about the acceleration behavior may be disposed on an upper side, the information about the deceleration behavior may be disposed on a lower side, the information about the behavior of the lane change to the right may be disposed on a right side, the information about the behavior of the lane change to the left may be disposed on a left side, and functions of selecting the acceleration behavior, the deceleration behavior, the behavior of the lane change to the right, and the behavior of the lane change to the left may be assigned to operation buttons 51a, 51c, 51b, and 51d, respectively. Alternatively, these displays may be switchable, and whether priority is placed on action or priority is placed on operation may be displayed separately. In addition, the display size of the first behavior information may be larger, and the display size of the second behavior information may be smaller. It is to be noted that, when behavior information display is arranged corresponding to the behavior in the front-rear direction and left-right direction of the vehicle, the driver is capable of having intuitive recognition and operation.

Next, an example of a travel environment other than the travel environment where there is a merging lane ahead will be described.

Figures 8A, 8B:
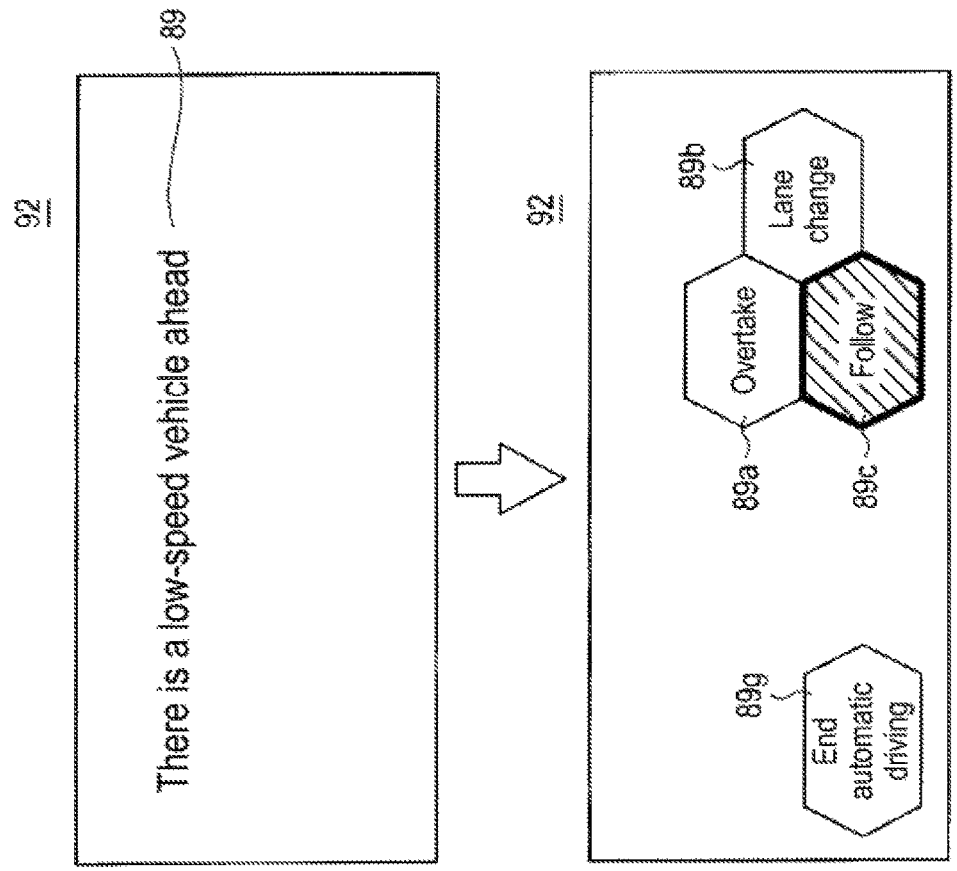
FIG. 8A is a view for describing a third example of a travel environment according to the first exemplary embodiment.
FIG. 8B is a view for describing display control for the third example of a travel environment according to the first exemplary embodiment.

FIG. 8A is a view illustrating a third example of the travel environment, and FIG. 8B is a view illustrating display control for this environment. FIG. 8A is an overhead view illustrating the travel environment of vehicle 1. Specifically, FIG. 8A illustrates the travel environment where a leading vehicle is traveling with a speed lower than the speed of vehicle 1, and a lane change to the adjacent lane is possible.

Vehicle controller 7 determines that the travel environment is the one illustrated in FIG. 8A based on the information about the travel state and the surrounding situation. In this case, vehicle controller 7 causes notification unit 92 to display the information about the determined travel environment as character information 89.

Vehicle controller 7 also reads, as behavior candidates corresponding to the determined travel environment, three behavior candidates which are a travel mode for overtaking the leading vehicle, a travel mode for performing a lane change to the adjacent lane, and a travel mode for decelerating vehicle 1 to follow the leading vehicle, from storage unit 8.

For example, vehicle controller 7 determines that the travel mode for decelerating vehicle 1 to follow the leading vehicle is the most suitable behavior, that is, the first behavior, because the speed of the leading vehicle after deceleration is higher than a predetermined value and is allowable.

In this case, which is the most suitable behavior among the three behavior candidates is determined using a conventional technology for determining the most suitable behavior based on the information about the travel state and the surrounding situation. Alternatively, which is the most suitable behavior may be determined in advance, or vehicle controller 7 may store the information about the last selected behavior in storage unit 8, and determine this behavior as the most suitable behavior. Alternatively, vehicle controller 7 may store in storage unit 8 the number of times each behavior has been previously selected, and determine the most frequently selected behavior as the most suitable behavior.

Vehicle controller 7 also displays character information of "follow" indicating the first behavior in display region 89c in a highlighted manner, and character information items of "overtake" and "lane change" indicating the second behavior in display regions 89a and 89b, respectively, as illustrated in FIG. 8B. Vehicle controller 7 also displays, in display region 89g, the display of "end autonomous driving" indicating that the driving is switched from autonomous driving to manual driving.

The information about the first behavior may be disposed on an upper side, the information about the second behavior may be disposed on a lower side, and functions of selecting the first behavior and the second behavior may be assigned to operation buttons 51a and 51c, respectively. Alternatively, the information about the overtaking behavior may be disposed on an upper side, the information about the following behavior may be disposed on a lower side, the information about the behavior of the lane change to the right may be disposed on a right side, the information about the behavior of the lane change to the left may be disposed on a left side, and functions of selecting the overtaking behavior, the following behavior, the behavior of the lane change to the right, and the behavior of the lane change to the left may be assigned to operation buttons 51a, 51c, 51b, and 51d, respectively. Alternatively, these displays may be switchable, and whether priority is placed on action or priority is placed on operation may be displayed separately. In addition, the display size of the first behavior information may be larger, and the display size of the second behavior information may be smaller.

FIG. 9A is a view illustrating a fourth example of the travel environment, and FIG. 9B is a view illustrating display control for this environment. FIG. 9A is an overhead view illustrating the travel environment of vehicle 1. Specifically, FIG. 9A illustrates the travel environment where the lane in which vehicle 1 is traveling ends ahead.

Vehicle controller 7 determines that the travel environment is the one illustrated in FIG. 9A based on the information about the travel state and the surrounding situation. In this case, vehicle controller 7 causes notification unit 92 to display the information about the determined travel environment as character information 99.

Vehicle controller 7 also reads, as behavior candidates corresponding to the determined travel environment, two behavior candidates which are a travel mode for performing a lane change to the adjacent lane, and a travel mode for keeping traveling in the current lane, from storage unit 8.

For example, vehicle controller 7 determines that the travel mode for performing a lane change to the adjacent lane is the most suitable behavior, that is, the first behavior, because TTC to the point where the lane ends is shorter than a predetermined value.

In this case, which is the most suitable behavior between the two behavior candidates is determined using a conventional technology for determining the most suitable behavior based on the information about the travel state and the surrounding situation. Alternatively, which is the most suitable behavior may be determined in advance, or vehicle controller 7 may store the information about the last selected behavior in storage unit 8, and determine this behavior as the most suitable behavior. Alternatively, vehicle controller 7 may store in storage unit 8 the number of times each behavior has been previously selected, and determine the most frequently selected behavior as the most suitable behavior.

Vehicle controller 7 also displays character information of "lane change" indicating the first behavior in display region 99*b* in a highlighted manner, and character information of "keep" indicating the second behavior in display region 99*c*, as illustrated in FIG. 9B. Vehicle controller 7 also displays, in display region 99*g*, the display of "end autonomous driving" indicating that the driving is switched from autonomous driving to manual driving.

The information about the first behavior may be disposed on an upper side, the information about the second behavior may be disposed on a lower side, and functions of selecting the first behavior and the second behavior may be assigned to operation buttons 51*a* and 51*c*, respectively; information about a behavior of doing nothing may be disposed on a lower side, the information about the behavior of lane change to the right may be disposed on a right side, the information about the behavior of lane change to the left may be disposed on a left side, and functions of selecting the behavior of doing nothing, the behavior of lane change to the right, and the behavior of lane change to the left may be assigned to operation buttons 51*c*, 51*b*, and 51*d*, respectively; or these displays may be switchable, and whether priority is placed on action or priority is placed on operation may be displayed separately. In addition, the display size of the first behavior information may be larger, and the display size of the second behavior information may be smaller. Notably, due to the configuration in which a different function is assigned to each display region depending on a different travel environment as illustrated in FIGS. 7B, 8B, and 9B, notification of information or operation is enabled with fewer regions.

It has been described above that vehicle controller 7 causes notification unit 92 to provide notification regarding a behavior according to the information about the travel environment and surrounding situation. However, the present invention is not limited thereto. For example, it may be configured such that vehicle controller 7 causes notification unit 92 to provide notification regarding a behavior when the driver performs a predetermined operation.

FIG. 10A is a view illustrating a fifth example of the travel environment, and FIG. 10B is a view illustrating display control for this environment. FIG. 10A is an overhead view illustrating the travel environment of vehicle 1. Specifically, FIG. 10A illustrates the travel environment where vehicle 1 can change lanes to the left and right.

FIG. 10A illustrates the travel environment where, different from the travel environments illustrated in FIGS. 5A to 9A, vehicle 1 can travel in a normal way without requiring a lane change or acceleration and deceleration of the vehicle. In this case, vehicle controller 7 may cause notification unit 92 not to display the information about the travel environment as character information as indicated by display 109 in FIG. 10B.

When the driver depresses any of the operation buttons on operating unit 51 under the above-described condition where character information is not displayed on notification unit 92, vehicle controller 7 reads the behavior candidates in a normal travel from storage unit 8.

Specifically, storage unit 8 stores four behavior candidates which are acceleration of vehicle 1, deceleration of vehicle 1, lane change of vehicle 1 to the right, and lane change of vehicle 1 to the left, in association with the travel environment of normal travel as illustrated in FIG. 10A. Vehicle controller 7 reads these behavior candidates, and causes notification unit 92 to display these behavior candidates in display regions 109*a* to 109*d*, respectively.

In addition, vehicle controller 7 displays the display of "end autonomous driving" indicating that the driving is switched from autonomous driving to manual driving in display region 109*g*, and a display of "cancel" indicating that updating of the behavior is canceled in display region 109*e* in a highlighted manner.

The present exemplary embodiment described above can effectively notify the driver of the behavior candidates to be executed next, thereby enabling the driver to select more preferable behavior.

Note that the driver may directly perform a manual operation on the steering wheel or the like, instead of selecting the behavior he/she desires to do. Thus, the driver can quickly switch to a manual driving operation according to his/her intention.

In the present exemplary embodiment described above, character information is displayed on notification unit 92. However, the present invention is not limited thereto. For example, information may be displayed using a symbol indicating the behavior for enabling the driver to visually recognize the information. Hereinafter, a display using a symbol for enabling the driver to visually recognize information will be described, using the displays in FIGS. 5B and 7B as one example.

Figure 11:
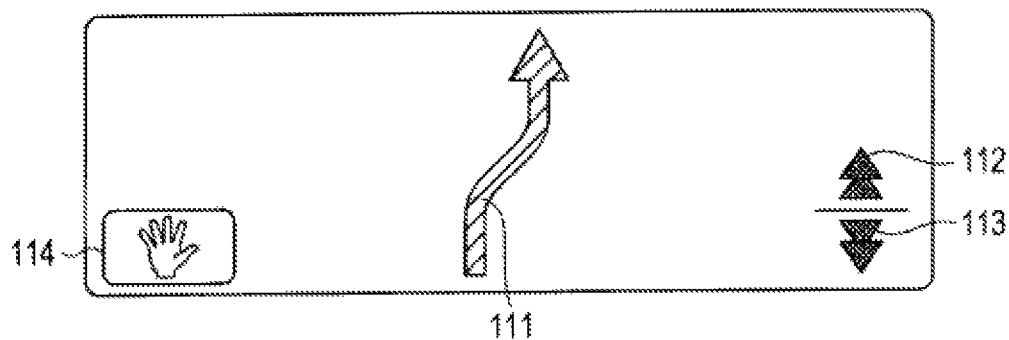
FIG. 11 is a view for describing another display control for the first example of a travel environment illustrated in FIG. 5A.

FIG. 11 is a view for describing another display control for the first example of the travel environment illustrated in FIG. 5A. In this example, the above-described first behavior is a lane change of vehicle 1 to the right, and the second behavior is acceleration of vehicle 1 and deceleration of vehicle 1.

In this case, symbol 111 indicating "lane change" which is the first behavior is displayed bigger on the center, and symbol 112 indicating "acceleration of vehicle 1" and symbol 113 indicating "deceleration of vehicle 1" which are the second behavior are displayed smaller on the right. In addition, symbol 114 indicating ending of autonomous driving is displayed smaller on the left.

If an instruction for changing the behavior of vehicle 1 is not received from the driver, the lane change is performed.

Figure 12A:
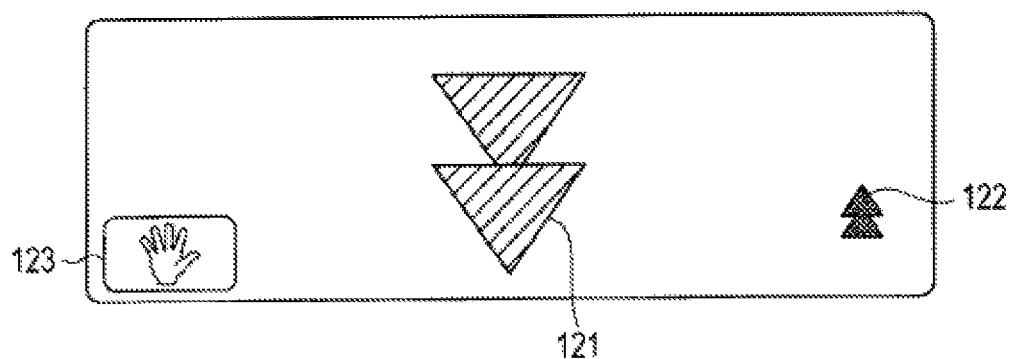
FIG. 12A is a view for describing another display control for the second example of a travel environment illustrated in FIG. 7A.
Figure 12B:
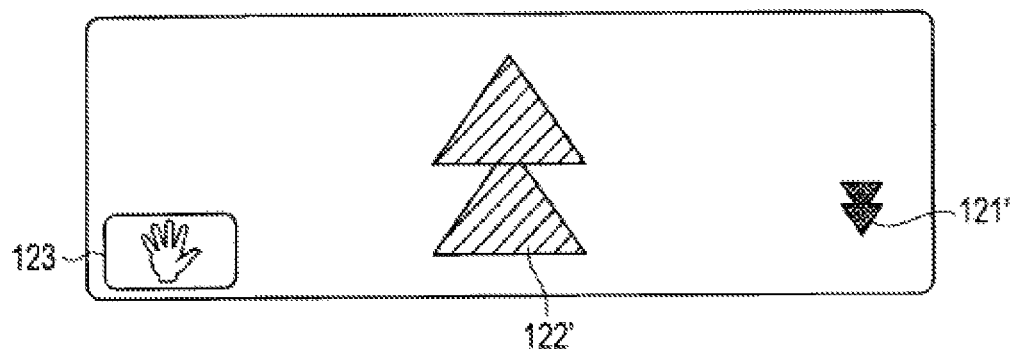
FIG. 12B is a view for describing another display control for the second example of a travel environment illustrated in FIG. 7A.

FIGS. 12A and 12B are views for describing another display control for the second example of the travel environment illustrated in FIG. 7A. In this example, different from the first example, a lane change is impossible because a nearby vehicle is traveling on the right of vehicle 1. Therefore, "deceleration of vehicle 1" is set as the first behavior, and "acceleration of vehicle 1" is set as the second behavior, for example.

In this case, as illustrated in FIG. 12A, symbol 121 indicating "deceleration of vehicle 1" which is the first behavior is displayed bigger on the center, and symbol 122 indicating "acceleration of vehicle 1" which is the second behavior is displayed smaller on the right. In addition, symbol 123 indicating ending of autonomous driving is displayed smaller on the left.

It is supposed here that operating unit 51 receives an operation for selecting "acceleration of vehicle 1" from the driver. In this case, as illustrated in FIG. 12B, symbol 122' indicating "acceleration of vehicle 1" which is the first behavior is displayed bigger on the center, and symbol 121' indicating "deceleration of vehicle 1" which is the second behavior is displayed smaller on the right.

The present exemplary embodiment described above can effectively notify the driver of the behavior candidates to be executed next, thereby enabling the driver to select more preferable behavior. On the other hand, the driver can recognize the behaviors to be executed by vehicle 1 or other selectable behaviors, thereby being capable of continuing autonomous driving with a sense of security. Alternatively, the driver can smoothly issue an instruction to the vehicle.

In addition, according to the present exemplary embodiment, the options notified by the notification unit, that is, the second behavior, can be variable according to the travel environment.

Second Exemplary Embodiment

The first exemplary embodiment has described the configuration in which an operation according to the display on notification unit 92 is performed using operating unit 51 provided on steering wheel 5. The present exemplary embodiment describes a configuration in which a touch panel is provided in place of operating unit 51 provided on steering wheel 5.

Figure 13:
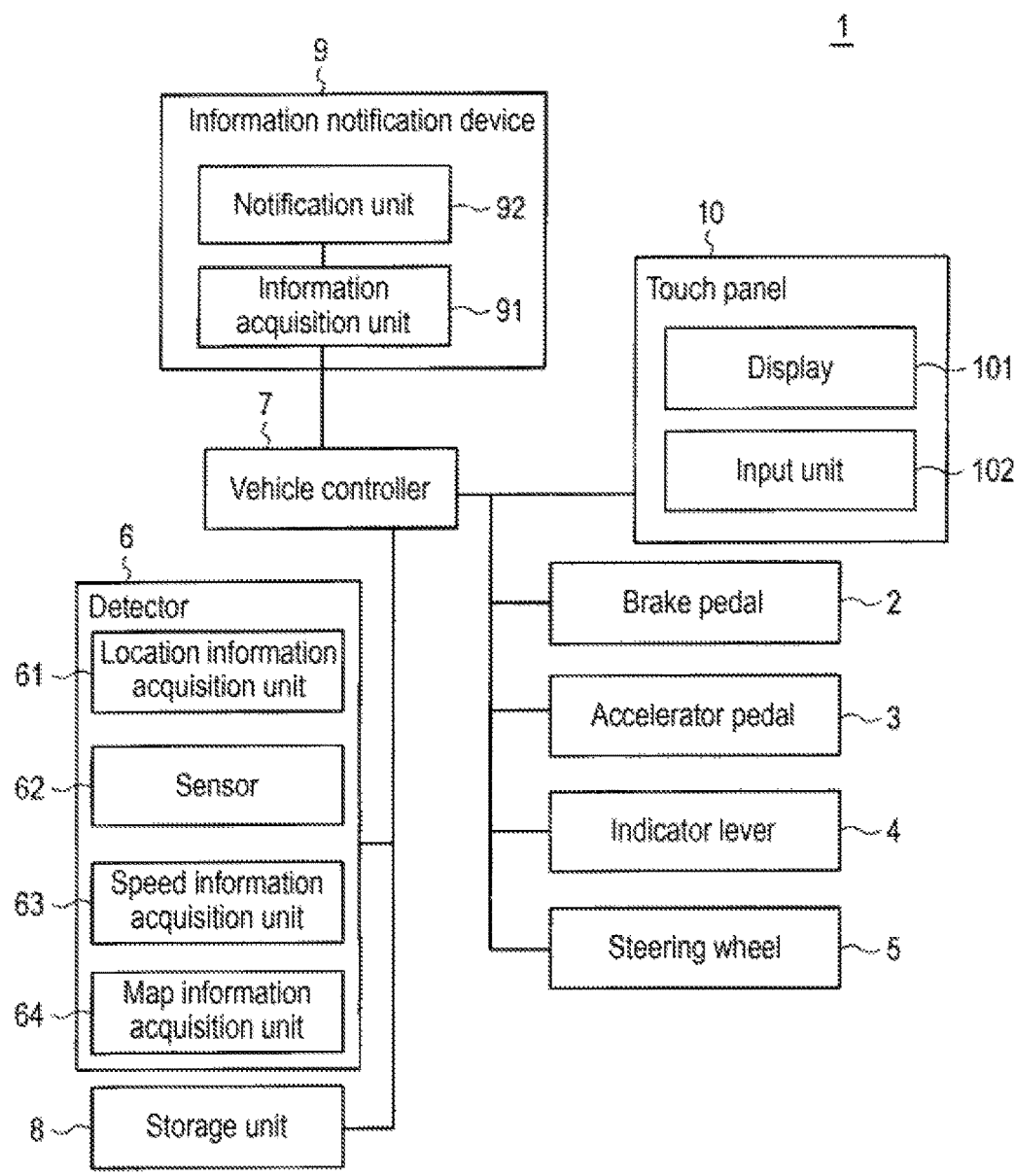
FIG. 13 is a block diagram illustrating a configuration of a main part of a vehicle including an information notification device according to a second exemplary embodiment of the present invention.

FIG. 13 is a block diagram illustrating a configuration of a main part of vehicle 1 including an information notification device according to the second exemplary embodiment of the present invention. It should be noted that constituent elements in FIG. 13 which are substantially identical to the constituent elements in FIG. 1 are denoted by the identical reference numerals used in FIG. 1 and will not be described in detail. Vehicle 1 illustrated in FIG. 13 is provided with touch panel 10 in place of operating unit 51 on steering wheel 5.

Touch panel 10 is a device including a liquid crystal panel or the like and capable of displaying and inputting information, and is connected to vehicle controller 7. Touch panel 10 includes display 101 that displays information based on control by vehicle controller 7, and input unit 102 that receives an operation from a driver or the like and outputs the received operation to vehicle controller 7.

Next, display control for touch panel 10 will be described. Herein, the display control will be described for the case where vehicle 1 is traveling on the center lane of three lanes, and vehicle 1 is capable of changing the lane to the right lane or the left lane.

Figure 14A:
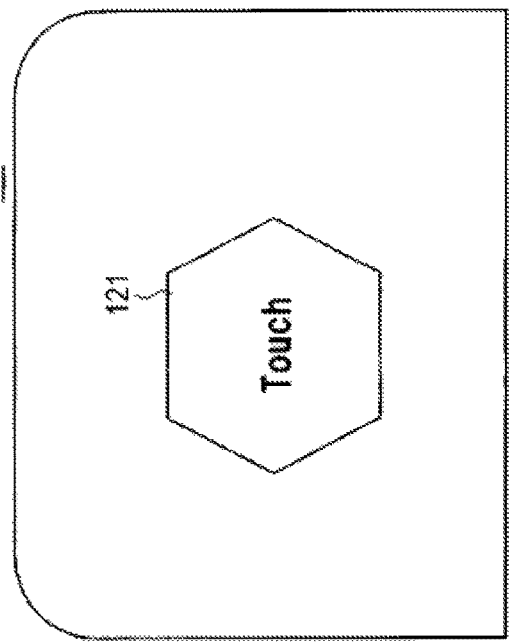
FIG. 14A is a view for describing a display on a touch panel according to the second exemplary embodiment.
Figure 14B:
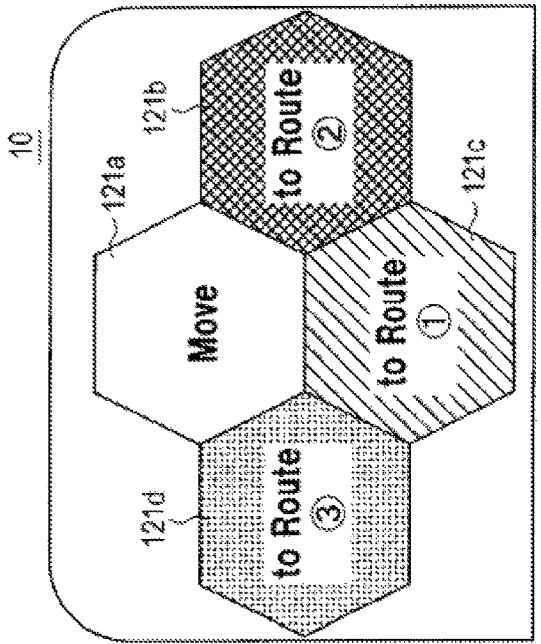
FIG. 14B is a view for describing a display on the touch panel according to the second exemplary embodiment.
Figure 14C:
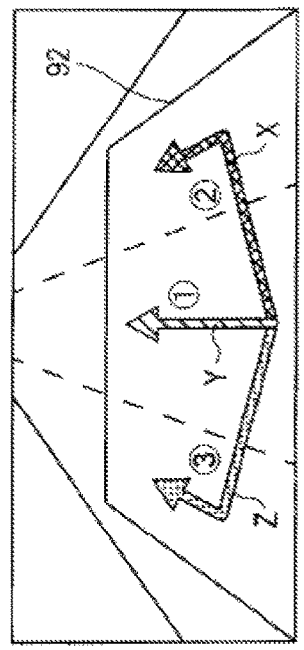
FIG. 14C is a view for describing a display on the touch panel according to the second exemplary embodiment.

FIGS. 14A to 14C are views for describing the display on touch panel 10 according to the second exemplary embodiment. FIG. 14A illustrates an initial display on display 101 of touch panel 10. When determining that vehicle 1 is capable of changing the lane to the right lane or the left lane, vehicle controller 7 causes display 101 of touch panel 10 to execute the display illustrated in FIG. 14A. Herein, the display of "Touch" in display region 121 indicates that touch panel 10 is in a mode where a touch operation performed by the driver is acceptable.

When the driver performs the touch operation for touching display region 121 with the display illustrated in FIG. 14A being displayed therein, input unit 102 receives this operation, and outputs to vehicle controller 7 information indicating that this operation is performed. When receiving this information, vehicle controller 7 causes display 101 to display the display illustrated in FIG. 14B, and causes notification unit 92 to display the display illustrated in FIG. 14C.

In FIG. 14B, display region 121a having therein a display of "Move" which is an operation for instructing vehicle 1 to move is illustrated. In addition, display regions 121b to 121d indicating that it is possible for vehicle 1 to travel in each of three lanes are illustrated in FIG. 14B. Note that display regions 121b to 121d respectively correspond to traveling in lanes indicated by arrows X, Y, and Z in FIG. 14C.

In addition, each display region in FIG. 14B and the corresponding arrow in FIG. 14C have the same manner (for example, color, arrangement, and the like). This makes the display easy to be understood by the driver.

In addition, the lanes indicated by arrows X, Y, and Z may be displayed by varying thickness or the like such that the behavior to be executed by the vehicle determined by the vehicle controller and other behaviors selectable by the driver can be distinguished.

The driver touches the display region corresponding to the lane he/she wishes to travel, from among display regions 121b to 121d, to select the behavior of vehicle 1. In this case, input unit 102 receives the behavior selecting operation performed by the driver, and outputs information about the selected behavior to vehicle controller 7. Then, vehicle controller 7 controls vehicle 1 such that vehicle 1 executes the selected behavior. Thus, vehicle 1 travels in the lane the driver wishes to travel.

It is to be noted that the driver may swipe touch panel 10 instead of touching touch panel 10. For example, when the driver wishes to change the lane to the lane indicated by arrow X in FIG. 14C in the example in FIG. 14C, the driver swipes right on touch panel 10.

In this case, input unit 102 receives the swipe operation, and outputs the information indicating the swipe operation content to vehicle controller 7. Then, vehicle controller 7 controls vehicle 1 such that vehicle 1 executes the selected behavior of changing the lane to the lane indicated by arrow X.

In addition, when display region 121a displaying "Move" which indicates the operation for instructing vehicle 1 to move is displayed, the driver may utter "behavior selection" in a voice. Thus, the driver can operate by seeing only the display on the HUD without seeing the touch panel at his/her hand.

In addition, when the driver performs the touch operation or swipe operation, the display manner of the lane corresponding to the selected display region of the touch panel may be changed such that the driver can confirm which lane he/she is about to select before the selection. For example, the moment the driver touches display region 121b, the thickness of lane X may be enlarged, and if the driver immediately releases his/her hand, lane X may not be selected and the thickness of lane X may be returned to the original size; and the moment the driver then touches display region 121c, the thickness of lane Y may be enlarged, and if the driver keeps this state for a while, lane Y may be selected and may flicker to indicate that lane Y is determined. According to this configuration, the driver can perform the selecting operation or determining operation without viewing his/her hands.

Notably, as in the first exemplary embodiment, vehicle control functions such as acceleration, deceleration, overtake, and keep may be assigned to display regions according to the travel environment.

According to the present exemplary embodiment described above, the driver can perform an intuitive operation due to the touch panel being provided in place of the operating unit. Furthermore, because the number, shape, color, and the like of display regions in the touch panel receiving an operation can freely be changed, the flexibility of a user interface is improved.

Third Exemplary Embodiment

The first exemplary embodiment has described the case where the first behavior and the second behavior are simultaneously displayed. The present exemplary embodiment describes a configuration in which a first behavior is displayed first on notification unit 92, and when a driver's operation is received, a second behavior is displayed.

The configuration of the present exemplary embodiment is achieved such that a grip sensor for detecting whether or not the driver holds steering wheel 5 is further included in operating unit 51 in the configuration, illustrated in FIG. 1, described in the first exemplary embodiment.

FIGS. 15A to 15D are each a view for describing a display on notification unit 92 according to the third exemplary embodiment of the present invention. FIGS. 15A to 15D each illustrate an example of a display in a travel environment, similar to that illustrated in FIG. 8A, where a vehicle traveling ahead of vehicle 1 in the same lane is traveling with a speed lower than the speed of vehicle 1, and a lane change to the adjacent lane is possible.

Figure 15A:
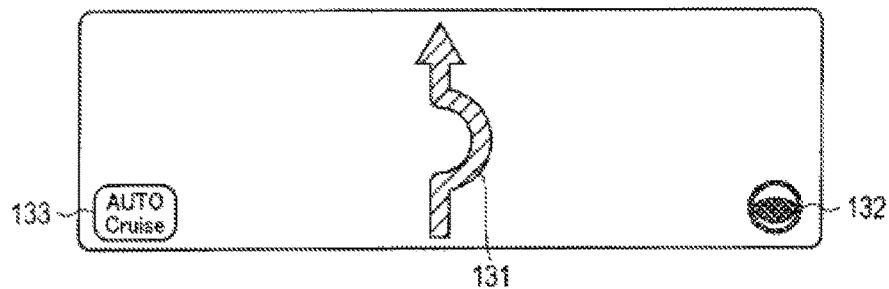
FIG. 15A is a view for describing a display on a notification unit according to a third exemplary embodiment of the present invention.

When determining that the travel environment is the one illustrated in FIG. 8A, vehicle controller 7 firstly causes notification unit 92 to execute the display illustrated in FIG. 15A.

In FIG. 15A, symbol 131 indicating "overtake" which is the first behavior among behavior candidates to be executed after a lapse of a first predetermined time is illustrated in a first manner (for example, in a first color).

When a second predetermined time has elapsed after vehicle controller 7 causes notification unit 92 to execute the display illustrated in FIG. 15A, vehicle controller 7 causes notification unit 92 to display symbol 131 in a second manner different from the first manner (for example, in a second color different from the first color) from the first manner. Herein, the second predetermined time is similar to the second predetermined time described in the first exemplary embodiment.

Specifically, while symbol 131 is displayed in the first manner, the driver is able to select the second behavior, but when symbol 131 is changed to the second manner, it becomes impossible for the driver to select the second behavior.

FIG. 15A also illustrates steering-wheel-shaped symbol 132 indicating that the second behavior is selectable. As the driver holds steering wheel 5 while symbol 132 is displayed, the second behavior is displayed. Symbol 132 is a display indicating that the second behavior is selectable. However, such configuration may be applied that the driver is notified of the second behavior being selectable by symbol 131 being displayed in the first manner. In this case, symbol 132 may not be displayed.

FIG. 15A also illustrates symbol 133 indicating that vehicle 1 is now in an autonomous driving mode. Symbol 133 is an auxiliary display notifying the driver that vehicle 1 is now traveling in the autonomous driving mode. However, symbol 133 may not be displayed.

When the driver holds steering wheel 5 in response to the display in

FIG. 15A, the grip sensor detects the holding, and outputs information about the detection result to vehicle controller 7. In this case, vehicle controller 7 causes notification unit 92 to execute the display illustrated in FIG. 15B.

Figure 15B:
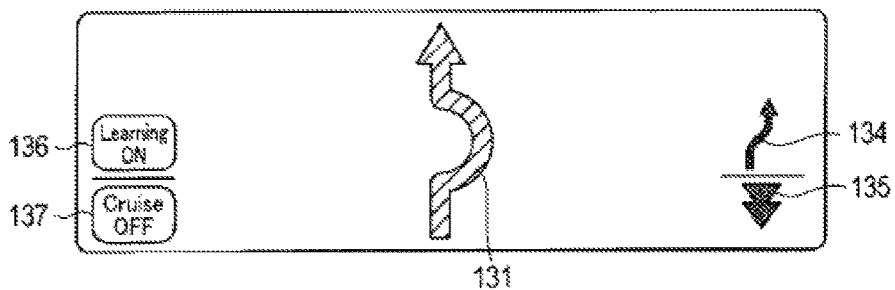
FIG. 15B is a view for describing a display on the notification unit according to the third exemplary embodiment.

In FIG. 15B, symbol 131 indicating "overtake" which is the first behavior is illustrated in the first manner (for example, in the first color) as in FIG. 15A. In addition, symbol 134 indicating "lane change" which is the second behavior and symbol 135 indicating "deceleration" which is the second behavior are also illustrated.

The driver performs changing from the first behavior to the second behavior by operating operating unit 51 on steering wheel 5. For example, the driver updates the behavior to "lane change" (symbol 134) or "deceleration" (symbol 135) by pressing operation button 51a or operation button 51c (see FIG. 2C) on operating unit 51.

Further, symbol 136 indicating that vehicle controller 7 is learning the behavior of vehicle 1 is illustrated in FIG. 15B. While symbol 136 is displayed, vehicle controller 7 learns the behavior selected by the driver. Symbol 136 may not be displayed. Further, the learning may always be conducted.

Specifically, vehicle controller 7 stores the behavior selected by the driver into storage unit 8, and when vehicle 1 encounters again the similar travel environment, vehicle controller 7 causes notification unit 92 to display the stored behavior as the first behavior. Alternatively, vehicle controller 7 may store, in storage unit 8, the number of times each behavior has been previously selected, and cause notification unit 92 to display the most frequently selected behavior as the first behavior.

In FIG. 15B, symbol 137 indicating that vehicle 1 is not in the autonomous driving mode is also illustrated. When symbol 137 is displayed, vehicle controller 7 waits until the behavior to be executed after a lapse of the first predetermined time is selected by the driver.

Figure 15C:
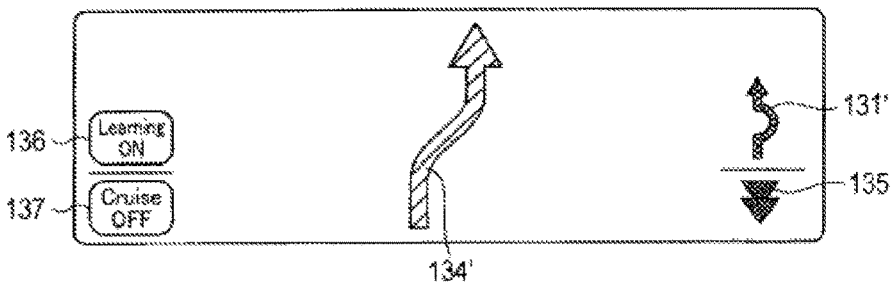
FIG. 15C is a view for describing a display on the notification unit according to the third exemplary embodiment.

When the driver presses operation button 51a on operating unit 51 in response to the display illustrated in FIG. 15B to select "lane change", vehicle controller 7 receives the information about the selecting operation, and causes notification unit 92 to execute the display illustrated in FIG. 15C.

In FIG. 15C, symbol 134' indicating "lane change" is illustrated in the first manner. When receiving the information about the operation for selecting "lane change", vehicle controller 7 determines that the selected behavior is the behavior that is to be executed next, and causes notification unit 92 to display symbol 134' indicating "lane change" in the first manner.

Further, symbol 131 which has been displayed as the first behavior in FIG. 15B is switched to symbol 134, and displayed as symbol 131' in FIG. 15C.

When the driver presses twice in succession any one of the operation buttons in response to the display illustrated in FIG. 15C, the selecting operation previously conducted by the driver may be canceled. In this case, vehicle controller 7 receives the information about the operation for pressing any one of the operation buttons twice in succession, and causes notification unit 92 to execute changing from the display illustrated in FIG. 15C to the display illustrated in FIG. 15B.

In a period from the time when vehicle controller 7 causes notification unit 92 to execute the display illustrated in FIG. 15A before the second predetermined time has elapsed, vehicle controller 7 changes the display on notification unit 92 to the display illustrated in FIG. 15B and the display illustrated in FIG. 15C based on the operation performed by the driver. Then, vehicle controller 7 causes notification unit 92 to execute the display illustrated in FIG. 15D when the second predetermined time has elapsed after vehicle controller 7 causes notification unit 92 to execute the display illustrated in FIG. 15A.

Figure 15D:
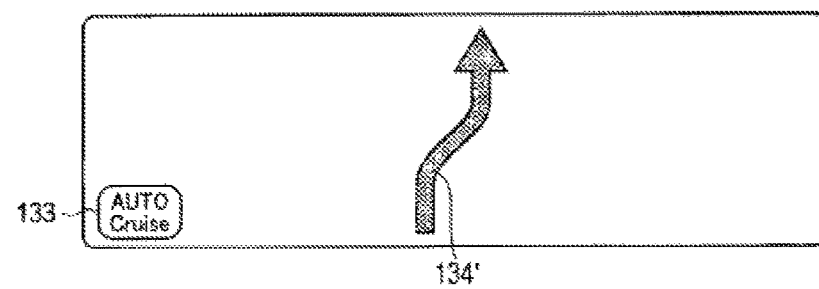
FIG. 15D is a view for describing a display on the notification unit according to the third exemplary embodiment.

Notably, when acquiring the information indicating that the driver releases his/her hand from steering wheel 5 from the grip sensor, vehicle controller 7 may cause notification unit 92 to display the display illustrated in FIG. 15D before the second predetermined time has elapsed.

In this case, FIG. 15D illustrates the state where symbol 134' indicating "lane change" selected by the driver as the next behavior is displayed in the second manner, and symbol 133 indicating that vehicle 1 is traveling in the autonomous driving mode is displayed again.

According to the present exemplary embodiment described above, vehicle controller 7 changes the display on notification unit 92 such that the driver can confirm the other behavior candidates, only when the driver intends to update the behavior to be executed next. According to this configuration, the display visually confirmed by the driver can be reduced, whereby the burden on the driver can be reduced.

Fourth Exemplary Embodiment

The above-mentioned exemplary embodiments have described some of the methods for determining which is the most suitable behavior from among a plurality of behavior candidates executable by vehicle 1. The present exemplary embodiment describes a case where a driver model constructed in advance by learning is used as the method for determining the most suitable behavior.

The method for constructing the driver model will now be described. The driver model is constructed in such a way that the tendency of an operation performed by a driver for each travel environment is modeled based on information relating to the frequency of each operation. Travel histories of a plurality of drivers are aggregated, and the driver model is constructed from the aggregated travel histories.

The travel history of each driver is formed such that the frequency of a behavior actually selected by the driver from among behavior candidates corresponding to each travel environment is aggregated for each behavior candidate, for example.

FIG. 16 is a diagram illustrating one example of the travel history. FIG. 16 illustrates that driver x selects the behavior candidate of "deceleration" three times, "acceleration" once, and "lane change" five times, in a travel environment of "approaching to a merging lane". FIG. 16 also illustrates that driver x selects the behavior candidate of "follow" twice, "overtake" twice, and "lane change" once, in a travel environment where "there is a low-speed vehicle ahead". The same is applied to driver y.

The travel history of the driver may be formed by aggregating the behaviors selected during autonomous driving, or by aggregating the behaviors actually executed by the driver during manual driving. Thus, a travel history according to a driving state, i.e., autonomous driving or manual driving, can be collected.

The driver model is classified into a clustering type constructed by clustering travel histories of a plurality of drivers, and an individually-adapted type in which a driver model of a specific driver (for example, driver x) is constructed from a plurality of travel histories similar to the travel history of driver x.

Firstly, the clustering type will be described. The clustering-type driver model is constructed in such a way that travel histories of a plurality of drivers illustrated in FIG. 16 are aggregated in advance. Then, a plurality of drivers having a high degree of similarity between the travel histories, that is, a plurality of drivers having a similar driving operation tendency, is grouped to construct a driver model.

FIG. 17 is a diagram illustrating a method for constructing the clustering-type driver model. FIG. 17 illustrates the travel histories of drivers a to f in tabular form. FIG. 17 illustrates that, from the travel histories of drivers a to f, model A is constructed based on the travel histories of drivers a to c, and model B is constructed based on the travel histories of drivers d to f.

The degree of similarity between travel histories may be obtained such that: for example, frequencies (numerical values) in the travel histories of driver a and driver b are treated as frequency distributions; a correlation value in the respective frequency distributions is calculated; and the calculated correlation value is set as the degree of similarity. In this case, when the correlation value calculated from the travel histories of driver a and driver b is higher than a predetermined value, the travel histories of driver a and driver b are grouped into a single group.

Note that the calculation of the degree of similarity is not limited thereto. For example, the degree of similarity may be calculated based on the same number of the behavior having the highest frequency in the travel history of driver a and the travel history of driver b.

Then, the clustering-type driver model is constructed by calculating the average of the frequencies in the travel histories of the drivers in each group, for example.

FIG. 18 is a diagram illustrating one example of the constructed clustering-type driver model. The average frequency of the travel history in each group is derived by calculating the average of the frequencies in the travel histories of the drivers in each group illustrated in FIG. 17. In this way, the clustering-type driver model is constructed using the average frequency for the behavior determined for each travel environment.

It is to be noted that the driver model may be constructed using only the behavior having the highest frequency from among the calculated average frequencies. FIG. 19 is a diagram illustrating another example of the constructed clustering-type driver model. As illustrated in FIG. 19, the most frequent behavior is selected for each travel environment, and the driver model is constructed using the selected behavior.

Now, a method for using the constructed clustering-type driver model will be described with examples.

The driver model illustrated in FIG. 18 is stored in advance in storage unit 8 of vehicle 1. In addition, vehicle controller 7 stores, in storage unit 8, the travel history of driver y in previous driving. Notably, driver y is detected by a camera or the like (not illustrated) installed in the vehicle interior.

Then, vehicle controller 7 calculates the degree of similarity between the travel history of driver y and the travel history of each model in the driver model to determine which model is the most suitable for driver y. For example, regarding the travel history of driver y illustrated in FIG. 16 and the driver model illustrated in FIG. 18, vehicle controller 7 determines that model B is the most suitable for driver y.

Vehicle controller 7 determines that, in actual autonomous travel, the behavior having the highest frequency is the behavior most suitable for driver y, that is, the first behavior, in each travel environment in model B.

In this way, the notification regarding the behavior more suitable for the driver can be provided by constructing in advance the driver model from the travel histories of a plurality of drivers.

For example, even when the frequency of the behavior for the travel environment of "there is a low-speed vehicle ahead" is zero in the travel history of driver y as illustrated in FIG. 16, that is, even when the driver has never selected the behavior of "follow", "overtake", and "lane change" in the travel environment of "there is a low-speed vehicle ahead", vehicle controller 7 can determine the behavior of "follow" as the first behavior in the travel environment of "there is a low-speed vehicle ahead" based on model B illustrated in FIG. 18.

Next, the individually-adapted type will be described. The individually-adapted-type driver model is constructed in such a way that travel histories of a plurality of drivers illustrated in FIG. 16 are aggregated in advance, as in the method for constructing the clustering-type. The different point from the clustering-type is such that the driver model is constructed for each driver. Hereinafter, an example of constructing the driver model for driver y will be described.

Firstly, travel histories of a plurality of drivers having a high degree of similarity with the travel history of driver y are extracted from the aggregated travel histories of a plurality of drivers. Then, the driver model for driver y is constructed from the extracted travel histories of a plurality of drivers.

FIG. 20 is a diagram illustrating a method for constructing the individually-adapted-type driver model. As in FIG. 17, FIG. 20 illustrates the travel histories of drivers a to f in tabular form. FIG. 20 also illustrates that the driver model for driver y is constructed from the travel histories of drivers c to e having a high degree of similarity with the travel history of driver y illustrated in FIG. 16.

The individually-adapted-type driver model is constructed by calculating the average of the frequencies in the extracted travel histories of the drivers.

FIG. 21 is a diagram illustrating one example of the constructed individually-adapted-type driver model. In the travel history of driver y illustrated in FIG. 16 and the travel histories of drivers c to e illustrated in FIG. 20, the average frequency of each behavior is derived for each travel environment. In this way, the individually-adapted-type driver model for driver y is constructed using the average frequency for the behavior corresponding to each travel environment.

Now, a method for using the constructed individually-adapted-type driver model will be described with examples.

The driver model for driver y illustrated in FIG. 21 is stored in advance in storage unit 8 of vehicle 1. In addition, vehicle controller 7 stores, in storage unit 8, the travel history of driver y in previous driving. Notably, driver y is detected by a camera or the like (not illustrated) installed in the vehicle interior.

Vehicle controller 7 then determines that, in actual autonomous travel, the behavior having the highest frequency is the behavior most suitable for driver y, that is, the first behavior, in each travel environment in the driver model for driver y.

In this way, the notification regarding the behavior more suitable for the driver can be provided by constructing in advance the driver model for each driver from the travel histories of a plurality of drivers.

For example, even when the frequency of the behavior for the travel environment of "there is a low-speed vehicle ahead" is zero in the travel history of driver y as illustrated in FIG. 16, that is, even when the driver has never selected the behavior of "follow", "overtake", and "lane change" in the travel environment of "there is a low-speed vehicle ahead", vehicle controller 7 can determine the behavior of "lane change" as the first behavior in the travel environment of "there is a low-speed vehicle ahead" based on the driver model illustrated in FIG. 21.

A description will next be given of a case where driving characteristics of a driver (habit in driving) are acquired, and autonomous driving according to the taste of the driver is performed. In general, the actual action (for example, the level of acceleration or deceleration, or an operation amount of a steering wheel) for one behavior (for example, lane change) differs for each driver. Therefore, if autonomous driving according to the taste of the driver is enabled, more comfortable driving for the driver can be implemented.

Notably, while the case where the driving characteristics of the driver are acquired during manual driving, and the acquired driving characteristics are reflected in autonomous driving will be described below, the present invention is not limited to this case.

Vehicle controller 7 extracts a characteristic amount indicating the driving characteristics of the driver based on the content of an operation performed by the driver for each unit in vehicle 1, and stores the acquired amount in storage unit 8. Herein, examples of the characteristic amount include a characteristic amount pertaining to a speed, a characteristic amount pertaining to steering, a characteristic amount pertaining to an operation timing, a characteristic amount pertaining to vehicle exterior sensing, and a characteristic amount pertaining to vehicle interior sensing.

The characteristic amount pertaining to a speed is the speed, acceleration, deceleration, or the like of the vehicle, for example, and these characteristic amounts are acquired from a speed sensor or the like mounted to the vehicle.

The characteristic amount pertaining to steering includes a steering angle, angular velocity, angular acceleration, and the like of the steering, for example, and these characteristic amounts are acquired from steering wheel 5.

The characteristic amount pertaining to an operation timing includes an operation timing of the brake, accelerator, indicator lever, steering wheel, and the like, for example, and these characteristic amounts are acquired respectively from brake pedal 2, accelerator pedal 3, indicator lever 4, and steering wheel 5.

The characteristic amount pertaining to vehicle external sensing includes the distance between vehicle 1 and a vehicle present in front of, at the side of, or at the back of vehicle 1, for example, and these characteristic amounts are acquired from sensor 62 or the like.

The characteristic amount pertaining to vehicle interior sensing includes personal identification information indicating who the driver is and who the fellow passenger is, for example, and these characteristic amounts are acquired from a camera or the like installed in the vehicle interior.

For example, when the driver manually performs a lane change, vehicle controller 7 detects that the driver manually performs the lane change. The detection is performed by analyzing operation time-series data which is acquired from controller area network (CAN) information by establishing rules on operation time-series data pattern for a lane change in advance. Upon detection, vehicle controller 7 acquires the characteristic amount. Vehicle controller 7 stores characteristic amounts in storage unit 8 for each driver, and constructs a driving characteristic model.

Note that vehicle controller 7 may construct the driver model based on the characteristic amount for each driver. Specifically, vehicle controller 7 extracts a characteristic amount pertaining to a speed, a characteristic amount pertaining to steering, a characteristic amount pertaining to an operation timing, a characteristic amount pertaining to vehicle exterior sensing, and a characteristic amount pertaining to vehicle interior sensing, and stores the extracted characteristic amounts into storage unit 8. Then, vehicle controller 7 may construct, based on the characteristic amounts stored in storage unit 8, a driver model in which the operation tendency of the driver for each travel environment and information about the frequency of each operation are associated with each other.

FIG. 22 is a diagram for describing one example of a driving characteristic model. FIG. 22 illustrates the characteristic amounts for each driver in tabular form. FIG. 22 also illustrates the number of times each driver has previously selected each behavior. Although FIG. 22 illustrates only some of the characteristic amounts described above, any of or all of the characteristic amounts described above may be illustrated.

The characteristic amounts illustrated in FIG. 22 will be described in detail. Numerical values in terms of the speed represent the actual speed in stages. Numerical values in terms of the steering wheel, the brake, and the accelerator represent operation amounts in stages. These numerical values are obtained by calculating the averages of the speed and the operation amounts for the steering wheel, the brake, and the accelerator during a predetermined previous time period, and by showing the averages in stages.

For example, when driver x performs a lane change without having a fellow passenger in FIG. 22, the speed level is 8, and the operation amount levels for the steering wheel, the brake, and the accelerator are respectively 4, 6, and 8.

While in autonomous driving, vehicle controller 7 selects, from the driving characteristic models in FIG. 22, the driving characteristic model corresponding to the driver, behavior, and fellow passenger, according to who the driver is, what behavior is executed, and who the fellow passenger is.

Then, vehicle controller 7 causes vehicle 1 to travel with the speed corresponding to the selected driving characteristic model, and controls vehicle 1 in combination of the operation amounts and operation timings for the steering wheel, the brake, and the accelerator. Thus, autonomous driving according to the taste of the driver can be implemented. Note that the notification regarding the information about the driving characteristic model illustrated in FIG. 22 can be provided by notification unit 92.

FIGS. 23A to 23D are each a view for describing a display on notification unit 92 according to the fourth exemplary embodiment of the present invention. FIGS. 23A to 23D are each a view illustrating a display corresponding to the first example of the travel environment illustrated in FIG. 5A.

Figure 23A:
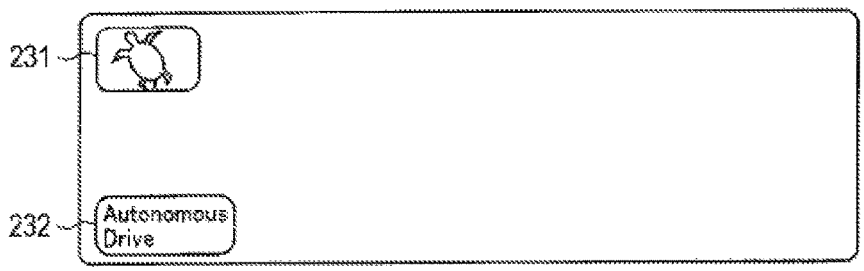
FIG. 23A is a view for describing a display on the notification unit according to the fourth exemplary embodiment.

FIG. 23A illustrates a display on notification unit 92 when vehicle 1 performs normal travel without requiring a lane change or acceleration/deceleration of the vehicle. In FIG. 23A, symbol 231 indicating that the driver has a driving characteristic of "frequently decelerating" and symbol 232 indicating that autonomous driving is now conducted are illustrated.

Vehicle controller 7 determines the driving characteristic of the driver based on the number of times the driver has previously selected each behavior included in the driving characteristic model illustrated in FIG. 22, for example. In this case, vehicle controller 7 causes notification unit 92 to display a display including symbol 231 as illustrated in FIGS. 23A to 23D for the driver who frequently "decelerates" (that is, the driver who frequently selects the behavior of "deceleration") based on the driving characteristic, for example.

Figure 23B:
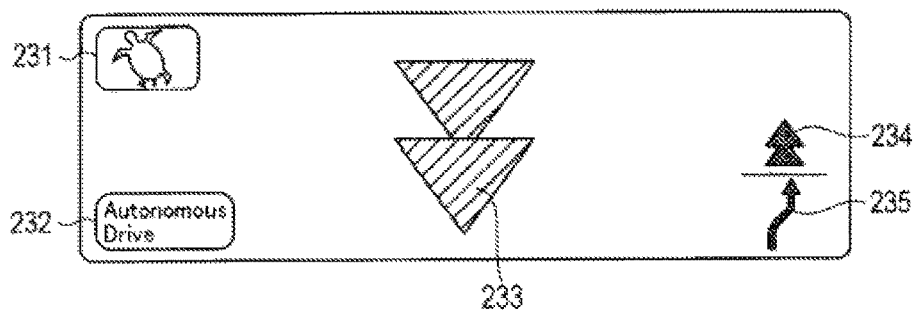
FIG. 23B is a view for describing a display on the notification unit according to the fourth exemplary embodiment.

When determining that the travel environment is the one in the first example illustrated in FIG. 5A, vehicle controller 7 determines that the first behavior is "deceleration" based on the driver's driving characteristic of "frequently decelerating", and causes notification unit 92 to execute the display in FIG. 23B.

In FIG. 23B, symbol 233 indicating "deceleration" which is the first behavior is illustrated in the first manner (for example, in the first color). In addition, symbol 234 indicating "acceleration" which is the second behavior and symbol 235 indicating "lane change" which is the second behavior are illustrated.

Figure 23C:
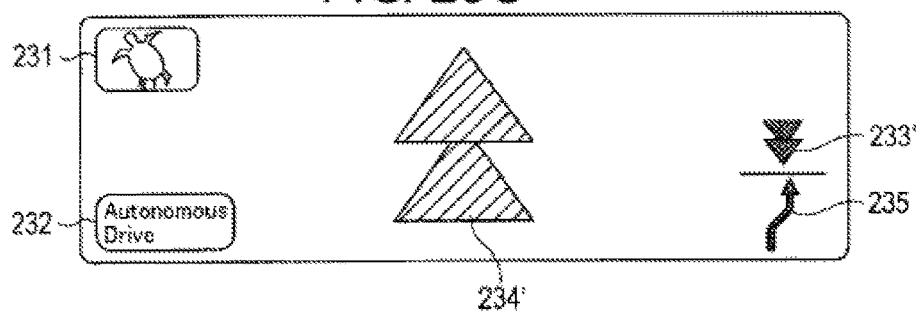
FIG. 23C is a view for describing a display on the notification unit according to the fourth exemplary embodiment.

When the driver changes the behavior to the behavior of "acceleration" by the operation described in the first exemplary embodiment, vehicle controller 7 causes notification unit 92 to execute the display in FIG. 23C.

In FIG. 23C, symbol 234' indicating "acceleration" which is the selected behavior is illustrated in the first manner. Further, symbol 233 which has been displayed as the first behavior in FIG. 23B is switched to symbol 234, and displayed as symbol 233'.

Figure 23D:
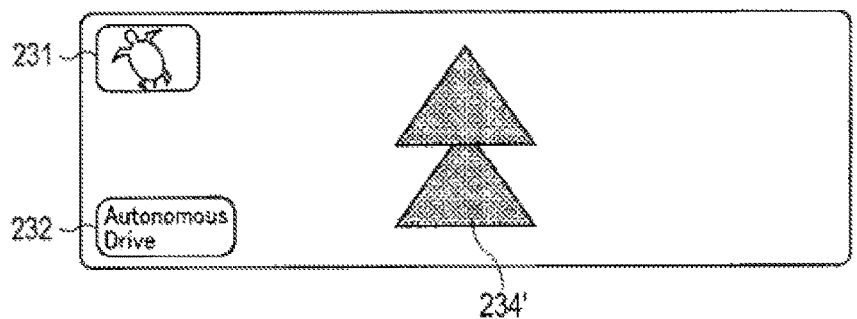
FIG. 23D is a view for describing a display on the notification unit according to the fourth exemplary embodiment.
Figure 24A:
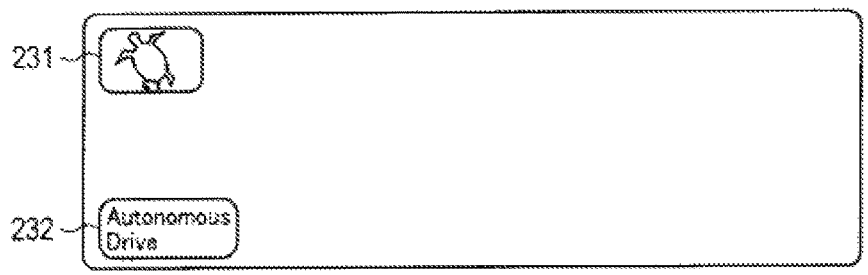
FIG. 24A is a view for describing a display on the notification unit according to the fourth exemplary embodiment.
Figure 24B:
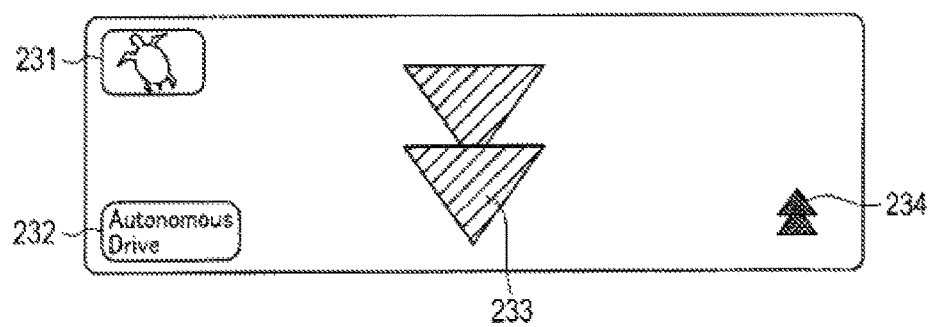
FIG. 24B is a view for describing a display on the notification unit according to the fourth exemplary embodiment.
Figure 24C:
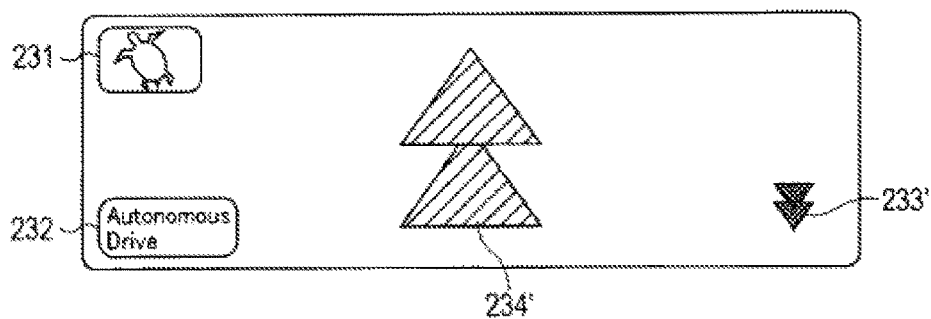
FIG. 24C is a view for describing a display on the notification unit according to the fourth exemplary embodiment.
Figure 24D:
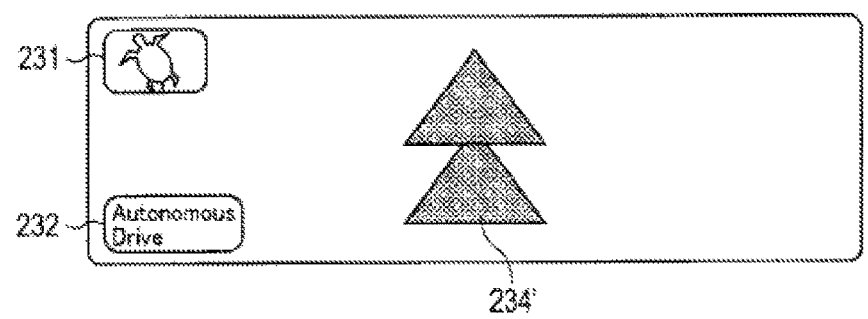
FIG. 24D is a view for describing a display on the notification unit according to the fourth exemplary embodiment.

Then, vehicle controller 7 causes notification unit 92 to execute the display illustrated in FIG. 23D when the second predetermined time has elapsed after vehicle controller 7 causes notification unit 92 to execute the display illustrated in FIG. 23A. In FIG. 23D, symbol 234' indicating "acceleration" selected as the next behavior by the driver is displayed in the second manner.

When the behavior to be executed next is determined to be "acceleration", vehicle controller 7 reads characteristic amounts corresponding to the behavior of "acceleration" included in the driving characteristic model, and controls vehicle 1 such that vehicle 1 performs "acceleration" with these characteristic amounts being reflected thereon.

FIGS. 24A to 24D are each a view for describing a display on notification unit 92 according to the fourth exemplary embodiment of the present invention. FIGS. 24A to 24D are each a view illustrating a display corresponding to the second example of the travel environment illustrated in FIG. 7A. It should be noted that constituent elements in FIGS. 24A to 24D which are substantially identical to constituent elements in FIGS. 23A to 23D are denoted by identical reference numerals used in FIGS. 23A to 23D and will not be described in detail. FIGS. 24A to 24D are formed by deleting symbol 235 indicating "lane change" from FIGS. 23A to 23D.

As mentioned previously, in the second example (FIG. 7A), different from the first example (FIG. 5A), a lane change is impossible because a nearby vehicle is traveling on the right of vehicle 1. Therefore, "lane change" is not displayed in FIGS. 24B and 24C. Further, in the example in FIG. 24C, because "acceleration" is selected as in FIG. 23C, vehicle controller 7 reads characteristic amounts corresponding to the behavior of "acceleration" included in the driving characteristic model, and controls vehicle 1 such that vehicle 1 performs "acceleration" with these characteristic amounts being reflected thereon, as in FIGS. 23A to 23D.

FIGS. 25A to 25D are each a view for describing a display on notification unit 92 according to the fourth exemplary embodiment of the present invention. FIGS. 25A to 25D are each a view illustrating a display corresponding to the third example of the travel environment illustrated in FIG. 8A.

Figure 25A:
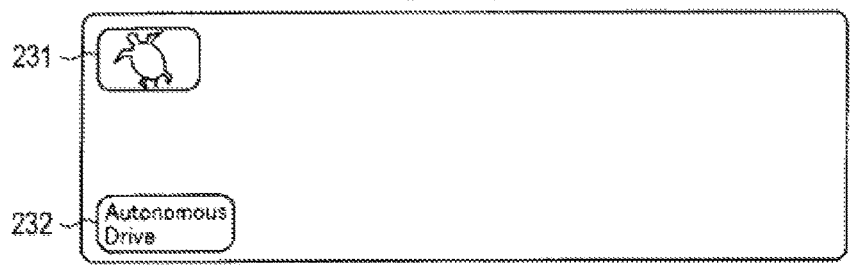
FIG. 25A is a view for describing a display on the notification unit according to the fourth exemplary embodiment.

FIG. 25A is similar to FIG. 23A. When determining that the travel environment is the one in the third example illustrated in FIG. 8A, vehicle controller 7 determines that the first behavior is "deceleration" based on the driver's driving characteristic of "frequently decelerating", and causes notification unit 92 to execute the display in FIG. 25B.

Figure 25B:
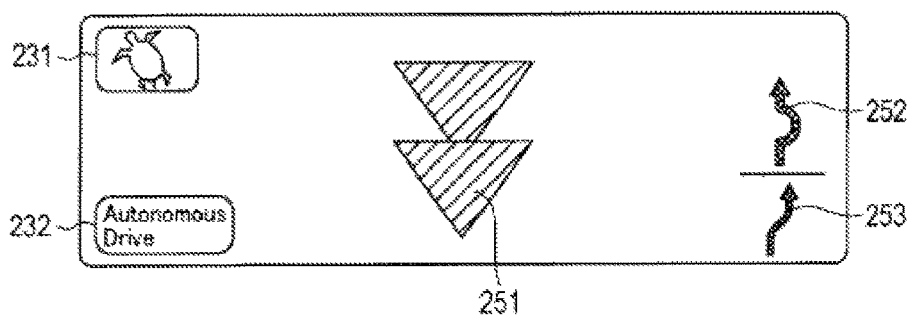
FIG. 25B is a view for describing a display on the notification unit according to the fourth exemplary embodiment.

In FIG. 25B, symbol 251 indicating "deceleration" which is the first behavior is illustrated in the first manner (for example, in the first color). In addition, symbol 252 indicating "overtake" which is the second behavior and symbol 253 indicating "lane change" which is the second behavior are illustrated.

Figure 25C:
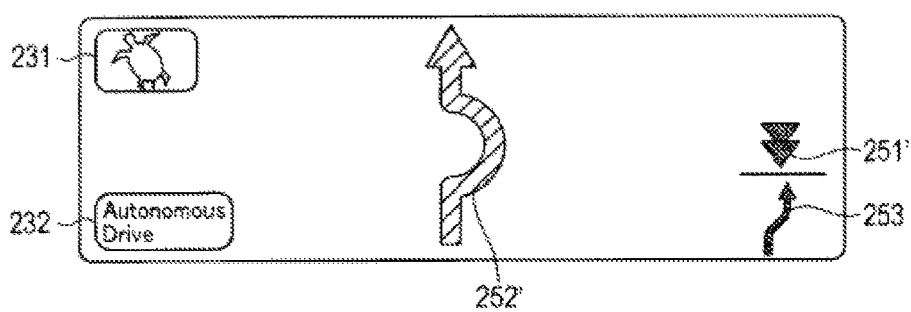
FIG. 25C is a view for describing a display on the notification unit according to the fourth exemplary embodiment.

When the driver changes the behavior to the behavior of "overtake" by the operation described in the first exemplary embodiment, vehicle controller 7 causes notification unit 92 to execute the display in FIG. 25C.

In FIG. 25C, symbol 252' indicating "overtake" which is the selected behavior is illustrated in the first manner. Further, symbol 251 which has been displayed as the first behavior in FIG. 25B is switched to symbol 252 and displayed as symbol 251'.

Figure 25D:
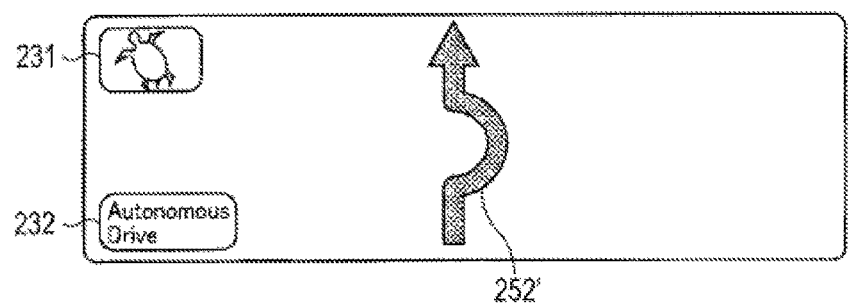
FIG. 25D is a view for describing a display on the notification unit according to the fourth exemplary embodiment.

Then, vehicle controller 7 causes notification unit 92 to execute the display illustrated in FIG. 25D when the second predetermined time has elapsed after vehicle controller 7 causes notification unit 92 to execute the display illustrated in FIG. 25A. In FIG. 25D, symbol 252' indicating "overtake" selected as the next behavior by the driver is displayed in the second manner.

When the behavior to be executed next is determined to be "overtake", vehicle controller 7 reads characteristic amounts corresponding to the behavior of "overtake" included in the driving characteristic model, and controls vehicle 1 such that vehicle 1 performs "acceleration" with these characteristic amounts being reflected thereon.

A description will next be given of an example of a display when the driving characteristic of the driver is not the driving characteristic of "frequently decelerating".

Figure 26A:
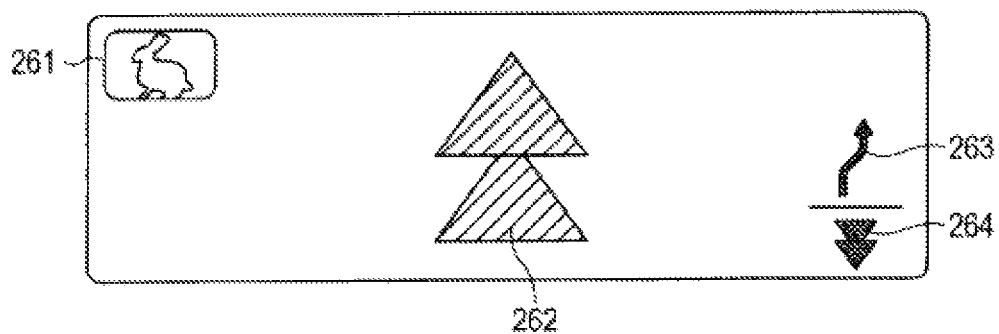
FIG. 26A is a view for describing a display on the notification unit according to the fourth exemplary embodiment.
Figure 26B:
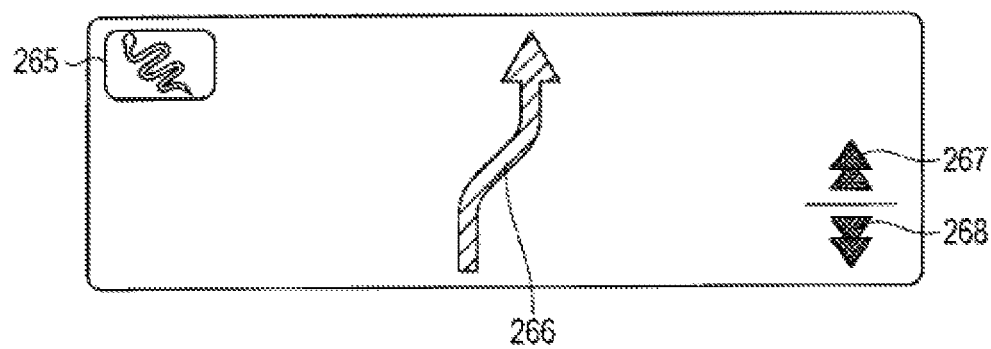
FIG. 26B is a view for describing a display on the notification unit according to the fourth exemplary embodiment.

FIGS. 26A to 26B are each a view for describing a display on notification unit 92 according to the fourth exemplary embodiment of the present invention. FIGS. 26A to 26B are each a view illustrating a display corresponding to the first example of the travel environment illustrated in FIG. 5A. It is to be noted that FIG. 26A illustrates an example of a case where the driver has a driving characteristic of "frequently accelerating", and FIG. 26B illustrates an example of a case where the driver has a driving characteristic of "frequently performing a lane change".

In FIG. 26A, symbol 261 indicating that the driver has a driving characteristic of "frequently accelerating" is illustrated. Symbol 262 indicating "acceleration" which is the first behavior is also illustrated in the first manner (for example, in the first color). In addition, symbol 263 indicating "lane change" which is the second behavior and symbol 264 indicating "deceleration" which is the second behavior are also illustrated.

Vehicle controller 7 causes notification unit 92 to execute a display including symbol 261 as illustrated in FIG. 26A for the driver who has frequently "accelerated" previously (that is, the driver who has frequently selected the behavior of "acceleration" previously) based on the driving characteristic, for example. In addition, vehicle controller 7 determines the first behavior as "acceleration" and causes notification unit 92 to execute the display in FIG. 26A based on the driver's driving characteristic of "frequently accelerating".

In FIG. 26B, symbol 265 indicating that the driver has a driving characteristic of "frequently performing a lane change" is illustrated. Symbol 266 indicating "lane change" which is the first behavior is also illustrated in the first manner (for example, in the first color). In addition, symbol 267 indicating "acceleration" which is the second behavior and symbol 268 indicating "deceleration" which is the second behavior are also illustrated.

Vehicle controller 7 causes notification unit 92 to execute a display including symbol 265 as illustrated in FIG. 26B for the driver who has frequently performed "lane change" previously (that is, the driver who has frequently selected the behavior of "lane change" previously) based on the driving characteristic, for example. Vehicle controller 7 determines the first behavior as "lane change" and causes notification unit 92 to execute the display in FIG. 26B based on the driver's driving characteristic of "frequently performing a lane change".

The description has been given only using the driving characteristic model. However, the driver model may also be considered. Symbols 231, 261, and 265 in FIGS. 23A to 23D, 24A to 24D, 25A to 25D, 26A, and 26B may indicate the type of the driver model selected from the operation history of the driver. For example, for the driver model to be applied to a driver frequently selecting "deceleration" for the first example of the travel environment illustrated in FIG. 5A, vehicle controller 7 causes notification unit 92 to execute the display including symbol 231 as in FIGS. 23A to 23D and determines the first behavior as "deceleration". For the driver model to be applied to a driver frequently selecting "acceleration", vehicle controller 7 causes notification unit 92 to execute the display including symbol 261 as in FIG. 26A and determines the first behavior as "acceleration". For the driver model to be applied to a driver frequently selecting "lane change", vehicle controller 7 causes notification unit 92 to execute the display including symbol 265 as in FIG. 26B and determines the first behavior as "lane change".

According to the present exemplary embodiment described above, when determining a future behavior of the vehicle, the vehicle can learn the previous travel history of the driver and reflect the result in determining the future behavior. In addition, when controlling the vehicle, vehicle controller can learn the driving characteristic (driving taste) of the driver and reflect the result in controlling the vehicle.

Thus, the vehicle can control the autonomous driving at a timing or with an operation amount favored by the driver or the occupant, thereby being capable of suppressing unnecessary operation intervention performed by the driver during the autonomous driving without causing deviation from a sense of the driver when he/she actually manually drives the vehicle.

Note that, in the present invention, the function similar to the function executed by vehicle controller 7 may be executed by a cloud server or a server device. In addition, storage unit 8 may be provided in the cloud server or the server device, not in vehicle 1. Alternatively, storage unit 8 may store a driver model which has already been constructed, and vehicle controller 7 may determine a behavior by referring to the driver model stored in storage unit 8.

As described above, in the fourth exemplary embodiment, vehicle controller 7 acquires the information about the characteristic amount indicating the driving characteristic of the driver; storage unit 8 stores the information about the characteristic amount; and vehicle controller 7 constructs, for each travel environment of the vehicle, the driver model which indicates the tendency of the behavior of the vehicle selected by the driver in terms of the frequency of the selected behavior, based on the information about the characteristic amount stored in storage unit 8.

In addition, vehicle controller 7 determines, among from a plurality of drivers, the group of the drivers having similar behavior selection, and constructs the driver model for each group or each travel environment of the vehicle.

Further, vehicle controller 7 calculates the average of the frequency of the behavior selected by each driver for each group of the drivers performing a similar operation, and constructs, for each travel environment of the vehicle, a driver model in which the tendency of the behavior of the vehicle selected by the driver is indicated in terms of the calculated average.

Moreover, vehicle controller 7 constructs, based on the vehicle behavior which is selected by another driver having a similar tendency to the vehicle behavior selected by a specific driver, a driver model in which the tendency of the vehicle behavior selected by the specific driver is indicated in terms of the frequency of each selected behavior, for each travel environment of the vehicle.

Accordingly, vehicle controller 7 can construct a driver model more suitable for the driving tendency of the driver, and can perform autonomous driving more appropriate for the driver based on the constructed driver model.

(Modification of Driver Model)

The driver model described above is constructed in such a way that the operation (behavior) tendency of a driver for each travel environment is modeled based on information relating to the frequency of each operation. However, the present invention is not limited thereto.

For example, the driver model may be constructed based on a travel history in which an environmental parameter indicating a travel environment (i.e., situation) through which the vehicle has previously traveled and the operation (behavior) actually selected by the driver in this travel environment are associated with each other. When the environmental parameter is incorporated into the driver model, options can be decided without going through the procedure for individually performing detection and labeling of the travel environment and inputting (storing) the labeling result in the driver model. Specifically, when the difference in travel environment as in FIGS. 23A to 23D and 24A to 24D is acquired as environmental parameters, and the acquired parameters are directly input (stored) in the driver model, "acceleration", "deceleration", and "lane change" are determined as options in FIGS. 23A to 23D, and "acceleration" and "deceleration" are determined as options in FIGS. 24A to 24D. Hereinafter, an example of constructing such a driver model will be described. Note that the driver model described below may be restated as a situation database.

Now, a travel history for constructing the driver model in the present modification will be described. FIG. 27 is a diagram illustrating one example of the travel history. FIG. 27 illustrates the travel history in which environmental parameters indicating a travel environment through which the vehicle driven by driver x has previously traveled and the operation (behavior) actually selected by the driver in this travel environment are associated with each other.

The environmental parameters in (a) to (c) in the travel history in FIG. 27 respectively indicate the travel environment when the vehicle behavior is presented to the driver as in FIGS. 8B, 5B, and 7B, for example. The environmental parameters in the travel history are acquired from sensing information or infrastructure information.

The sensing information is information detected by sensors or radars in the vehicle. The infrastructure information includes information from GPS, map information, information acquired through road-to-vehicle communication, for example.

For example, the environmental parameters in the travel history in FIG. 27 include: "host vehicle information"; "leading vehicle information" indicating information about a vehicle traveling in front of the host vehicle in a lane of the host vehicle; "adjacent lane information" indicating information about an adjacent lane of the lane in which the host vehicle is traveling; "merging lane information" indicating, when there is a merging lane on a location where the host vehicle travels, the information about the merging lane; and "location information" indicating information about the location of the host vehicle and the surrounding thereof. In addition, following vehicle information may be included. In this case, a relative speed of the following vehicle relative to the host vehicle, head-to-head spacing, rate of change of the head-to-head spacing, and the like may be used. In addition, vehicle presence information may be included.

For example, the "host vehicle information" includes information about speed Va of the host vehicle. The "leading vehicle information" includes information about relative speed Vba of the leading vehicle relative to the host vehicle, distance DRba between the leading vehicle and the host vehicle, and rate of change RSb of the size of the leading vehicle.

Herein, speed Va of the host vehicle is detected by a speed sensor mounted to the host vehicle. Relative speed Vba and distance DRba between the host vehicle and the leading vehicle are detected by a sensor, radar, or the like. Rate of change RSb of the size is calculated from a relational expression of RSb=−Vba/DRba.

The "adjacent lane information" includes information about an adjacent following vehicle traveling behind the host vehicle in the adjacent lane, information about an adjacent leading vehicle traveling in front of the host vehicle in the adjacent lane, and information about remaining adjacent lane length DRda for the host vehicle.

The adjacent following vehicle information includes information about relative speed Vca of the adjacent following vehicle relative to the host vehicle, head-to-head spacing Dca between the adjacent following vehicle and the host vehicle, and rate of change Rca of the head-to-head spacing. Head-to-head spacing Dca between the adjacent following vehicle and the host vehicle is the distance between the front part (head) of the host vehicle and the front part (head) of the adjacent following vehicle measured in the direction along the travel direction of the host vehicle (and the adjacent following vehicle). Note that the head-to-head spacing may be calculated from the inter-vehicular distance or vehicle length. In addition, the head-to-head spacing may be replaced by the inter-vehicular distance.

Relative speed Vca and head-to-head spacing Dca are detected by a sensor, radar, or the like. Rate of change Rca of the head-to-head spacing is calculated from a relational expression of Rca=Vca/Dca.

In addition, the adjacent leading vehicle information includes information about relative speed Vda of the adjacent leading vehicle relative to the host vehicle, head-to-head spacing Dda between the adjacent leading vehicle and the host vehicle, and rate of change Rda of the head-to-head spacing. Head-to-head spacing Dda between the adjacent leading vehicle and the host vehicle is the distance between the front part (head) of the host vehicle and the front part (head) of the adjacent leading vehicle measured along the travel direction of the host vehicle (and the adjacent leading vehicle).

Relative speed Vda and head-to-head spacing Dda are detected by a sensor, radar, or the like. In addition, rate of change Rda of the head-to-head spacing is calculated from a relational expression of Rda=Vda/Dda.

Remaining adjacent lane length DRda for the host vehicle is a parameter indicating the degree of possibility of a lane change to the adjacent lane. Specifically, when the distance between the front part (head) of the host vehicle and the rear part of the adjacent leading vehicle measured along the travel direction of the host vehicle (and the adjacent leading vehicle) is longer than distance DRba between the leading vehicle and the host vehicle, remaining adjacent lane length DRda for the host vehicle is the distance between the front part (head) of the host vehicle and the rear part of the adjacent leading vehicle, and when the distance between the front part (head) of the host vehicle and the rear part of the adjacent leading vehicle is shorter than DRba, remaining adjacent lane length DRda is DRba. Remaining adjacent lane length DRda for the host vehicle is detected by a sensor, radar, or the like.

The "merging lane information" includes information about relative speed Vma of a merging vehicle relative to the host vehicle, head-to-head spacing Dma between the merging vehicle and the host vehicle, and rate of change Rma of the head-to-head spacing. Head-to-head spacing Dma between the merging vehicle and the host vehicle is the distance between the front part (head) of the host vehicle and the front part (head) of the merging vehicle measured in the direction along the travel direction of the host vehicle (and the merging vehicle).

Relative speed Vma and head-to-head spacing Dma are detected by a sensor, radar, or the like. Rate of change Rma of the head-to-head spacing is calculated from a relational expression of Rma=Vma/Dma.

In the example of the travel history illustrated in FIG. 27, the numerical values of the speed, distance, and rate of change described above are classified into a plurality of levels, and the numerical values indicating the classified levels are stored. Note that the numerical values of the speed, distance, and rate of change may be stored without being classified into levels.

The location information includes "host vehicle location information", "number of travel lanes", "host vehicle travel lane", "distance to start/end point of merging section", "distance to start/end point of branch section", "distance to start/end point of road work section", "distance to start/end point of lane end section", "distance to accident spot", and the like. FIG. 27 illustrates, as examples of the location information, the "host vehicle travel lane" (travel lane in FIG. 27) and the "distance to start/end point of merging section" (illustrated as "distance to merging point" in FIG. 27).

For example, numerical information indicating the latitude and longitude acquired from the GPS is stored in the part of the "host vehicle location information" not illustrated. The number of travel lanes on the road where the host vehicle is traveling is stored in the part of the "number of travel lanes". Numerical information indicating the location of the lane where the host vehicle is traveling is stored in the part of the "host vehicle travel lane" not illustrated. When there are start and end points of a merging section within a predetermined distance, the distances to the start and end points of the merging section are classified into a plurality of predetermined levels, and the numerical values of the classified levels are stored in the part of the "distance to start/end point of merging section". When there are no start and end points of a merging section within the predetermined distance, "0" is stored in the part of the "distance to start/end point of merging section".

When there are start and end points of a branch section within a predetermined distance, the distances to the start and end points of the branch section are classified into a plurality of predetermined levels, and the numerical values of the classified levels are stored in the part of the "distance to start/end point of branch section". When there are no start and end points of a branch section within the predetermined distance, "0" is stored in the part of the "distance to start/end point of branch section". When there are start and end points of a road work section within a predetermined distance, the distances to the start and end points of the road work section are classified into a plurality of predetermined levels, and the numerical values of the classified levels are stored in the part of the "distance to start/end point of road work section". When there are no start and end points of a road work section within the predetermined distance, "0" is stored in the part of the "distance to start/end point of road work section".

When there are start and end points of a lane end section within a predetermined distance, the distances to the start and end points of the lane end section are classified into a plurality of predetermined levels, and the numerical values of the classified levels are stored in the part of the "distance to start/end point of lane end section". When there are no start and end points of a lane end section within the predetermined distance, "0" is stored in the part of the "distance to start/end point of lane end section".

When there is an accident spot within a predetermined distance, the distance to the accident spot is classified into a plurality of predetermined levels, and the numerical values of the classified levels are stored in the part of the "distance to accident spot". When there is no accident spot within the predetermined distance, "0" is stored in the part of the "distance to accident spot".

In addition, the location information may include information indicating which lane, out of all lanes on the road where the host vehicle is traveling, is the merging lane, the branch lane, the lane having a road work, the lane which ends, and the lane having an accident spot.

Note that the travel history illustrated in FIG. 27 is merely one example, and the present invention is not limited thereto. For example, when the adjacent lane information is information about the right adjacent lane, the travel history may further include "left adjacent lane information" opposite to the right adjacent lane.

The "left adjacent lane information" includes information about a left adjacent following vehicle traveling behind the host vehicle in the left adjacent lane, information about a left adjacent leading vehicle traveling in front of the host vehicle in the left adjacent lane, and information about remaining left adjacent lane length DRda for the host vehicle.

The left following vehicle information includes information about relative speed Vfa of the left adjacent following vehicle relative to the host vehicle, head-to-head spacing Dfa between the left adjacent following vehicle and the host vehicle, and rate of change Rfa of the head-to-head spacing.

Head-to-head spacing Dfa between the left adjacent following vehicle and the host vehicle is the distance between the front part (head) of the host vehicle and the front part (head) of the left adjacent following vehicle measured in the direction along the travel direction of the host vehicle (and the left adjacent following vehicle).

Here, relative speed Vfa and head-to-head spacing Dfa are detected by a sensor, radar, or the like. In addition, rate of change Rfa of the head-to-head spacing is calculated from a relational expression of Rfa=Vfa/Dfa.

In addition, the left adjacent leading vehicle information includes information about relative speed Vga of the left adjacent leading vehicle relative to the host vehicle, head-to-head spacing Dga between the left adjacent leading vehicle and the host vehicle, and rate of change Rga of the head-to-head spacing. Head-to-head spacing Dga between the left adjacent leading vehicle and the host vehicle is the distance between the front part (head) of the host vehicle and the front part (head) of the left adjacent leading vehicle measured along the travel direction of the host vehicle (and the left adjacent leading vehicle).

Here, relative speed Vga and head-to-head spacing Dga are detected by a sensor, radar, or the like. In addition, rate of change Rga of the head-to-head spacing is calculated from a relational expression of Rga=Vga/Dga.

It is to be noted that, while the description has been given of the case where the vehicle is in the left side of the road, the similar process is also applied for the case where the vehicle is in the right side of the road by inverting left to right.

In addition, the travel history illustrated in FIG. 27 may include "following vehicle information" indicating information about a vehicle traveling behind the host vehicle in the travel lane of the host vehicle.

The following vehicle information includes information about relative speed Vea of the following vehicle relative to the host vehicle, head-to-head spacing Dea between the following vehicle and the host vehicle, and rate of change Rea of the head-to-head spacing. Head-to-head spacing Dea between the following vehicle and the host vehicle is the distance between the front part (head) of the host vehicle and the front part (head) of the following vehicle measured in the direction along the travel direction of the host vehicle (and the following vehicle).

Here, relative speed Vea and head-to-head spacing Dea are detected by a sensor, radar, or the like. Rate of change Rea of the head-to-head spacing is calculated from a relational expression of Rea=Vea/Dea.

It is to be noted that, if the head-to-head spacing cannot be measured because of the vehicles being hidden by a moving body, the measurable distance between vehicles or an approximate value obtained by adding a predetermined vehicle length to the distance between vehicles may be substituted for the head-to-head spacing, or the head-to-head spacing may be calculated by adding the vehicle length of each recognized vehicle type to the distance between vehicles. Alternatively, regardless of whether the head-to-head spacing can be measured, the measurable distance between vehicles or an approximate value obtained by adding a predetermined vehicle length to the distance between vehicles may be substituted for the head-to-head spacing, or the head-to-head spacing may be calculated by adding the vehicle length of each recognized vehicle type to the distance between vehicles.

The travel history may include other various information items pertaining to the travel environment of the vehicle. For example, the travel history may include information about the size or the type of a leading vehicle, an adjacent vehicle, or a merging vehicle, or information about the relative position relative to the host vehicle. For example, when the vehicle approaching from behind is an emergency vehicle as a result of recognition of the type of the vehicle by a camera sensor, information indicating the vehicle being an emergency vehicle may be included. According to this configuration, notification regarding information for responding to the emergency vehicle can be provided. Alternatively, numerical values indicating, in stages, operation amounts of the steering wheel, the brake, and the accelerator or the information pertaining to a fellow passenger as described with reference to FIG. 22 may be included in the travel history.

In addition, the travel history of the driver may be formed by aggregating the behaviors selected during autonomous driving, or by aggregating the behaviors actually executed by the driver during manual driving. Thus, a travel history according to a driving state, i.e., autonomous driving or manual driving, can be collected.

Further, although the environmental parameters included in the travel history in the example in FIG. 27 show the travel environment when a vehicle behavior is presented to the driver, the environmental parameters may show a travel environment when the driver performs behavior selection. Alternatively, the travel history may include both environmental parameters showing the travel environment when a vehicle behavior is presented to the driver and environmental parameters showing the travel environment when the driver performs behavior selection.

Moreover, the following configuration may be applied when vehicle controller 7 generates the display of the overhead view illustrated FIG. 2A, 5A, 6A, 7A, 8A, 9A, or 10A or the display illustrated FIG. 14C. Specifically, vehicle controller 7 generates, as notification information item, at least one of the information about the environmental parameter which has a high rate of contribution by which the first behavior and the second behavior are selected, and the information (for example, icon) pertaining to this environmental parameter. The notification information may be provided by notification unit 92 by displaying the generated notification information on the overhead view.

In this case, if distance DRba between the leading vehicle and the host vehicle or rate of change RSb of the size of the leading vehicle has a high rate of contribution, for example, vehicle controller 7 may cause notification unit 92 to display a high luminance region or a color-changed region between the leading vehicle and the host vehicle in the overhead view so as to provide the notification information.

Alternatively, vehicle controller 7 may display, as the notification information, an icon indicating that distance DRba or rate of change RSb has a high rate of contribution, in a region between the leading vehicle and the host vehicle. Still alternatively, vehicle controller 7 may cause notification unit 92 to depict, as the notification information, a line segment connecting the leading vehicle and the host vehicle in the overhead view, or to depict line segments connecting all surrounding vehicles and the host vehicle as the notification information and to highlight only the line segment connecting the leading vehicle and the host vehicle in the overhead view.

Alternatively, vehicle controller 7 may cause notification unit 92 to display between the leading vehicle and the host vehicle, as the notification information, a region having higher luminance than the surrounding region or a region having a different color from the surrounding region, not in the overhead view, but in a viewpoint image viewed by the driver, thereby implementing augmented reality (AR) display. Alternatively, vehicle controller 7 may cause notification unit 92 to display in the viewpoint image, as the notification information, an AR image of an icon indicating an environmental parameter having a high rate of contribution in a region between the leading vehicle and the host vehicle.

Still alternatively, vehicle controller 7 may cause notification unit 92 to display in the viewpoint image, as the notification information, an AR image of a line segment connecting the leading vehicle and the host vehicle, or to display in the viewpoint image, as the notification information, an AR image of line segments connecting all surrounding vehicles and the host vehicle and to highlight only the line segment connecting the leading vehicle and the host vehicle.

It should be noted that the method for providing notification regarding the environmental parameter having a high rate of contribution or the information pertaining to the environmental parameter is not limited to the methods described above. For example, vehicle controller 7 may generate, as the notification information, an image in which the leading vehicle involved with an environmental parameter having a high rate of contribution is displayed in a highlighted manner, and may cause notification unit 92 to display this image.

In addition, vehicle controller 7 may generate, as the notification information, information indicating the direction of the leading vehicle or the like involved with an environmental parameter having a high rate of contribution in the overhead view or AR display, and display this information in the host vehicle or around the host vehicle.

Alternatively, in place of providing the notification regarding the information about the environmental parameter having a high rate of contribution or the information pertaining to this environmental parameter, vehicle controller 7 may make a leading vehicle or the like which is involved with an environmental parameter having a low rate of contribution unnoticeable by lowering the display luminance of the leading vehicle or the like, generate, as the notification information, the information about the environmental parameter having a high rate of contribution which becomes relatively noticeable or the information pertaining to the environmental parameter, and cause notification unit 92 to display the generated information.

Next, the construction of a driver model based on the travel history of the driver will be described. The driver model is classified into a clustering type constructed by clustering travel histories of a plurality of drivers, and an individually-adapted type in which a driver model of a specific driver (for example, driver x) is constructed from a plurality of travel histories similar to the travel history of driver x.

Firstly, the clustering type will be described. The clustering-type driver model is constructed in such a way that the travel history of the driver illustrated in FIG. 27 is aggregated in advance for each driver. Then, a plurality of drivers having a high degree of similarity between the travel histories, that is, a plurality of drivers having a similar driving operation tendency, is grouped to construct a driver model.

The degree of similarity between travel histories can be determined, for example, based on a correlation value of a vector having, when the behaviors in the travel histories of driver a and driver b are quantified according to a predetermined rule, the numerical value of the environmental parameter and the numerical value of the behavior as an element. In this case, when the correlation value calculated from the travel histories of driver a and driver b is higher than a predetermined value, the travel histories of driver a and driver b are grouped into a single group. Note that the calculation of the degree of similarity is not limited thereto.

Next, the individually-adapted type will be described. The individually-adapted-type driver model is constructed in such a way that travel histories of a plurality of drivers illustrated in FIG. 27 are aggregated in advance, as in the method for constructing the clustering-type. The different point from the clustering-type is such that the driver model is constructed for each driver. For example, when a driver model is constructed for driver y, the travel history of driver y and travel histories of the other drivers are compared, and the travel histories of the drivers having a high degree of similarity are extracted. Then, the individually-adapted-type driver model for driver y is constructed from the extracted travel histories of a plurality of drivers.

Notably, the driver model (situation database) based on the travel history in FIG. 27 is not limited to the clustering type or the individually-adapted type, and may be constructed to include travel histories of all drivers, for example.

Now, a method for using the constructed driver model will be described with examples. A description will next be given of a case where a driver model formed by aggregating travel histories of four drivers a to d is used for driver x. Note that the driver model is constructed by vehicle controller 7.

Modification

FIGS. 28A and 28B are diagrams illustrating a method for using the driver model in the present modification. FIG. 28A illustrates environmental parameters indicating the current travel environment of the vehicle driven by driver x. FIG. 28B illustrates one example of a driver model for driver x.

As illustrated in FIG. 28A, the behavior (operation) for the environmental parameters indicating the current travel environment is blank. Vehicle controller 7 acquires environmental parameters at predetermined intervals, and determines the next behavior from the driver model illustrated in FIG. 28B by using any one of the environmental parameters as a trigger.

For example, the environmental parameter indicating the need to change the operation of the vehicle, such as the case where the distance to the start point of the merging section becomes shorter than or equal to a predetermined distance or the case where the relative speed relative to the leading vehicle becomes less than or equal to a predetermined value, may be used as a trigger.

Vehicle controller 7 compares the environmental parameters illustrated in FIG. 28A with the environmental parameters in the travel history of the driver model illustrated in FIG. 28B, and determines the behavior associated with the most similar environmental parameters as the first behavior. In addition, vehicle controller 7 determines some behaviors associated with the other similar environmental parameters as the second behavior.

The similarity between environmental parameters can be determined from a correlation value of a vector having the numerical values of the environmental parameters as elements. For example, when the correlation value calculated from the vector having the numerical values of the environmental parameters illustrated in FIG. 28A as an element and the vector having the numerical values of the environmental parameters in FIG. 28B as an element is larger than a predetermined value, these environmental parameters are determined to be similar to each other. Note that the method for determining similarity between environmental parameters is not limited thereto.

In the above, a behavior is determined based on the degree of similarity between environmental parameters. However, a group of environmental parameters having high degree of similarity may be firstly generated, statistics of the environmental parameters in this group may be taken, and a behavior may be determined from this statistical data.

In this way, the notification regarding the behavior more suitable for the driver can be provided by constructing in advance the driver model for each driver from the travel histories of a plurality of drivers. Notably, to register a safer travel history into a database, it may be configured such that: storage unit 8 stores information indicating a safe travel standard; vehicle controller 7 determines whether or not the travel history satisfies this standard; and vehicle controller 7 further registers the travel history satisfying this standard into the database and does not register the travel history not satisfying this standard.

In addition, due to the association between the parameter indicating the travel environment and the behavior, vehicle controller 7 can determine the next behavior with high accuracy without determining a specific travel environment, i.e., without performing labeling of travel environments.

It is to be noted that the driver model (situation database) may be constructed from the travel history in which the behavior selected by the driver during autonomous driving and the environmental parameters indicating the travel environment when this behavior is presented are associated with each other. Alternatively, the driver model (situation database) may be constructed from the travel history in which the behavior selected by the driver during autonomous driving and the environmental parameters indicating the travel environment when the vehicle performs this behavior are associated with each other.

When the environmental parameters indicate the travel environment when the vehicle performs the behavior selected by the driver, the following configuration may be applied. Specifically, environmental parameters indicating a future travel environment are predicted from the environmental parameters indicating the current travel environment. Then, from among the environmental parameters indicating the travel environment when the vehicle performs the behavior selected by the driver, the behavior associated with the environmental parameter most similar to the predicted environmental parameters may be determined as the first behavior, and some behaviors associated with the other similar environmental parameters may be determined as the second behavior.

For example, the above prediction is conducted by extrapolating the environmental parameters in the future from the environmental parameters indicating the travel environments at the present moment and before the present moment.

Alternatively, the driver model (situation database) may be constructed from both the travel history in which the behavior selected by the driver during autonomous driving and the environmental parameters indicating the travel environment when this behavior is presented are associated with each other, and the travel history in which the behavior selected by the driver during autonomous driving and the environmental parameters indicating the travel environment when the vehicle performs this behavior are associated with each other.

In this case, both of the travel histories are stored in the form illustrated in FIG. 28B for example, and vehicle controller 7 determines the next behavior from these travel histories. In this case, vehicle controller 7 may place priority between these travel histories, and may preferentially determine the next behavior from the travel history in which the behavior selected by the driver during autonomous driving and the environmental parameters indicating the travel environment when the vehicle performs this behavior are associated with each other.

Note that, in the present invention, the function similar to the function executed by vehicle controller 7 may be executed by a cloud server or a server device. Particularly, storage unit 8 may be mounted in a server device such as a cloud server, not in vehicle 1, because it has an enormous amount of data with accumulation of travel histories. Alternatively, storage unit 8 may store a driver model which has already been constructed, and vehicle controller 7 may determine a behavior by referring to the driver model stored in storage unit 8.

It is to be noted that, in the configuration in which storage unit 8 is mounted in a cloud server, a cache is desirably provided in case of storage unit 8 being inaccessible due to a drop in a communication speed or disruption of communication.

Figure 29:
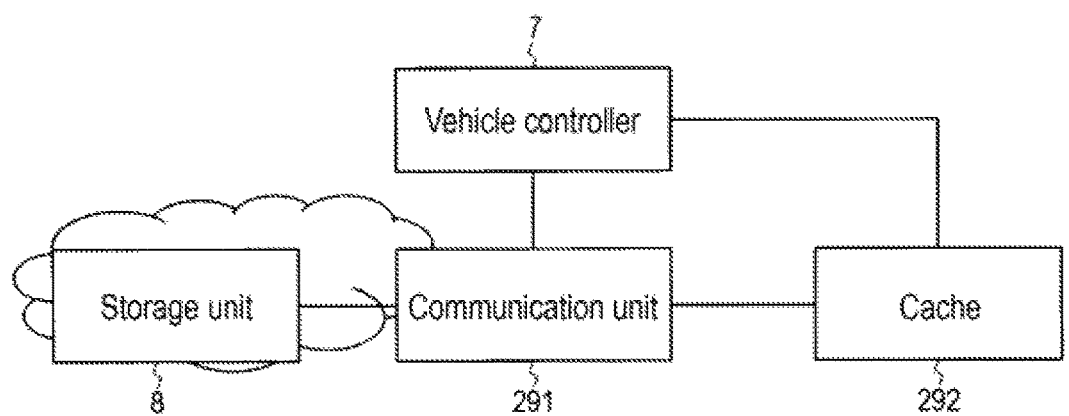
FIG. 29 is a block diagram illustrating one example of a cache arrangement in a modification of the driver model according to the fourth exemplary embodiment.

FIG. 29 is a block diagram illustrating one example of the arrangement of the cache. Vehicle controller 7 causes storage unit 8 to store the travel history through communication unit 291, and causes cache 292 to store a portion of the driver model (situation database) stored in storage unit 8 through communication unit 291.

Vehicle controller 7 accesses the driver model in cache 292. Conceivable methods for creating a cache in this case include a method for limitation according to presence or absence of an environmental parameter, a method using location information, and a method for processing data. Each of the methods will be described below.

Firstly, the method for limitation according to presence or absence of an environmental parameter will be described. It is possible to extract similar situations through comparison with surrounding situations, if there are sufficient travel environments (situations) having only the same environmental parameters. Therefore, vehicle controller 7 extracts travel environments having only the same environmental parameters from among the travel environments stored in storage unit 8, sorts these travel environments, and holds the resultant in cache 292.

In this case, vehicle controller 7 updates a primary cache at the timing at which the environmental parameters acquired from the detected situation are changed. According to this process, vehicle controller 7 can extract similar surrounding conditions even if the communication speed drops. Notably, the environmental parameters which are determined to be changed or not may be all environmental parameters or some of the environmental parameters described previously.

Moreover, because the environmental parameters vary from hour to hour, a primary cache and a secondary cache may be prepared in cache 292. For example, vehicle controller 7 holds travel environments having the same environmental parameters in the primary cache. Further, vehicle controller 7 holds, in the secondary cache, at least one of a travel environment in which one environmental parameter is added to the travel environment held in the primary cache and a travel environment in which one environmental parameter is reduced from the travel environment held in the primary cache.

Accordingly, vehicle controller 7 can extract a similar situation only by using the data in cache 292, even if temporal communication disruption occurs.

This case will be more specifically described with reference to FIG. 30. When sensor 62 detects surrounding situation 303 in which only adjacent leading vehicle 302 is present around host vehicle 301, vehicle controller 7 extracts travel environments (travel environments having the same environmental parameters) where only adjacent leading vehicle 302 is present, from storage unit 8 in which all travel environments (situations) stored, and stores the extracted travel environments in primary cache 304.

In addition, vehicle controller 7 extracts a travel environment where only one vehicle other than adjacent leading vehicle 302 is added (travel environment where one environmental parameter is added to the same environmental parameter) or a travel environment where there is no adjacent leading vehicle 302 (travel environment where one environmental parameter is reduced from the same environmental parameters) from storage unit 8, and stores the extracted travel environments in secondary cache 305.

When surrounding situation 303 detected by sensor 62 is changed, vehicle controller 7 copies the travel environment corresponding to changed surrounding situation 303 to primary cache 304 from secondary cache 305, extracts, from storage unit 8, a travel environment where one environmental parameter is added and a travel environment where one environmental parameter is reduced relative to the travel environment corresponding to changed surrounding situation 303, and stores the extracted travel environments into secondary cache 305. Thus, vehicle controller 7 updates secondary cache 305. Accordingly, vehicle controller 7 can smoothly extract more similar surrounding situation through comparison with the surrounding situations.

Next, the method using location information will be described. When location information is included in environmental parameters, vehicle controller 7 can extract, from storage unit 8, the travel environment (situation) where the location indicated by the location information is included within a certain range around the location of the host vehicle, and store the extracted travel environment in cache 292.

In this case, vehicle controller 7 updates cache 292 when the location indicated by the location information corresponding to the travel environment falls outside the certain range. Accordingly, vehicle controller 7 can extract a similar surrounding situation as long as the location falls within a certain range, even if long-term communication disruption occurs.

In addition, the method for processing data will be described. Operation histories including environmental parameters are accumulated in storage unit 8. Vehicle controller 7 divides the respective environmental parameters for each predetermined range to form a mesh on a multidimensional space. Then, vehicle controller 7 creates a table in which behaviors included in each mesh are counted for each type.

Figures 31A, 31B:
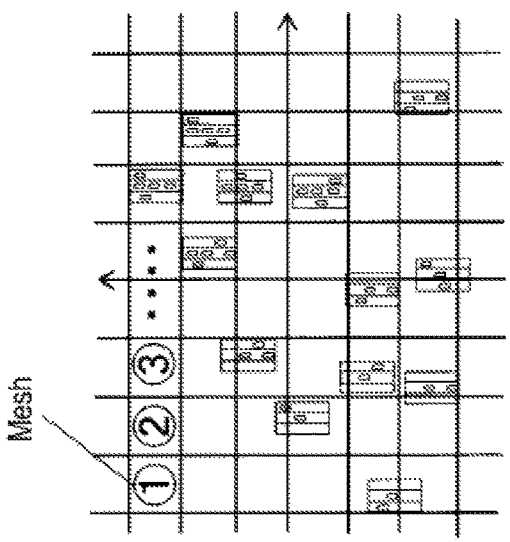
FIG. 31A is a diagram illustrating one example of a method for generating a cache in the modification of the driver model according to the fourth exemplary embodiment.
FIG. 31B is a diagram illustrating one example of a method for generating a cache in the modification of the driver model according to the fourth exemplary embodiment.

A description will be given of the case where the environmental parameters to be used are limited to two, for example. Vehicle controller 7 maps the environmental parameters included in the operation history on a plane as illustrated in FIG. 31A, and each axis is equally divided, whereby the plane is divided into a plurality of blocks. This is called a mesh.

Vehicle controller 7 counts the number of behaviors included in each mesh for each type (for example, the type such as acceleration, deceleration, lane change, or overtake). FIG. 31B illustrates a table where the number of behaviors included in each mesh is counted for each type.

Vehicle controller 7 stores this content in cache 292. Then, when extracting similar surrounding situation through the comparison with surrounding situations, vehicle controller 7 determines in which mesh the detected environmental parameter is located, selects the behavior having the highest number from the behaviors included in the determined mesh, and determines the selected behavior as the behavior to be provided as notification.

For example, when determining that the detected environmental parameter is located in No. 3 mesh, vehicle controller 7 determines operation of the behavior (here, "acceleration") showing the highest number among the behaviors included in the No. 3 mesh as the behavior to be provided as notification. If this method is used, cache 292 can be updated at any timing, and the capacity of cache 292 can be made constant.

The cache is created by using one of these methods or a combination thereof. It is to be noted that the methods described above are merely one example, and the method for creating a cache is not limited thereto.

The above is an example of extending the driver model according to the fourth exemplary embodiment. In this example, vehicle controller 7 acquires information about characteristic amounts indicating a driver's driving characteristic including information about a previous travel environment, storage unit 8 stores the information about characteristic amounts, and when it is determined that a vehicle behavior is needed to be changed, vehicle controller 7 determines information similar to characteristic amounts indicating the driver's driving characteristic including information about a newly-acquired travel environment, from the information about characteristic amounts stored in storage unit 8, and provides notification regarding the behavior corresponding to the determined information.

In addition, the following configuration may be applied to the example of extending the driver model according to the fourth exemplary embodiment. It is configured such that the information about characteristic amounts indicating the driver's driving characteristic including the information about the previous travel environment is at least one of information about characteristic amounts when a vehicle behavior is presented to the driver and information about characteristic amounts when the driver performs behavior selection.

In addition, when the information about characteristic amounts indicating the driver's driving characteristic including the information about the previous travel environment is both the information about characteristic amounts when a vehicle behavior is presented to the driver and the information about characteristic amounts when the driver performs behavior selection, vehicle controller 7 determines information similar to characteristic amount indicating the driver's driving characteristic including information about a newly-acquired travel environment, from both information items of characteristic amounts, and provides notification regarding the behavior corresponding to the determined information.

In addition, when the information about characteristic amounts indicating the driver's driving characteristic including the information about the previous travel environment is both the information about characteristic amounts when a vehicle behavior is presented to the driver and the information about characteristic amounts when the driver performs behavior selection, vehicle controller 7 determines information similar to characteristic amounts indicating the driver's driving characteristic including information about a newly-acquired travel environment, preferentially from the information about characteristic amounts when the driver performs behavior selection, and provides notification regarding the behavior corresponding to the determined information.

In addition, the information about characteristic amounts indicating the driver's driving characteristic including the information about the previous travel environment is information about characteristic amounts indicating the driver's driving characteristic when the vehicle is under autonomous driving and/or under manual driving.

Accordingly, vehicle controller 7 can construct a driver model more suitable for the driving tendency of the driver, and can perform autonomous driving more appropriate for the driver based on the constructed driver model. Due to the association between parameters indicating the travel environment and the behavior, vehicle controller 7 can determine the next behavior with high accuracy without requiring a process for determining a specific travel environment, i.e., without performing labeling of travel environments.

Common Description for Fifth to Eleventh Exemplary Embodiments

Recently, development pertaining to autonomous driving for motor vehicles has been advanced. According to the levels of vehicle automation defined by National Highway Traffic Safety Administration (NHTSA) in 2013, vehicle automation is classified into no automation (level 0), function-specific automation (level 1), combined function automation (level 2), limited self-driving automation (level 3), and full self-driving automation (level 4). The level 1 is a driving assistance system autonomously performing one of acceleration, deceleration, and steering, and level 2 is a driving assistance system autonomously performing two or more of acceleration, deceleration, and steering in unison. In either case, driver intervention for a driving operation is required. The automation level 4 is a full self-driving automation system autonomously performing all of acceleration, deceleration, and steering, and the driver does not intervene the driving operation. The automation level 3 is a limited self-driving automation system autonomously performing all of acceleration, deceleration, and steering, but the driver performs a driving operation according to need.

The exemplary embodiments below mainly propose a device (hereinafter also referred to as a "driving assistance device") that controls a human machine interface (HMI) for providing/receiving information pertaining to autonomous driving of the vehicle to/from an occupant of the vehicle (for example, a driver) in the level 3 or 4 of vehicle automation. As one object, the technology described in the fifth to eleventh exemplary embodiments aims to support implementation of safe and comfortable autonomous driving by presenting useful information to a driver during autonomous driving of a vehicle. In addition, the technology described in the fifth to eleventh exemplary embodiments enables the driver to easily and simply change the action determined by the vehicle during autonomous driving by presenting information providing less sense of incongruity to the driver.

Note that, "Actions" of the vehicle in the description below correspond to "behaviors" of the vehicle in the description of the first to fourth exemplary embodiments, and include an activation state such as steering or braking while the vehicle is traveling or stopped, or a control content pertaining to autonomous driving control, during autonomous driving or manual driving. The "actions" include constant-speed driving, acceleration, deceleration, temporarily stop, stop, lane change, route change, right/left turn, parking, and the like, for example. The actions of the vehicle are classified into currently-executed actions (also referred to as "current actions"), actions which are to be executed after the currently-executed actions (also referred to as "planned actions"), and the like. Further, the planned actions include actions which are to be executed immediately after the currently-executed action and actions which are to be executed at any timing after the currently-executed action is ended. Note that the planned actions may include actions which are to be executed after the currently-executed action is ended.

Figure 32:
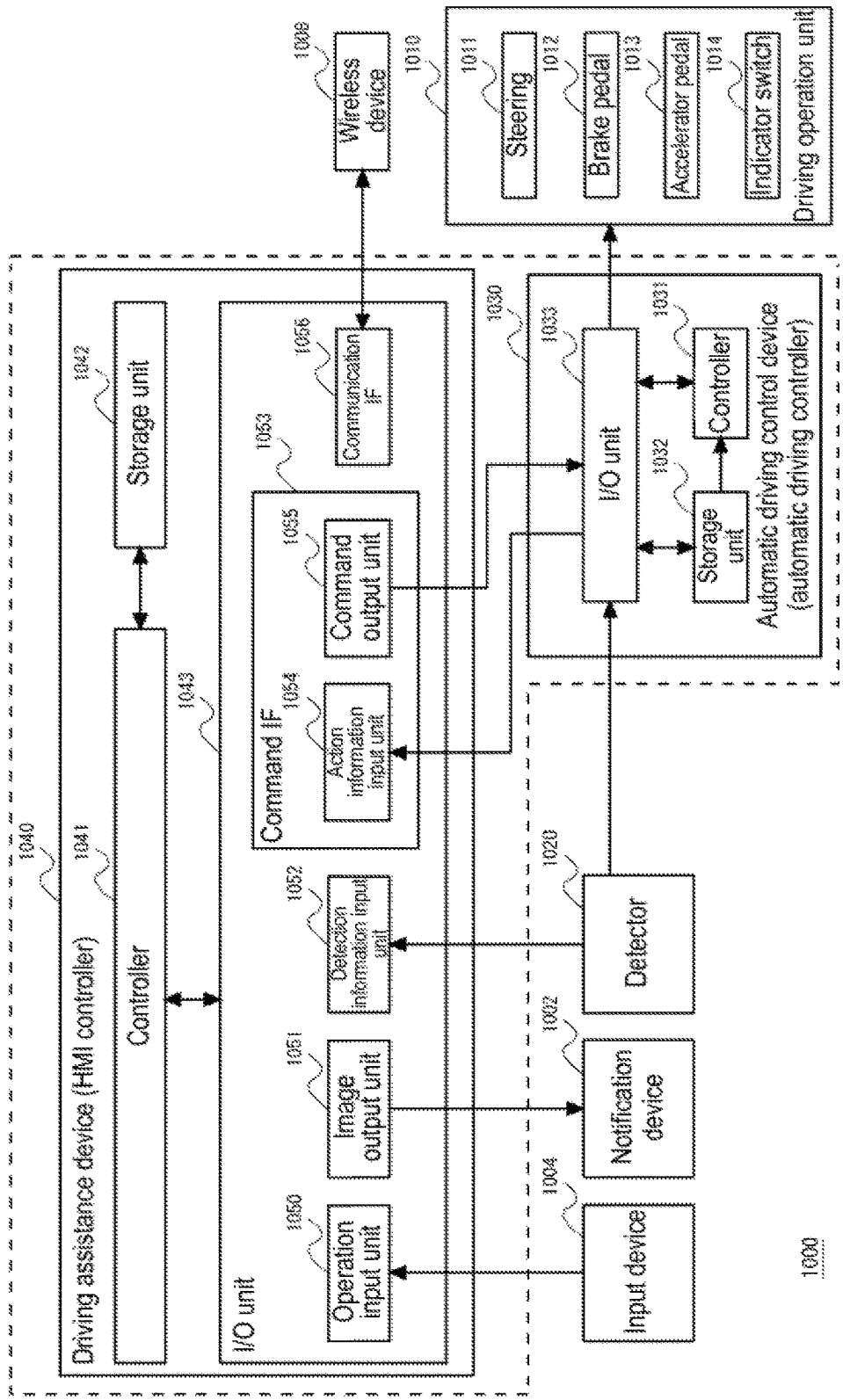
FIG. 32 is a block diagram illustrating a configuration of a vehicle according to fifth to eleventh exemplary embodiments of the present invention.

FIG. 32 is a block diagram illustrating the configuration of vehicle 1000, showing the configuration pertaining to autonomous driving. Vehicle 1000 can travel in an autonomous driving mode, and includes notification device 1002, input device 1004, wireless device 1008, driving operating unit 1010, detector 1020, autonomous driving control device 1030, and driving assistance device 1040. The devices illustrated in FIG. 32 may be interconnected by exclusive lines or wire communication such as a controller area network (CAN). Alternatively, they may be interconnected by wire communication or wireless communication such as a Universal Serial Bus (USB), Ethernet (registered trademark), Wi-Fi (registered trademark), or Bluetooth (registered trademark).

Notification device 1002 notifies the driver of information pertaining to travel of vehicle 1000. Notification device 1002 may be a display for displaying information, such as a light emitting element, e.g., a light emitting diode (LED), provided on, for example, a car navigation system, a head-up display, a center display, a steering wheel, a pillar, a dashboard, and the vicinity of an instrument panel in the vehicle interior. Notification device 1002 may also be a speaker for notifying the driver of information by converting the information into a voice/sound or a vibrator provided on a position (for example, a driver seat, a steering wheel, and the like) where the driver can sense the vibration. In addition, notification device 1002 may be a combination of these elements.

Vehicle 1000 corresponds to vehicle 1 in the first to fourth exemplary embodiments. Notification device 1002 corresponds to information notification device 9 in FIGS. 1 and 13, input device 1004 corresponds to operating unit 51 in FIG. 1 and input unit 102 in FIG. 13, and detector 1020 corresponds to detector 6 in FIGS. 1 and 13. In addition, autonomous driving control device 1030 and driving assistance device 1040 correspond to vehicle controller 7 in FIGS. 1 and 13. Hereinafter, the description of the components which have already been described in the first to fourth exemplary embodiments will be omitted as appropriate.

Notification device 1002 is a user interface device for presenting information pertaining to the autonomous driving of the vehicle to an occupant. Notification device 1002 may be: a head unit such as a car navigation system, or a display audio; a mobile terminal device such as a smartphone or a tablet; or an exclusive console terminal device. In addition, notification device 1002 may be a liquid crystal display, an organic EL display, or a head-up display (HUD). Input device 1004 is a user interface device that receives an operation input performed by an occupant. For example, input device 1004 receives information pertaining to autonomous driving of a host vehicle that is input by the driver. Input device 1004 outputs the received information to driving assistance device 1040 as an operation signal.

Figure 33:
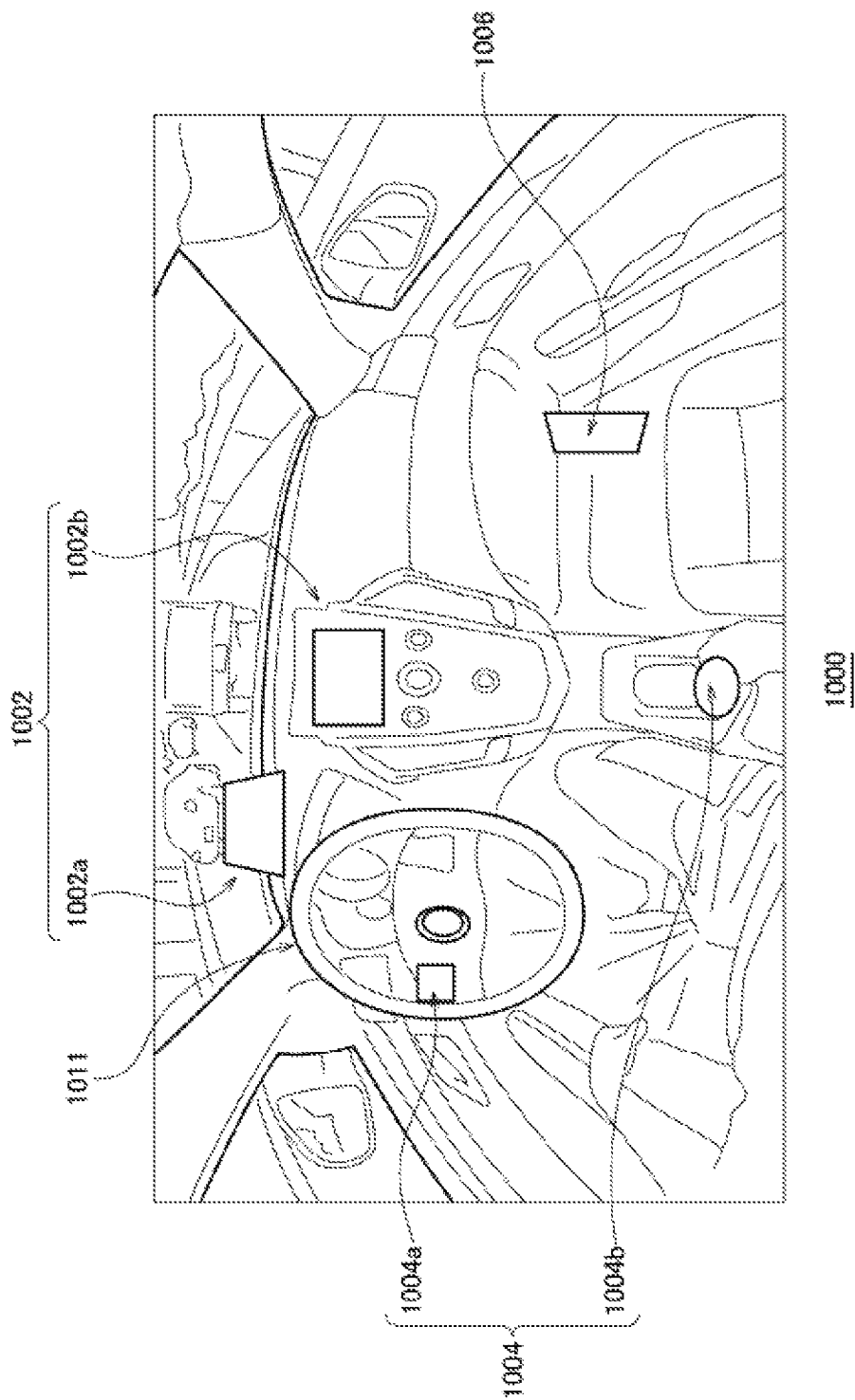
FIG. 33 is a diagram schematically illustrating an interior of the vehicle in FIG. 32.

FIG. 33 schematically illustrates an interior of vehicle 1000 in FIG. 32. Notification device 1002 may be head-up display (HUD) 1002a or center display 1002b. Input device 1004 may be first operating unit 1004a mounted to steering wheel 1011 or second operating unit 1004b mounted between a driver seat and a passenger seat. Note that notification device 1002 and input device 1004 may be integrated. For example, they may be mounted as a touch panel display.

Although not mentioned below, speaker 1006 for presenting information pertaining to autonomous driving to occupants with a voice/sound may be mounted on vehicle 1000 as illustrated in FIG. 33. In this case, driving assistance device 1040 may cause notification device 1002 to display an image indicating information pertaining to autonomous driving, and in addition to or in place of this configuration, may output a voice/sound indicating the information pertaining to autonomous driving from speaker 1006.

Returning to FIG. 32, wireless device 1008 is adapted to a mobile phone communication system, Wireless Metropolitan Area Network (WMAN), or the like, and executes wireless communication with a device (not illustrated) outside of vehicle 1000. Driving operating unit 1010 includes steering 1011, brake pedal 1012, accelerator pedal 1013, and indicator switch 1014. Steering 1011 corresponds to steering wheel 5 in FIGS. 1 and 13, brake pedal 1012 corresponds to brake pedal 2 in FIGS. 1 and 13, accelerator pedal 1013 corresponds to accelerator pedal 3 in FIGS. 1 and 13, and indicator switch 1014 corresponds to indicator lever 4 in FIGS. 1 and 13.

Steering 1011, brake pedal 1012, accelerator pedal 1013, and indicator switch 1014 can be electronically controlled respectively by a steering ECU, a brake ECU, at least one of an engine ECU and a motor ECU, and an indicator controller. In an autonomous driving mode, the steering ECU, the brake ECU, the engine ECU, and the motor ECU drive actuators according to control signals supplied from autonomous driving control device 1030. In addition, the indicator controller turns on or off an indicator lamp according to a control signal supplied from autonomous driving control device 1030.

Detector 1020 detects a surrounding situation and a travel state of vehicle 1000. As has been partially mentioned in the first to fourth exemplary embodiments, for example, detector 1020 detects a speed of vehicle 1000, relative speed of a leading vehicle relative to vehicle 1000, distance between vehicle 1000 and the leading vehicle, relative speed of a vehicle in the adjacent lane relative to vehicle 1000, distance between vehicle 1000 and the vehicle in the adjacent lane, and location information of vehicle 1000. Detector 1020 outputs detected various information items (hereinafter referred to as "detection information") to autonomous driving control device 1030 and driving assistance device 1040. Note that the detail of detector 1020 will be described later.

Autonomous driving control device 1030 is an autonomous driving controller having mounted thereto an autonomous driving control function, and determines an action of vehicle 1000 in autonomous driving. Autonomous driving control device 1030 includes controller 1031, storage unit 1032, and input/output unit (I/O unit) 1033. The configuration of controller 1031 can be achieved by collaboration of a hardware resource and a software resource, or by a hardware resource alone. Available hardware resources include a processor, a ROM, a RAM, and other LSI, and available software resources include a program such as an operating system, an application, and firmware. Storage unit 1032 has a non-volatile recording medium such as a flash memory. I/O unit 1033 executes communication control according to various communication formats. For example, I/O unit 1033 outputs information pertaining to autonomous driving to driving assistance device 1040, and receives a control command from driving assistance device 1040. I/O unit 1033 also receives detection information from detector 1020.

Controller 1031 applies the control command input from driving assistance device 1040 and various information items collected from detector 1020 or various ECUs to an autonomous driving algorithm, thereby calculating a control value for controlling a target to be autonomously controlled such as a travel direction of vehicle 1000. Controller 1031 transmits the calculated control value to the ECU or the controller for each of the targets to be controlled. In the present exemplary embodiment, controller 1031 transmits the calculated control value to the steering ECU, the brake ECU, the engine ECU, and the indicator controller. It is to be noted that, in an electric vehicle or a hybrid car, controller 1031 transmits the control value to the motor ECU in place of or in addition to the engine ECU.

Driving assistance device 1040 is an HMI controller executing an interface function between vehicle 1000 and a driver, and includes controller 1041, storage unit 1042, and I/O unit 1043. Controller 1041 executes a variety of data processing such as HMI control. Controller 1041 can be achieved by collaboration of a hardware resource and a software resource, or by a hardware resource alone. Available hardware resources include a processor, a ROM, a RAM, and other LSI, and available software resources include a program such as an operating system, an application, and firmware.

Storage unit 1042 is a storage area for storing data that will be referred to or updated by controller 1041. For example, storage unit 1042 is implemented by a non-volatile recording medium such as a flash memory. I/O unit 1043 executes various communication controls according to various communication formats. I/O unit 1043 is provided with operation input unit 1050, image output unit 1051, detection information input unit 1052, command interface (IF) 1053, and communication IF 1056.

Operation input unit 1050 receives, from input device 1004, an operation signal by an operation performed to input device 1004 by a driver, an occupant, or a user outside of the vehicle, and outputs this operation signal to controller 1041. Image output unit 1051 outputs image data generated by controller 1041 to notification device 1002 and causes notification device 1002 to display this image data. Detection information input unit 1052 receives, from detector 1020, information (hereinafter referred to as "detection information") which is the result of the detection process performed by detector 1020 and indicates the current surrounding situation and travel state of vehicle 1000, and outputs the received information to controller 1041.

Command IF 1053 executes an interface process with autonomous driving control device 1030, and includes action information input unit 1054 and command output unit 1055. Action information input unit 1054 receives information, pertaining to autonomous driving of vehicle 1000, transmitted from autonomous driving control device 1030, and outputs the received information to controller 1041. Command output unit 1055 receives, from controller 1041, a control command which indicates the manner of autonomous driving to autonomous driving control device 1030, and transmits this control command to autonomous driving control device 1030.

Communication IF 1056 executes an interface process with wireless device 1008. Communication IF 1056 transmits the data output from controller 1041 to wireless device 1008, and transmits this data to the external device from wireless device 1008. In addition, communication IF 1056 receives data transmitted from the external device and transferred by wireless device 1008, and outputs this data to controller 1041.

Note that autonomous driving control device 1030 and driving assistance device 1040 are configured as individual devices. As a modification, autonomous driving control device 1030 and driving assistance device 1040 may be integrated into one controller as indicated by a broken line in FIG. 32. In other words, a single autonomous driving control device may have both the functions of autonomous driving control device 1030 and driving assistance device 1040 in FIG. 32. In this case, a plurality of ECUs is provided in the integrated controller, wherein one of them may achieve the function of driving control device 1030, and the other may achieve the function of driving assistance device 1040. In addition, one ECU in the integrated controller may execute a plurality of operating systems (OSs), wherein one of them may achieve the function of driving control device 1030 and the other may achieve the function of driving assistance device 1040.

FIG. 34 is a block diagram illustrating the detailed configuration of detector 1020 in FIG. 32. Detector 1020 includes location information acquisition unit 1021, sensor 1022, speed information acquisition unit 1023, and map information acquisition unit 1024. Location information acquisition unit 1021 acquires the current location of vehicle 1000 from a GPS receiver.

Sensor 1022 is a general term for various sensors for detecting a situation outside of the vehicle and the state of vehicle 1000. Examples of sensors to be mounted for detecting the situation outside of the vehicle include a camera, a millimeter-wave radar, light detection and ranging or laser imaging detection and ranging (LIDAR), an ambient temperature sensor, an atmospheric pressure sensor, a humidity sensor, and an illuminance sensor. The situation outside the vehicle includes a road condition, including lane information, of a road in which a host vehicle is traveling, an environment including weather, a surrounding situation of the host vehicle, and nearby vehicles (such as nearby vehicles traveling in the adjacent lane) present near the host vehicle. Note that the situation outside the vehicle may be anything which is information about an outside of the vehicle detectable by the sensor. In addition, as sensors for detecting the state of vehicle 1000, for example, an acceleration sensor, a gyro sensor, a geomagnetic sensor, an inclination sensor, and the like are mounted.

Speed information acquisition unit 1023 acquires the current speed of vehicle 1000 from a speed sensor. Map information acquisition unit 1024 acquires map information around the current location of vehicle 1000 from a map database. The map database may be recorded in a recording medium in vehicle 1000, or downloaded from a map server via a network when being used. Hereinafter, each exemplary embodiment will be described.

Fifth Exemplary Embodiment

The fifth exemplary embodiment will be firstly summarized. If notification regarding the current action of the vehicle is only provided without providing notification regarding a future action during autonomous driving of the vehicle, an occupant of the vehicle may have an anxiety feeling. In view of this, in the fifth exemplary embodiment, an action that vehicle 1000 is currently executing (hereinafter referred to as a "current action") and an action that vehicle 1000 is planned to execute next after the current action (hereinafter referred to as a "planned action") are both presented to the driver during autonomous driving. Specifically, autonomous driving control device 1030 determines the current action and the planned action. Then, driving assistance device 1040 causes notification device 1002 in vehicle 1000 to display both the current action and the planned action.

Hereinafter, the details which have already been described in the previous exemplary embodiments will be omitted as appropriate. The configurations or operations described in the present exemplary embodiment can be combined with or replaced with configurations or operations described in other exemplary embodiments or modifications without departing from the spirit of the present invention.

Autonomous driving control device 1030 in the fifth exemplary embodiment determines both the current action and the planned action based on detection information output from detector 1020. Action information input unit 1054 in driving assistance device 1040 acquires, from autonomous driving control device 1030, current action information indicating a current action that autonomous driving control device 1030 causes vehicle 1000 to execute and planned action information indicating a planned action that autonomous driving control device 1030 causes vehicle 1000 to execute next after the current action. In the fifth exemplary embodiment, data including both the current action information and the planned action information is acquired as action information. The current action can be said to be an action that the vehicle is currently executing. The planned action can be said to be an action that the vehicle is going to execute after ending the currently-executed action, and may be an action that the vehicle is going to execute next after the currently-executed action or an action that the vehicle is going to execute next after the next action after the currently-executed action, for example.

FIG. 35 is a diagram illustrating action information input from autonomous driving control device 1030. The action information includes current action information which is identification information of a current action and planned action information which is identification information of a planned action. The identification information of the current action and the planned action may be a code or the like by which a kind of an action can be uniquely identified. The action information also includes remaining time information indicating a time from the current time until the planned action is executed, in other words, a time from the current time until the current action is switched to the planned action. For example, the action information in FIG. 35 indicates that the current action is a lane change to the right, the planned action is acceleration, and the remaining time from when the vehicle ends the current action until the vehicle starts the planned action is 10 seconds. The "current time" is a time at present recognized by autonomous driving control device 1030, and may be a system time inside autonomous driving control device 1030, for example. The "current time" may also be a time acquired from an unillustrated timer device measuring the current time in vehicle 1000. The "current time" may also be a time at which the content of the current action is determined, a time at which a content of a planned action planned to be executed in the future is determined, or a time at which the action information is provided to driving assistance device 1040.

FIG. 36 is a block diagram illustrating the detailed configuration of controller 1041 in driving assistance device 1040. Controller 1041 includes image generator 1060. Image generator 1060 generates a current action image representing the current action based on the current action information input from autonomous driving control device 1030 and a planned action image representing the planned action based on the planned action information. In the fifth exemplary embodiment, the current action image with a size larger than the size of the planned action image is generated.

Image output unit 1051 in driving assistance device 1040 outputs the current action image and the planned action image to notification device 1002 such that the current action image and the planned action image are displayed in a fixed field of view of the driver of vehicle 1000. These images being displayed in a fixed field of view of the driver also means that these images are displayed in the same field of view of the driver. For example, the current action image and the planned action image may be simultaneously displayed on positions close to each other or within a predetermined distance such that the driver can visually recognize these images at a time. Alternatively, these images may be displayed on predetermined positions in the same screen as overlapping each other in time. Alternatively, both the current action image and the planned action image may be displayed in a proximity range that does not need an eye movement. Still alternatively, image generator 1060 may generate image data of a screen in which the current action image and the planned action image are arranged in the proximity range.

Image generator 1060 further generates a remaining time image indicating a time until a planned action to be updated based on the remaining time information input from autonomous driving control device 1030 is executed. Image output unit 1051 further outputs the remaining time image to notification device 1002, and causes notification device 1002 to display the current action image and the planned action image including the remaining time image within a fixed field of view of the driver of vehicle 1000.

Figure 37A:
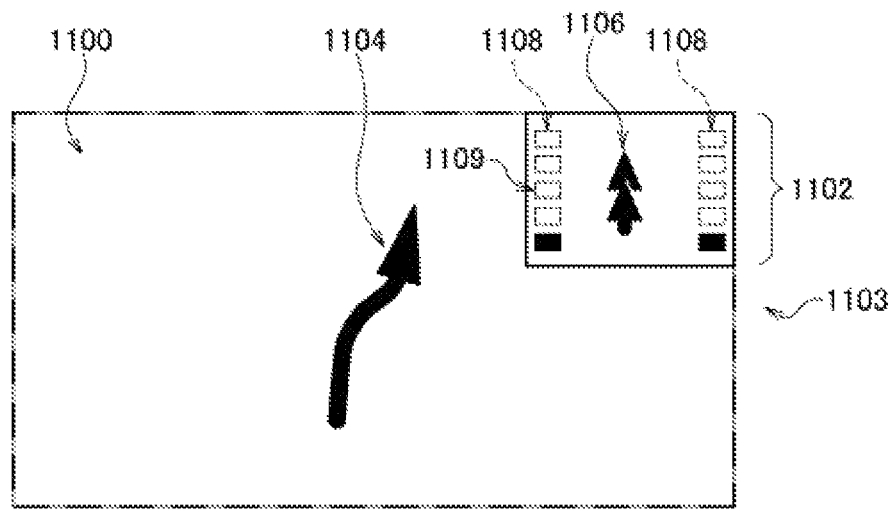
FIG. 37A is a view illustrating one example of an autonomous driving information screen according to the fifth exemplary embodiment.
Figure 37B:
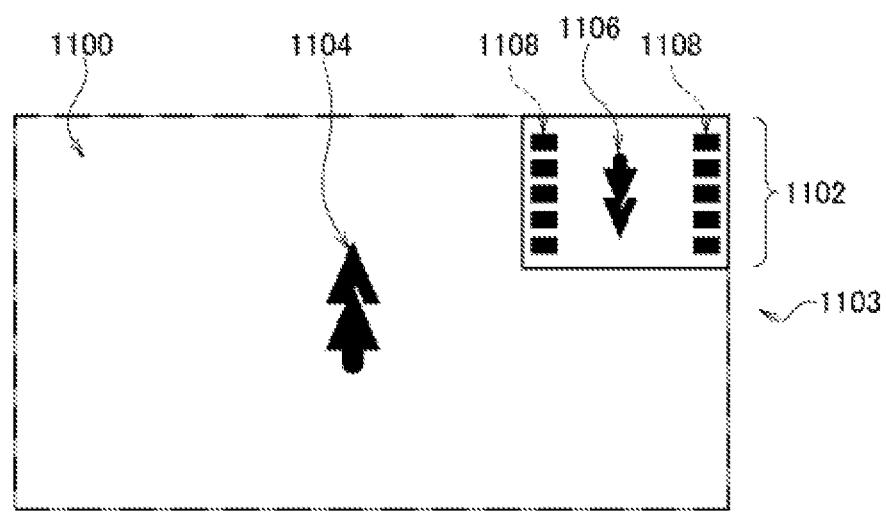
FIG. 37B is a view illustrating one example of an autonomous driving information screen according to the fifth exemplary embodiment.

A screen which includes various information items pertaining to autonomous driving and is displayed on notification device 1002 is also referred to as an "autonomous driving information screen". FIGS. 37A and 37B illustrate one example of the autonomous driving information screen. FIG. 37A illustrates an example of autonomous driving information screen 1103 at a first time, and FIG. 37B illustrates an example of autonomous driving information screen 1103 at a second time after the first time.

The display manner of current action image 1104 in autonomous driving information screen 1103 is set to be different from the display manner of planned action image 1106. This configuration prevents the driver from confusing between the current action of the vehicle and the planned action following the current action. For example, current action image 1104 is displayed with a size larger than the size of planned action image 1106. In addition, current action image 1104 is displayed on the center position in the fixed field of view of the driver of vehicle 1000. For example, current action image 1104 is displayed near the center of autonomous driving information screen 1103. On the other hand, planned action image 1106 is displayed on the surrounding position in the fixed field of view of the driver. For example, planned action image 1106 is displayed near the end of autonomous driving information screen 1103. In the examples in FIGS. 37A and 37B, current action image 1104 is displayed in main region 1100 in the display screen on autonomous driving information screen 1103, while planned action image 1106 is displayed in sub-region 1102 smaller than main region 1100.

In addition, in autonomous driving information screen 1103, remaining time image 1108 is displayed in association with planned action image 1106. Specifically, planned action image 1106 and remaining time image 1108 are displayed as being arranged close to each other in same sub-region 1102. In the fifth exemplary embodiment, remaining time image 1108 includes a plurality of time indicators 1109. Each of time indicators 1109 is displayed in an on state or in an off state, and the longer the remaining time until the planned action is executed is, the more time indicators 1109 are displayed in an on state.

In remaining time image 1108, notification regarding a remaining time condition until the planned action is executed is provided to the driver by gradually changing time indicators 1109 in the on state to the off state with time. For example, time indicators 1109 may be configured such that 5 seconds are allotted for each time indicator 1109 and a remaining time at a maximum of 25 seconds is indicated by five time indicators 1109. An appropriate value may be determined for the time taken for one time indicator 1109 to turn off according to knowledge of a developer or through experiments, and the like, or a user such as a driver may set any time therefor.

Typically, when a time corresponding to one time indicator 1109 has elapsed from the first time at which autonomous driving information screen 1103 in FIG. 37A is displayed, the current action of vehicle 1000 is switched to "acceleration" represented by planned action image 1106 in FIG. 37A. Upon the switching, autonomous driving information screen 1103 in FIG. 37B is displayed on notification device 1002. In autonomous driving information screen 1103 in FIG. 37B, "acceleration" represented by planned action image 1106 in FIG. 37A is displayed as current action image 1104.

Autonomous driving control device 1030 may determine, as the planned action, an action plan which is information obtained by successively combining a plurality of actions (individual actions). The action plan includes an "overtake" action. For example, the action plan of "overtake" is created by a combination of three individual actions. Specifically, the "overtake" action plan is created by a combination of (1) lane change to the right, (2) acceleration, and (3) lane change to the left. When autonomous driving control device 1030 determines an action plan as the planned action, action information input unit 1054 in driving assistance device 1040 acquires planned action information indicating the action plan. Specifically, a plurality of individual actions and information indicating the order of executing each of the individual actions are set in the planned action part (planned action information) of the action information illustrated in FIG. 35.

Figure 38:
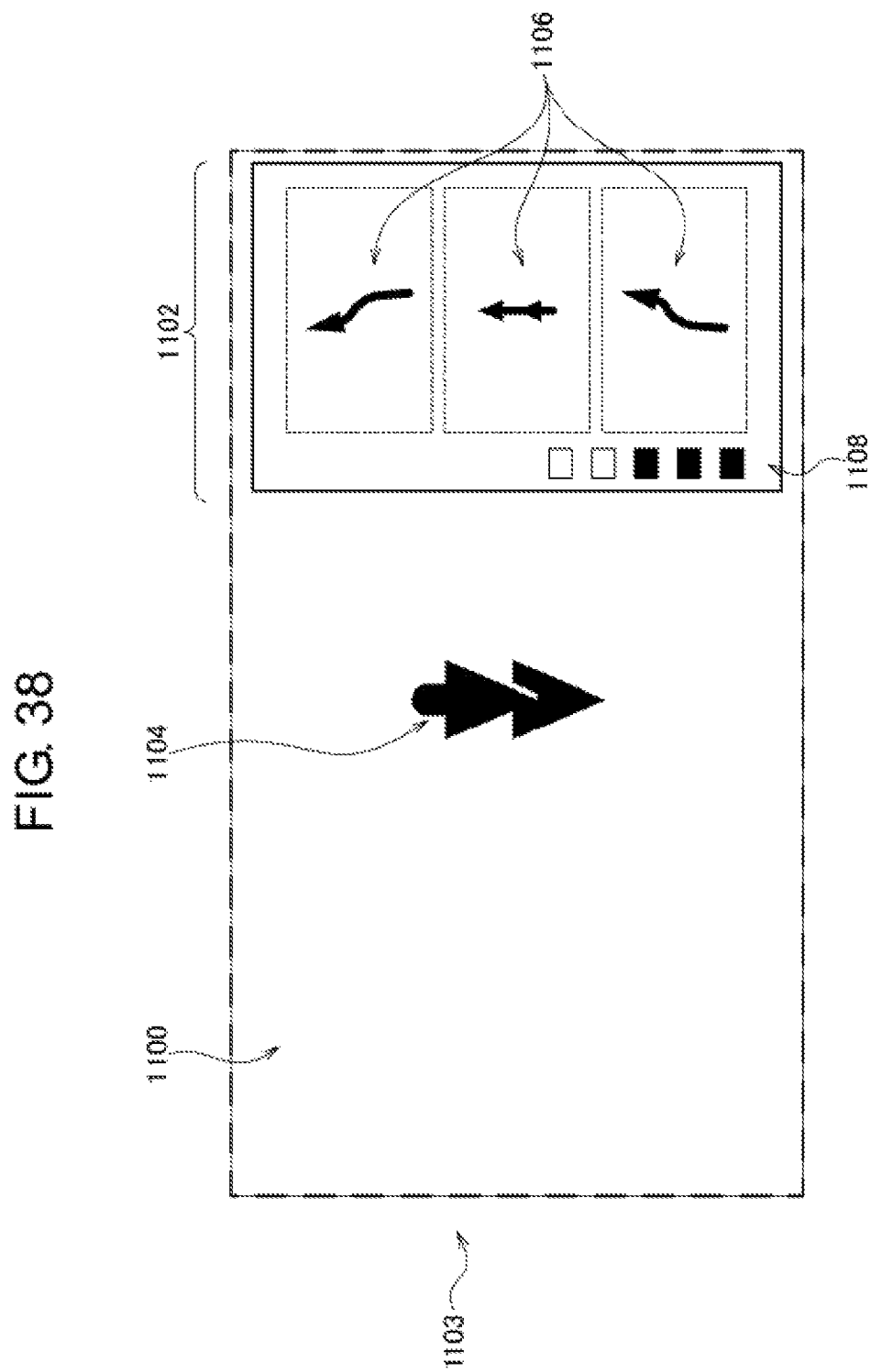
FIG. 38 is a view illustrating one example of an autonomous driving information screen according to the fifth exemplary embodiment.

When the planned action is an action plan, image generator 1060 generates planned action image 1106 in which a plurality of images representing a plurality of individual actions included in the action plan on action basis is arranged according to the order of execution of the plurality of individual actions. FIG. 38 illustrates one example of an autonomous driving information screen. In autonomous driving information screen 1103 in FIG. 38, planned action image 1106 which represents an action plan indicating an overtake action is displayed. Planned action image 1106 in FIG. 38 also includes three images showing three individual actions, and these images are arranged such that the image showing the individual action which is to be executed earlier is located on a lower position.

Autonomous driving control device 1030 may also determine, as a planned action, a plurality of action candidates which can be executed next after the current action during autonomous driving. The planned action in this case may include two actions which are "acceleration" being a first candidate and "deceleration" being a second candidate, or may include three actions including "lane change to the left" being a third candidate in addition to the above-mentioned two candidates. Autonomous driving control device 1030 determines a remaining time when each of the plurality of action candidates is executed, and further determines a priority order among the plurality of action candidates.

Action information input unit 1054 in driving assistance device 1040 acquires planned action information (referred to as "candidate information" here) including a plurality of action candidates. Specifically, candidate information indicating a plurality of action candidates and the remaining time and priority order for each action candidate is set in the planned action part of the action information illustrated in FIG. 35.

Image generator 1060 generates current action image 1104 representing the current action indicated by the action information and a plurality of candidate images corresponding to the plurality of action candidates indicated by the action information. In the fifth exemplary embodiment, as a plurality of candidate images, a plurality of planned action images 1106 representing a plurality of action candidates and a plurality of remaining time images 1108 representing the remaining time for each action candidate are generated. Image output unit 1051 outputs current action image 1104 to notification device 1002. Image output unit 1051 also performs predetermined ranking of the plurality of candidate images and outputs the resultant candidate images. Thus, current action image 1104 and the plurality of candidate images arranged according to the predetermined ranking are displayed in a fixed field of view of the driver.

The ranking among the action candidates is performed according to the priority of each action candidate indicated in the action information. Specifically, the action candidates are arranged such that an action candidate having a higher priority is placed higher in rank. As a modification, the action candidates may be arranged such that an action candidate with a shorter remaining time to execution is placed higher in rank. In addition, as described in exemplary embodiments mentioned below, the action candidates may be arranged such that an action candidate having a higher degree of coincidence with a taste or an operation pattern of the driver is placed higher in rank under the surrounding situation and the travel state of vehicle 1000 at present.

The display arrangement according to ranking may be achieved by arranging a plurality of candidate images corresponding to a plurality of action candidates on predetermined positions in autonomous driving information screen 1103 according to the order of each action candidate in a non-parametric display manner for visualizing the orders by, for example, a vertical or horizontal arrangement order. This order (the same is applied to the other exemplary embodiments) can also be referred to as a priority order or degree of priority in display on the screen or in presentation to the driver, and can also be referred to as a recommendation order or a degree of recommendation. For example, the candidate image of the action candidate having a higher order may be arranged on the right side (or may be arranged on the left side, and which side the candidate image is arranged may be determined in advance) in sub-region 1102 in autonomous driving information screen 1103.

Figure 63A:
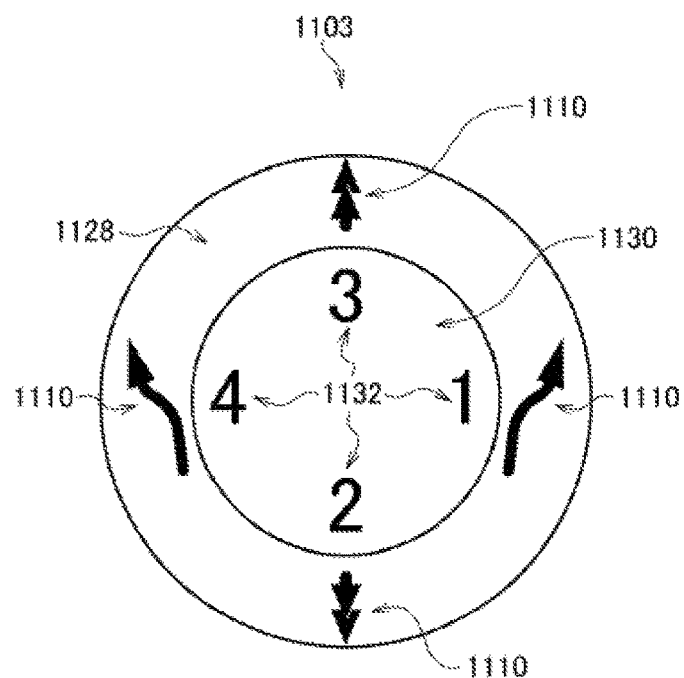
FIG. 63A is a view illustrating one example of an autonomous driving information screen according to the fifth exemplary embodiment.
Figure 63B:
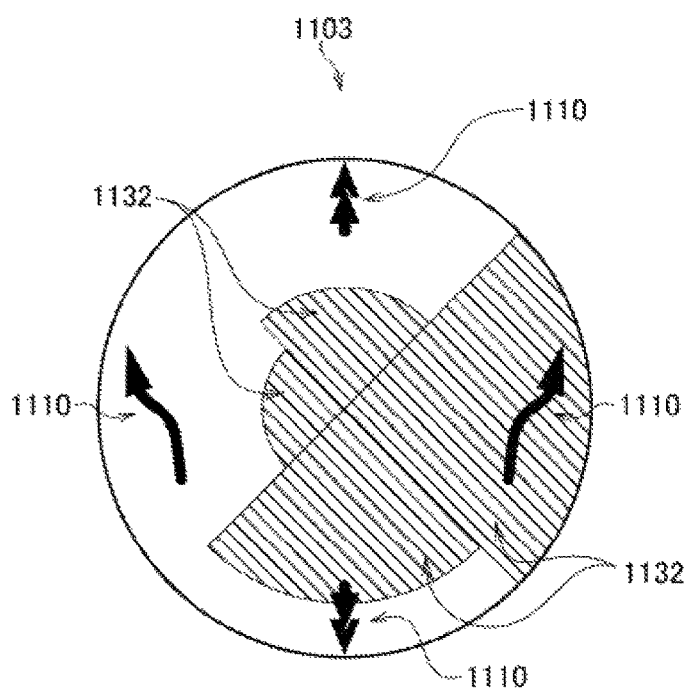
FIG. 63B is a view illustrating one example of an autonomous driving information screen according to the fifth exemplary embodiment.

In addition, the display arrangement according to ranking may be a parametric display in which orders are visualized using a histogram. For example, each candidate image may be displayed in such a manner that an object indicating the order generated by image generator 1060 is added thereto. The object may be a histogram image with a shape according to the order or may be a numeral image or the like directly showing the order, and may be generated by image generator 1060. The example of the parametric display is also illustrated in FIGS. 63A and 63B described later. In addition, a candidate image of an action candidate with a higher order may be displayed with a visible appearance (design). For example, such a candidate image may be displayed with a larger size or in a color which is expected to provide higher visibility.

Figure 39:
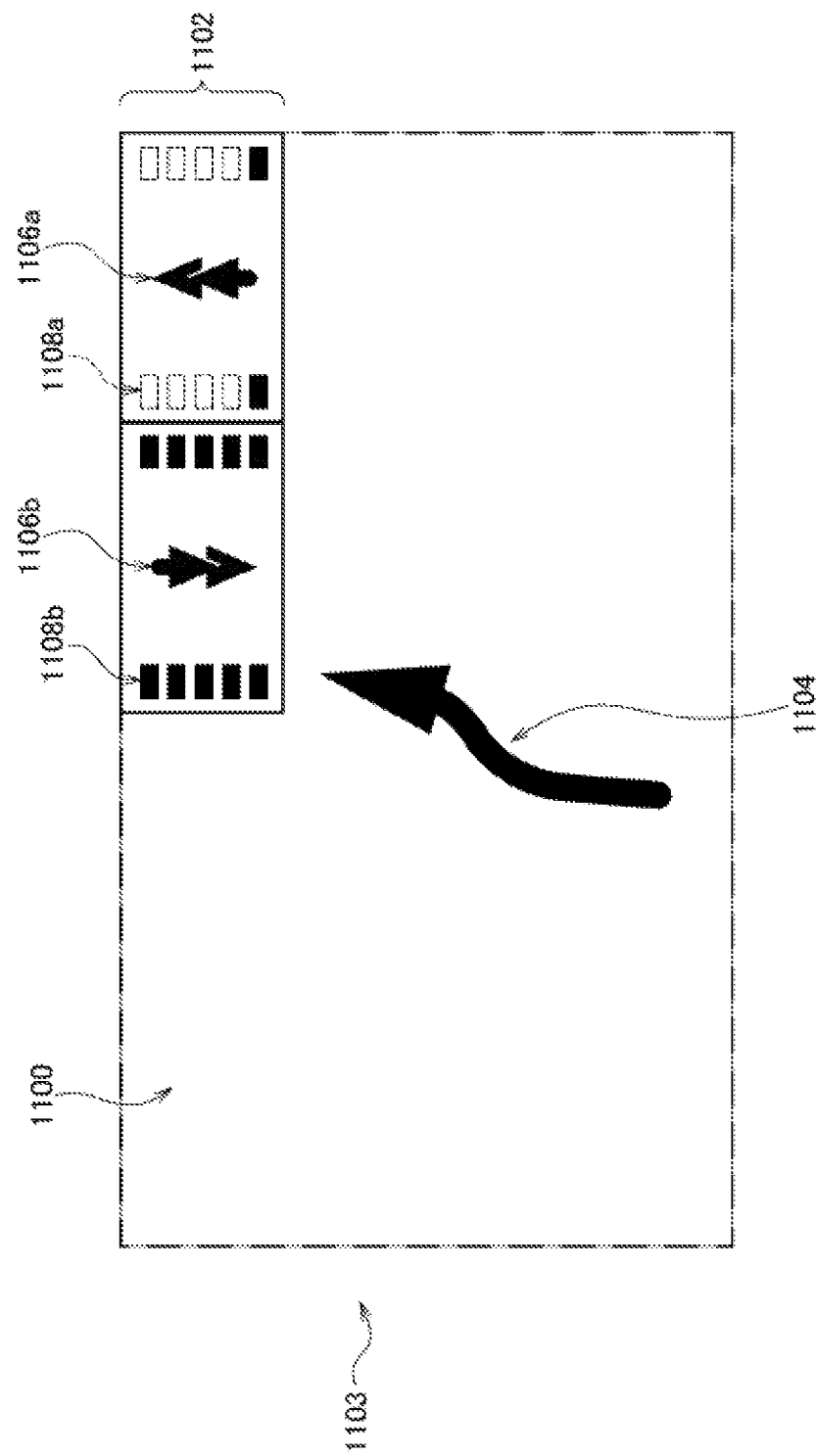
FIG. 39 is a view illustrating one example of an autonomous driving information screen according to the fifth exemplary embodiment.

FIG. 39 illustrates one example of the autonomous driving information screen. In autonomous driving information screen 1103 in FIG. 39, first planned action image 1106*a* representing "acceleration" which is a first action candidate and second planned action image 1106*b* representing "deceleration" which is a second action candidate are displayed. Further, first remaining time image 1108*a* representing a remaining time until the first action candidate is executed and second remaining time image 1108*b* representing a remaining time until the second action candidate is executed are displayed. Here, the priority of "acceleration" is higher, and first planned action image 1106*a* representing "acceleration" is displayed on the right side showing a higher order. In FIG. 39, the order of first planned action image 1106*a* and remaining time image 1108 is presented in a non-parametric display manner. As previously stated, the order may be presented in a parametric manner in which a histogram or the like with a shape according to the order is added to each of first planned action image 1106*a* and second planned action image 1106*b*.

According to this embodiment, the driver can understand in advance a plurality of action candidates which are to be executed in the future in autonomous driving of the vehicle, whereby increased sense of safety can be provided to the driver. In addition, as described in the following exemplary embodiments, when the driver can select a planned action, the driver can select a future action of the vehicle in autonomous driving from among a plurality of candidates. Furthermore, the selection by the driver from the candidates can be supported by presenting the orders of the candidates to the driver.

Figure 40:
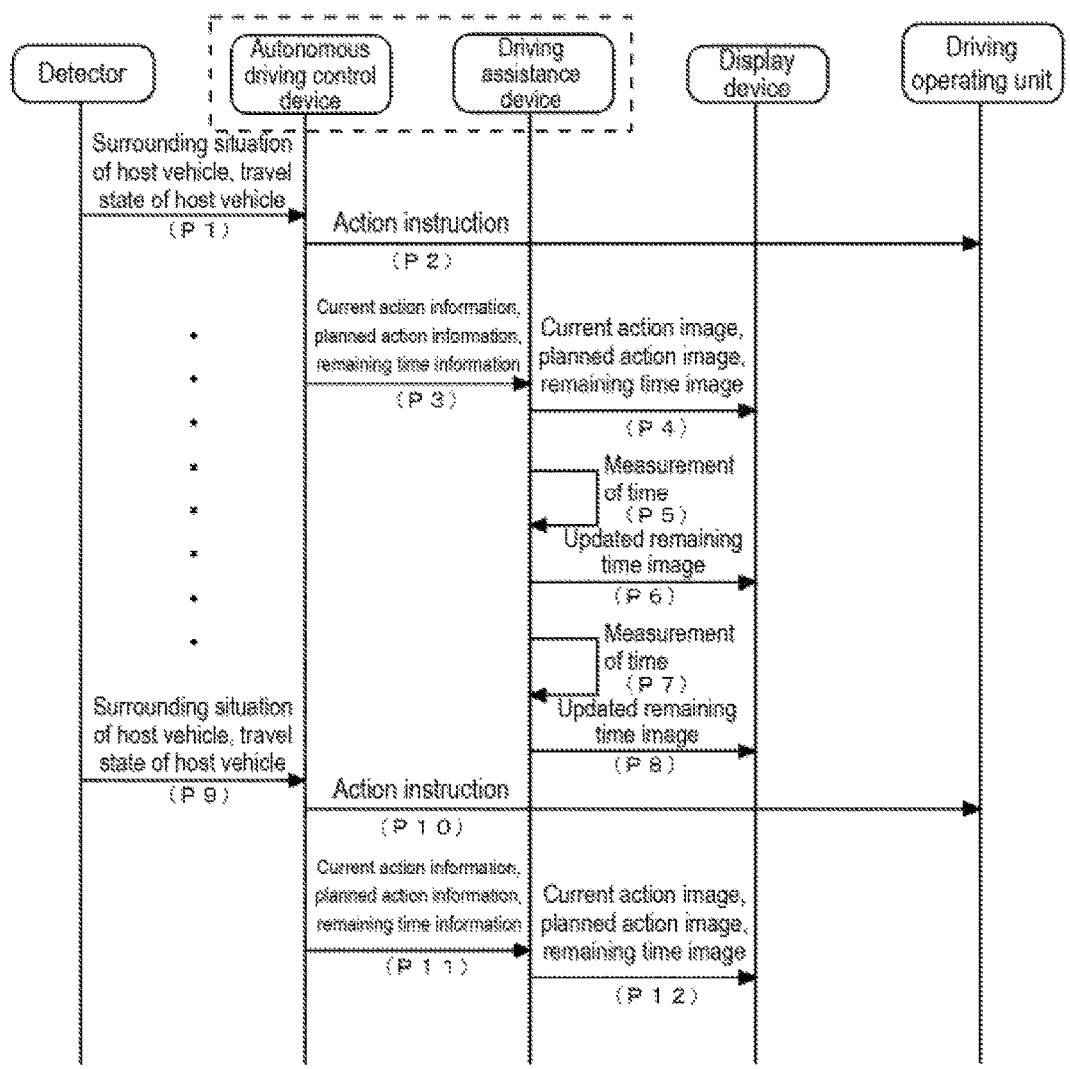
FIG. 40 is a sequence diagram illustrating an example of a process pertaining to human machine interface (HMI) control of a vehicle according to the fifth exemplary embodiment.

FIG. 40 is a sequence diagram illustrating an example of a process involved with HMI control of vehicle 1000. Detector 1020 detects the surrounding situation and the travel state of vehicle 1000, and outputs detection information indicating the detection result to autonomous driving control device 1030 (P1). Autonomous driving control device 1030 determines a current action of the vehicle, a planned action, and a remaining time to the execution of the planned action according to the detection information acquired from detector 1020. Then, autonomous driving control device 1030 outputs an action instruction for instructing vehicle 1000 to execute the current action to driving operating unit 1010, thereby causing vehicle 1000 to execute the current action (P2). Autonomous driving control device 1030 also transmits current action information, planned action information, and remaining time information to driving assistance device 1040 (P3).

Driving assistance device 1040 generates a current action image, a planned action image, and a remaining time image based on the current action information, the planned action information, and the remaining time information which have been acquired from autonomous driving control device 1030, and causes notification device 1002 to display these images (P4). Specifically, image generator 1060 in driving assistance device 1040 further determines display positions of the current action image, the planned action image, and the remaining time image on the screen. Image output unit 1051 in driving assistance device 1040 outputs to notification device 1002 display position information indicating display positions of the current action image, the planned action image, and the remaining time image along with these images, and causes the notification device 1002 to display the autonomous driving information screen including the respective images being arranged on the positions illustrated in FIGS. 37A and 37B, and the like.

As a modification, image generator 1060 in driving assistance device 1040 may generate image data of the entire autonomous driving information screen in which the current action image is disposed on the center position and the planned action image and the remaining time image are disposed on the surrounding position. Image output unit 1051 in driving assistance device 1040 may output the generated image data of the autonomous driving information screen to notification device 1002 and cause notification device 1002 to display the generated image data.

Driving assistance device 1040 measures the time from P4 (P5), and outputs, to notification device 1002, the updated remaining time image on which a lapse of time is reflected, thereby updating the manner of the remaining time image in the autonomous driving information screen (P6). The updated remaining time image is such that, for example, the time indicator which has been in an on state is changed to an off state. Driving assistance device 1040 repeats the process for updating the remaining time image until new current action information, new planned action information, and new remaining time information are acquired from autonomous driving control device 1030 (P7 to P8).

Detector 1020 periodically detects the surrounding situation and the travel state of vehicle 1000, and outputs detection information indicating the detection result to autonomous driving control device 1030 (P9). Autonomous driving control device 1030 newly determines a current action, a planned action, and a remaining time to the execution of the planned action according to the detection information. Autonomous driving control device 1030 then outputs an action instruction for instructing vehicle 1000 to execute the newly determined current action to driving operating unit 1010, thereby causing vehicle 1000 to execute the newly determined current action (P10). Autonomous driving control device 1030 transmits, to driving assistance device 1040, new current action information, new planned action information, and new remaining time information respectively indicating the current action, the planned action, and the remaining time which have been newly determined (P11). Driving assistance device 1040 generates a new current action image, a new planned action image, and a new remaining time image based on the new current action information, the new planned action information, and the new remaining time information which have been acquired from autonomous driving control device 1030, and causes notification device 1002 to display these images (P12).

As indicated by a broken line in FIG. 40, autonomous driving control device 1030 and driving assistance device 1040 may be integrated into one autonomous driving control device. In this case, a single autonomous driving control device may execute both the process of autonomous driving control device 1030 and the process of driving assistance device 1040. The same is applied to the following exemplary embodiments.

Figure 41:
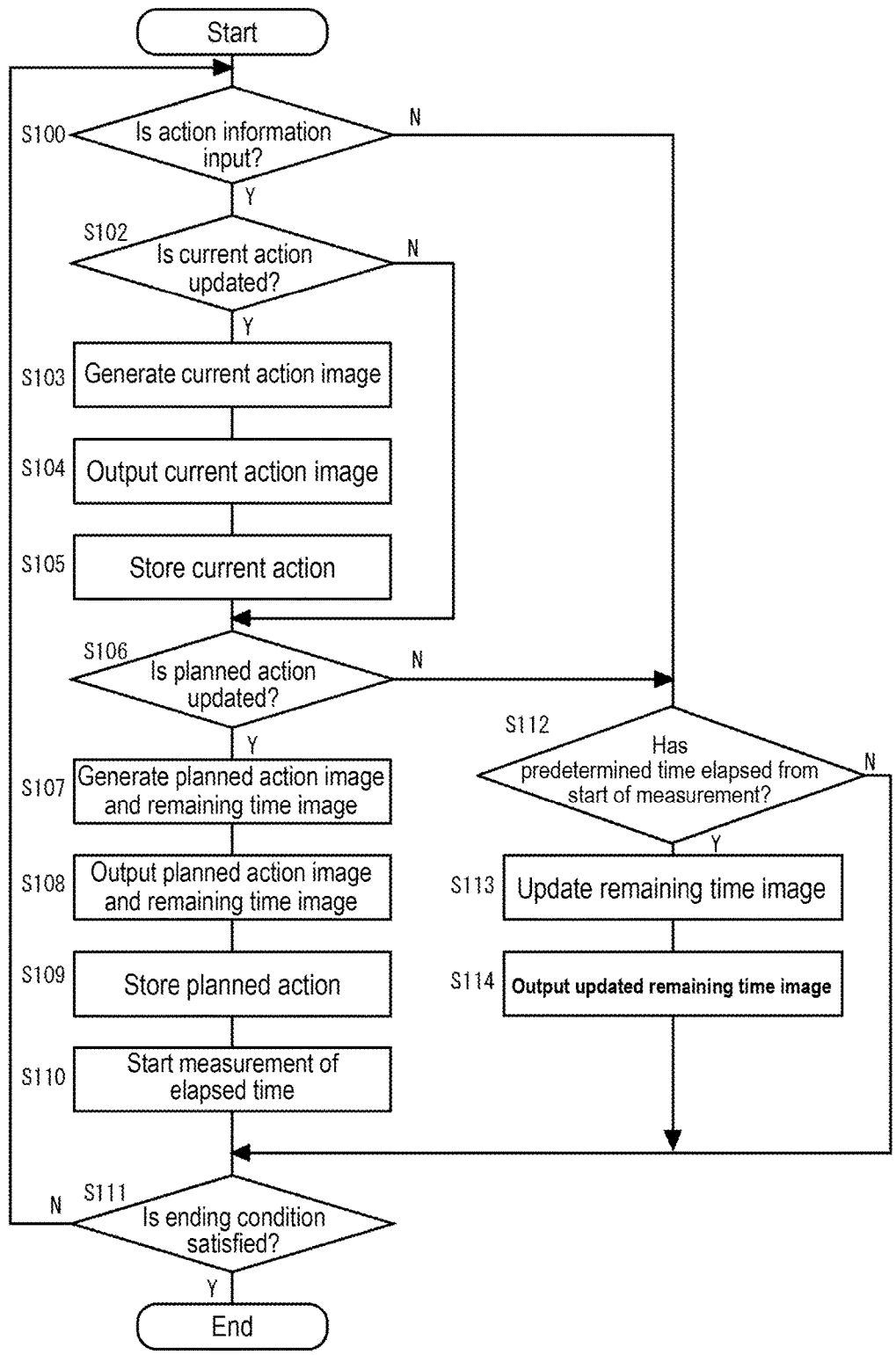
FIG. 41 is a flowchart illustrating an example of a process of the driving assistance device according to the fifth exemplary embodiment.

FIG. 41 is a flowchart illustrating an example of a process of driving assistance device 1040. When action information input unit 1054 acquires the action information output from autonomous driving control device 1030 (Y in S100), image generator 1060 determines whether or not the current action indicated by the action information and a current action stored in advance in storage unit 1042 coincide with each other. Image generator 1060 also determines whether or not the planned action indicated by the action information and a planned action stored in advance in storage unit 1042 coincide with each other.

When the current action indicated by the action information and the current action stored in advance in storage unit 1042 do not coincide with each other, that is, when the current action is updated (Y in S102), image generator 1060 generates a current action image representing the current action indicated by the action information (S103). Image output unit 1051 outputs the current action image to notification device 1002 and causes the notification device 1002 to display the current action image (S104), and image generator 1060 causes storage unit 1042 to store the current action indicated by the action information (S105). When the current action indicated by the action information and the current action stored in advance in storage unit 1042 coincide with each other, that is, when the current action is not updated (N in S102), steps S103 to S105 are skipped.

When the planned action indicated by the action information and the planned action stored in advance in storage unit 1042 do not coincide with each other, that is, when the planned action is updated (Y in S106), image generator 1060 generates a planned action image representing the planned action indicated by the action information. Image generator 1060 also generates a remaining time image representing a remaining time indicated by the action information (S107). Image output unit 1051 outputs the planned action image and the remaining time image to notification device 1002 and causes the notification device 1002 to display these images (S108), and image generator 1060 causes storage unit 1042 to store the planned action indicated by the action information (S109). Image generator 1060 starts measuring an elapsed time from the start of displaying the planned action image and the remaining time image (S110).

When a predetermined ending condition is satisfied (Y in S111), the flow in FIG. 41 is ended, and when the ending condition is not satisfied (N in S111), the process returns to S100. The ending condition is common to the following exemplary embodiments, and is satisfied when the driver ends the autonomous driving mode or when an ignition key or a power source of the vehicle is switched to off, for example.

If the action information has not yet been input from autonomous driving control device 1030 (N in S100), image generator 1060 determines whether or not a predetermined time has elapsed from the start of the measurement of the elapsed time. Similarly, when the planned action indicated by the action information and the planned action stored in advance in storage unit 1042 coincide with each other, that is, when the planned action is not updated (N in S106), image generator 1060 determines whether or not a predetermined time has elapsed from the start of the measurement of the elapsed time. When detecting that the predetermined time has elapsed from the start of the measurement of the elapsed time (Y in S112), image generator 1060 updates the remaining time image (S113). For example, when detecting that a time allotted to one time indicator 1109 has elapsed, image generator 1060 generates a remaining time image in which one time indicator 1109 is changed from the on state to the off state. Image output unit 1051 outputs the updated remaining time image to notification device 1002 and causes notification device 1002 to display this image (S114). As a modification, the entire image of the autonomous driving information screen may be updated in updating the remaining time image. If the predetermined time has not elapsed from the start of the measurement of the elapsed time (N in S112), steps S113 and S114 are skipped.

Regarding S106 to S109 in FIG. 41, autonomous driving control device 1030 may change the planned action to a second planned action (for example, acceleration) from a first planned action (for example, lane change to the right) during the execution of a certain current action. In this case, action information input unit 1054 in driving assistance device 1040 acquires, from autonomous driving control device 1030, action information in which the current action information is not updated but the planned action information and the remaining time information are updated. Specifically, action information input unit 1054 acquires action information which is updated such that the planned action information indicates the second planned action and the remaining time information indicates the time until the second planned action is executed.

Image generator 1060 generates a new planned action image representing the second planned action and a new remaining time image representing a time until the second planned action is executed. Image output unit 1051 outputs the new planned action image and the new remaining time image to notification device 1002. Thus, the new planned action image representing the second planned action and the new remaining time image are displayed, in place of the previous planned action image representing the first planned action and the remaining time image, within the fixed field of view of the driver along with the current action image which is not updated.

While the respective processes are sequentially executed in the flowchart in FIG. 41, the respective processes may be executed in parallel, as appropriate. For example, the processes in S102 to S105 and the processes in S106 to S110 may be executed in parallel. In addition, when action information is input from autonomous driving control device 1030, the determination made in steps S102 and S106 may be skipped. Specifically, regardless of whether the current action and the planned action have been updated, the current action image, the planned action image, and the remaining time image may be newly generated and output at all times.

As described above, driving assistance device 1040 in the fifth exemplary embodiment notifies an occupant (driver or the like) of the vehicle of a current action during autonomous driving, and also, in advance, of an action at a future point, specifically, a planned action to be executed next after the current action. In addition, driving assistance device 1040 also notifies the occupant (driver or the like) of the vehicle of a remaining time until the current action is switched to the planned action. According to this configuration, driving assistance device 1040 can assist the driver of the vehicle to foresee a planned action in autonomous driving and to be capable of foreseeing when the planned action is executed. In other words, driving assistance device 1040 prevents the execution of an unexpected action by the occupant during autonomous driving of the vehicle, thereby preventing the occupant from having a sense of anxiety. In addition, driving assistance device 1040 can assist the driver to appropriately determine whether to stop the autonomous driving to regain driving control authority.

A modification will be described. During autonomous driving of the vehicle, autonomous driving control device 1030 determines a second action (for example, acceleration) which is to be executed next after a first action (for example, lane change to the right) which is the current action and a remaining time until the second action is executed. In this case, autonomous driving control device 1030 may further determine a third action (for example, deceleration) which is to be executed next after the second action and a remaining time until the third action is executed.

Action information input unit 1054 in driving assistance device 1040 may acquire, from autonomous driving control device 1030, current action information indicating the first action, planned action information indicating the second action and the third action, and remaining time information indicating the remaining time to the second action and the remaining time to the third action. Image generator 1060 may generate a current action image representing the first action, a planned action image and a remaining time image respectively representing the second action and the remaining time to the second action, and a planned action image and a remaining time image respectively representing the third action and the remaining time to the third action.

Image output unit 1051 may output these image data items to notification device 1002 to display these images as being arranged within the fixed field of view of the driver in the manner illustrated in FIG. 39. For example, the planned action image representing the second action and the remaining time image representing the remaining time to the second action may be arranged like first planned action image 1106a and second planned action image 1106b in FIG. 39. In addition, the planned action image representing the third action and the remaining time image representing the remaining time to the third action may be arranged like second planned action image 1106b and second remaining time image 1108b in FIG. 39.

Notably, while the current action of the vehicle is the first action, the planned action image representing the third action and the remaining time image representing the remaining time to the third action may not be displayed. For example, the process relating to the generation, output, or display of these images may be skipped. When the third action is not displayed, the display may have the manner illustrated in FIG. 37A.

When the current action of the vehicle is switched to the second action from the first action, image output unit 1051 may not display the image representing the first action, and may display the image representing the second action and the image representing the third action within the same field of view of the driver. This process may be performed when notification (new action information or the like) indicating that the current action of the vehicle is switched to the second action from the first action is received from autonomous driving control device 1030, for example. Image generator 1060 may generate a current action image representing the second action as a current action and a planned action image representing the third action as a planned action, and image output unit 1051 may output these images to notification device 1002 to switch the content of autonomous driving information screen 1103.

When the third action is not displayed during the execution of the first action, autonomous driving information screen 1103 in this modification is switched from the screen in FIG. 37A to the screen in FIG. 37B, for example. On the other hand, when the third action is displayed during the execution of the first action, autonomous driving information screen 1103 is switched from the screen in FIG. 39 to the screen in FIG. 37B. Regardless of whether the third action is displayed or not during the execution of the first action, when the current action of the vehicle is switched to the second action from the first action, the position of the image representing the second action is changed to the center position from the surrounding position in the fixed field of view of the driver. Further, the relatively small display of the planned action image representing the second action is changed to a relatively large display of the current action image representing the second action. On the other hand, the planned action image representing the third action is displayed with a size smaller than the current action image representing the second action on the surrounding position in the fixed field of view of the driver.

Sixth Exemplary Embodiment

The sixth exemplary embodiment will be firstly summarized. During autonomous driving of a vehicle, a driver may not be able to understand what action the driver can instruct the vehicle to immediately execute, and therefore, the driver may have a sense of anxiety.

In view of this, in the sixth exemplary embodiment, a candidate of an action that the vehicle is caused to immediately execute (hereinafter referred to as a "current action candidate") is presented to the driver, in place of the current action of the vehicle during autonomous driving. The current action candidate can also be referred to as a candidate of a substitute action substituted for the current action, and can also be referred to as a candidate of an action that vehicle 1000 is caused to execute in place of the current action. Specifically, autonomous driving control device 1030 determines the current action, and driving assistance device 1040 determines the current action candidate. Then, driving assistance device 1040 causes notification device 1002 in vehicle 1000 to display both the current action and the current action candidate. Notably, it is obvious that, even when the driver instructs the vehicle to execute an action that the vehicle should immediately execute, a certain delay from the present moment is actually allowed, because of the occurrence of processes of the respective devices, communication among the respective devices, or the like.

Hereinafter, the details which have already been described in the previous exemplary embodiments will be omitted as appropriate. The configurations or operations described in the present exemplary embodiment can be combined with or replaced with configurations or operations described in other exemplary embodiments or modifications without departing from the spirit of the present invention.

Figure 42:
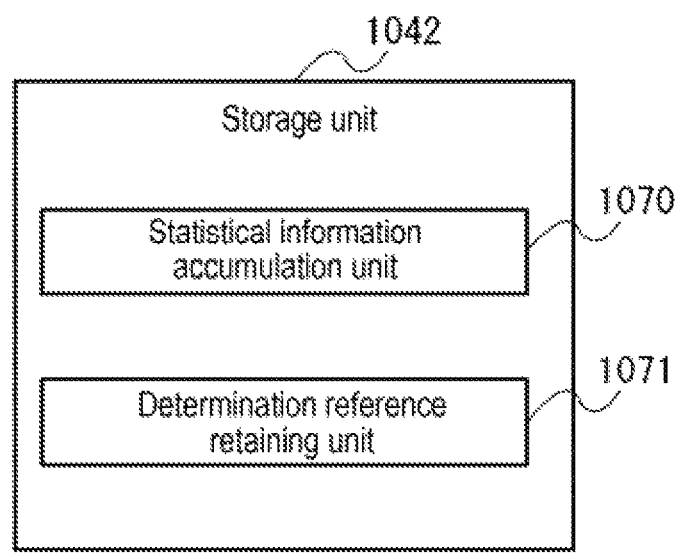
FIG. 42 is a block diagram illustrating a detailed configuration of a storage unit in a driving assistance device according to the sixth exemplary embodiment of the present invention.

FIG. 42 is a block diagram illustrating the detailed configuration of storage unit 1042 in driving assistance device 1040. Storage unit 1042 includes statistical information accumulation unit 1070 and determination reference retaining unit 1071.

Statistical information accumulation unit 1070 accumulates statistical information indicating the relevance between the surrounding situation and the travel state of the vehicle and the action of the vehicle. FIG. 43 schematically illustrates the statistical information accumulated in statistical information accumulation unit 1070. The statistical information in the sixth exemplary embodiment corresponds to the travel history in FIG. 27 and the driver models in FIGS. 28A and 28B. The statistical information includes a plurality of records obtained by associating values of a plurality of kinds of environmental parameters indicating the surrounding situation and the travel state of the vehicle with an action that the vehicle is caused to immediately execute (or an action performance that the vehicle has been caused to immediately execute). In other words, the statistical information is accumulated by associating the current action executed in various environmental states with the parameter values indicating the environmental states. The statistical information may be modeled and patterned by a known statistical process.

The action prescribed in the statistical information in the sixth exemplary embodiment is a current action of the vehicle, in other words, an action that the vehicle is caused to immediately execute. The actions prescribed in the statistical information include an individual action as indicated in histories (d) and (e) and an action plan created by combining a plurality of individual actions as indicated in history (f). The meaning of each environmental parameter prescribed in the statistical information has already been described in the fourth exemplary embodiment, so that the description thereof will be omitted. Note that the environmental parameters include the speed of vehicle 1000, a relative speed of a leading vehicle relative to vehicle 1000, the distance between vehicle 1000 and the leading vehicle, a relative speed of a nearby vehicle in the adjacent lane relative to vehicle 1000, the distance between vehicle 1000 and the nearby vehicle in the adjacent lane, and location information of vehicle 1000. The items of the environmental parameters prescribed in the statistical information are included in the detection information input from detector 1020, or item values can be specified through calculation based on the detection information.

Returning to FIG. 42, determination reference retaining unit 1071 retains data (hereinafter referred to as a "determination reference") which becomes a reference for a determination process by later-described determination unit 1062. The determination reference is data which determines an action that vehicle 1000 can be caused to execute at present (immediately) for each of a plurality of patterns in the detection information input from detector 1020. For example, when a certain pattern in the detection information indicates that nearby vehicles are present ahead of vehicle 1000 and in the right lane, deceleration and a lane change to the left may be determined as action candidates which are executable for this pattern. In other words, acceleration and a lane change to the right may be excluded from the executable action candidates.

Action information input unit 1054 in driving assistance device 1040 acquires, from autonomous driving control device 1030, action information indicating a current action that autonomous driving control device 1030 causes vehicle 1000 to execute. Detection information input unit 1052 in driving assistance device 1040 acquires, from detector 1020, detection information indicating the detection result of the surrounding situation and the travel state of vehicle 1000.

Figure 44:
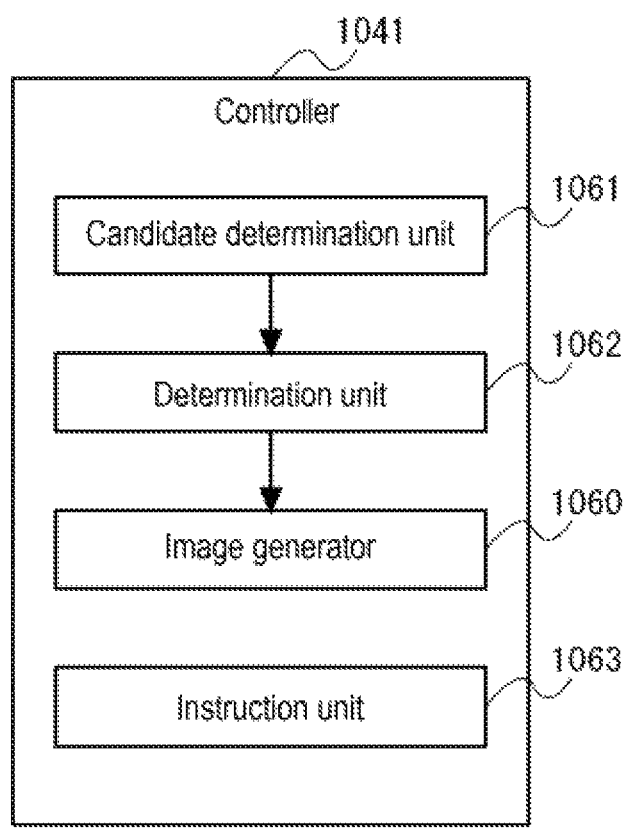
FIG. 44 is a block diagram illustrating a detailed configuration of a controller in a driving assistance device according to the sixth exemplary embodiment.

FIG. 44 is a block diagram illustrating the detailed configuration of controller 1041 in driving assistance device 1040. Controller 1041 includes image generator 1060, candidate determination unit 1061, determination unit 1062, and instruction unit 1063. Candidate determination unit 1061 and determination unit 1062 determine an executable action candidate different from the current action indicated by the action information acquired from autonomous driving control device 1030, based on the detection information acquired from detector 1020.

Specifically, candidate determination unit 1061 constructs an n-dimensional vector space corresponding to the number (n) of the environmental parameters in the statistical information accumulated in statistical information accumulation unit 1070, and arranges the actions specified in the statistical information in the vector space. Next, candidate determination unit 1061 specifies a position (hereinafter also referred to as a "current environment position") which is a specific position in the vector space and corresponds to the environmental parameter indicated by the detection information. Then, candidate determination unit 1061 determines, as temporal current action candidates, one or more actions present within a predetermined range (in other words, within a predetermined distance) from the current environment position in the vector space. Specifically, candidate determination unit 1061 determines, as the temporal action candidate, an action associated with the environmental parameter close to the detection information from among a plurality of kinds of actions prescribed in the statistical information. A threshold of the predetermined range may be determined according to knowledge of a developer or through experiments.

Determination unit 1062 determines whether or not each of the temporal current action candidates determined by candidate determination unit 1061 can be executed by the vehicle at present (immediately) by referring to the detection information output from detector 1020 and the determination reference retained in determination reference retaining unit 1071. Determination unit 1062 determines, as a final current action candidate to be presented to the driver, the candidate which can be executed by the vehicle at present from among one or more temporal current action candidates determined by candidate determination unit 1061. For example, if there are no vehicles in the right lane when the temporal current action candidate is a lane change to the right, determination unit 1062 may determine this temporal current action candidate as a final current action candidate. On the contrary, if there is a nearby vehicle in the right lane when the temporal current action candidate is a lane change to the right, determination unit 1062 may exclude this temporal current action candidate from the final current action candidate. Note that the process, performed by determination unit 1062, for determining whether or not it is possible to cause the vehicle to execute a specific action at present may be implemented by a known method.

As described above, in the sixth exemplary embodiment, the current action candidate presented to the driver is determined by collaboration between candidate determination unit 1061 and determination unit 1062. However, the current action candidate may be determined by executing the process of only one of these units. Notably, when temporarily determining one or more current action candidates, candidate determination unit 1061 or determination unit 1062 determines whether or not the current action indicated by the action information and each of the candidates coincide with each other. Then, candidate determination unit 1061 or determination unit 1062 excludes the current action candidate coinciding with the current action from the candidates, and delivers only the current action candidate not coinciding with the current action to image generator 1060 as the candidate to be presented to the driver. Thus, the action coinciding with the current action is prevented from being presented as an action substituted for the current action.

Image generator 1060 generates a current action image representing the current action indicated by the action information, and a current action candidate image representing the final current action candidate determined by candidate determination unit 1061 and determination unit 1062. Image output unit 1051 outputs the current action image and the current action candidate image to notification device 1002 such that the current action image and the current action candidate image are displayed within the fixed field of view of the driver of the vehicle. Although not stated in the sixth exemplary embodiment, driving assistance device 1040 may acquire planned action information and remaining time information from autonomous driving control device 1030 along with the current action information, and cause notification device 1002 to further display a planned action image and a remaining time image, as in the fifth exemplary embodiment.

Figure 45:
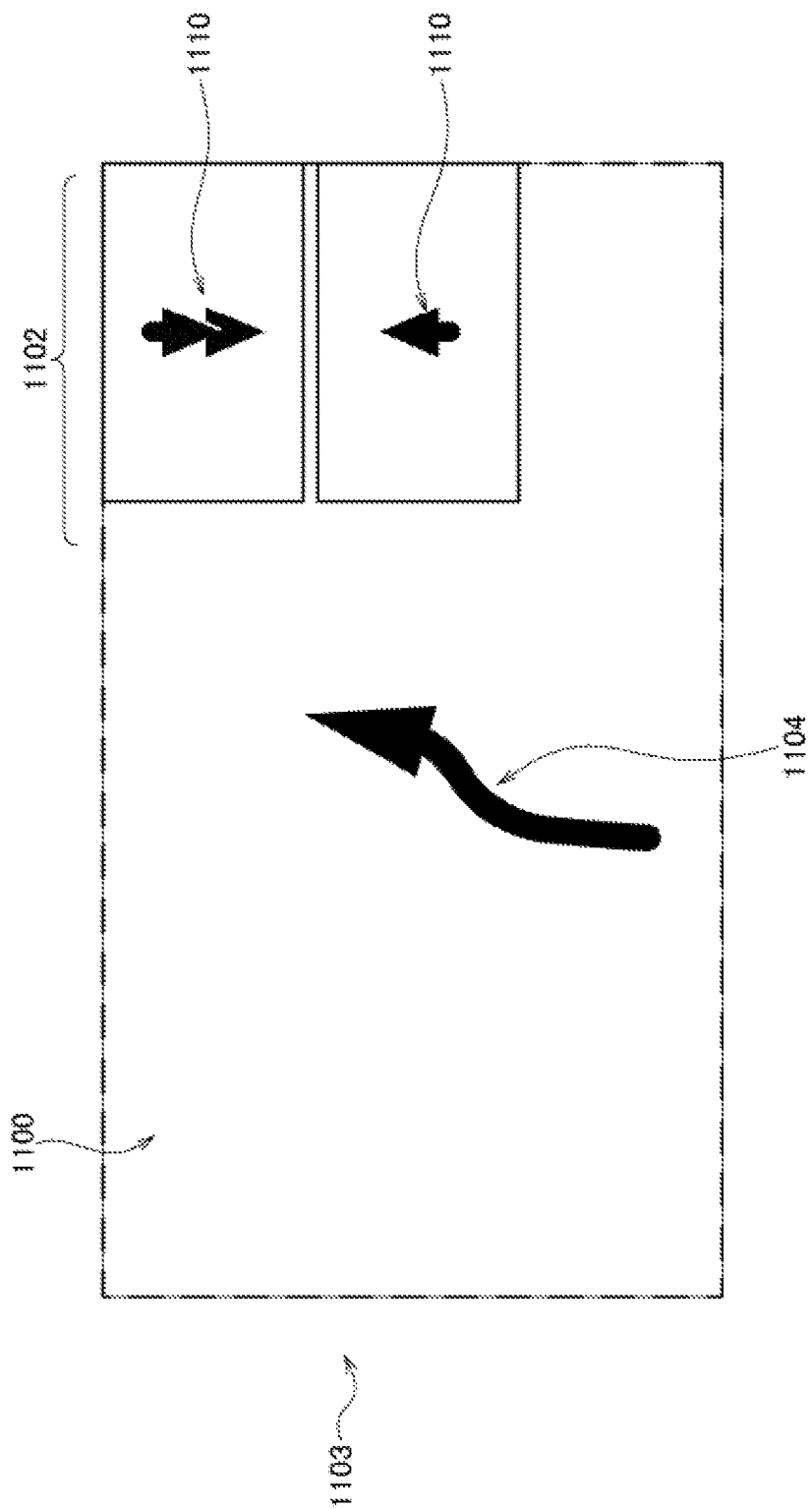
FIG. 45 is a view illustrating one example of an autonomous driving information screen according to the sixth exemplary embodiment.

Notification device 1002 displays an autonomous driving information screen including the current action image and the current action candidate image output from driving assistance device 1040. FIG. 45 illustrates one example of the autonomous driving information screen. FIG. 45 illustrates autonomous driving information screen 1103 in which current action image 1104 is disposed in main region 1100 and two current action candidate images 1110 are disposed in sub-region 1102. In FIG. 45, upper current action candidate image 1110 represents "deceleration" which is the first current action candidate, and lower current action candidate image 1110 represents "straight ahead (with current speed being maintained)" which is the second current action candidate.

In addition, the display manner of current action image 1104 in autonomous driving information screen 1103 is set to be different from the display manner of current action candidate image 1110. This configuration prevents the driver from confusing between the current action which has been determined by the autonomous driving controller and the current action candidate proposed as an action substituted for the current action. For example, current action image 1104 is displayed with a size larger than the size of current action candidate image 1110. In addition, current action image 1104 is displayed on the center position in the fixed field of view of the driver of vehicle 1000. For example, current action image 1104 is displayed near the center of autonomous driving information screen 1103. On the other hand, current action candidate image 1110 is displayed on the surrounding position in the fixed field of view of the driver. For example, it is displayed near the end of autonomous driving information screen 1103.

Returning to FIG. 44, when a predetermined time has elapsed after current action candidate image 1110 is output (displayed), instruction unit 1063 causes command output unit 1055 to output a control command for causing the vehicle to execute the current action candidate to autonomous driving control device 1030.

Specifically, operation input unit 1050 receives, from input device 1004, a signal (hereinafter referred to as an "operation instruction") for designating an action of the vehicle which should be executed during autonomous driving. When the operation instruction has not been received within a predetermined period in which current action image 1104 and current action candidate image 1110 are displayed on notification device 1002, instruction unit 1063 causes command output unit 1055 to output, to autonomous driving control device 1030, a control command for causing the vehicle to execute the current action candidate represented by current action candidate image 1110. This situation can be restated as a case where the operation instruction is not accepted within the predetermined period after current action candidate image 1110 is output. The predetermined period to wait for the reception of the operation instruction may assume an appropriate value according to knowledge of a developer or through experiments. For example, the predetermined period may be set to be 5 to 10 seconds.

In addition, when the operation instruction has been received within the predetermined period in which current action image 1104 and current action candidate image 1110 are displayed on notification device 1002, instruction unit 1063 causes command output unit 1055 to output, to autonomous driving control device 1030, a control command for causing the vehicle to execute the action designated by the operation instruction. The action designated by the operation instruction is the current action determined by autonomous driving control device 1030 or the current action candidate determined by driving assistance device 1040.

For example, when the operation instruction to select current action candidate image 1110 is input from input device 1004, instruction unit 1063 causes command output unit 1055 to output, to autonomous driving control device 1030, a control command for causing the vehicle to execute the current action candidate represented by current action candidate image 1110. On the contrary, when the operation instruction to select current action image 1104 is input from input device 1004, instruction unit 1063 causes command output unit 1055 to output, to autonomous driving control device 1030, a control command for causing the vehicle to execute the current action represented by current action image 1104.

Figure 46:
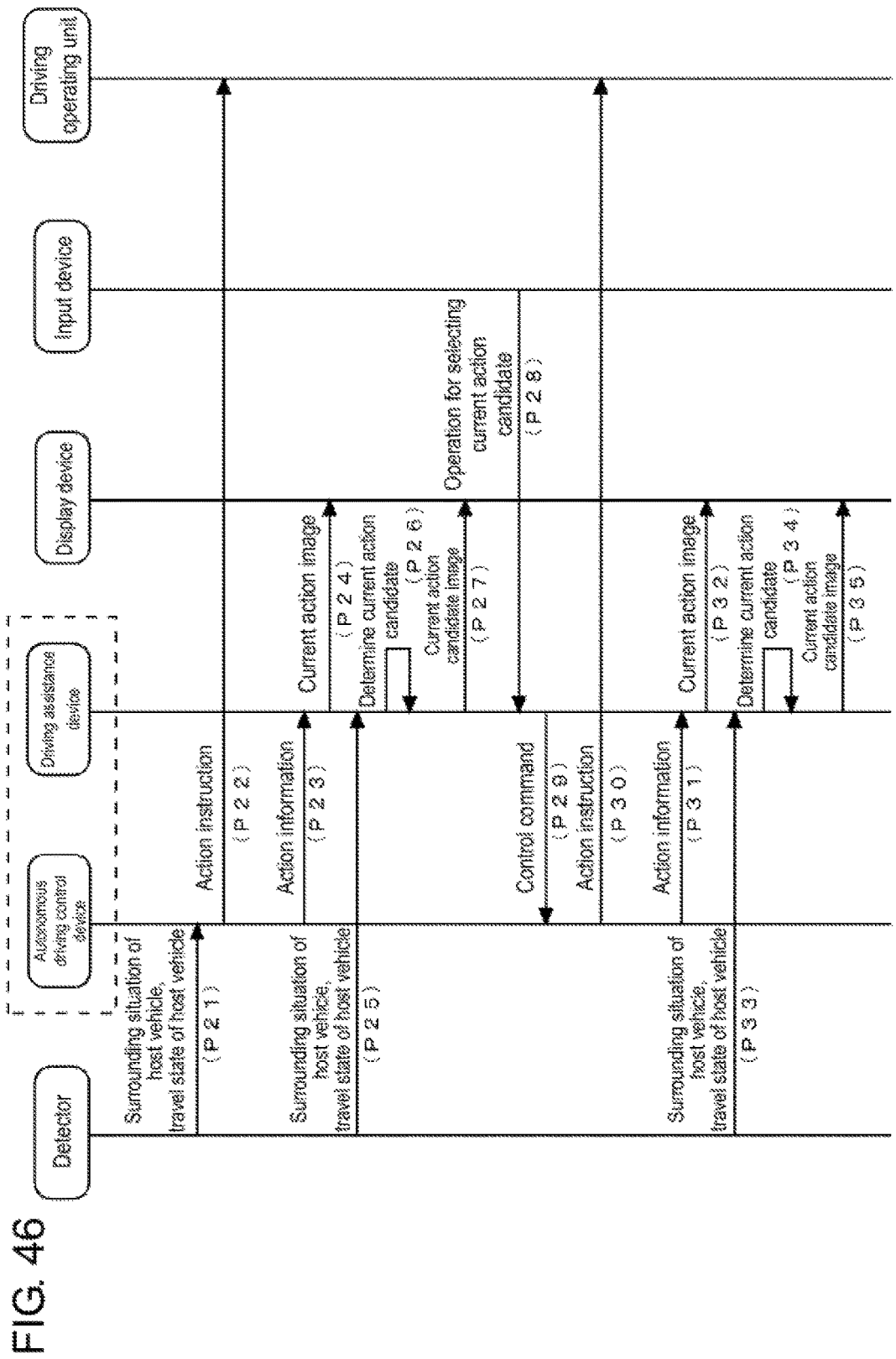
FIG. 46 is a sequence diagram illustrating an example of a process pertaining to HMI control of a vehicle according to the sixth exemplary embodiment.

FIG. 46 is a sequence diagram illustrating an example of a process pertaining to HMI control of vehicle 1000. Detector 1020 periodically detects the surrounding situation and the travel state of vehicle 1000, and periodically outputs detection information indicating the detection result to autonomous driving control device 1030 (P21). Autonomous driving control device 1030 determines the current action of the vehicle according to the detection information acquired from detector 1020. Then, autonomous driving control device 1030 outputs an action instruction for instructing the vehicle to execute the current action to driving operating unit 1010, thereby causing vehicle 1000 to execute the current action (P22). Autonomous driving control device 1030 also transmits action information indicating the current action to driving assistance device 1040 (P23). Driving assistance device 1040 generates a current action image based on the current action information acquired from autonomous driving control device 1030, and causes notification device 1002 to display this image (P24).

Driving assistance device 1040 acquires detection information periodically output from detector 1020 (P25). For example, driving assistance device 1040 and autonomous driving control device 1030 may acquire the detection information output from detector 1020 in P21 in parallel (independently). Alternatively, driving assistance device 1040 may acquire the detection information transferred by autonomous driving control device 1030. With every acquisition of the periodically output detection information, driving assistance device 1040 determines a current action candidate based on the detection information (P26). Driving assistance device 1040 generates a current action candidate image representing the current action candidate, and causes notification device 1002 to display this image (P27).

When the driver confirming the autonomous driving information screen of notification device 1002 inputs, to input device 1004, a selecting operation for instructing the vehicle to execute the current action candidate, input device 1004 transmits an operation instruction for instructing the vehicle to execute the current action candidate to driving assistance device 1040 (P28). Driving assistance device 1040 transmits, to autonomous driving control device 1030, a control command to instruct the vehicle to execute the current action candidate (P29). Autonomous driving control device 1030 identifies the current action candidate designated in the control command as a new current action, and outputs a new action instruction for instructing vehicle 1000 to execute the new current action to driving operating unit 1010 to cause vehicle 1000 to execute the new current action (P30).

Autonomous driving control device 1030 transmits new action information indicating the new current action to driving assistance device 1040 (P31). Driving assistance device 1040 generates a new current action image based on the new current action information acquired from autonomous driving control device 1030, and causes notification device 1002 to display this image (P32). Driving assistance device 1040 acquires latest detection information output from detector 1020 (P33), and determines a new current action candidate (P34). Driving assistance device 1040 causes notification device 1002 to display a new current candidate image (P35).

Regarding P29 to P35 in FIG. 46, after the control command is transmitted to autonomous driving control device 1030, detection information input unit 1052 in driving assistance device 1040 acquires, from autonomous driving control device 1030, action information indicating a current action updated according to the control command. The updated current action is an action designated in the control command, that is, the current action candidate designated by the driver. Then, driving assistance device 1040 updates the content of autonomous driving information screen 1103 of notification device 1002 so as to reflect the latest state.

Figure 47:
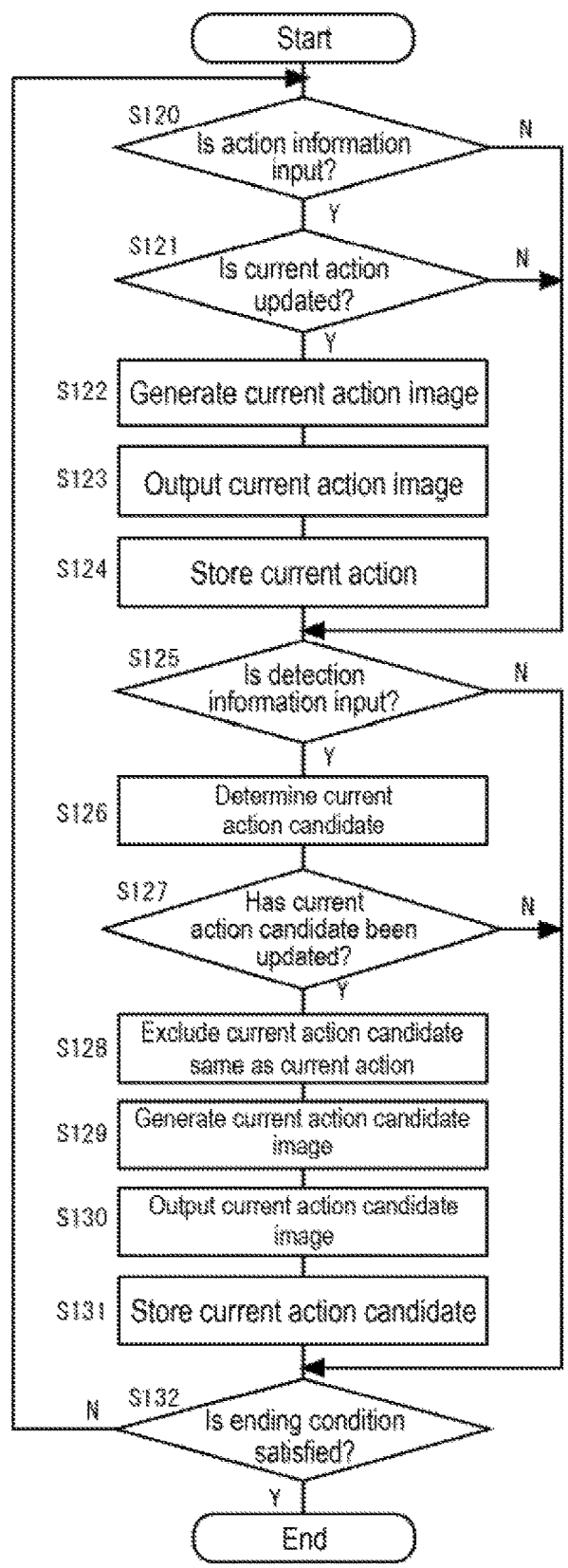
FIG. 47 is a flowchart illustrating an example of a process of the driving assistance device according to the sixth exemplary embodiment.

FIG. 47 is a flowchart illustrating an example of the process of driving assistance device 1040. When action information input unit 1054 acquires the action information output from autonomous driving control device 1030 (Y in S120), image generator 1060 determines whether or not the current action indicated by the action information and the current action stored in advance in storage unit 1042 coincide with each other. The processes in subsequent steps S121 to S124 are the same as the processes in S102 to S105 in FIG. 41, so that the description thereof will be omitted. When the action information has not yet been acquired (N in S120), steps S121 to S124 are skipped.

When detection information input unit 1052 acquires the detection information output from detector 1020 (Y in S125), candidate determination unit 1061 determines one or more current action candidates based on the detection information, statistical information accumulated in statistical information accumulation unit 1070, and determination reference retained in determination reference retaining unit 1071 (S126). Candidate determination unit 1061 determines whether or not the current action candidate determined in S126 coincides with the current action candidate stored in advance in storage unit 1042. When the current action candidate determined in S126 does not coincide with the current action candidate stored in advance in storage unit 1042, that is, when the current action candidate is updated (Y in S127), candidate determination unit 1061 determines whether or not the current action candidate determined in S126 coincides with the current action indicated by the action information. Then, candidate determination unit 1061 excludes the current action candidate coinciding with the current action from the targets for the subsequent processes (S128).

Image generator 1060 generates a current action candidate image representing the current action candidates passing through filtering in S127 and S128 (S129), and image output unit 1051 outputs the current action candidate image to notification device 1002 and causes notification device 1002 to display this image (S130). Candidate determination unit 1061 causes storage unit 1042 to store information about the current action candidates based on which the current action candidate image is generated (S131). If the detection information has not yet been acquired (N in S125), steps S126 to S131 are skipped. If the current action candidate has not been updated (N in S127), steps S128 to S131 are skipped. When a predetermined ending condition is satisfied (Y in S132), the flow in FIG. 47 is ended, and when the ending condition is not satisfied (N in S132), the process returns to S120.

As described in a modification mentioned below, when a plurality of current action candidates is presented to the driver, candidate determination unit 1061 may set such that an action candidate having a higher degree of coincidence with a taste or an operation pattern of the driver is placed higher in rank under the surrounding situation and the travel state of vehicle 1000 at present. Then, as in the case where a plurality of planned actions is input in the fifth exemplary embodiment, image generator 1060 may generate a plurality of current action candidate images corresponding to the current action candidates in a manner according to the rank order of each candidate. In addition, image output unit 1051 may cause notification device 1002 to display the plurality of current action candidate images in a manner according to the rank order of each candidate.

In addition, as previously described in the fifth exemplary embodiment, image generator 1060 may generate data of the autonomous driving information screen including both the current action image and the current action candidate image, and image output unit 1051 may output the data of the autonomous driving information screen to notification device 1002 and cause notification device 1002 to display this data. That is to say, both the current action image and the current action candidate image may be collectively output to notification device 1002.

Figure 48:
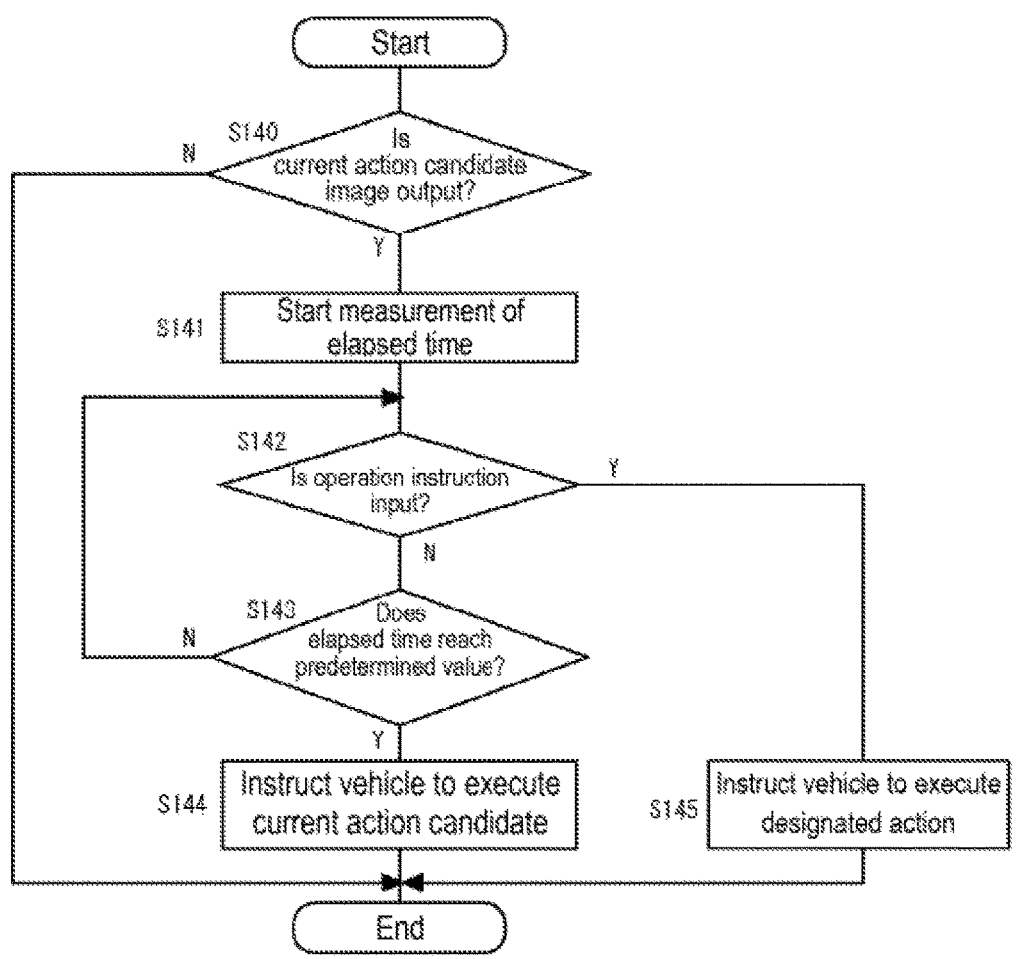
FIG. 48 is a flowchart illustrating an example of a process of the driving assistance device according to the sixth exemplary embodiment.

FIG. 48 also illustrates a flowchart showing an example of the process of driving assistance device 1040. When the current action candidate image is output to notification device 1002 from image output unit 1051 (Y in S140), instruction unit 1063 starts the measurement of an elapsed time from the output of the current action candidate image (S141). When an operation instruction is not input from input device 1004 (N in S142) and the elapsed time reaches a predetermined threshold (Y in S143), instruction unit 1063 causes command output unit 1055 to output, to autonomous driving control device 1030, a control command to instruct the vehicle to execute the current action candidate (S144). The threshold is a time value determined according to knowledge of a developer or through experiments. For example, it may be set to be 5 to 10 seconds. When a plurality of current action candidates is presented to the driver, instruction unit 1063 may output a control command to instruct the vehicle to execute the current action candidate with the highest rank order according to the rank order of each candidate determined in advance.

If the elapsed time has not yet reached the predetermined threshold (N in S143), the process returns to S142. When the operation instruction for designating the current action or the current action candidate is input (Y in S142), instruction unit 1063 causes command output unit 1055 to output, to autonomous driving control device 1030, a control command to instruct the vehicle to execute the current action or the current action candidate designated by the operation instruction (S145). This operation instruction may be a signal indicating that an operation for selecting one of the current action image and the current action candidate image in the autonomous driving information screen is input. If the current action candidate image has not yet been output (N in S140), the processes in subsequent steps from S141 are skipped, and the flow in FIG. 48 is ended.

As described above, driving assistance device 1040 according to the sixth exemplary embodiment notifies the occupant (driver or the like) in the vehicle of a current action in autonomous driving, and proposes a current action candidate which can be executed immediately in place of the current action. With the configuration described above in which options of latest actions of the vehicle are presented to the driver, autonomous driving on which the driver's intention is further reflected and which suits the taste or the like of the driver can be implemented. In addition, because the current action candidates which can be selected by the driver are executable under the surrounding situation or the travel state of the vehicle at present, the driver can issue an instruction to change the action in autonomous driving without anxiety.

A modification will be described. In the sixth exemplary embodiment, when an operation instruction has not been received in a predetermined period in which current action image 1104 and current action candidate image 1110 are displayed on notification device 1002, a control command to allow the current action candidate to be executed is output to autonomous driving control device 1030. Specifically, in the sixth exemplary embodiment, the action determined by driving assistance device 1040 is given priority to be executed by the vehicle over the action determined by autonomous driving control device 1030. As a modification, if the operation instruction has not been received within the predetermined period, instruction unit 1063 may cause command output unit 1055 to output, to autonomous driving control device 1030, a control command to cause the vehicle to execute the current action represented by current action image 1104. Specifically, the action determined by autonomous driving control device 1030 may be given priority to be executed by the vehicle over the action determined by driving assistance device 1040.

Another modification will be described. In the sixth exemplary embodiment, driving assistance device 1040 accumulates, into a local storage unit, statistical information indicating relevance between the surrounding situation and the travel state of the vehicle and the action of the vehicle. As a modification, this statistical information may be accumulated in an information processing device outside of the vehicle, for example, a database server or the like connected through a communication network. That is, statistical information accumulation unit 1070 may be provided at a remote place (for example, on a cloud) outside of the vehicle. Candidate determination unit 1061 in driving assistance device 1040 may access the statistical information accumulated in the statistical information accumulation unit outside of the vehicle through communication IF 1056 and wireless device 1008, and determine a current action candidate according to the statistical information and the detection information from detector 1020. This is similarly applied to the exemplary embodiments below which use statistical information.

Still another modification will be described. As has been described previously, the statistical information accumulated in statistical information accumulation unit 1070 may be information (driver model) on which a taste or a driving pattern of an occupant (typically, a driver) of the vehicle is reflected. It can be said that the statistical information in the present modification is formed by accumulating a combination of previous environmental parameter values and a performance of a current action under the environment. For example, driving assistance device 1040 may further include a statistical information recording unit that sequentially records, on the statistical information in statistical information accumulation unit 1070, previous environmental parameter values during travel of the vehicle and the latest operation (the consequent latest action of the vehicle) performed by the driver under the environmental parameter values.

Candidate determination unit 1061 in the present modification determines a plurality of current action candidates which is associated with the environmental parameter values of which difference from the currently detected environmental parameter values falls within a predetermined range, by referring to statistical information accumulation unit 1070. Besides, candidate determination unit 1061 determines the priority order (which can be also referred to as a degree of priority) of each of the plurality of current action candidates. For example, when determining a plurality of current action candidates, candidate determination unit 1061 may set such that a higher priority is placed on a current action candidate associated with the environmental parameter values close to the currently detected environmental parameter values. That is to say, candidate determination unit 1061 may place a higher priority on a current action candidate which suits the taste or the driving pattern of the driver from among a plurality of current action candidates.

Image generator 1060 generates a plurality of current action candidate images corresponding to the plurality of current action candidates determined by candidate determination unit 1061, that is, image generator 1060 generates images representing the contents of the respective candidates. Image output unit 1051 outputs the current action image and the plurality of current action candidate images to notification device 1002 such that the current action image and the plurality of current action candidate images are displayed within the fixed field of view of the driver of vehicle 1000. In addition, image output unit 1051 causes notification device 1002 to display the plurality of current action candidate images in a manner according to the priority order of each candidate.

For example, as previously described in the fifth exemplary embodiment, image generator 1060 and image output unit 1051 may display the plurality of current action candidate images in a parametric display manner in which priorities are visualized using a histogram, or in a non-parametric display manner in which priorities are visualized by, for example, a vertical or horizontal arrangement order. Specifically, an image indicating a priority order itself may be added to each of the current action candidate images, a current action candidate image having a higher priority order may be displayed in a highly visible manner, or the current action candidate images may be arranged in descending priority order from a predetermined position of autonomous driving information screen 1103. In addition, images of only current action candidates having priority orders equal to or higher than a predetermined order may be generated or only such current action candidates may be determined to be displayed.

This modification can provide assistance in such way that candidates preferable for the occupant can be selected from among a plurality of current action candidates. In addition, with the configuration in which a priority order suited to the driver model is determined, the priority order suited to the driving pattern of the target (for example, a driver oneself, a fellow passenger oneself, a model of a standard or exemplary driver, and the like) of the driver model can be presented. The present modification can also be applied to the generation and display of a current action candidate image or a planned action candidate image in the other exemplary embodiments.

In FIG. 45, current action image 1104 represents "lane change" which is the current action, while upper current action candidate image 1110 represents "deceleration" which is the first current action candidate, and lower current action candidate image 1110 represents "straight ahead (with current speed being maintained)" which is the second current action candidate. Although not illustrated, it is supposed, as another example, that, due to the distance between the host vehicle and a leading vehicle being reduced because of deceleration of the leading vehicle, autonomous driving control device 1030 (which can be also referred to as an autonomous travel control ECU) determines the execution of the current action which is "lane change to the overtaking lane" and driving assistance device 1040 (which can be also referred to as an HMI control ECU) presents that the current action is being executed. In this case, driving assistance device 1040 may determine that "the benefit obtained by the host vehicle performing a lane change is reduced by the leading vehicle also performing a lane change to the overtaking lane" based on that lighting of the right indicator of the leading vehicle is detected. Then, driving assistance device 1040 may recommend and present, as an option that vehicle 1000 can be immediately instructed to execute (in other words, an option which can be selected), "keep traveling in the current lane, and then, acceleration, if possible" as a current action candidate substituted for the current action which is "lane change to the overtaking lane".

Seventh Exemplary Embodiment

The seventh exemplary embodiment will be firstly summarized. During autonomous driving of a vehicle, a driver may not be able to understand what is a future action of the vehicle which can be instructed to change the control in autonomous driving, and therefore, the driver may have a sense of anxiety.

In view of this, in the seventh exemplary embodiment, a candidate of an action that the vehicle is caused to execute in the future during autonomous driving (hereinafter, such a candidate will be referred to as a "planned action candidate") is presented to the driver. Specifically, autonomous driving control device 1030 determines a current action, and driving assistance device 1040 determines a planned action candidate. Then, driving assistance device 1040 causes notification device 1002 in vehicle 1000 to display both the current action and the planned action candidate. The planned action candidate can be referred to as an action which can be executed next after the currently executed action, or an action plan which can be selected next. In addition, the planned action candidate corresponds to the planned action in the fifth exemplary embodiment, and in the seventh exemplary embodiment, the planned action candidate can also be referred to as a planned action determined by driving assistance device 1040 and presented to the driver as a selectable candidate.

Hereinafter, the details which have already been described in the previous exemplary embodiments will be omitted as appropriate. The configurations or operations described in the present exemplary embodiment can be combined with or replaced with configurations or operations described in other exemplary embodiments or modifications without departing from the spirit of the present invention.

The functional blocks in driving assistance device 1040 are the same as those in the sixth exemplary embodiment. Specifically, controller 1041 includes image generator 1060, candidate determination unit 1061, determination unit 1062, and instruction unit 1063 as illustrated in FIG. 44. In addition, storage unit 1042 includes statistical information accumulation unit 1070 and determination reference retaining unit 1071 as illustrated in FIG. 42.

The determination reference retained in determination reference retaining unit 1071 is the same as that in the sixth exemplary embodiment. Specifically, the determination reference is data which determines an action that vehicle 1000 can be caused to execute at present (immediately) for each of a plurality of patterns in the detection information input from detector 1020.

The statistical information (FIG. 43) accumulated in statistical information accumulation unit 1070 in the seventh exemplary embodiment also corresponds to the travel history in FIG. 27 and the driver models in FIGS. 28A and 28B, and indicates the relevance between the surrounding situation and the travel state of the vehicle and the action of the vehicle. It is to be noted that the statistical information in the seventh exemplary embodiment includes a plurality of records obtained by associating a plurality of kinds of environmental parameter values indicating the surrounding situation and the travel state of the vehicle with an action (or an action performance) to be executed by the vehicle at a future point. In other words, the statistical information has accumulated therein an action executed at a future point (after a predetermined time) relative to the current environmental state in association with the parameter values indicating the current environmental state. The future point may be 10 seconds to a few minutes later. In addition, each action prescribed in the statistical information has associated therewith remaining time information (for example, 10 seconds to a few minutes) until this action is executed in the future. As previously stated, statistical information may be accumulated in a device outside of vehicle 1000, and driving assistance device 1040 may access remote statistical information through communication IF 1056 and wireless device 1008.

Action information input unit 1054 in driving assistance device 1040 acquires, from autonomous driving control device 1030, action information indicating a current action that autonomous driving control device 1030 causes vehicle 1000 to execute. Detection information input unit 1052 in driving assistance device 1040 acquires, from detector 1020, detection information indicating the detection result of the surrounding situation and the travel state of vehicle 1000.

Candidate determination unit 1061 determines, based on the detection information output from detector 1020, one or more planned action candidates which are actions that vehicle 1000 can be caused to execute after the current action indicated by the action information. Specifically, as in the sixth exemplary embodiment, candidate determination unit 1061 extracts, as the candidates, one or more actions associated with the environmental parameter values close to the detection information from among actions prescribed in the statistical information. It is to be noted that, different from the sixth exemplary embodiment, the candidates extracted from the statistical information in the seventh exemplary embodiment are planned action candidates indicating actions to be executed by the vehicle at a future point. The planned action candidate may be an action which is planned to be executed next after the current action of vehicle 1000, and may be an action which is planned to be executed in a few tens of seconds or a few minutes from the present moment after the current action of vehicle 1000 is ended, with other actions being executed in this period. Different remaining times are specified for both actions in the statistical information.

Image generator 1060 generates a current action image representing the current action indicated by the action information and one or more planned action candidate images representing one or more planned action candidates. Image output unit 1051 outputs the current action image and the planned action candidate images to notification device 1002 such that the current action image and the planned action candidate images are displayed within the fixed field of view of the driver of the vehicle. Notification device 1002 displays an autonomous driving information screen including the current action image and the planned action candidate images output from driving assistance device 1040.

In addition, when determining the planned action candidate, candidate determination unit 1061 further delivers the remaining time information associated with the planned action candidate in the statistical information to image generator 1060. When generating a planned action candidate image representing the planned action candidate, image generator 1060 also generates a remaining time image representing a remaining time indicated by the remaining time information. Image output unit 1051 outputs the remaining time image as well as the current action image and the planned action candidate image to notification device 1002, thereby causing notification device 1002 to display the planned action candidate image including the remaining time image on the autonomous driving information screen.

FIG. 49 illustrates one example of the autonomous driving information screen. FIG. 49 illustrates autonomous driving information screen 1103 in which current action image 1104 is disposed in main region 1100 and planned action candidate images 1112 representing one planned action candidate and remaining time image 1108 are disposed in sub-region 1102. Planned action candidate images 1112 in FIG. 49 represent, as one planned action candidate, an action plan (in this example, an overtaking action) created by combining three individual actions.

In addition, remaining time image 1108 in FIG. 49 represents the length of the remaining time until the planned action candidate is executed by a proportion of a hatched area in sub-region 1102. For example, the proportion of the hatched area may be increased with the decrease in the remaining time. Specifically, the display manner of remaining time image 1108 may be updated such that, when the remaining time is initially set to be 60 seconds and 20 seconds have elapsed from the start of the display of planned action candidate images 1112, one-third of sub-region 1102 from the bottom is hatched. In addition, the display manner of remaining time image 1108 may be updated such that, when 40 seconds have elapsed from the start of the display of planned action candidate images 1112, two-thirds of sub-region 1102 from the bottom is hatched. In this way, notification regarding the remaining time may be provided by changing a pattern or a color, or the notification regarding the remaining time may be provided by other methods such as displaying a timer object for counting the remaining time.

When the remaining time to the execution of the planned action candidate becomes zero after the start of the display of planned action candidate images 1112, image output unit 1051 may transmit a command to instruct notification device 1002 to end the display of planned action candidate images 1112 to notification device 1002 to end the display of planned action candidate images 1112. In addition, image generator 1060 may generate a new planned action candidate image representing a planned action candidate newly determined by candidate determination unit 1061, and image output unit 1051 may transmit the new planned action candidate image to notification device 1002 and causes notification device 1002 to display this image.

FIGS. 50A to 50F also illustrate one example of the autonomous driving information screen. In autonomous driving information screens 1103 in FIGS. 50A to 50F, planned action candidate image 1112 is disposed on the center of a double circle and current action image 1104 is disposed on an outer circle. In addition, remaining time display region 1114 is formed on the outer circle. A hatched area represented by remaining time image 1108 is increased with the decrease in the remaining time to the execution of the planned action candidate (FIGS. 50A to 50E). For example, the display manner of remaining time image 1108 may be updated such that, when the remaining time is initially set to be 60 seconds and 20 seconds have elapsed from the start of the display of planned action candidate image 1112, one-third of remaining time display region 1114 is hatched.

Figure 50C:
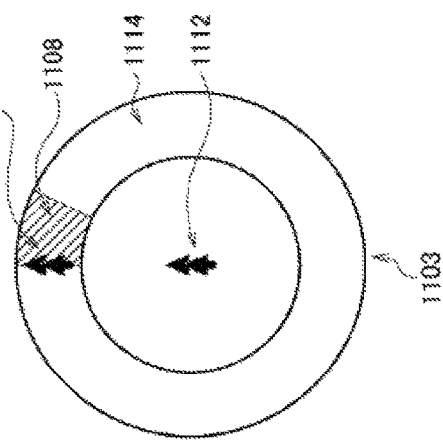
FIG. 50C is a view illustrating one example of an autonomous driving information screen according to the seventh exemplary embodiment.
Figure 50F:
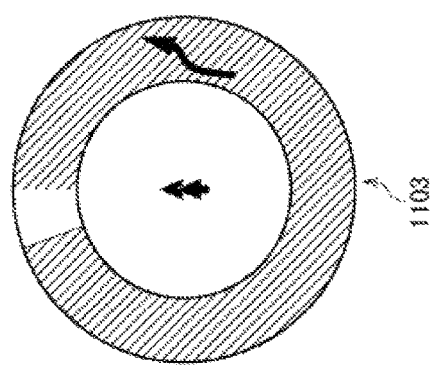
FIG. 50F is a view illustrating one example of an autonomous driving information screen according to the seventh exemplary embodiment.
Figure 50B:
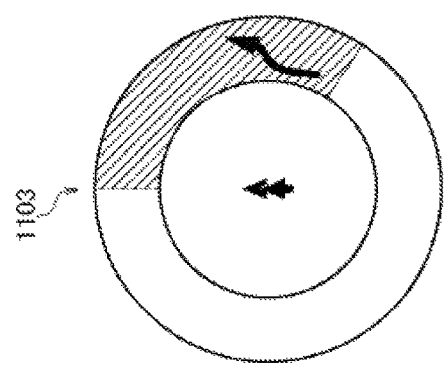
FIG. 50B is a view illustrating one example of an autonomous driving information screen according to the seventh exemplary embodiment.
Figure 50E:
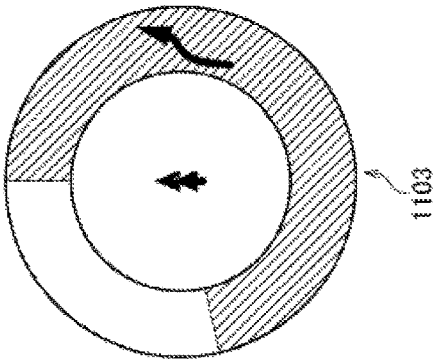
FIG. 50E is a view illustrating one example of an autonomous driving information screen according to the seventh exemplary embodiment.
Figure 50A:
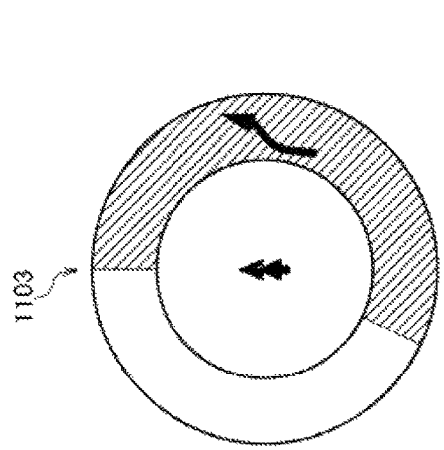
FIG. 50A is a view illustrating one example of an autonomous driving information screen according to the seventh exemplary embodiment.
Figure 50D:
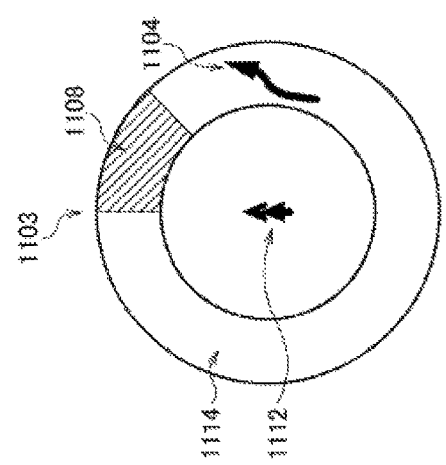
FIG. 50D is a view illustrating one example of an autonomous driving information screen according to the seventh exemplary embodiment.

FIG. 50F illustrates autonomous driving information screen 1103 when the remaining time up to the execution of the planned action candidate becomes zero, in other words, when the elapsed time from the start of the display of planned action candidate image 1112 reaches the remaining time associated with the planned action candidate in the statistical information. In this example, the planned action candidate (acceleration) represented by planned action candidate image 1112 is switched to the current action, and with this, current action image 1104 representing a lane change to the right is switched to current action image 1104 representing acceleration.

FIGS. 51A to 51F also illustrate one example of the autonomous driving information screen. Autonomous driving information screens 1103 illustrated in FIGS. 51A to 51F are different from autonomous driving information screens 1103 illustrated in FIGS. 50A to 50F in the following three points. (1) As in the fifth exemplary embodiment, a planned action is acquired from autonomous driving control device 1030, and planned action image 1106 representing the planned action is disposed on the center of a double circle. (2) Planned action candidate image 1112 is disposed near a periphery of an inner circle. Note that an up-pointing triangle indicates acceleration, down-pointing triangle indicates deceleration, left-pointing triangle indicates a lane change to the left, and right-pointing triangle indicates a lane change to the right. (3) Remaining time image 1108 represents a remaining time until the planned action represented by planned action image 1106 is executed.

Figure 51A:
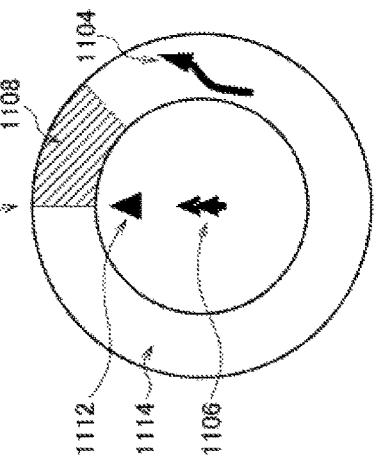
FIG. 51A is a view illustrating one example of an autonomous driving information screen according to the seventh exemplary embodiment.
Figure 51B:
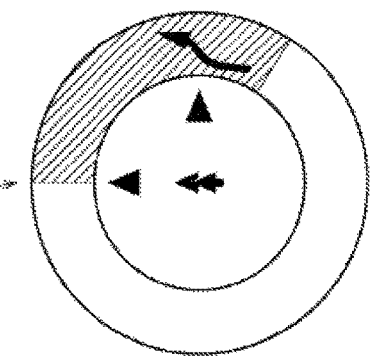
FIG. 51B is a view illustrating one example of an autonomous driving information screen according to the seventh exemplary embodiment.
Figure 51C:
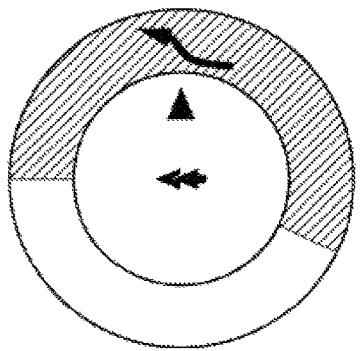
FIG. 51C is a view illustrating one example of an autonomous driving information screen according to the seventh exemplary embodiment.
Figure 51D:
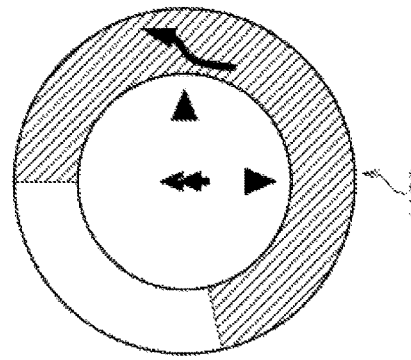
FIG. 51D is a view illustrating one example of an autonomous driving information screen according to the seventh exemplary embodiment.
Figure 51E:
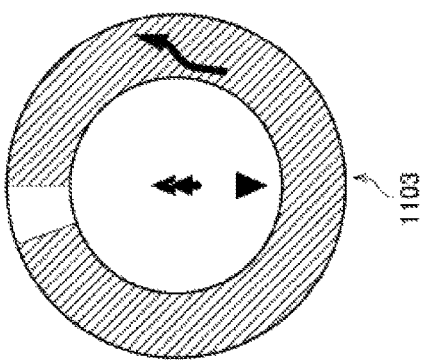
FIG. 51E is a view illustrating one example of an autonomous driving information screen according to the seventh exemplary embodiment.
Figure 51F:
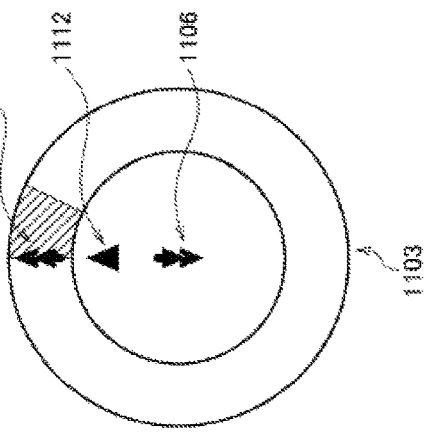
FIG. 51F is a view illustrating one example of an autonomous driving information screen according to the seventh exemplary embodiment.

As illustrated in FIGS. 51A and 51E, while the remaining time until the execution of the planned action "acceleration" represented by planned action image 1106 is reduced, the planned action candidate (planned action candidate image 1112) presented to the driver is updated as needed. FIG. 51F illustrates autonomous driving information screen 1103 when the remaining time until the execution of the planned action candidate becomes zero, in other words, when the elapsed time from the start of the display of planned action image 1106 reaches the remaining time provided from autonomous driving control device 1030. In this example, the planned action (acceleration) represented by planned action image 1106 so far is switched to the current action, and with this, current action image 1104 representing a lane change to the right is switched to current action image 1104 representing acceleration.

The driver may instruct the vehicle to execute the planned action candidate represented by planned action candidate image 1112 by pressing a cross button mounted to input device 1004. For example, the driver may instruct the vehicle to execute acceleration represented by planned action candidate image 1112 by selecting an up button of the cross button while planned action candidate image 1112 representing an up-pointing triangle is displayed.

FIG. 52 also illustrates one example of the autonomous driving information screen. In autonomous driving information screen 1103, two planned action candidate images 1112 representing two planned action candidates (two action plans) are displayed. In addition, in autonomous driving information screen 1103, remaining time image 1108 representing a remaining time until each planned action candidate is executed is indicated by using a plurality of time indicators 1109 as in the fifth exemplary embodiment. Further, selection frame 1116 for allowing the driver to select a specific planned action candidate from the planned action candidates represented by the plurality of planned action candidate images 1112 is displayed in autonomous driving information screen 1103. The driver inputs an operation for designating a desired planned action candidate by means of selection frame 1116 to input device 1004.

When receiving the input of the operation for designating the planned action candidate through operation input unit 1050, image generator 1060 in driving assistance device 1040 generates an inquiry image having a content of inquiring the driver about "execution" or "reservation" of the designated planned action candidate. "Execution" means that the vehicle is caused to immediately execute the planned action candidate. "Reservation" means that the vehicle is caused to execute the planned action candidate at a timing at which a predetermined time has elapsed from the operation instruction for designating reservation and at which the vehicle becomes able to execute the planned action candidate. Image output unit 1051 outputs the inquiry image to notification device 1002 and causes notification device 1002 to display this image.

When the operation for designating "execution" is input through operation input unit 1050 while the inquiry image is displayed, instruction unit 1063 outputs a control command to cause vehicle 1000 to execute the planned action candidate to autonomous driving control device 1030 at a first timing. On the other hand, when the operation for designating "reservation" is input while the inquiry image is displayed, instruction unit 1063 outputs a control command to cause vehicle 1000 to execute the planned action candidate to autonomous driving control device 1030 at a second timing later than the first timing.

The process sequence of vehicle 1000 in the seventh exemplary embodiment is the same as the process sequence in FIG. 46 described in the sixth exemplary embodiment. It should be noted that the determination of the current action candidate and the display of the current action candidate image are replaced by the determination of the planned action candidate and the display of the planned action candidate image (P26, P27). In addition, input device 1004 provides notification regarding the operation for selecting the planned action candidate to driving assistance device 1040 (P28). Driving assistance device 1040 outputs a control command to instruct the vehicle to execute the planned action candidate to autonomous driving control device 1030 (P29).

Regarding P29 to P35 in FIG. 46, after the control command is transmitted to autonomous driving control device 1030, detection information input unit 1052 in driving assistance device 1040 acquires, from autonomous driving control device 1030, action information indicating a current action updated according to the control command. The updated current action is an action designated in the control command, that is, the planned action candidate designated by the driver. Driving assistance device 1040 updates the content of autonomous driving information screen 1103 of notification device 1002 so as to reflect the latest action of the vehicle.

Figure 53:
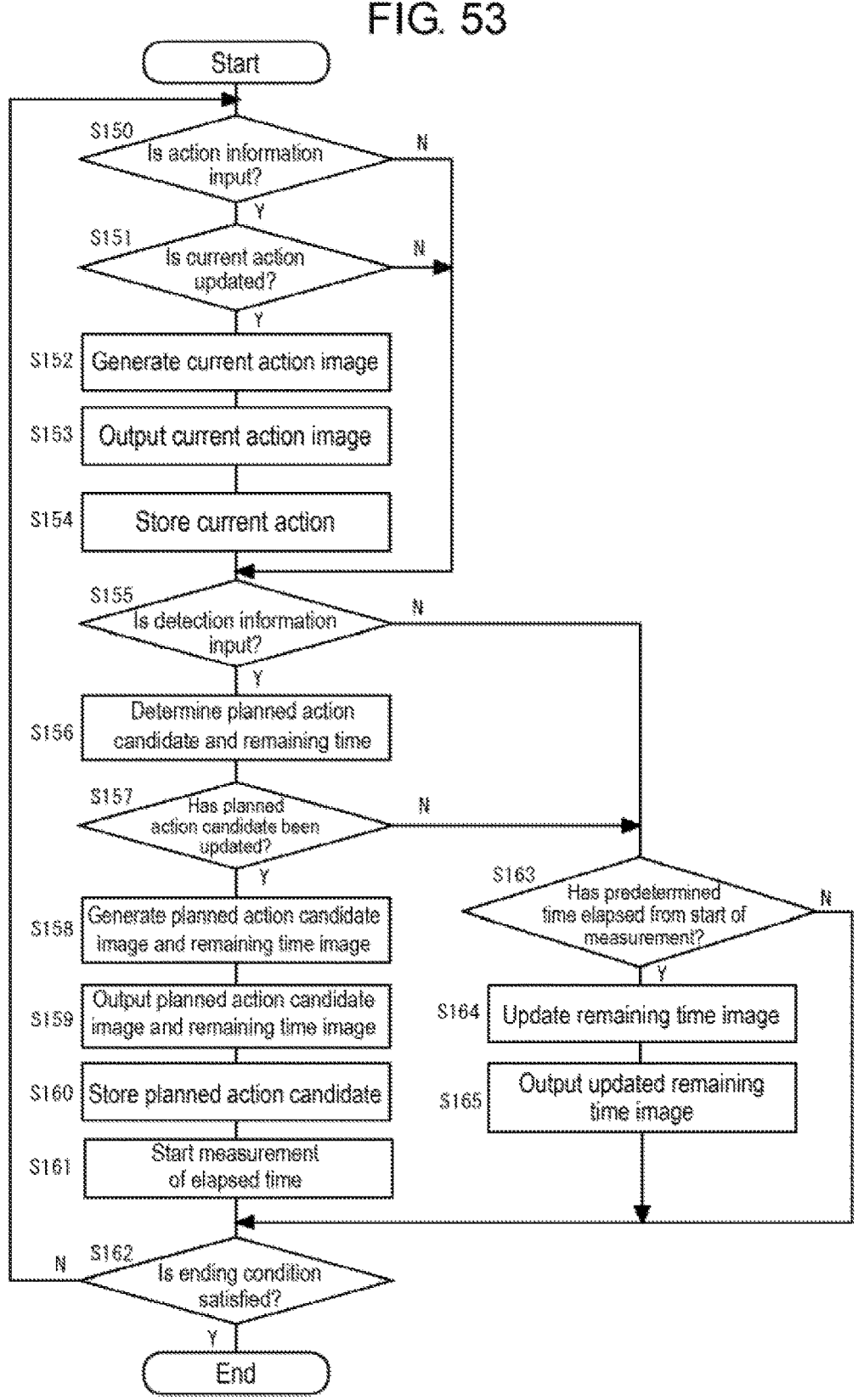
FIG. 53 is a flowchart illustrating an example of a process of the driving assistance device according to the seventh exemplary embodiment.

FIG. 53 is a flowchart illustrating an example of the process of driving assistance device 1040. When action information input unit 1054 acquires the action information output from autonomous driving control device 1030 (Y in S150), image generator 1060 determines whether or not the current action indicated by the action information and the current action stored in advance in storage unit 1042 coincide with each other. The processes in subsequent steps S151 to S154 are the same as the processes in S102 to S105 in FIG. 41, so that the description thereof will be omitted. When the action information has not yet been acquired (N in S150), steps S151 to S154 are skipped.

When detection information input unit 1052 acquires the detection information output from detector 1020 (Y in S155), candidate determination unit 1061 determines one or more planned action candidates based on the detection information and statistical information accumulated in statistical information accumulation unit 1070 (S156). Image generator 1060 determines whether or not the planned action candidate determined in S156 coincides with the planned action candidate stored in advance in storage unit 1042. When the planned action candidate determined in S156 does not coincide with the planned action candidate stored in advance in storage unit 1042, that is, when the planned action candidate is updated (Y in S157), image generator 1060 generates a planned action candidate image representing the planned action candidate (S158).

Image generator 1060 further identifies the remaining time to the execution associated with the planned action candidate in advance in the statistical information, and further generates a remaining time image representing the remaining time in S158. Image output unit 1051 outputs the planned action candidate image and the remaining time image to notification device 1002 and causes notification device 1002 to display the autonomous driving information screen (S159). Image generator 1060 stores, in storage unit 1042, the information indicating the planned action candidate based on which the image has been generated (S160), and starts the measurement of the elapsed time from the output (from the start of the display) of the planned action candidate image (S161). When a predetermined ending condition is satisfied (Y in S162), the flow in FIG. 53 is ended, and when the ending condition is not satisfied (N in S162), the process returns to S150.

When there is no input of the detection information (N in S155) or when the planned action candidate is not updated (N in S157), image generator 1060 determines whether or not a predetermined time has elapsed from the start of the measurement of the elapsed time. The predetermined time is a unit time in which the remaining time image needs to be updated, and may be a time allotted to one time indicator 1109, for example. When detecting that the predetermined time has elapsed from the start of the measurement of the elapsed time (Y in S163), image generator 1060 updates the remaining time image (S164). Image output unit 1051 outputs the updated remaining time image to notification device 1002 and causes notification device 1002 to display this image (S165). According to this process, for example, the hatched area in remaining time display region 1114 in FIG. 49 and FIGS. 50A to 50F is increased, or one time indicator 1109 in FIG. 52 is switched to the off state from the on state. If the predetermined time has not been elapsed from the start of the measurement of the elapsed time (N in S163), steps S164 and S165 are skipped.

Figure 54:
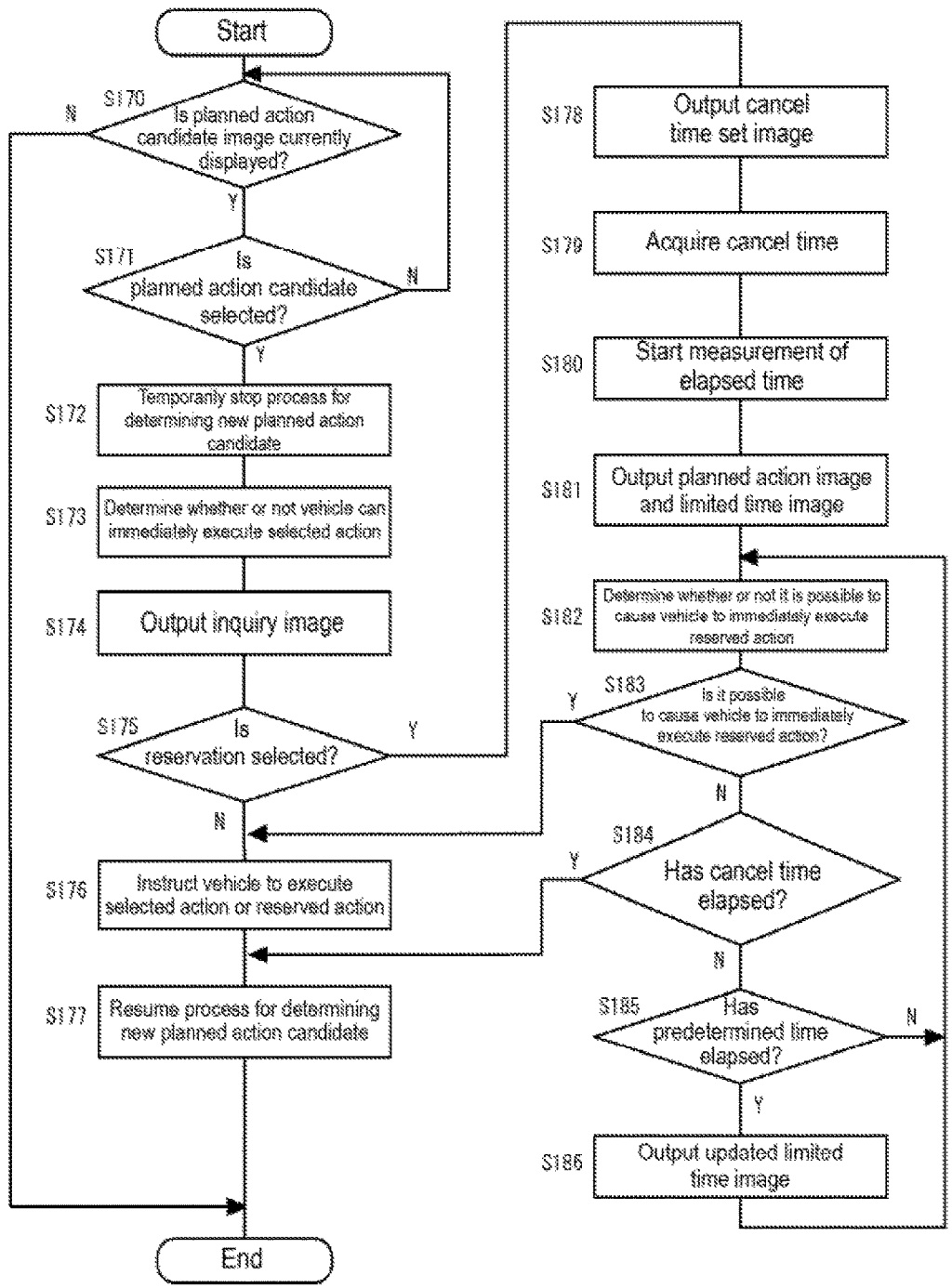
FIG. 54 is a flowchart illustrating an example of a process of the driving assistance device according to the seventh exemplary embodiment.

FIG. 54 also illustrates a flowchart showing an example of the process of driving assistance device 1040. If the planned action candidate (planned action candidate image) has not been selected (N in S171) after image output unit 1051 outputs the planned action candidate image to notification device 1002 and while the planned action candidate image is displayed in the autonomous driving information screen on notification device 1002 (Y in S170), the process returns to S170. When the planned action candidate is selected in the autonomous driving information screen (Y in S171), candidate determination unit 1061 pauses a process for determining a new planned action candidate (S172).

Determination unit 1062 determines whether or not vehicle 1000 can immediately execute the selected planned action candidate (hereinafter also referred to as a "selected action") (S173). Specifically, determination unit 1062 determines whether or not it is possible to cause the vehicle to currently execute the selected action by referring to the latest detection information output from detector 1020 and the determination reference retained in determination reference retaining unit 1071. In this case, even if the selected action cannot be immediately executed by the vehicle, this selected action may become executable when the surrounding situation or the travel state of the vehicle is changed. In view of this, in the seventh exemplary embodiment, the selected action can be reserved. The reservation can also be referred to as a behavior for instructing the vehicle to execute the selected action at a possible timing within a certain time period.

Image generator 1060 generates an inquiry image for inquiring the driver about immediate execution or reservation of the selected action, and image output unit 1051 outputs the inquiry image to notification device 1002 and causes notification device 1002 to display this image (S174). FIGS. 55A and 55B illustrate one example of the autonomous driving information screen. In autonomous driving information screen 1103 in FIG. 55A, planned action candidate images 1112 selected in autonomous driving information screen 1103 in FIG. 52 are displayed. In autonomous driving information screen 1103 in FIG. 55A, an inquiry image including execution button 1118 and reservation button 1120 is also displayed. When determination unit 1062 determines that the selected action can immediately be executed, image generator 1060 generates an inquiry image including both execution button 1118 and reservation button 1120. On the other hand, when determination unit 1062 determines that it is impossible to immediately execute the selected action, image generator 1060 generates an inquiry image including reservation button 1120 but not including execution button 1118. Thus, a selected action which cannot be immediately executed can only be reserved.

Returning to FIG. 54, when "execution" for the selected action is selected in the autonomous driving information screen (N in S175), operation input unit 1050 receives from input device 1004 an operation instruction for instructing the vehicle to immediately execute the selected action. The operation instruction may be a signal indicating that the immediate execution of the planned action candidate represented by the planned action candidate images is selected in the inquiry image. Instruction unit 1063 transmits a control command to instruct the vehicle to immediately execute the selected action to autonomous driving control device 1030 from command output unit 1055 (S176). This control command can be referred to as a control command to instruct the vehicle to immediately execute the planned action candidate represented by the planned action candidate images in place of the current action represented by the current action image in the autonomous driving information screen.

Thereafter, the current action image in the autonomous driving information screen is changed to the one representing the selected action due to the processes in S150 to S153 in FIG. 53. Candidate determination unit 1061 resumes the process for determining a new planned action candidate (S177). If the planned action candidate image is not being displayed (N in S170), the processes in subsequent steps are skipped, and the flow in FIG. 54 is ended.

When "reservation" for the selected action is selected in the autonomous driving information screen (Y in S175), operation input unit 1050 receives from input device 1004 an operation instruction for instructing the vehicle to reserve the selected action. Image generator 1060 generates a cancel time set image for allowing the driver to set a time until the execution of the selected action (hereinafter also referred to as a "reserved action") that the vehicle is instructed to reserve is canceled. Image output unit 1051 outputs the cancel time set image to notification device 1002 and causes notification device 1002 to display this image (S178). FIG. 55B illustrates autonomous driving information screen 1103 including cancel time set image 1122. In cancel time set image 1122 in FIG. 55B, a cancel time can be set within a range from 30 seconds to 10 minutes. During reservation, the process for determining a new planned action candidate is stopped. However, when the driver sets the time for canceling the reservation, a new planned action candidate is presented to the driver after the reservation is canceled.

Returning to FIG. 54, when the driver inputs the operation for setting the cancel time for canceling the reservation to input device 1004, operation input unit 1050 receives, from input device 1004, a signal indicating the set cancel time (S179). Instruction unit 1063 starts the measurement of the elapsed time from the start of the reservation (S180). Image generator 1060 generates a reserved action image representing the reserved action and a limited time image representing the length of a time until the cancel time for canceling the reservation. Image output unit 1051 outputs the reserved action image and the limited time image to notification device 1002 and causes notification device 1002 to display these images (S181). The reserved action image has a display manner different from the display manner of the planned action candidate image, and represents that the specific action selected by the driver is being reserved. For example, the reserved action image may have applied with a predetermined symbol indicating that the action is being reserved.

Figure 56A:
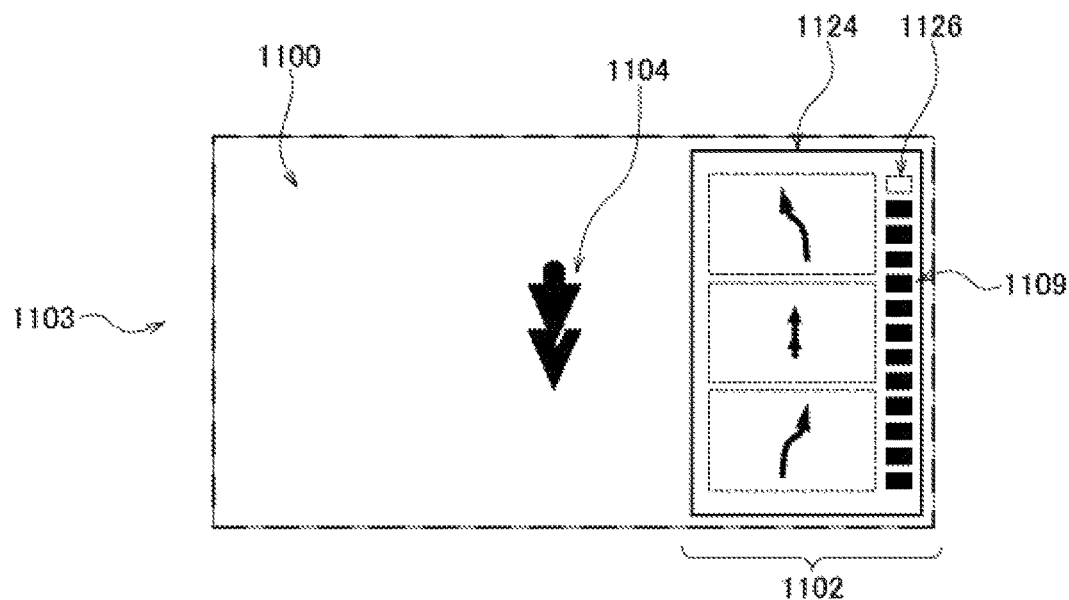
FIG. 56A is a view illustrating one example of an autonomous driving information screen according to the seventh exemplary embodiment.
Figure 56B:
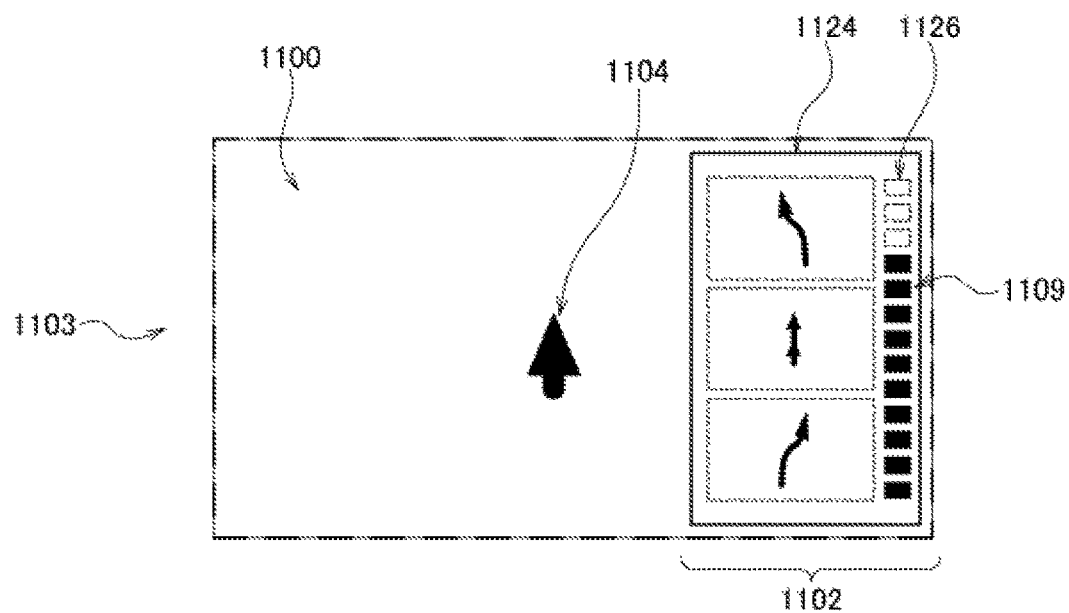
FIG. 56B is a view illustrating one example of an autonomous driving information screen according to the seventh exemplary embodiment.

FIGS. 56A and 56B illustrate one example of the autonomous driving information screen. In autonomous driving information screen 1103 in FIG. 56A, reserved action image 1124 and limited time image 1126 are displayed in sub-region 1102. In this example, limited time image 1126 represents a length of a time until the cancel of the reservation by a plurality of time indicators 1109. Image generator 1060 generates reserved action image 1124 in a manner different from the manner of planned action candidate image 1112. Alternatively, image output unit 1051 causes notification device 1002 to display reserved action image 1124 in a manner different from the manner of planned action candidate image 1112. Thus, the driver can easily identify whether the reserved action candidate is being presented or has already been reserved in autonomous driving information screen 1103.

Specifically, when the planned action candidate is presented to the driver, remaining time image 1108 is disposed on the left side of planned action candidate image 1112, as in autonomous driving information screen 1103 in FIG. 52. On the other hand, when the reserved action is presented to the driver, limited time image 1126 is disposed on the right side of reserved action image 1124, as in autonomous driving information screen 1103 in FIG. 56A. As modifications, a background color may differ between planned action candidate image 1112 and reserved action image 1124, or a display size may differ between these images. In addition, a predetermined symbol image indicating that the reserved action is being reserved may be added to reserved action image 1124.

Returning to FIG. 54, determination unit 1062 determines whether or not it is possible to cause the vehicle to immediately execute the reserved action by referring to the latest detection information output from detector 1020 and the determination reference retained in determination reference retaining unit 1071 (S182). If it is possible to cause the vehicle to immediately execute the reserved action (Y in S183), instruction unit 1063 transmits a control command to instruct the vehicle to immediately execute the reserved action to autonomous driving control device 1030 from command output unit 1055 (S176). Thereafter, the current action image in the autonomous driving information screen is changed to the one representing the reserved action due to the processes in S150 to S153 in FIG. 53.

If it is determined that it is impossible to immediately execute the reserved action (N in S183) and the cancel time has elapsed (Y in S184), candidate determination unit 1061 resumes the process for determining a new planned action candidate without instructing the vehicle to execute the reserved action (S177), and the flow in FIG. 54 is ended. If the cancel time has not elapsed (N in S184) and a predetermined time for which the limited time image has to be updated has not elapsed (N in S185), the process returns to S182 where it is again determined whether or not it is possible to cause the vehicle to immediately execute the reserved action. When the predetermined time in which the limited time image has to be updated has elapsed (Y in S185), image generator 1060 updates the limited time image. Image output unit 1051 outputs the updated limited time image to notification device 1002 and causes notification device 1002 to display this image (S186). Then, the process returns to S182 where it is again determined whether or not it is possible to cause the vehicle to immediately execute the reserved action.

FIG. 56B illustrates autonomous driving information screen 1103 at a point after the point of FIG. 56A. Between FIG. 56A and FIG. 56B, the current action of the vehicle represented by current action image 1104 is switched from deceleration to straight ahead (with the current speed being maintained), but in sub-region 1102, only limited time image 1126 is changed, because the reserved action has not yet been executed. Specifically, by changing some of time indicators 1109 to the off state from the on state, the driver is notified that the remaining time until the cancel of the reservation is reduced. When the elapsed time from the start of the reservation reaches the cancel time (for example, 5 minutes), the display of reserved action image 1124 is ended, and the screen is returned to autonomous driving information screen 1103 (FIG. 52 or the like) presenting a planned action candidate newly determined by candidate determination unit 1061.

As described above, driving assistance device 1040 according to the seventh exemplary embodiment notifies the occupant (driver or the like) in the vehicle of a current action in autonomous driving, and presents to the driver a future action of the vehicle which can be instructed to change the control in autonomous driving. With the configuration described above in which options of future actions of the vehicle in autonomous driving are presented to the driver, autonomous driving on which the driver's intention is further reflected and which suits the taste or the like of the driver can be implemented. In addition, a sense of anxiety of the driver involved with autonomous driving can be suppressed. Further, according to driving assistance device 1040 in the seventh exemplary embodiment, an action which cannot currently be executed can be reserved to be executed in the future, whereby it is easier to implement autonomous driving which suits the taste or the like of the driver.

A modification will be described. In the seventh exemplary embodiment, driving assistance device 1040 determines whether or not the selected action selected by the driver can be immediately executed. As a modification, autonomous driving control device 1030 may determine whether or not the selected action selected by the driver can be immediately executed. In this case, driving assistance device 1040 may not execute this determination process. Driving assistance device 1040 may generate an inquiry image in which immediate execution and reservation are both selectable, regardless of whether the selected action selected by the driver can immediately be executed or not, and may present this image to the driver.

In addition, when receiving an operation instruction indicating immediate execution of the selecting action as the operation performed by the driver for the inquiry image, instruction unit 1063 in driving assistance device 1040 may transmit, to autonomous driving control device 1030 from command output unit 1055, a first control command to cause the vehicle to immediately execute the selecting action. In addition, when receiving an operation instruction indicating reservation of the selected action as the operation performed by the driver for the inquiry image, instruction unit 1063 in driving assistance device 1040 may transmit, to autonomous driving control device 1030 from command output unit 1055, a second control command to cause the vehicle to execute the selected action after a predetermined time. The second control command may be a control command to instruct the vehicle to execute the selected action within the cancel time set to cancel time set image 1122 by the driver, for example. In other words, the second control command may be a control command to instruct the vehicle to cancel the execution of the selected action when the cancel time has elapsed.

Another modification will be described. While not stated in the seventh exemplary embodiment, the configuration for causing the vehicle to execute the planned action candidate may be the same as the configuration described in the sixth exemplary embodiment. Specifically, instruction unit 1063 in driving assistance device 1040 may transmit, to autonomous driving control device 1030 from command output unit 1055, a control command to cause the vehicle to execute the planned action candidate, after current action image 1104 and planned action candidate image 1112 are displayed in autonomous driving information screen 1103 for a predetermined time.

In addition, when an operation instruction for designating an action of the vehicle has not been input within a predetermined time for which current action image 1104 and planned action candidate image 1112 are displayed in autonomous driving information screen 1103, instruction unit 1063 may transmit, to autonomous driving control device 1030 from command output unit 1055, a control command to cause the vehicle to execute the planned action candidate. Furthermore, when receiving an operation instruction for selecting the planned action candidate (planned action candidate image 1112) within a predetermined period in which current action image 1104 and planned action candidate image 1112 are displayed in autonomous driving information screen 1103, instruction unit 1063 may transmit, to autonomous driving control device 1030 from command output unit 1055, a control command to cause the vehicle to execute the planned action candidate.

Still another modification will be described. The statistical information accumulated in statistical information accumulation unit 1070 may be information (driver model) on which a taste or a driving pattern of an occupant (typically, a driver) of the vehicle is reflected. It can be said that the statistical information in the present modification is formed by accumulating a combination of previous environmental parameter values and a performance of a planned action under the environment. For example, driving assistance device 1040 may further include a statistical information recording unit that sequentially records, on the statistical information in statistical information accumulation unit 1070, previous environmental parameter values during travel of the vehicle and an operation (the consequent future action of the vehicle) performed by the driver at a predetermined future point under the environmental parameter values.

Candidate determination unit 1061 in the present modification determines a plurality of planned action candidates which is associated with the environmental parameter values of which difference from the currently detected environmental parameter values falls within a predetermined range, by referring to statistical information accumulation unit 1070. Besides, candidate determination unit 1061 determines the priority order (which can be also referred to as a degree of priority) of each of the plurality of planned action candidates. For example, when determining a plurality of planned action candidates, candidate determination unit 1061 may set such that a higher priority is placed on a planned action candidate associated with the environmental parameter values close to the currently detected environmental parameter values. That is to say, candidate determination unit 1061 may place a higher priority on a planned action candidate which suits the taste or the driving pattern of the driver from among a plurality of planned action candidates.

Image generator 1060 generates a plurality of planned action candidate images corresponding to the planned action candidates determined by candidate determination unit 1061, that is, image generator 1060 generates images representing the contents of the respective candidates. Image output unit 1051 outputs the current action image and the plurality of planned action candidate images to notification device 1002 such that the current action image and the plurality of planned action candidate images are displayed within the fixed field of view of the driver of vehicle 1000. In addition, image output unit 1051 causes notification device 1002 to display the plurality of planned action candidate images in a manner according to the priority order of each candidate.

For example, as previously described in the fifth exemplary embodiment, image generator 1060 and image output unit 1051 may display the plurality of planned action candidate images in a parametric display manner in which priorities are visualized using a histogram, or in a non-parametric display manner in which priorities are visualized by, for example, a vertical or horizontal arrangement order. Specifically, an image indicating a priority order itself may be added to each of the planned action candidate images, a planned action candidate image having a higher priority order may be displayed in a highly visible manner, or the planned action candidate images may be arranged in descending priority order from a predetermined position of autonomous driving information screen 1103. In addition, images of only planned action candidates having priority orders equal to or higher than a predetermined order may be generated or only such planned action candidates may be determined to be displayed. This modification can provide assistance in such a way that candidates preferable for the occupant can be selected from among a plurality of planned action candidates. In addition, with the configuration in which a priority order suited to the driver model is determined, the priority order suited to the driving pattern of the target (for example, a driver oneself, a fellow passenger oneself, a model of a standard or exemplary driver, and the like) of the driver model can be presented.

Although not illustrated, it is supposed, as another example, that although the distance between the host vehicle and a leading vehicle is reduced because of deceleration of the leading vehicle, autonomous driving control device 1030 determines the execution of deceleration which is the current action because vehicles having a speed higher than the speed of the host vehicle are approaching in sequence from behind in the overtaking lane, and driving assistance device 1040 presents that this current action is executed. In this case, driving assistance device 1040 may determine that "a benefit becomes greater unless there are vehicles approaching from behind in the overtaking lane" based on the detection information from detector 1020. Then, driving assistance device 1040 may recommend and present, as an option of an action which can be reserved, a "lane change to the overtaking lane" to the driver as a planned action candidate that the vehicle can be instructed to execute in travel control with precise timing after the current action of "deceleration".

Eighth Exemplary Embodiment

The eighth exemplary embodiment will be firstly summarized. Even when an action of a vehicle planned to be executed at a future point (hereinafter referred to as a "planned action") is presented to a driver during autonomous driving, the driver may not be able to understand what action the driver can instruct the vehicle to execute as an action that the driver causes the vehicle to execute before the planned action. In addition, the driver may have a sense of anxiety as a consequence.

In view of this, in the eighth exemplary embodiment, not only a planned action planned by the autonomous driving controller but also a candidate of an action to be executed by the vehicle before the planned action is presented to the driver. The candidate to be presented to the driver in the eighth exemplary embodiment is a candidate of an action which can be immediately executed by the vehicle (hereinafter referred to as a "current action candidate"). Specifically, autonomous driving control device 1030 determines a planned action, and driving assistance device 1040 determines a current action candidate. Then, driving assistance device 1040 causes notification device 1002 in vehicle 1000 to display both the planned action and the current action candidate.

Hereinafter, the details which have already been described in the previous exemplary embodiments will be omitted as appropriate. The configurations or operations described in the present exemplary embodiment can be combined with or replaced with configurations or operations described in other exemplary embodiments or modifications without departing from the spirit of the present invention.

It can be said that the eighth exemplary embodiment is configured by replacing the display of a current action in the sixth exemplary embodiment by the display of a planned action, and the functional blocks in driving assistance device 1040 in the eighth exemplary embodiment are the same as those in the sixth exemplary embodiment. Specifically, controller 1041 includes image generator 1060, candidate determination unit 1061, determination unit 1062, and instruction unit 1063. In addition, storage unit 1042 includes statistical information accumulation unit 1070 and determination reference retaining unit 1071.

The statistical information accumulated in statistical information accumulation unit 1070 and the determination reference retained in determination reference retaining unit 1071 are the same as those in the sixth exemplary embodiment. Specifically, statistical information for determining a current action candidate is accumulated in statistical information accumulation unit 1070, and a determination reference for an action which can be immediately executed according to environmental parameters is retained in determination reference retaining unit 1071. As previously stated, statistical information may be accumulated in a device outside of vehicle 1000, and driving assistance device 1040 may access remote statistical information through communication IF 1056 and wireless device 1008.

Action information input unit 1054 acquires, from autonomous driving control device 1030, action information ("planned action information" in the fifth exemplary embodiment) indicating a planned action that autonomous driving control device 1030 causes vehicle 1000 to execute at a future point. Action information input unit 1054 further acquires, from autonomous driving control device 1030, remaining time information indicating a time from the current time until the planned action is executed. It is supposed that, as illustrated in FIG. 35, the remaining time information is included in a data set of the action information acquired from autonomous driving control device 1030.

Detection information input unit 1052 acquires, from detector 1020, detection information indicating the detection result of the surrounding situation and the travel state of vehicle 1000. Candidate determination unit 1061 and determination unit 1062 in driving assistance device 1040 determine, based on the detection information, an action that vehicle 1000 can be caused to execute before the planned action indicated by the action information. In the seventh exemplary embodiment, as the action described above, an action that vehicle 1000 can be caused to immediately execute at present is determined as a current action candidate. As a modification, an action which is to be executed before the point at which the planned action indicated by the action information is to be executed but after the current point, e.g., an action which is to be executed after the current action currently executed by vehicle 1000 is ended, may be determined as the current action candidate.

Specifically, as in the sixth exemplary embodiment, candidate determination unit 1061 determines, as temporal current action candidates, one or more actions associated with the environmental parameter values close to the detection information from among a plurality of kinds of actions prescribed in the statistical information in statistical information accumulation unit 1070. As in the sixth exemplary embodiment, determination unit 1062 also determines whether or not each of the temporal current action candidates determined by candidate determination unit 1061 can be executed by the vehicle at present (immediately) by referring to the detection information output from detector 1020 and the determination reference retained in determination reference retaining unit 1071. Then, the candidate which can be executed by the vehicle at present is determined as a final current action candidate presented to the driver.

Image generator 1060 generates a planned action image representing the planned action indicated by the action information, and a current action candidate image representing the final current action candidate determined by candidate determination unit 1061 and determination unit 1062. Image output unit 1051 outputs the planned action image and the current action candidate image to notification device 1002 such that the planned action image and the current action candidate image are displayed within the fixed field of view of the driver of vehicle 1000.

Image generator 1060 further generates a remaining time image indicating a time until a planned action which is updated based on the remaining time information input from autonomous driving control device 1030 is executed. Image output unit 1051 further outputs the remaining time image to notification device 1002, and causes notification device 1002 to display the current action candidate image and the planned action image including the remaining time image within a fixed field of view of the driver of vehicle 1000. Notification device 1002 displays an autonomous driving information screen including these images.

FIGS. 57A to 57E illustrate one example of the autonomous driving information screen. In autonomous driving information screens 1103 in FIGS. 57A to 57E, planned action image 1106 and remaining time image 1108 are disposed in an inner circle and current action candidate image 1110 is disposed on an outer circle. The entire of the inner circle is a remaining time display region, and remaining time image 1108 is updated such that the area of hatched remaining time image 1108 is increased with the decrease in the remaining time until the execution of the planned action. Regarding current action candidate image 1110, an up-pointing triangle indicates acceleration, down-pointing triangle indicates deceleration, left-pointing triangle indicates a lane change to the left, and right-pointing triangle indicates a lane change to the right, for example. For example, in autonomous driving information screen 1103 in FIG. 57B, two current action candidates which are "lane change to the left" and "deceleration" are presented.

As illustrated in FIGS. 57A to 57D, while the remaining time until the execution of the planned action is decreased, current action candidate image 1110 is updated, as needed, according to the change in the surrounding situation and the travel state of the vehicle. The driver may instruct the vehicle to execute the current action candidate represented by current action candidate image 1110 by pressing a cross button mounted to input device 1004. For example, the driver may instruct the vehicle to execute deceleration represented by current action candidate image 1110 by selecting a down button of the cross button while current action candidate image 1110 representing a down-pointing triangle is displayed.

Figure 57C:
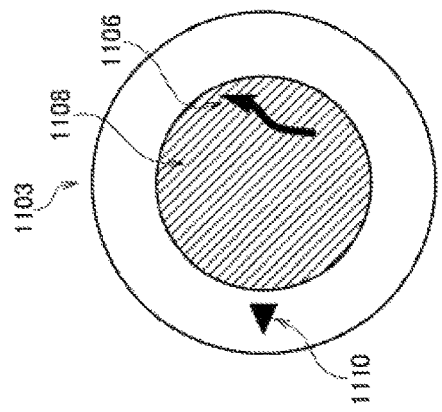
FIG. 57C is a view illustrating one example of an autonomous driving information screen according to the eighth exemplary embodiment.
Figure 57B:
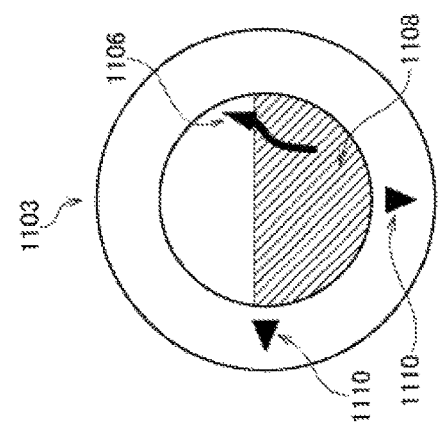
FIG. 57B is a view illustrating one example of an autonomous driving information screen according to the eighth exemplary embodiment.
Figure 57A:
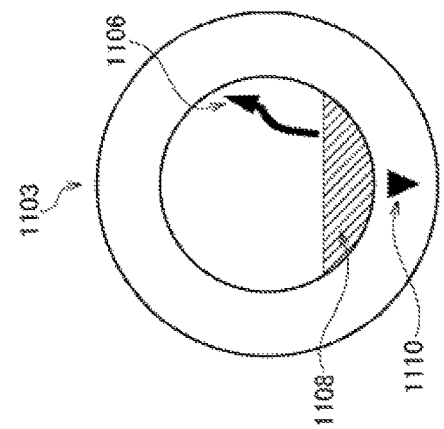
FIG. 57A is a view illustrating one example of an autonomous driving information screen according to the eighth exemplary embodiment of the present invention.
Figure 57E:
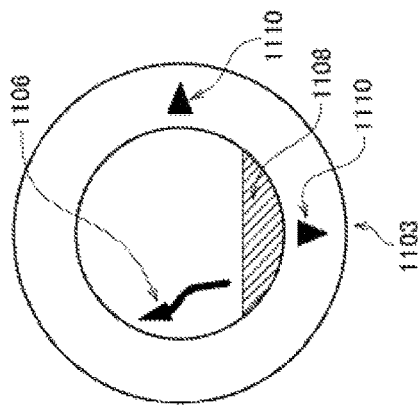
FIG. 57E is a view illustrating one example of an autonomous driving information screen according to the eighth exemplary embodiment.
Figure 57D:
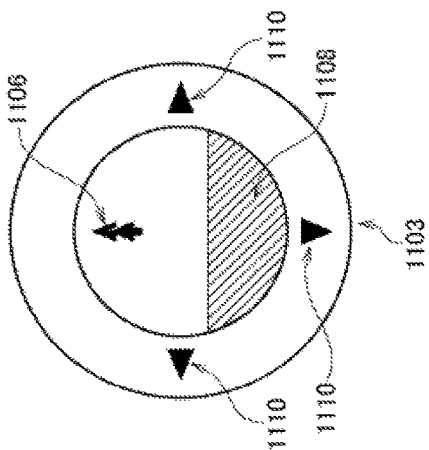
FIG. 57D is a view illustrating one example of an autonomous driving information screen according to the eighth exemplary embodiment.

FIG. 57E illustrates the result of the selection of any one of the current action candidates (current action candidate images 1110) performed by the driver before acceleration represented by planned action image 1106 in FIG. 57D is executed. For example, when the driver selects the current action candidate of "deceleration" in autonomous driving information screen 1103 in FIG. 57D, the current action of the vehicle is switched to deceleration. As a result, the planned action (planned action image 1106) of the vehicle determined by autonomous driving control device 1030 and the current action candidate (current action candidate image 1110) of the vehicle determined by driving assistance device 1040 are changed in autonomous driving information screen 1103 in FIG. 57E.

The process sequence of vehicle 1000 in the eighth exemplary embodiment is the same as the process sequence in FIG. 46 described in the sixth exemplary embodiment, and therefore, the description will be omitted. It should be noted that the acquisition of action information indicating the current action (P23, P31) and generation and output of the current action image (P24, P32) are respectively replaced by acquisition of action information indicating the planned action and the remaining time and generation and output of the planned action image.

Figure 58:
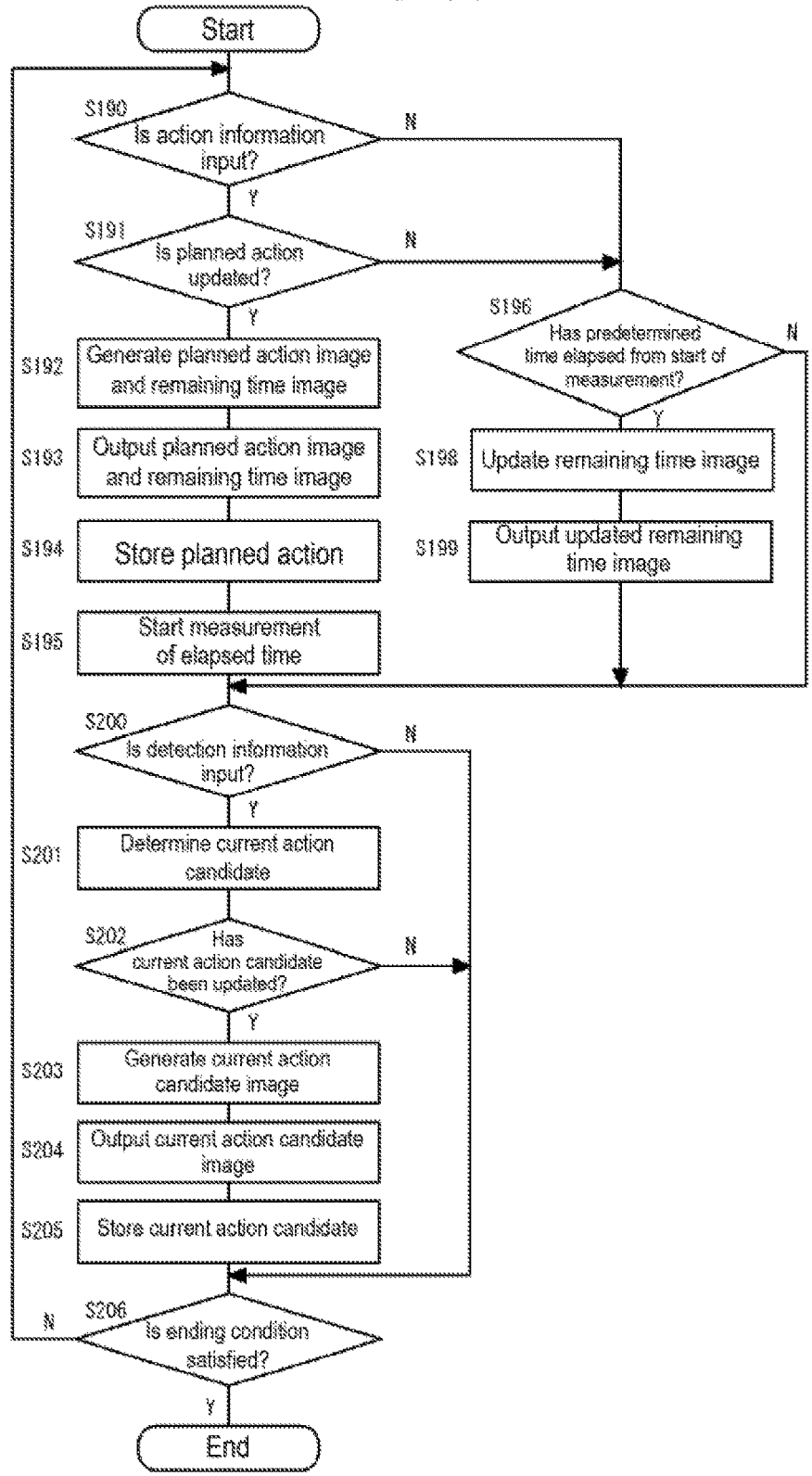
FIG. 58 is a flowchart illustrating an example of a process of the driving assistance device according to the eighth exemplary embodiment.

FIG. 58 is a flowchart illustrating an example of the process of driving assistance device 1040. The processes in S190 to S199 pertaining to the generation and display of the planned action image in FIG. 58 are the same as the processes in S100, S106 to S110, and S112 to S114 in FIG. 41 described in the fifth exemplary embodiment, and therefore, the description thereof will be omitted. When detection information input unit 1052 acquires the detection information output from detector 1020 (Y in S200), candidate determination unit 1061 determines one or more current action candidates based on the detection information, statistical information accumulated in statistical information accumulation unit 1070, and determination reference retained in determination reference retaining unit 1071 (S201). Image generator 1060 determines whether or not the current action candidate determined in S201 coincides with the current action candidate stored in advance in storage unit 1042.

When the current action candidate determined in S201 does not coincide with the current action candidate stored in advance in storage unit 1042, that is, when the current action candidate is updated (Y in S202), image generator 1060 generates a current action candidate image representing the current action candidate (S203). Image output unit 1051 outputs the current action candidate image to notification device 1002 and causes notification device 1002 to display this image (S204). Image generator 1060 causes storage unit 1042 to store information about the current action candidate based on which the current action candidate image is generated (S205). If the detection information has not yet been acquired (N in S200), steps S201 to S205 are skipped. If the current action candidate has not been updated (N in S202), steps S203 to S205 are skipped. When a predetermined ending condition is satisfied (Y in S206), the flow in FIG. 58 is ended, and when the ending condition is not satisfied (N in S206), the process returns to S190.

The process of driving assistance device 1040 pertaining to the selection of the current action candidate by the driver is the same as that in the sixth exemplary embodiment, and the process flow is the same as the process flow in FIG. 48. A length of a time for receiving the selection of the current action candidate may be a predetermined fixed value, or may be a value (for example, remaining time—5 seconds) less than the remaining time until the execution of the planned action determined by autonomous driving control device 1030.

As described above, driving assistance device 1040 according to the eighth exemplary embodiment notifies the occupant (driver or the like) in the vehicle of a planned action which is planned in autonomous driving, and proposes a current action candidate which can be executed immediately at present. With the configuration described above in which options of latest actions of the vehicle are presented to the driver, autonomous driving on which the driver's intention is further reflected and which suits the taste or the like of the driver can be implemented. In addition, because the current action candidates which can be selected by the driver are executable under the surrounding situation or the travel state of the vehicle at present, the driver can issue an instruction to change the action in autonomous driving without anxiety.

The modification previously described in the sixth exemplary embodiment can also be applied to the eighth exemplary embodiment, and the similar effect can be provided. For example, the statistical information accumulated in statistical information accumulation unit 1070 may be information (driver model) on which a taste or a driving pattern of an occupant (typically, a driver) of the vehicle is reflected. Candidate determination unit 1061 may determine a plurality of current action candidates which is associated with environmental parameter values of which difference from the currently detected environmental parameter values falls within a predetermined range, by referring to statistical information accumulation unit 1070. Besides, candidate determination unit 1061 may determine the priority order of each of the plurality of current action candidates. Image generator 1060 may generate a plurality of current action candidate images corresponding to the plurality of current action candidates determined by candidate determination unit 1061, that is, image generator 1060 may generate images representing the contents of the respective candidates. Image output unit 1051 may output the planned action image and the plurality of current action candidate images to notification device 1002 such that the planned action image and the plurality of current action candidate images are displayed within the fixed field of view of the driver of vehicle 1000. In addition, image output unit 1051 may cause notification device 1002 to display the plurality of current action candidate images in a manner according to the priority order of each candidate.

Another example, which is not illustrated, for presenting a planned action (which can also be referred to as a travel control plan in the future) and a current action candidate (which can also be referred to as a situation-adapted recommendation for the present moment) will be described. This example shows that, based on the situation where there is no merging vehicle while the host vehicle is traveling in the leftmost lane which approaches a merging lane, autonomous driving control device 1030 determines the execution of "keep traveling in the current lane" which is a planned action next after the current driving action, and driving assistance device 1040 presents that "keep traveling in the current lane" is planned to be executed. In this case, driving assistance device 1040 may determine that "if a merging vehicle appears before vehicle 1000 approaches the merging lane, a disadvantage is increased due to the need of an unexpected operation". Then, driving assistance device 1040 may recommend and present, as an option that vehicle 1000 can be immediately instructed to execute, "lane change from the leftmost lane to the right lane" as a current action candidate that the vehicle can be instructed to execute in travel control before "keep traveling in the current lane" which is planned to be executed next by vehicle 1000.

Ninth Exemplary Embodiment

The ninth exemplary embodiment will be firstly summarized. Even when an action (hereinafter referred to as a "planned action") of a vehicle planned to be executed at a future point is presented to a driver during autonomous driving, the driver may not be able to understand what action the driver can instruct the vehicle to execute as an action in place of the planned action. In addition, the driver may have a sense of anxiety as a consequence.

In view of this, in the ninth exemplary embodiment, not only a planned action planned by the autonomous driving controller but also a planned action candidate which is a candidate of an action to be executed by the vehicle in a future point in place of the planned action is presented to the driver. Specifically, autonomous driving control device 1030 determines a planned action, and driving assistance device 1040 determines a planned action candidate. Then, driving assistance device 1040 causes notification device 1002 in vehicle 1000 to display both the planned action and the planned action candidate. The planned action candidate can be an action different from the planned action determined by the autonomous driving controller, and can be an action planned to be executed by the vehicle.

Hereinafter, the details which have already been described in the previous exemplary embodiments will be omitted as appropriate. The configurations or operations described in the present exemplary embodiment can be combined with or replaced with configurations or operations described in other exemplary embodiments or modifications without departing from the spirit of the present invention.

It can be said that the ninth exemplary embodiment is configured by replacing the display of a current action in the seventh exemplary embodiment by the display of a planned action, and the functional blocks in driving assistance device 1040 in the ninth exemplary embodiment are the same as those in the seventh exemplary embodiment. Specifically, controller 1041 includes image generator 1060, candidate determination unit 1061, determination unit 1062, and instruction unit 1063. In addition, storage unit 1042 includes statistical information accumulation unit 1070 and determination reference retaining unit 1071.

The statistical information accumulated in statistical information accumulation unit 1070 and the determination reference retained in determination reference retaining unit 1071 are the same as those in the seventh exemplary embodiment. Specifically, statistical information for determining a planned action candidate is accumulated in statistical information accumulation unit 1070, and a determination reference for an action which can be immediately executed according to environmental parameters is retained in determination reference retaining unit 1071. As previously stated, statistical information may be accumulated in a device outside of vehicle 1000, and driving assistance device 1040 may access remote statistical information through communication IF 1056 and wireless device 1008.

Action information input unit 1054 acquires, from autonomous driving control device 1030, action information ("planned action information" in the fifth exemplary embodiment) indicating a planned action that autonomous driving control device 1030 causes vehicle 1000 to execute at a future point. Action information input unit 1054 further acquires, from autonomous driving control device 1030, remaining time information indicating a time from the current time until the planned action is executed. It is supposed that, as illustrated in FIG. 35, the remaining time information is included in a data set of the action information acquired from autonomous driving control device 1030.

Detection information input unit 1052 acquires, from detector 1020, detection information indicating the detection result of the surrounding situation and the travel state of vehicle 1000. Candidate determination unit 1061 determines, based on the detection information output from detector 1020, one or more planned action candidates which are different from the planned action indicated by the action information and which can be actions planned to be executed by vehicle 1000. The planned action candidate can also be referred to as an action that vehicle 1000 can be caused to execute in place of the planned action indicated by the action information. Specifically, as in the seventh exemplary embodiment, candidate determination unit 1061 extracts, as the planned action candidate, one or more actions associated with the environmental parameter values close to the detection information from among actions prescribed in the statistical information.

If one or more planned action candidates extracted from the statistical information include a candidate same as the planned action indicated by the action information, candidate determination unit 1061 excludes this candidate from the candidates to be presented to the driver. In other words, candidate determination unit 1061 determines, as candidates to be presented to the driver, a candidate different from the planned action indicated by the action information from among the planned action candidates extracted from the statistical information. Thus, presentation of a planned action candidate same as the planned action to the driver is prevented.

Image generator 1060 generates a planned action image representing the planned action indicated by the action information, and one or more planned action candidate images representing one or more planned action candidates determined to be presented to the driver by candidate determination unit 1061. Image output unit 1051 outputs the planned action image and the planned action candidate images to notification device 1002 such that the planned action image and the planned action candidate images are displayed within the fixed field of view of the driver of the vehicle. Notification device 1002 displays an autonomous driving information screen including the planned action image and the planned action candidate images output from driving assistance device 1040.

Image generator 1060 further generates a first remaining time image indicating a time until a planned action is executed, which time is updated based on the remaining time information input from autonomous driving control device 1030. Image output unit 1051 further outputs the first remaining time image to notification device 1002 in association with the planned action image, thereby causing notification device 1002 to display the planned action image including the first remaining time image on the autonomous driving information screen.

In addition, when determining the planned action candidate, candidate determination unit 1061 further delivers the remaining time information associated with the planned action candidate in the statistical information to image generator 1060. When generating a planned action candidate image representing the planned action candidate, image generator 1060 also generates a second remaining time image representing a remaining time indicated by the remaining time information. Image output unit 1051 further outputs the second remaining time image to notification device 1002 in association with the planned action candidate image, thereby causing notification device 1002 to display the planned action candidate image including the second remaining time image on the autonomous driving information screen.

Figure 59:
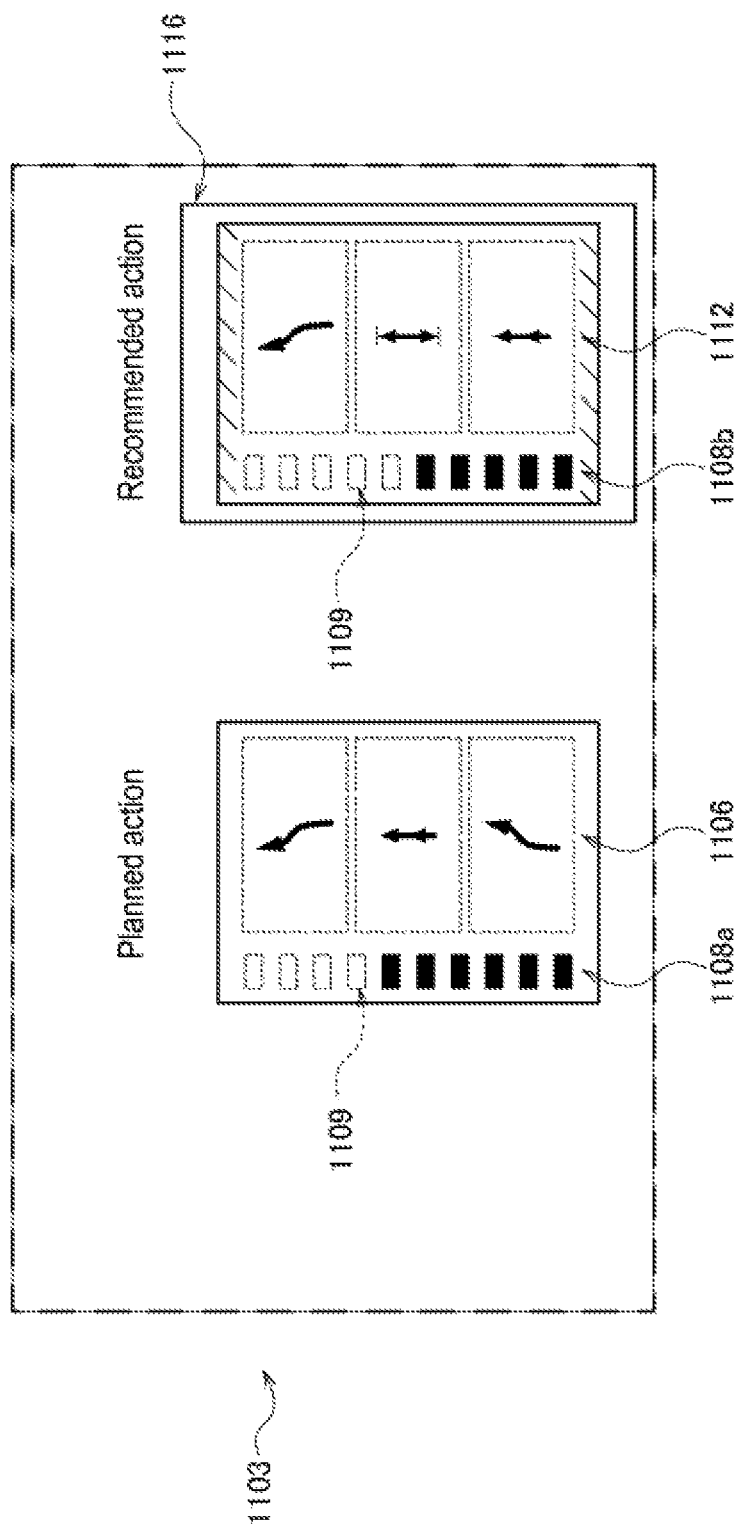
FIG. 59 is a view illustrating one example of an autonomous driving information screen according to the ninth exemplary embodiment of the present invention.

FIG. 59 illustrates one example of the autonomous driving information screen. In autonomous driving information screen 1103 in FIG. 59, one planned action image 1106 representing one planned action and one planned action candidate image 1112 representing one planned action candidate are displayed. When a plurality of planned actions is determined, a plurality of planned action images 1106 may be displayed, and when a plurality of planned action candidates is determined, a plurality of planned action candidate images 1112 may be displayed. In addition, first remaining time image 1108*a* is disposed near planned action image 1106, and second remaining time image 1108*b* is disposed near planned action candidate image 1112. Both remaining time images provide notification regarding the length of the remaining time according to a display manner of a plurality of time indicators 1109. The planned action and the planned action candidate illustrated in FIG. 59 are action plans created by combining a plurality of individual actions. However, they may be an individual action.

The display manner of planned action image 1106 in autonomous driving information screen 1103 is set to be different from the display manner of planned action candidate image 1112. For example, planned action image 1106 and planned action candidate image 1112 may have a different pattern, a different color, or a different size. This configuration prevents the driver from confusing between the planned action which has been planned by the autonomous driving controller and the planned action candidate proposed as an action substituted for the planned action. In FIG. 59, a label of "planned action" is added to planned action image 1106, and a label of "recommended action" is added to planned action candidate image 1112. Planned action candidate image 1112 further includes a hatched region.

To make the display manner different between planned action image 1106 and planned action candidate image 1112, image generator 1060 may apply, to planned action candidate image 1112, a symbol or a decoration different from that for planned action image 1106. In addition, image output unit 1051 may further output, to notification device 1002, display control data for designating that the display manner of planned action image 1106 and the display manner of planned action candidate image 1112 are different from each other.

Further, in autonomous driving information screen 1103, one or more planned actions (planned action image 1106) and selection frame 1116 for allowing the driver to select a specific action from one or more planned action candidates (planned action candidate image 1112) are displayed. The driver inputs, to input device 1004, an operation for selecting a desired planned action or planned action candidate by means of selection frame 1116.

The process when the planned action or the planned action candidate is selected is the same as in the seventh exemplary embodiment. Specifically, determination unit 1062 determines whether or not the vehicle can immediately execute the selected action. Image generator 1060 generates an inquiry image (for example, FIGS. 55A and 55B) for allowing the driver to designate "execution" or "reservation" of the selected action according to the determination result of determination unit 1062. When "execution" or "reservation" is designated while the inquiry image is displayed, instruction unit 1063 transmits, to autonomous driving control device 1030, a control command to cause the vehicle to execute the selected action selected by the driver, at a timing according to the designated "execution" or "reservation".

The process sequence of vehicle 1000 in the ninth exemplary embodiment is the same as the process sequence in FIG. 46 described in the sixth exemplary embodiment, and therefore, the description will be omitted. It should be noted that the acquisition of action information indicating the current action (P23, P31) and generation and output of the current action image (P24, P32) are respectively replaced by acquisition of action information indicating the planned action and the remaining time and generation and output of the planned action image. In addition, the generation and output of the current action candidate image (P26, P27, P34, and P35) are replaced by the generation and output of the planned action candidate image.

Figure 60:
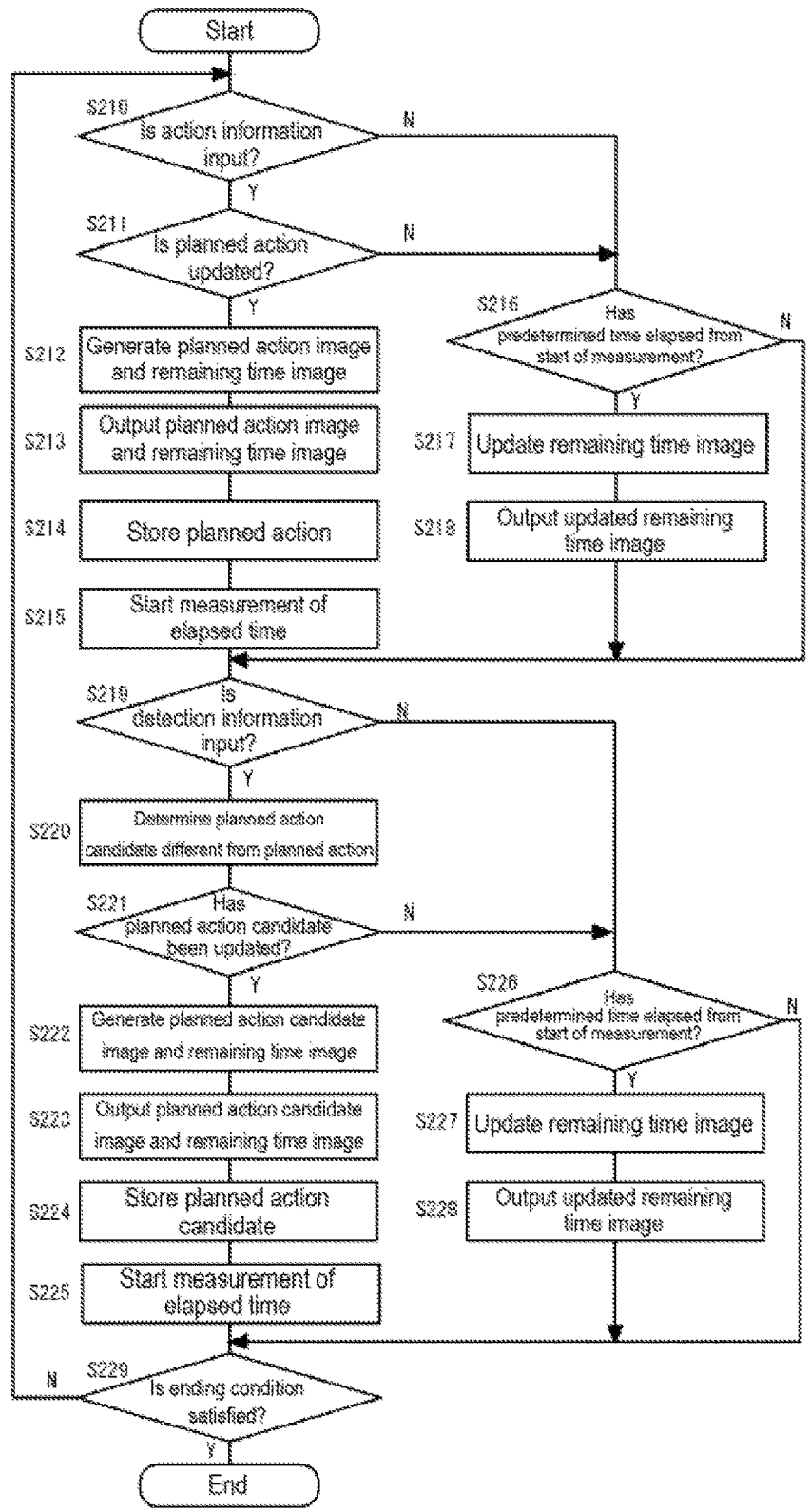
FIG. 60 is a flowchart illustrating an example of a process of the driving assistance device according to the ninth exemplary embodiment.

FIG. 60 is a flowchart illustrating an example of the process of driving assistance device 1040. The processes in S210 to S218 pertaining to the generation and display of the planned action image in FIG. 60 are the same as the processes in S100, S106 to S110, and S112 to S114 in FIG. 41 described in the fifth exemplary embodiment, and therefore, the description thereof will be omitted. When detection information input unit 1052 acquires the detection information output from detector 1020 (Y in S219), candidate determination unit 1061 determines one or more planned action candidates based on the detection information and statistical information accumulated in statistical information accumulation unit 1070. In this case, when extracting an action same as the planned action indicated by the action information from the statistical information, candidate determination unit 1061 excludes this action from the planned action candidates. Specifically, candidate determination unit 1061 determines a planned action candidate different from the planned action (S220).

Image generator 1060 determines whether or not the planned action candidate determined in S220 coincides with the planned action candidate stored in advance in storage unit 1042. When the planned action candidate determined in S220 does not coincide with the planned action candidate stored in advance in storage unit 1042, that is, when the planned action candidate is updated (Y in S221), image generator 1060 generates a planned action candidate image representing the planned action candidate (S222). Image generator 1060 further identifies the remaining time to the execution associated with the planned action candidate in advance in the statistical information, and further generates a remaining time image representing the remaining time in S222.

Image output unit 1051 outputs the planned action candidate image and the remaining time image to notification device 1002 and causes notification device 1002 to display the autonomous driving information screen (S223). Image generator 1060 stores, in storage unit 1042, the information indicating the planned action candidate based on which the image has been generated (S224), and starts the measurement of the elapsed time from the output (from the start of the display) of the planned action candidate image (S225). When a predetermined ending condition is satisfied (Y in S229), the flow in FIG. 60 is ended, and when the ending condition is not satisfied (N in S229), the process returns to S210.

When there is no input of the detection information (N in S219) or when the planned action candidate is not updated (N in S221), image generator 1060 determines whether or not a predetermined time has elapsed from the start of the measurement of the elapsed time. The predetermined time is a unit time in which the remaining time image needs to be updated, and may be a time allotted to one time indicator 1109, for example. When detecting that the predetermined time has elapsed from the start of the measurement of the elapsed time (Y in S226), image generator 1060 updates the remaining time image (S227). Image output unit 1051 outputs the updated remaining time image to notification device 1002 and causes notification device 1002 to display this image (S228). According to this process, one time indicator 1109 in FIG. 59 is changed to an off state from an on state, for example. If the predetermined time has not elapsed from the start of the measurement of the elapsed time (N in S226), steps S227 and S228 are skipped.

The process of driving assistance device 1040 (image generator 1060, determination unit 1062, instruction unit 1063, and the like) pertaining to the selection of a planned action or planned action candidate by the driver is the same as that in the seventh exemplary embodiment. For example, the process illustrated in the flowchart in FIG. 54 and the user interface indicated in autonomous driving information screen 1103 in FIGS. 55A, 55B, 56A, and 56B are directly applied to the ninth exemplary embodiment. However, an object to be selected by the driver includes a planned action determined by autonomous driving control device 1030 as well as a planned action candidate determined by driving assistance device 1040.

As described above, driving assistance device 1040 according to the ninth exemplary embodiment notifies the occupant (driver or the like) in the vehicle of a planned action in autonomous driving, and proposes a planned action candidate which can be executed in place of the planned action. With the configuration described above in which options of actions of a vehicle at a future point are presented to the driver, autonomous driving on which the driver's intention is further reflected and which suits the taste or the like of the driver can be implemented. In addition, a sense of anxiety of the driver involved with autonomous driving can be suppressed. Further, as in the seventh exemplary embodiment, an action which cannot currently be executed can be reserved to be executed in the future, whereby it is easier to implement autonomous driving which suits the taste or the like of the driver.

The modification previously described in the seventh exemplary embodiment can also be applied to the ninth exemplary embodiment, and the similar effect can be provided. For example, the statistical information accumulated in statistical information accumulation unit 1070 may be information (driver model) on which a taste or a driving pattern of an occupant (typically, a driver) of the vehicle is reflected. Candidate determination unit 1061 may determine a plurality of planned action candidates which is associated with environmental parameter values of which difference from the currently detected environmental parameter values falls within a predetermined range, by referring to statistical information accumulation unit 1070. Besides, candidate determination unit 1061 may determine the priority order of each of the plurality of planned action candidates. Image generator 1060 may generate a plurality of planned action candidate images corresponding to the plurality of planned action candidates determined by candidate determination unit 1061, that is, image generator 1060 may generate images representing the contents of the respective candidates. Image output unit 1051 may output the planned action image and the plurality of planned action candidate images to notification device 1002 such that the planned action image and the plurality of planned action candidate images are displayed within the fixed field of view of the driver of vehicle 1000. In addition, image output unit 1051 may cause notification device 1002 to display the plurality of planned action candidate images in a manner according to the priority order of each candidate.

Another example, which is not illustrated, for presenting a planned action (which can also be referred to as a travel control plan in the future) and a planned action candidate (which can also be referred to as a situation-adapted recommendation in the future) will be described. This example shows that, based on the situation where vehicles having a speed higher than the speed of the host vehicle are approaching in succession from behind in the right lane while the host vehicle is traveling in the leftmost lane which approaches a merging lane, autonomous driving control device 1030 determines to execute, next after the current driving action, an action of "keep traveling in the current lane" which is a planned action, and driving assistance device 1040 presents that "keep traveling in the current lane" is planned to be executed. In this case, driving assistance device 1040 may determine that, "if a merging vehicle appears before vehicle 1000 approaches the merging lane, a disadvantage is increased due to the need of an unexpected operation". Then, driving assistance device 1040 may recommend and present, as an option of an action which can be reserved, "lane change from the leftmost lane to the right lane" as a planned action candidate that the vehicle can be instructed to execute in travel control with precise timing before "keep traveling in the current lane" which is planned to be executed by vehicle 1000.

Tenth Exemplary Embodiment

The tenth exemplary embodiment will be firstly summarized. When a driver selects an action (hereinafter referred to as a "current action") which he/she causes a vehicle to immediately execute during autonomous driving of the vehicle, information supporting the selection of the action is not sufficiently presented to the driver, and thus, it may be difficult for the driver to smoothly select the action. In addition, the driver may have a sense of anxiety.

In view of this, in the tenth exemplary embodiment, information adapted to an individual driver is provided as information for supporting the selection of a current action of the vehicle. Specifically, driving assistance device 1040 determines a current action candidate from both a viewpoint based on the surrounding situation or the travel state of vehicle 1000 and a viewpoint based on the individual driver, and causes notification device 1002 in vehicle 1000 to display the determined candidate. Thus, smooth action selection suitable for the driver's intention is supported, and a support is provided such that the driver can issue an instruction for selecting an action or changing an action without anxiety.

Hereinafter, the details which have already been described in the previous exemplary embodiments will be omitted as appropriate. The configurations or operations described in the present exemplary embodiment can be combined with or replaced with configurations or operations described in other exemplary embodiments or modifications without departing from the spirit of the present invention.

Figure 61:
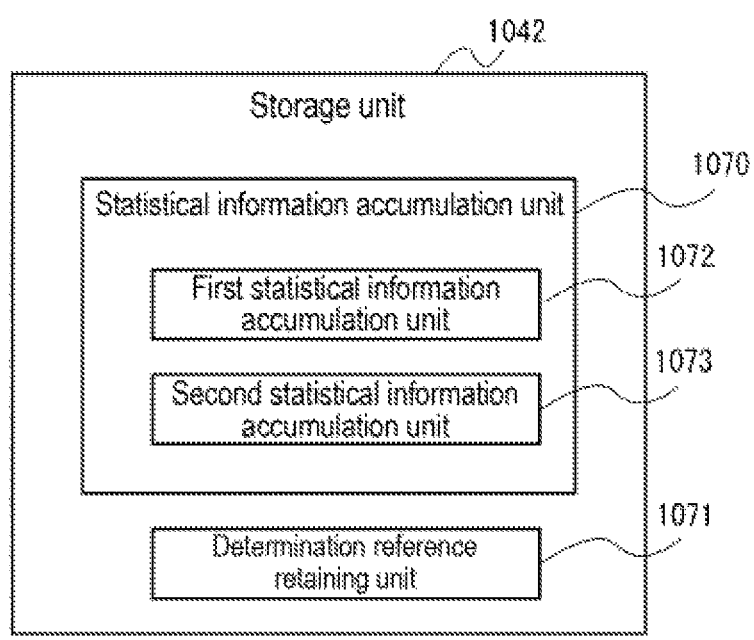
FIG. 61 is a block diagram illustrating a detailed configuration of a storage unit in a driving assistance device according to the tenth exemplary embodiment of the present invention.

FIG. 61 is a block diagram illustrating the detailed configuration of storage unit 1042 in driving assistance device 1040. Determination reference retaining unit 1071 retains a determination reference similar to those in the other exemplary embodiments. Statistical information accumulation unit 1070 includes first statistical information accumulation unit 1072 accumulating first statistical information and second statistical information accumulation unit 1073 accumulating second statistical information.

The first statistical information and the second statistical information both show the relevance between the surrounding situation and the travel state of the vehicle and an action of the vehicle, as in the previous exemplary embodiments. Specifically, similar to the statistical information (FIG. 43) in the sixth exemplary embodiment, the first statistical information and the second statistical information include a plurality of records obtained by associating values of a plurality of kinds of environmental parameters indicating the surrounding situation and the travel state of the vehicle with an action that the vehicle is caused to immediately execute (or an action performance that the vehicle has been caused to immediately execute).

It should be noted that the first statistical information and the second statistical information have different statistical ranges. Specifically, the first statistical information has a wider statistical range than that of the second statistical information. The first statistical information is formed by recording operation performances and action performances of a group of persons and a large number of vehicles under various environmental situations. Naturally, the first statistical information may be formed by modeling, as an operation pattern and an action pattern, histories of operation performances and action performances under various environmental situations by a known statistical method. The second statistical information is formed by recording operation performances or action performances of an individual driver and individual vehicle 1000 under previous environmental situations. The second statistical information may be formed by modeling, as an operation pattern and an action pattern, histories of operation performances of an individual driver and action performances of individual vehicle 1000 by a known statistical method.

For example, the first statistical information may be formed by sequentially recording operation histories of a large group of people, in other words, action histories of a plurality of vehicles, together with environmental parameter values. Also, the first statistical information may be formed by recording average combinations of environmental parameter values and actions in a large group of people. The first statistical information can be referred to as information indicating a typical operation pattern, that is, a typical action pattern of a vehicle, according to various surrounding environments or travel states. In addition, the first statistical information has high completeness of environmental parameter values and actions, because it is based on operation histories in a large group of people and action histories of a large number of vehicles.

On the other hand, the second statistical information may be formed by accumulating operation histories of an individual driver, that is, action histories of individual vehicle 1000. Also, the second statistical information may be formed by sequentially recording combinations of environmental parameter values and actions based on the operation of the individual driver. The second statistical information can be referred to as statistical information on which the taste or the operation pattern of the individual driver is more strongly reflected than the first statistical information. In addition, the second statistical information has low completeness of environmental parameter values and actions, because it is formed by accumulating operation histories of the individual driver and action histories of individual vehicle 1000.

In the tenth exemplary embodiment, the first statistical information and the second statistical information are both locally stored in vehicle 1000. However, at least one of the first statistical information and the second statistical information may be accumulated in a device outside of the vehicle, e.g., on a database on a cloud. For example, the second statistical information may be sequentially accumulated locally in vehicle 1000, because the statistical range thereof covers an individual driver or individual vehicle 1000. On the other hand, the first statistical information may be subjected to an aggregation process, statistical process, accumulation process, and the like on a server on a cloud, because the statistical range thereof covers a large group of people or a large number of vehicles. Driving assistance device 1040 may access remote statistical information through communication IF 1056 and wireless device 1008.

Action information input unit 1054 in driving assistance device 1040 acquires, from autonomous driving control device 1030, action information indicating a current action that autonomous driving control device 1030 causes vehicle 1000 to execute. Detection information input unit 1052 in driving assistance device 1040 acquires, from detector 1020, detection information indicating the detection result of the surrounding situation and the travel state of vehicle 1000.

Figure 62:
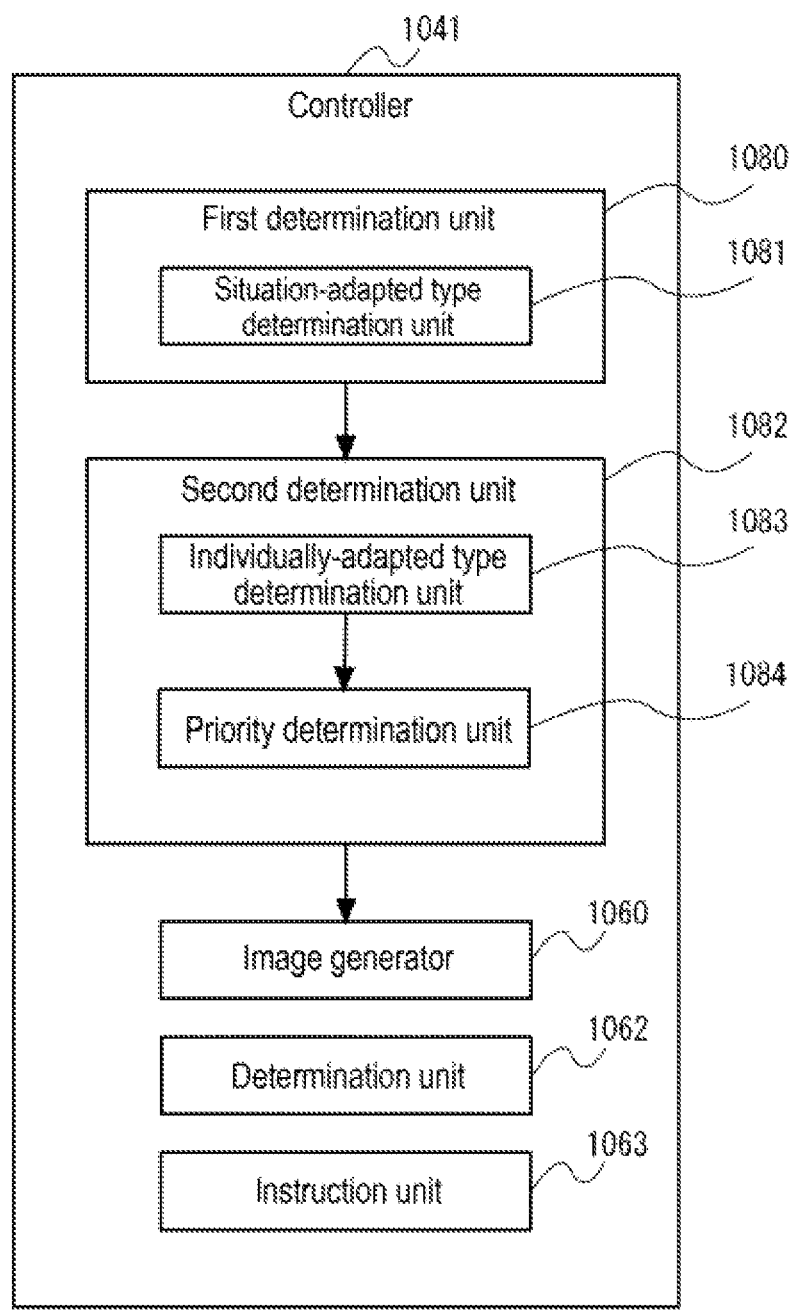
FIG. 62 is a block diagram illustrating a detailed configuration of a controller in the driving assistance device according to the tenth exemplary embodiment.

FIG. 62 is a block diagram illustrating the detailed configuration of controller 1041 in driving assistance device 1040. Controller 1041 includes first determination unit 1080, second determination unit 1082, image generator 1060, determination unit 1062, and instruction unit 1063.

First determination unit 1080 determines one or more first actions that vehicle 1000 can be caused to execute based on the detection information output from detector 1020 and the first statistical information accumulated in first statistical information accumulation unit 1072. First determination unit 1080 includes situation-adapted type determination unit 1081.

Situation-adapted type determination unit 1081 corresponds to candidate determination unit 1061 in the sixth exemplary embodiment. Situation-adapted type determination unit 1081 determines, as first actions, one or more action candidates (hereinafter referred to as "situation-adapted current action candidates") that vehicle 1000 can be caused to execute in place of the current action indicated by the action information. Specifically, as in the sixth exemplary embodiment, situation-adapted type determination unit 1081 determines, as a situation-adapted current action candidate (corresponding to the current action candidate in the sixth exemplary embodiment), an action associated with the environmental parameter values close to the detection information from among actions prescribed in the first statistical information. The situation-adapted current action candidate can be referred to as a typical operation pattern or a typical action pattern which is immediately executed under the current surrounding situation or travel state.

Notably, if the situation-adapted current action candidates extracted from the first statistical information include a candidate same as the current action indicated by the action information, situation-adapted type determination unit 1081 excludes this candidate from the candidates to be presented to the driver. In other words, situation-adapted type determination unit 1081 determines, as candidates to be presented to the driver, a candidate different from the current action indicated by the action information from among the situation-adapted current action candidates extracted from the first statistical information. Thus, presentation of a candidate same as the current action to the driver is prevented.

As in the sixth exemplary embodiment, determination unit 1062 determines whether or not each of the situation-adapted current action candidates determined by situation-adapted type determination unit 1081 can be immediately executed by the vehicle by referring to the detection information output from detector 1020 and the determination reference retained in determination reference retaining unit 1071. Situation-adapted type determination unit 1081 determines, as candidates to be presented to the driver, a candidate which is determined to be immediately executable by determination unit 1062 from among the one or more situation-adapted current action candidates extracted from the first statistical information.

Second determination unit 1082 determines one or more second actions that vehicle 1000 can be caused to execute based on the detection information output from detector 1020 and the second statistical information accumulated in second statistical information accumulation unit 1073. In the tenth exemplary embodiment, second determination unit 1082 determines, as a second action, information indicating the priority of each of the one or more situation-adapted current action candidates, which priority is according to the relevance between the second statistical information and the detection information. In other words, one or more second actions determined by second determination unit 1082 indicate the priorities of the respective one or more first actions.

Second determination unit 1082 includes individually-adapted type determination unit 1083 and priority determination unit 1084. Individually-adapted type determination unit 1083 corresponds to candidate determination unit 1061 in the sixth exemplary embodiment. Individually-adapted type determination unit 1083 determines one or more actions (hereinafter referred to as "individually-adapted current action candidates") that vehicle 1000 can be caused to execute in place of the current action indicated by the action information. Specifically, as in the sixth exemplary embodiment, individually-adapted type determination unit 1083 determines, as an individually-adapted current action candidate (corresponding to the current action candidate in the sixth exemplary embodiment), an action associated with the environmental parameter values close to the detection information from among actions prescribed in the second statistical information. The individually-adapted current action candidate can be referred to as an operation pattern of an individual driver or an action pattern of individual vehicle 1000 under the current surrounding situation or travel state.

Notably, if the individually-adapted current action candidates extracted from the second statistical information include a candidate same as the current action indicated by the action information, individually-adapted type determination unit 1083 excludes this candidate from the candidates to which ranking described later is to be performed. In other words, individually-adapted type determination unit 1083 determines a candidate different from the current action indicated by the action information from among the individually-adapted current action candidates extracted from the second statistical information, as the candidates to which the ranking is to be performed.

As in the case of the situation-adapted current action candidate, determination unit 1062 may determine whether or not each of the individually-adapted current action candidates determined by individually-adapted type determination unit 1083 can immediately be executed by referring to the detection information and the determination reference. Individually-adapted type determination unit 1083 may narrow down one or more individually-adapted current action candidates extracted from the second statistical information such that the candidate determined to be immediately executable is determined to be subjected to the ranking, and may exclude a candidate which cannot be immediately executed from the individually-adapted current action candidates.

Individually-adapted type determination unit 1083 performs ranking of one or more individually-adapted current action candidates. Individually-adapted type determination unit 1083 may set such that a higher priority is placed on an individually-adapted current action candidate associated with environmental parameter values close to the environmental parameter values indicated by the latest detection information. For example, individually-adapted type determination unit 1083 may extract, as an individually-adapted current action candidate, an action associated with environmental parameter values present within a predetermined range from the position (current environmental position) of the environmental parameter values indicated by the latest detection information in an n-order vector space corresponding to n environmental parameters. Then, for the extracted candidates, individually-adapted type determination unit 1083 may set such that a higher priority is placed on the candidate whose position in the vector space is closer to the current environmental position.

Priority determination unit 1084 determines priorities of one or more situation-adapted current action candidates determined to be presented to the driver by situation-adapted type determination unit 1081 based on the orders of one or more individually-adapted current action candidates determined by individually-adapted type determination unit 1083. For example, priority determination unit 1084 applies, to the situation-adapted current action candidate representing the same action as the individually-adapted current action candidate, the order of the individually-adapted current action candidate as a temporal order. Then, priority determination unit 1084 sets such that, according to the temporal order applied to each of the one or more situation-adapted current action candidates, a candidate having a higher temporal order is given a higher priority on the display on the screen, in other words, a higher priority in presentation and recommendation to the driver. Notably, a situation-adapted current action candidate having no individually-adapted current action candidate representing the same action, that is, a situation-adapted current action candidate to which a temporal order cannot be applied, is the lowest rank.

Image generator 1060 generates a first image representing one or more first actions and a second image representing one or more second actions. Specifically, image generator 1060 generates, as first images, current action candidate images respectively representing one or more situation-adapted current action candidates. Image generator 1060 also generates, as second images, priority images representing priority orders set to the respective one or more situation-adapted current action candidates by priority determination unit 1084. Image generator 1060 may generate priority images representing priority orders applied to the respective one or more situation-adapted current action candidates using a histogram or numeric characters. The histogram may be an image of a graphic object in which a display size corresponding to the degree of priority is set.

Image output unit 1051 outputs the current action candidate images and the priority images to notification device 1002 such that the current action candidate images and the priority images are displayed within the fixed field of view of the driver of the vehicle. Notification device 1002 displays an autonomous driving information screen including the current action candidate images and the priority images.

FIGS. 63A and 63B illustrate one example of the autonomous driving information screen. In autonomous driving information screen 1103 in FIG. 63A, the priority order of each of the situation-adapted current action candidates is displayed in numbers. In FIG. 63A, an outer circle is set as action candidate display region 1128, and four current action candidate images 1110 representing four situation-adapted current action candidates are displayed therein. Also, an inner circle is set as priority display region 1130 in FIG. 63A, and four priority images 1132 representing the priority orders of four situation-adapted current action candidates are displayed therein. In FIG. 63A, priority image 1132 representing the highest priority order "1" is applied to current action candidate image 1110 representing a lane change to the right, which shows that the lane change to the right is the most recommended current action to the individual driver.

In autonomous driving information screen 1103 in FIG. 63B, the degree of priority of each of the situation-adapted current action candidates is displayed in histogram. In FIG. 63B, four current action candidate images 1110 representing four situation-adapted current action candidates are displayed on a peripheral part of a circle. In addition, in FIG. 63B, four priority images 1132 representing the priority orders of four situation-adapted current action candidates are displayed in such a way that priority image 1132 with a larger size is applied to the situation-adapted current action candidate having a higher priority. In FIG. 63B, priority image 1132 with the largest size representing the highest priority is applied to current action candidate image 1110 representing a lane change to the right, which shows that the lane change to the right is the most recommended current action to the individual driver.

While autonomous driving information screen 1103 in FIG. 63A or 63B is displayed, the driver may instruct the vehicle to execute the current action candidate represented by current action candidate image 1110 by pressing a cross button mounted to input device 1004. For example, the driver may instruct the vehicle to execute deceleration represented by current action candidate image 1110 by selecting a down button of the cross button while current action candidate image 1110 representing a down-pointing triangle is displayed. The process of instruction unit 1063 in driving assistance device 1040 is the same as that in the sixth exemplary embodiment.

Figure 64:
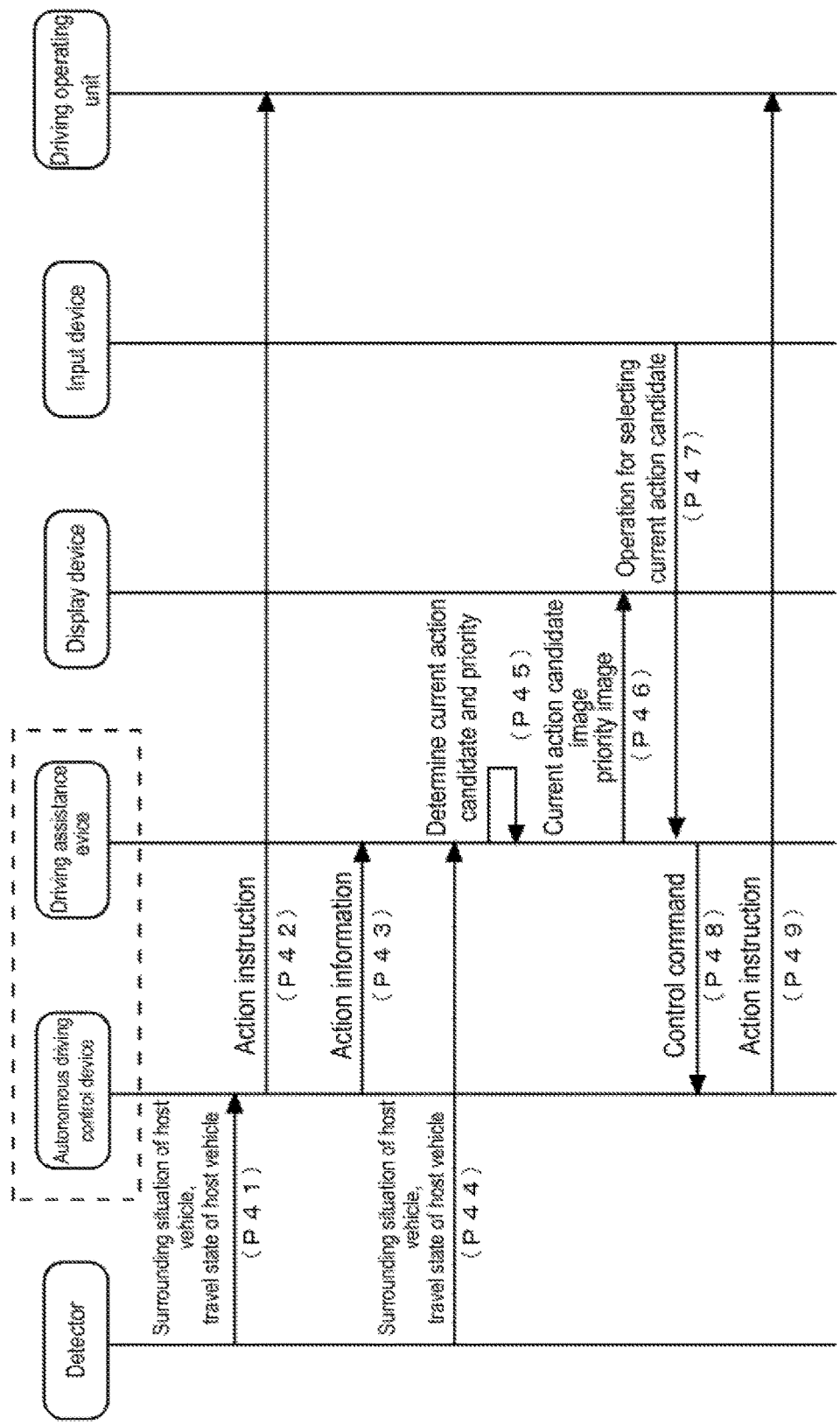
FIG. 64 is a sequence diagram illustrating an example of a process pertaining to HMI control of a vehicle according to the tenth exemplary embodiment of the present invention.

FIG. 64 is a sequence diagram illustrating an example of a process pertaining to HMI control of vehicle 1000. P41 to P44 in FIG. 64 are the same as P21 to P23 and P25 in the sequence diagram in FIG. 46 described in the sixth exemplary embodiment. Although not illustrated in FIG. 64, driving assistance device 1040 may cause notification device 1002 to further display a current action image based on the action information acquired from autonomous driving control device 1030 as indicated in P24 in FIG. 46.

Driving assistance device 1040 determines one or more situation-adapted current action candidates according to the relevance between the detection information and the first statistical information, and determines priority of each of the situation-adapted current action candidates according to the relevance between the detection information and the second statistical information (P45). Driving assistance device 1040 generates current action candidate images representing the one or more situation-adapted current action candidates and priority images representing the priorities of the respective candidates, outputs these images to notification device 1002, and causes notification device 1002 to display these images (P46). The processes in subsequent P47 to P49 are the same as the processes in P28 to P30 in the sequence diagram in FIG. 46 described in the sixth exemplary embodiment.

Figure 65:
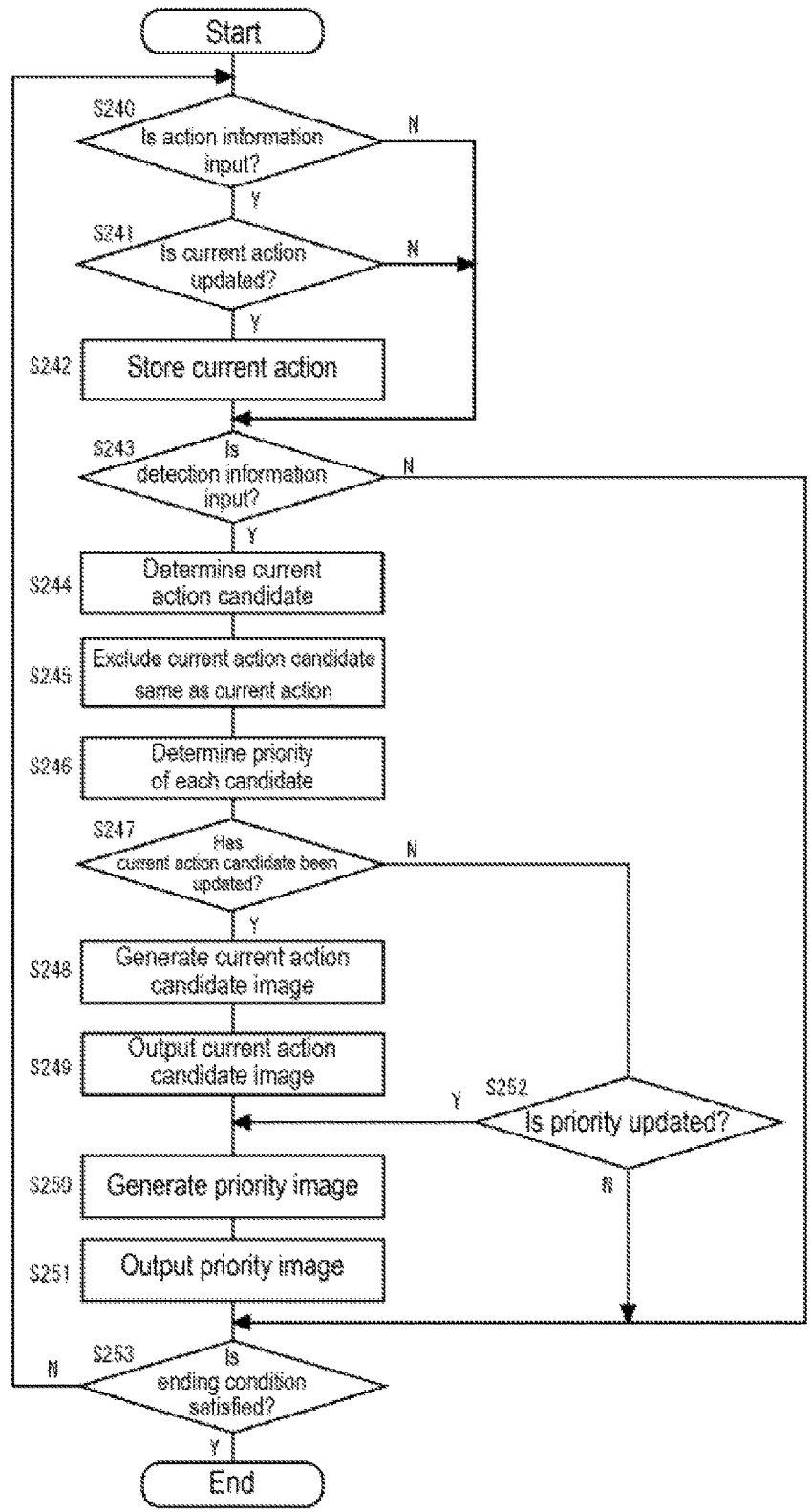
FIG. 65 is a flowchart illustrating an example of a process of a driving assistance device according to the tenth exemplary embodiment.

FIG. 65 is a flowchart illustrating an example of the process of driving assistance device 1040. When action information input unit 1054 acquires the action information output from autonomous driving control device 1030 (Y in S240), controller 1041 determines whether or not the current action indicated by the action information and the current action stored in advance in storage unit 1042 coincide with each other. When they do not coincide with each other, that is, when the current action is updated (Y in S241), controller

1041 causes storage unit 1042 to store the current action indicated by the action information (S242). If the action information has not yet been acquired (N in S240), steps S241 and S242 are skipped. If the current action has not been updated (N in S241), S242 is skipped.

When detection information input unit 1052 acquires the detection information output from detector 1020 (Y in S243), situation-adapted type determination unit 1081 determines one or more situation-adapted current action candidates based on the detection information and the first statistical information (S244). Situation-adapted type determination unit 1081 excludes a candidate same as the current action stored in storage unit 1042 from the temporarily determined one or more situation-adapted current action candidates (S245). Individually-adapted type determination unit 1083 determines one or more individually-adapted current action candidates based on the detection information and the second statistical information, and determines the order of each candidate. Notably, Individually-adapted type determination unit 1083 may also exclude a candidate same as the current action stored in storage unit 1042 from the temporarily determined one or more individually-adapted current action candidates. Priority determination unit 1084 determines priorities of the one or more situation-adapted current action candidates on the screen display based on the orders of the one or more individually-adapted current action candidates (S246). Priority determination unit 1084 stores information indicating the situation-adapted current action candidates and priorities in storage unit 1042.

When the situation-adapted current action candidate is updated (Y in S247), image generator 1060 generates a current action candidate image representing the updated situation-adapted current action candidate (S248). Image output unit 1051 outputs the current action candidate image to notification device 1002 and causes notification device 1002 to display this image (S249). Image generator 1060 generates priority images representing the priorities of the respective one or more situation-adapted current action candidates (S250), and image output unit 1051 outputs the priority images to notification device 1002 and causes notification device 1002 to display the images (S251). When the priority is updated (Y in S252) without the situation-adapted current action candidate being updated (N in S247), the process proceeds to S250, and when the priority as well as the situation-adapted current action candidate is not updated (N in S252), the process proceeds to S253.

When a predetermined ending condition is satisfied (Y in S253), the flow in FIG. 65 is ended, and when the ending condition is not satisfied (N in S253), the process returns to S240. If the detection information has not yet been input (N in S243), steps S244 to S251 are skipped. As described above, driving assistance device 1040 according to the tenth exemplary embodiment determines situation-adapted current action candidates and determines a priority in presenting these candidates according to a taste of the driver, every time detection information is input. When at least one of the situation-adapted current action candidate and the priority is updated, the display content of autonomous driving information screen 1103 is also updated.

The process of driving assistance device 1040 pertaining to the selection of the current action candidate by the driver is the same as that in the sixth exemplary embodiment, and the process flow is the same as the process flow in FIG. 48. A length of a waiting time for receiving the selection of a current action candidate may be a predetermined fixed value. When the action selection has not been input until the waiting time has elapsed from the start of the display of current action candidate images 1110, instruction unit 1063 in driving assistance device 1040 may transmit, to autonomous driving control device 1030 from command output unit 1055, a control command to instruct the vehicle to immediately execute the current action candidate (situation-adapted current action candidate) with the highest priority.

As described above, driving assistance device 1040 according to the tenth exemplary embodiment presents, to the driver, autonomous driving information screen 1103 in which a priority adapted to the individual driver or individual vehicle 1000 is applied to each of one or more situation-adapted current action candidates. Accordingly, information useful for assisting the selection of a current action of the vehicle can be presented to the driver. In the tenth exemplary embodiment, a current action candidate to be displayed in autonomous driving information screen 1103 is extracted from the first statistical information in which various environmental parameter values and various actions are exhaustively recorded, whereby a current action candidate more adapted to ever-changing environmental parameter values of the vehicle are easy to be presented. In addition, a priority order of each candidate is determined based on the second statistical information on which the taste of the driver is strongly reflected, whereby a priority according to the taste or operation pattern of the individual driver can be presented.

A modification will be described. In the tenth exemplary embodiment, the situation-adapted current action candidate determined by situation-adapted type determination unit 1081 and the priority determined by priority determination unit 1084 are displayed in autonomous driving information screen 1103. As a modification, the situation-adapted current action candidate determined by situation-adapted type determination unit 1081 and the individually-adapted current action candidate determined by individually-adapted type determination unit 1083 are both displayed in autonomous driving information screen 1103 in parallel.

It is desirable that situation-adapted type determination unit 1081 in the present modification determines a situation-adapted current action candidate different from the current action indicated by the action information acquired from autonomous driving control device 1030. Similarly, individually-adapted type determination unit 1083 desirably determines an individually-adapted current action candidate different from the current action indicated by the action information. Thus, the presentation of a candidate same as the current action of the vehicle to the driver can be prevented.

It is desirable that, in autonomous driving information screen 1103 in the present modification, the display manner of the situation-adapted current action candidate and the display manner of the individually-adapted current action candidate are different from each other. For example, a display position, pattern, color, size, or the like may be different between the situation-adapted current action candidate and the individually-adapted current action candidate such that the driver can easily distinguish the situation-adapted current action candidate from the individually-adapted current action candidate. Image generator 1060 may generate the image of the individually-adapted current action candidate in a manner different from the manner of the image of the situation-adapted current action candidate. When transmitting the image of the situation-adapted current action candidate and the image of the individually-adapted current action candidate to notification device 1002, image output unit 1051 may further transmit display control data for instructing notification device 1002 to display the images of both candidates in different manners.

In addition, situation-adapted type determination unit 1081 in the present modification may determine the priority orders of one or more situation-adapted current action candidates based on the relevance between the detection information and the first statistical information. Individually-adapted type determination unit 1083 may also determine the priority orders of one or more individually-adapted current action candidates based on the relevance between the detection information and the second statistical information as in the tenth exemplary embodiment. Image generator 1060 and image output unit 1051 may display, on autonomous driving information screen 1103, images representing one or more situation-adapted current action candidates, images representing the priority orders of the one or more situation-adapted current action candidates, images representing one or more individually-adapted current action candidates, and images representing the priority orders of the one or more individually-adapted current action candidates. In addition, one or more situation-adapted current action candidates and one or more individually-adapted current action candidates may be displayed as being arranged in a manner by which both candidates are easily compared to each other for each priority order.

Another example, which is not illustrated, for presenting a situation-adapted current action candidate (which can also be referred to as a situation-adapted recommendation for the present moment) and an individually-adapted current action candidate (which can also be referred to as an individually-adapted recommendation for the present moment) will be described. This example shows that, based on the situation where vehicles having a speed higher than the speed of the host vehicle are approaching in succession from behind in the right lane while the host vehicle is traveling in the leftmost lane which approaches a merging lane, autonomous driving control device 1030 determines to execute the current action of "keep traveling in the current lane (optional)", and driving assistance device 1040 presents that "keep traveling in the current lane (optional)" is being executed (for example, see the fifth and sixth exemplary embodiments).

In this case, driving assistance device 1040 may determine that, "if a merging vehicle appears before vehicle 1000 approaches the merging lane, a disadvantage is increased due to the need of an unexpected operation". Then, driving assistance device 1040 may recommend and present, as an option that vehicle 1000 can be immediately instructed to execute, "deceleration" as a situation-adapted current action candidate that vehicle 1000 can be instructed to execute in travel control in place of "keep traveling in the current lane" which is being executed by vehicle 1000.

Further, driving assistance device 1040 may determine "acceleration" as the individually-adapted current action candidate that vehicle 1000 can be instructed to execute in travel control in place of "keep traveling in the current lane" which is being executed by vehicle 1000, "based on a tendency of a driving action the driver selects when there is a vehicle approaching from behind in the left lane at a certain speed before the merging lane". Then, driving assistance device 1040 may recommend and present the individually-adapted current action candidate of "acceleration" as an option that vehicle 1000 can be immediately instructed to execute. As described above, driving assistance device 1040 may simultaneously present, to the driver, the situation-adapted current action candidate and the individually-adapted current action candidate which are determined at timings close to each other.

Eleventh Exemplary Embodiment

The eleventh exemplary embodiment will be firstly summarized. When, during autonomous driving of a vehicle, a driver selects an action that he/she causes the vehicle to execute at a future point, in other words, an action that the vehicle is planned to execute after a predetermined time (hereinafter referred to as a "planned action"), information supporting the selection of the action is not sufficiently presented to the driver, and thus, it may be difficult for the driver to smoothly select the action. In addition, the driver may have a sense of anxiety.

In view of this, in the eleventh exemplary embodiment, information adapted to an individual driver is provided as information for supporting the selection of a planned action of the vehicle. Specifically, driving assistance device 1040 determines a planned action candidate from both a viewpoint based on the surrounding situation or the travel state of vehicle 1000 and a viewpoint based on the individual driver, and causes notification device 1002 in vehicle 1000 to display the determined candidate. Thus, smooth action selection suitable for the driver's intention is supported, and a support is provided such that the driver can issue an instruction for selecting an action or changing an action without anxiety. In the eleventh exemplary embodiment, a planned action candidate of the vehicle is presented to the driver, which is different from the tenth exemplary embodiment in which a current action candidate of the vehicle is presented to the driver. The details which have already been described in the previous exemplary embodiments will be omitted below as appropriate. The configurations or operations described in the present exemplary embodiment can be combined with or replaced with configurations or operations described in other exemplary embodiments or modifications without departing from the spirit of the present invention.

Storage unit 1042 in driving assistance device 1040 has the configuration illustrated in FIG. 61 described in the tenth exemplary embodiment, and controller 1041 in driving assistance device 1040 has the configuration illustrated in FIG. 62 described in the tenth exemplary embodiment.

The first statistical information accumulated in first statistical information accumulation unit 1072 and the second statistical information accumulated in second statistical information accumulation unit 1073 are both the statistical information (FIG. 43) indicating the relevance between the surrounding situation and the travel state of the vehicle and the action of the vehicle. Specifically, as in the seventh exemplary embodiment, the first statistical information and the second statistical information include a plurality of records obtained by associating a plurality of kinds of environmental parameter values indicating the surrounding situation and the travel state of the vehicle with an action (or an action performance) to be executed by the vehicle in a future point. In other words, the statistical information has accumulated therein an action executed at a future point (after a predetermined time) relative to the current environmental state in association with the parameter values indicating the current environmental state. As described above, the eleventh exemplary embodiment is different from the tenth exemplary embodiment in that the action prescribed in the first statistical information and the second statistical information is a planned action.

It should be noted that, as in the tenth exemplary embodiment, the first statistical information and the second statistical information have different statistical ranges. Specifically, the first statistical information has a wider statistical range than that of the second statistical information. The first statistical information is formed by recording operation performances and action performances of a group of persons and a large number of vehicles under various environmental situations. Naturally, the first statistical information may be formed by modeling, as an operation pattern and an action pattern, histories of operation performances and action performances under various environmental situations by a known statistical method. The second statistical information is formed by recording operation performances or action performances of an individual driver and individual vehicle 1000 under previous environmental situations. The second statistical information may be formed by modeling, as an operation pattern and an action pattern, histories of operation performances of an individual driver and action performances of individual vehicle 1000 by a known statistical method.

In the eleventh exemplary embodiment, the first statistical information and the second statistical information are both locally stored in vehicle 1000. However, at least one of the first statistical information and the second statistical information may be accumulated in a device outside of the vehicle, e.g., on a database on a cloud. For example, the second statistical information may be sequentially accumulated locally in vehicle 1000, because the statistical range thereof covers an individual driver or individual vehicle 1000. On the other hand, the first statistical information may be subjected to an aggregation process, statistical process, accumulation process, and the like on a server on a cloud, because the statistical range thereof covers a large group of people or a large number of vehicles. Driving assistance device 1040 may access remote statistical information through communication IF 1056 and wireless device 1008.

Detection information input unit 1052 in driving assistance device 1040 acquires, from detector 1020, detection information indicating the detection result of the surrounding situation and the travel state of vehicle 1000. First determination unit 1080 determines one or more first actions which can be planned actions to be executed by vehicle 1000, based on the detection information output from detector 1020 and the first statistical information accumulated in first statistical information accumulation unit 1072.

Situation-adapted type determination unit 1081 in first determination unit 1080 determines, as first actions, one or more action candidates (hereinafter referred to as "situation-adapted planned action candidates") which can be planned actions to be executed by vehicle 1000. Specifically, as in the seventh exemplary embodiment, situation-adapted type determination unit 1081 determines, as a situation-adapted planned action candidate (corresponding to the planned action candidate in the seventh exemplary embodiment), an action associated with the environmental parameter values close to the detection information from among actions prescribed in the first statistical information. The situation-adapted planned action candidate can be referred to as a typical operation pattern or a typical action pattern which is to be executed at a future point in response to the current surrounding situation or travel state.

Second determination unit 1082 determines one or more second actions which can be planned actions to be executed by vehicle 1000, based on the detection information output from detector 1020 and the second statistical information accumulated in second statistical information accumulation unit 1073. In the eleventh exemplary embodiment, second determination unit 1082 determines, as a second action, information indicating the priority of each of the one or more situation-adapted planned action candidates, which priority is according to the relevance between the second statistical information and the detection information. In other words, one or more second actions determined by second determination unit 1082 indicate the priorities of the respective one or more first actions.

Individually-adapted type determination unit 1083 in second determination unit 1082 determines one or more action candidates (hereinafter referred to as "individually-adapted planned action candidates") which can be planned actions to be executed by vehicle 1000. Specifically, as in the seventh exemplary embodiment, individually-adapted type determination unit 1083 determines, as an individually-adapted planned action candidate (corresponding to the planned action candidate in the seventh exemplary embodiment), an action associated with the environmental parameter values close to the detection information from among actions prescribed in the second statistical information. The individually-adapted planned action candidate can be referred to as a future operation pattern of an individual driver or a future action pattern of individual vehicle 1000 in response to the current surrounding situation or travel state.

As in the tenth exemplary embodiment, individually-adapted type determination unit 1083 performs ranking of one or more individually-adapted planned action candidates extracted from the second statistical information. As in the tenth exemplary embodiment, priority determination unit 1084 determines priority orders of one or more situation-adapted planned action candidates determined by situation-adapted type determination unit 1081 based on the orders of one or more individually-adapted planned action candidates determined by individually-adapted type determination unit 1083.

Image generator 1060 generates a first image representing one or more first actions and a second image representing one or more second actions. Specifically, image generator 1060 generates, as first images, planned action candidate images respectively representing one or more situation-adapted planned action candidates. Image generator 1060 also generates, as second images, priority images representing priority orders set to the respective one or more situation-adapted planned action candidates by priority determination unit 1084. Image generator 1060 may generate priority images representing the degrees of priority applied to the respective one or more situation-adapted planned action candidates using a histogram or numeric characters. The histogram may be an image of a graphic object in which a display size corresponding to the degree of priority is set.

Image output unit 1051 outputs the planned action candidate images and the priority images to notification device 1002 such that the planned action candidate images and the priority images are displayed within the fixed field of view of the driver of the vehicle. Notification device 1002 displays an autonomous driving information screen including the planned action candidate images and the priority images.

Figure 66:
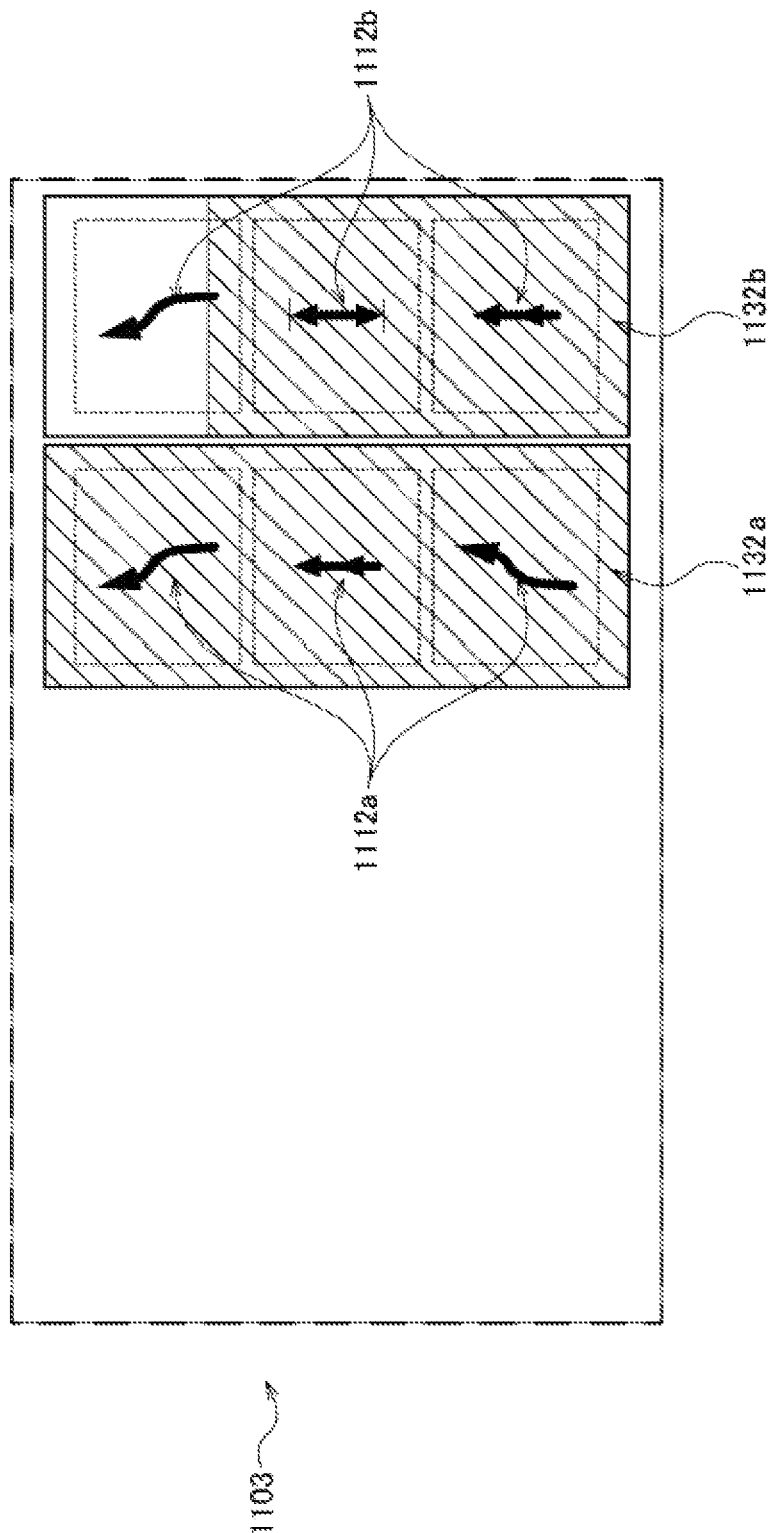
FIG. 66 is a view illustrating one example of an autonomous driving information screen according to the eleventh exemplary embodiment of the present invention.

FIG. 66 illustrates one example of the autonomous driving information screen. In autonomous driving information screen 1103 in FIG. 66, first planned action candidate images 1112a and second planned action candidate images 1112b are displayed as the planned action candidate images. The planned action candidates (situation-adapted planned action candidates) in FIG. 66 are both an action plan created by combining a plurality of individual actions. However, if an individual action is determined as the situation-adapted planned action candidates, a planned action candidate image representing this individual action is displayed.

In addition, in FIG. 66, the priority of each planned action candidate is represented using a histogram. Specifically, the priority of the planned action candidate represented by first planned action candidate images 1112*a* is represented by first priority image 1132*a* (hatching), and the priority of the planned action candidate represented by second planned action candidate images 1112*b* is represented by second priority image 1132*b* (hatching) In FIG. 66, relatively large priority image 1132 is applied to first planned action candidate images 1112*a*. This shows that the action represented by first planned action candidate images 1112*a* is strongly recommended to the individual driver. Note that a priority image representing the priority of each planned action candidate in number may be displayed as illustrated in FIG. 63A.

The process sequence of vehicle 1000 in the eleventh exemplary embodiment is the same as the process sequence in FIG. 64 described in the tenth exemplary embodiment, and therefore, the description will be omitted. It is to be noted that the input of action information to driving assistance device 1040 from autonomous driving control device 1030 indicated by P43 in FIG. 64 is not performed in the eleventh exemplary embodiment, and this will be described in a modification described later. In addition, the current action candidate and the current action candidate image in FIG. 64 are respectively replaced by a planned action candidate (specifically, situation-adapted planned action candidate, individually-adapted planned action candidate) and a planned action candidate image.

Figure 67:
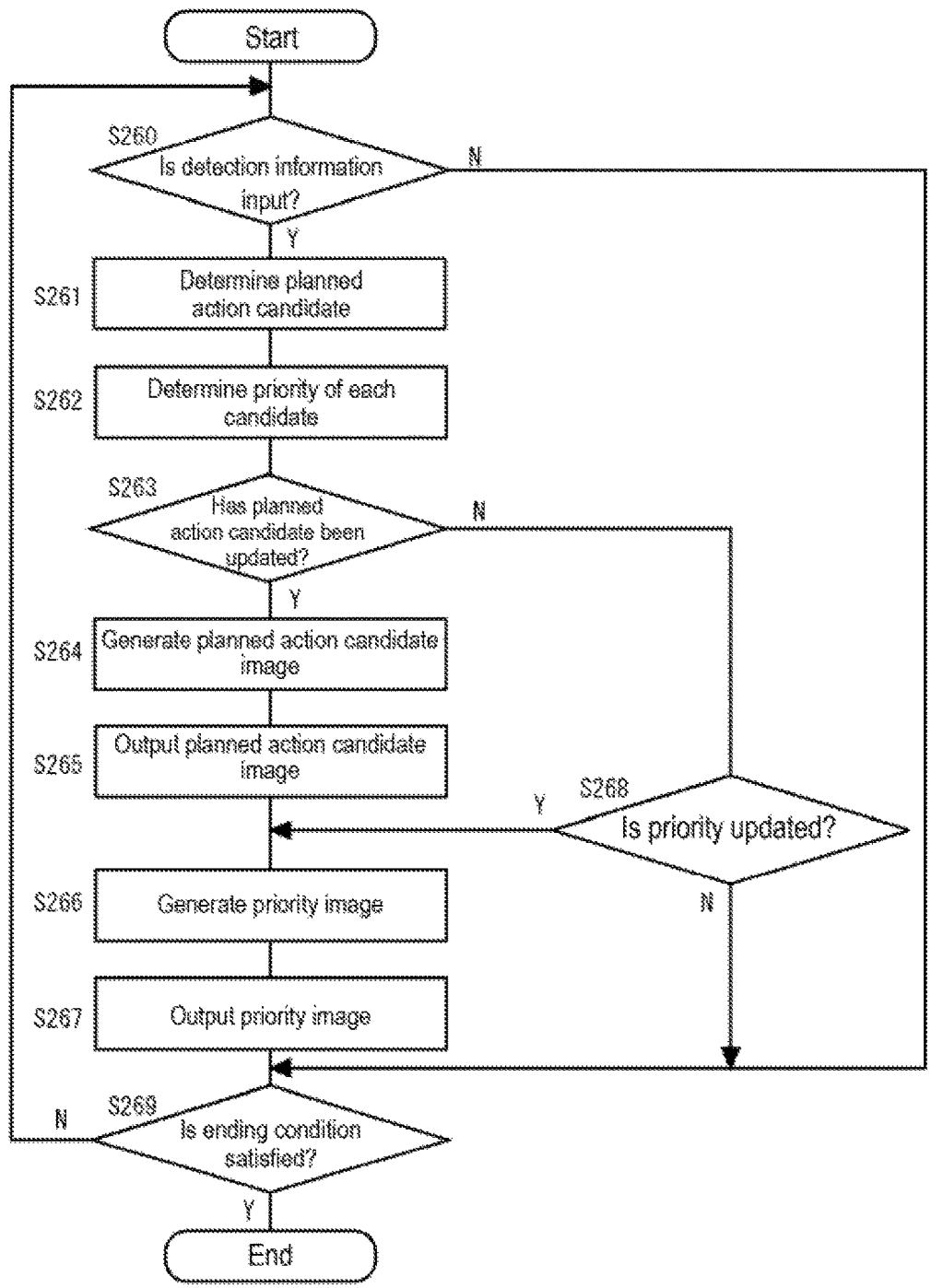
FIG. 67 is a flowchart illustrating an example of a process of a driving assistance device according to the eleventh exemplary embodiment.

FIG. 67 is a flowchart illustrating an example of the process of driving assistance device 1040. When detection information input unit 1052 acquires the detection information output from detector 1020 (Y in S260), situation-adapted type determination unit 1081 determines one or more situation-adapted planned action candidates based on the detection information and the first statistical information (S261). Individually-adapted type determination unit 1083 determines one or more individually-adapted planned action candidates based on the detection information and the second statistical information, and determines the order of each candidate. Priority determination unit 1084 determines priorities of the one or more situation-adapted planned action candidates based on the orders of the one or more individually-adapted planned action candidates (S262). Priority determination unit 1084 stores information indicating the situation-adapted planned action candidates and priorities in storage unit 1042.

When the situation-adapted planned action candidate is updated (Y in S263), image generator 1060 generates a planned action candidate image representing the updated situation-adapted planned action candidate (S264). Image output unit 1051 outputs the planned action candidate image to notification device 1002 and causes notification device 1002 to display this image (S265). Image generator 1060 generates priority images representing the priorities of the respective one or more situation-adapted planned action candidates (S266), and image output unit 1051 outputs the priority images to notification device 1002 and causes notification device 1002 to display the images (S267). When the priority is updated (Y in S268) without the situation-adapted planned action candidate being updated (N in S263), the process proceeds to S266, and when the priority as well as the situation-adapted planned action candidate is not updated (N in S268), the process proceeds to S269.

When a predetermined ending condition is satisfied (Y in S269), the flow in FIG. 67 is ended, and when the ending condition is not satisfied (N in S269), the process returns to S260. If the detection information has not yet been input (N in S260), steps S261 to S268 are skipped. As described above, driving assistance device 1040 according to the eleventh exemplary embodiment determines situation-adapted planned action candidates and determines a priority in presenting these candidates according to a taste of the driver, every time detection information is input. When at least one of the situation-adapted planned action candidate and the priority is updated, the display content of autonomous driving information screen 1103 is also updated.

The process of driving assistance device 1040 (image generator 1060, determination unit 1062, instruction unit 1063, and the like) pertaining to the selection of a planned action candidate by the driver is the same as that in the seventh exemplary embodiment. For example, the process illustrated in the flowchart in FIG. 54 and the user interface indicated in autonomous driving information screen 1103 in FIGS. 55A, 55B, 56A, and 56B are directly applied to the eleventh exemplary embodiment.

As described above, driving assistance device 1040 according to the eleventh exemplary embodiment presents, to the driver, autonomous driving information screen 1103 in which a priority adapted to the individual driver or individual vehicle 1000 is applied to each of one or more situation-adapted planned action candidates. Accordingly, information useful for assisting the selection of a planned action of the vehicle can be presented to the driver. In the eleventh exemplary embodiment, a planned action candidate to be displayed in autonomous driving information screen 1103 is extracted from the first statistical information in which various environmental parameter values and various actions are exhaustively recorded, whereby a planned action candidate more adapted to ever-changing environmental parameter values of the vehicle are easy to be presented. In addition, a priority order of each candidate is determined based on the second statistical information on which the taste of the driver is strongly reflected, whereby a priority according to the taste or operation pattern of the individual driver can be presented.

Another example, which is not illustrated, for presenting a situation-adapted planned action candidate (which can also be referred to as a situation-adapted recommendation in the future) and an individually-adapted planned action candidate (which can also be referred to as an individually-adapted recommendation in the future) will be described. This example shows that, based on the situation where, when vehicle 1000 turns right at an intersection of a road with two lanes on each side, there is a vehicle approaching vehicle 1000 in the opposite lane, autonomous driving control device 1030 determines to execute the current action of "temporal stop", and driving assistance device 1040 presents that "temporal stop" is being executed (for example, see the fifth and sixth exemplary embodiments).

In this case, driving assistance device 1040 may determine "a distance between the host vehicle and the vehicle approaching from the front in the opposite lane for sufficiently ensuring a time taken for the host vehicle to turn right". Then, driving assistance device 1040 may recommend and present, as an option of an action which can be reserved, "turn right" as a situation-adapted planned action candidate that the vehicle can be instructed to execute in travel control with precise timing after the current action of "temporal stop".

In addition, based on a "tendency of a driving action performed by the driver when there is a vehicle approaching from the front in the opposite lane", driving assistance device 1040 may determine "turn right by one lane with precise timing—temporal stop—turn right by one lane with precise timing" (here, an action plan created by combining a plurality of individual actions) as an individually-adapted planned action candidate that the vehicle can be instructed to execute in travel control with precise timing after the current action of "temporal stop". Then, driving assistance device 1040 may further recommend and present the individually-adapted planned action candidate as an option which can be reserved. Note that the tendency of the driving action performed by the driver may be as described below. For example, the tendency may be as follows. When a vehicle approaching from front decelerates because vehicles on the rear side in the closer opposite lane are blocked due to a traffic signal, and a vehicle approaching from front in the distant opposite lane gives a left-turn signal, the host vehicle turns right and cuts in front of the vehicle approaching from front in the closer opposite lane, temporarily stops, and then, restarts to turn right when it can be confirmed again that the vehicle approaching from front in the distant opposite lane intends to turn left because it is decelerating or keeps on giving a left-turn signal. As described above, driving assistance device 1040 may simultaneously present, to the driver, the situation-adapted planned action candidate and the individually-adapted planned action candidate which are determined at timings close to each other.

A modification will be described. Action information input unit 1054 acquires, from autonomous driving control device 1030, action information indicating a planned action determined by autonomous driving control device 1030. Image generator 1060 may further generate a planned action image representing the planned action. Image output unit 1051 may further output the planned action image to notification device 1002 and cause notification device 1002 to simultaneously display the planned action image, the planned action candidate image, and the priority image within the fixed field of view of the driver. In this case, the planned action determined by autonomous driving control device 1030 as well as the planned action candidate determined by driving assistance device 1040 may be presented as subjects to be selected by the driver, and may be action candidates indicated to autonomous driving control device 1030 from driving assistance device 1040.

In addition, in this modification, if the situation-adapted planned action candidates extracted from the first statistical information include a candidate same as the planned action indicated by the action information, situation-adapted type determination unit 1081 may exclude this candidate from the situation-adapted planned action candidates (for example, the candidates to be presented to the driver). Further, if the individually-adapted planned action candidates extracted from the second statistical information include a candidate same as the planned action indicated by the action information, individually-adapted type determination unit 1083 may exclude this candidate from the individually-adapted planned action candidates (for example, the candidates to which ranking is to be performed). Thus, the presentation of a candidate same as the planned action planned by autonomous driving control device 1030 to the driver can be prevented.

Although not mentioned in the eleventh exemplary embodiment, as another modification, a remaining time until the planned action prescribed in the statistical information (for example, the first statistical information) is executed may further be displayed in autonomous driving information screen 1103, as in the seventh or ninth exemplary embodiment. For example, to a planned action candidate image, a remaining time image representing a remaining time until the planned action candidate (for example, situation-adapted planned action candidate) represented by this image is executed may be applied.

Next, modifications common to the respective exemplary embodiments will be described.

In the case where seats in vehicle 1000 can be changed between a state where they face forward during manual driving and a state where a front seat swivels to face a rear seat during autonomous driving, driving assistance device 1040 may provide all notifications in voice/sound when the front seat faces the rear seat based on detection information of a seat sensor (not illustrated) for detecting a state of the seats. Also, the notification method may be switched to providing notification in voice/sound from displaying notification. Further, driving assistance device 1040 may provide notification regarding a current action in voice/sound and provide notification regarding a planned action in display. In other words, a way (medium) to provide notifications regarding some kinds of information pertaining to a current action, a current action candidate, a planned action, and a planned action candidate may differ from a way (medium) to provide notifications regarding other kinds of information. In addition, the action information determined by autonomous driving control device 1030 may be provided in voice/sound, and the action candidate determined by driving assistance device 1040 may be provided by being displayed on a screen, and the reverse combination may also be employed. When the notification method is appropriately changed according to the state inside vehicle 1000 including a driver, an occupant, and the like, an information receiving side hardly has a feeling of troublesome, and reliability in information transmission can be enhanced.

In addition, driving assistance device 1040 may notify the driver of a need to view notification device 1002 (in this case, a display device such as a head-up display) by vibration (because it is unnecessary for the driver to always view notification device 1002 during autonomous driving), and then, output an audio explanation using a voice/sound from a speaker at about a timing at which the driver views the display on notification device 1002. A human being responds faster to a sense of touch (vibration) and a sense of hearing (sound)≈a sense of touch (vibration to an eardrum), but responds slower to a visual sense (display). On the other hand, it is hard for a human being to understand what is meant by notification by means of a touch and auditory notification using a single tone. According to auditory notification using a voice/sound, the meaning of the voice/sound is transmitted, but it takes time to completely transmit the meaning. According to visual notification, information expressing a meaning can be transmitted. In the present modification, characteristics of the respective senses are preferably combined and used.

In addition, a situation to be provided may not be a series of a single situation, but may be overlap each other. For example, a state where it is possible to start may be transmitted to a driver or a fellow passenger by a display in which "←" is displayed, "→" is added after a while, then, "←" disappears with "→" being still displayed, and finally, both arrows disappear, like an arrow display of a railway crossing, in combination of auditory notification, visual notification, and notification by means of a touch. For example, a driver is notified of a need to view notification device 1002 (in this case, a display device such as a head-up display) by vibration, and then, an audio explanation using a voice/sound may be output at about a timing at which the driver views the display on notification device 1002. In addition, before this explanation is finished, notification regarding a change in the situation may be provided in a predetermined alarm sound, and the display content of notification device 1002 may be changed or added.

While the exemplary embodiments according to the present invention have been described above with reference to the drawings, the functions of the above-mentioned devices or processing units can be implemented by a computer program.

A computer achieving the above-mentioned functions through execution of a program is provided with an input device such as a keyboard, a mouse, or a touch pad, an output device such as a display or a speaker, a central processing unit (CPU), a read only memory (ROM), a random access memory (RAM), or a storage device such as a hard disk drive or a solid state drive (SSD). The computer is also provided with a reading device for reading information from a recording medium such as a digital versatile disk read only memory (DVD-ROM) or a universal serial bus (USB) memory, a network card that performs communication through a network, and the like. The respective components are interconnected with a bus.

The reading device reads the program from the recording medium having the program recorded thereon, and the storage device stores the program. Alternatively, the network card performs communication with a server device connected to a network, and a program, downloaded from the server device, for achieving the functions of the respective devices is stored in the storage device.

Then, the CPU copies the program stored in the storage device on the RAM, sequentially reads commands included in the program from the RAM, and executes the read commands, whereby the functions of the respective devices are achieved.

It is to be noted that the exemplary embodiments may be specified by items described below.

[Item 1]

A driving assistance device including:

an action information input unit that acquires, from an autonomous driving controller that determines an action of a vehicle during autonomous driving of the vehicle, action information indicating a first action that the vehicle is caused to execute;

a detection information input unit that acquires, from a detector that detects a surrounding situation and a travel state of the vehicle, detection information indicating a detection result;

a candidate determination unit that determines, based on the detection information, a second action that the vehicle can be caused to execute after the first action indicated by the action information;

an image generator that generates a first image representing the first action indicated by the action information and a second image representing the second action; and an image output unit that outputs the first image and the second image to a display in the vehicle such that the first image and the second image are displayed within a fixed field of view of a driver of the vehicle.

According to this configuration, a planned action candidate to be executed after the current action of the vehicle determined by the autonomous driving controller can be presented to the driver, whereby the determination of the driver of whether or not the driver issues an instruction regarding a future action of the vehicle can be assisted. In addition, a sense of anxiety of the driver involved with autonomous driving can be suppressed.

[Item 2]

The driving assistance device according to the item 1, further including an accumulation unit that accumulates statistical information indicating relevance between the surrounding situation and the travel state of the vehicle and the action of the vehicle, wherein the candidate determination unit determines the second action based on the statistical information and the detection information.

According to this configuration, an appropriate planned action candidate is easy to be determined.

[Item 3]

The driving assistance device according to the item 1, further including a communication interface that is able to communicate with, through a communication network, an accumulation unit, provided outside of the vehicle, for accumulating statistical information indicating relevance between the surrounding situation and the travel state of the vehicle and the action of the vehicle, wherein the candidate determination unit accesses the statistical information in the accumulation unit through the communication interface and determines the second action based on the statistical information and the detection information.

According to this configuration, an appropriate planned action candidate is easy to be determined.

[Item 4]

The driving assistance device according to the item 1, wherein the image generator generates an additional image representing a time until the second action is executed, and the image output unit outputs the additional image to the display in the vehicle and displays the second image including the additional image.

According to this configuration, notification regarding a timing at which the planned action is executed can be provided to the driver.

[Item 5]

The driving assistance device according to any one of the items 1 to 4, further including a command output unit that outputs, to the autonomous driving controller, a command to cause the vehicle to execute the second action, after the first image and the second image are displayed on the display in the vehicle for a predetermined time.

According to this configuration, the vehicle can be caused to execute the planned action determined by the driving assistance device.

[Item 6]

The driving assistance device according to any one of the items 1 to 4, further including;

an operation signal input unit that receives an operation instruction for designating the action of the vehicle; and a command output unit that outputs, to the autonomous driving controller, a command to cause the vehicle to execute the second action, when the operation instruction is not received within a predetermined time for which the first image and the second image are displayed on the display in the vehicle.

According to this configuration, the vehicle can be caused to execute the planned action determined by the driving assistance device.

[Item 7]

The driving assistance device according to any one of the items 1 to 4, further including;

an operation signal input unit that receives an operation instruction for designating the action of the vehicle; and a command output unit that outputs, to the autonomous driving controller, a command to cause the vehicle to execute the second action, when an operation instruction for selecting the second image is received within a predetermined time for which the first image and the second image are displayed on the display in the vehicle.

According to this configuration, the vehicle can be caused to execute the planned action determined by the driving assistance device with the driver's intention being reflected.

[Item 8]

The driving assistance device according to any one of the items 1 to 4, further including a command output unit, wherein when an operation for designating the second action is input, the image output unit outputs, to the display, an inquiry image for designating execution or reservation of the second action, and when an operation for designating execution is input while the inquiry image is displayed, the command output unit outputs, to the autonomous driving controller at a first timing, a command to cause the vehicle to execute the second action, and when an operation for designating reservation is input while the inquiry image is displayed, the command output unit outputs the command to the autonomous driving controller at a second timing later than the first timing.

According to this configuration, the vehicle can be caused to execute the planned action determined by the driving assistance device at a timing reflecting the driver's intention.

[Item 9]

The driving assistance device according to the item 8, wherein when the operation for designating the reservation is input while the inquiry image is displayed, the image output unit outputs, to the display, a third image representing that the second action is currently reserved.

According to this configuration, the driver is easy to recognize the action which is currently reserved.

[Item 10]

The driving assistance device according to any one of the items 5 to 9, wherein after the command is output to the autonomous driving controller, the action information input unit acquires first action information indicating a first action which has been updated according to the command.

According to this configuration, the latest action of the vehicle can be presented to the driver.

[Item 11]

The driving assistance device according to the item 1, further including an operation input unit that receives an operation instruction for designating an action of the vehicle to be executed during autonomous driving of the vehicle, wherein when an operation instruction for selecting the second image is received within a predetermined time for which the first image and the second image are displayed on the display in the vehicle, the image generator generates an inquiry image for making an inquiry to the driver of the vehicle about whether to immediately execute or execute after a predetermined time a second action represented by the second image which has been selected, and the image output unit outputs the inquiry image to the display.

According to this configuration, the action selected by the driver can be executed at a timing reflecting the driver's intention.

[Item 12]

The driving assistance device according the item 11, further including a command output unit, wherein when the operation input unit receives an operation instruction indicating that immediate execution of the second action represented by the second image is selected in the inquiry image, the command output unit transmits, to the autonomous driving controller, a control command to cause the vehicle to immediately execute the second action represented by the second image in place of the first action represented by the first image.

According to this configuration, the vehicle can be caused to immediately execute the action selected by the driver.

[Item 13]

The driving assistance device according to the item 11 or 12, further including a command output unit, wherein when the operation input unit receives an operation instruction indicating that execution of the second action represented by the second image after a predetermined time is selected in the inquiry image, the command output unit transmits, to the autonomous driving controller, a control command to cause the vehicle to execute the second action represented by the second image after a predetermined time.

According to this configuration, the vehicle can be caused to execute the action selected by the driver after a predetermined time.

[Item 14]

A driving control device including;

an autonomous driving controller that determines an action of a vehicle during autonomous driving of the vehicle;

a detection information input unit that acquires, from a detector that detects a surrounding situation and a travel state of the vehicle, detection information indicating a detection result;

a candidate determination unit that determines, based on the detection information, a second action that the vehicle can be caused to execute after a first action that the autonomous driving controller causes the vehicle to execute;

an image generator that generates a first image representing the first action and a second image representing the second action; and an image output unit that outputs the first image and the second image to a display in the vehicle such that the first image and the second image are displayed within a fixed field of view of a driver of the vehicle.

According to this configuration, a planned action candidate to be executed after the current action of the vehicle determined by the autonomous driving controller can be presented to the driver, whereby the determination of the driver of whether or not the driver issues an instruction regarding a future action of the vehicle can be assisted. In addition, a sense of anxiety of the driver involved with autonomous driving can be suppressed.

[Item 15]

A vehicle including:

an autonomous driving controller that determines an action of the vehicle during autonomous driving of the vehicle;

a detection information input unit that acquires, from a detector that detects a surrounding situation and a travel state of the vehicle, detection information indicating a detection result;

a candidate determination unit that determines, based on the detection information, a second action that the vehicle can be caused to execute after a first action that the autonomous driving controller causes the vehicle to execute;

an image generator that generates a first image representing the first action and a second image representing the second action; and an image output unit that outputs the first image and the second image to a display in the vehicle such that the first image and the second image are displayed within a fixed field of view of a driver of the vehicle.

According to this configuration, a planned action candidate to be executed after the current action of the vehicle determined by the autonomous driving controller can be presented to the driver, whereby the determination of the driver of whether or not the driver issues an instruction regarding a future action of the vehicle can be assisted. In addition, a sense of anxiety of the driver involved with autonomous driving can be suppressed.

[Item 16]

A driving assistance method executed by a computer, the method including:

a step of acquiring, from an autonomous driving controller that determines an action of a vehicle during autonomous driving of the vehicle, action information indicating a first action that the vehicle is caused to execute;

a step of acquiring, from a detector that detects a surrounding situation and a travel state of the vehicle, detection information indicating a detection result;

a step of determining, based on the detection information, a second action that the vehicle can be caused to execute after the first action indicated by the action information;

a step of generating a first image representing the first action indicated by the action information and a second image representing the second action; and a step of outputting the first image and the second image to a display in the vehicle such that the first image and the second image are displayed within a fixed field of view of a driver of the vehicle.

According to this configuration, a planned action candidate to be executed after the current action of the vehicle determined by the autonomous driving controller can be presented to the driver, whereby the determination of the driver of whether or not the driver issues an instruction regarding a future action of the vehicle can be assisted. In addition, a sense of anxiety of the driver involved with autonomous driving can be suppressed.

[Item 17]

A driving assistance program that causes a computer to execute:

a function of acquiring, from an autonomous driving controller that determines an action of a vehicle during autonomous driving of the vehicle, action information indicating a first action that the vehicle is caused to execute;

a function of acquiring, from a detector that detects a surrounding situation and a travel state of the vehicle, detection information indicating a detection result;

a function of determining, based on the detection information, a second action that the vehicle can be caused to execute after the first action indicated by the action information;

a function of generating a first image representing the first action indicated by the action information and a second image representing the second action; and a function of outputting the first image and the second image to a display in the vehicle such that the first image and the second image are displayed within a fixed field of view of a driver of the vehicle.

According to this configuration, a planned action candidate to be executed after the current action of the vehicle determined by the autonomous driving controller can be presented to the driver, whereby the determination of the driver of whether or not the driver issues an instruction regarding a future action of the vehicle can be assisted. In addition, a sense of anxiety of the driver involved with autonomous driving can be suppressed.

INDUSTRIAL APPLICABILITY

According to the present invention, information useful to the driver or information providing less sense of incongruity to the driver can be presented to the driver during autonomous driving of the vehicle.

REFERENCE MARKS IN THE DRAWINGS 1, 1000: vehicle
2: brake pedal
3: accelerator pedal
4: indicator lever
5: steering wheel
6: detector
7: vehicle controller
8: storage unit
9: information notification device
10: touch panel
29a, 29b, 39a, 69a, 79a, 79c, 89a, 89c, 99b, 99c, 109a, 109e, 121, 121a, 121b, 121c: display region
51: operating unit
51a, 51c, 51e: operation button
59: character information
59a, 59b: display region
61: location information acquisition unit
62: sensor
63: speed information acquisition unit
64: map information acquisition unit
69, 79, 89, 99: character information
91: information acquisition unit
92: notification unit
101: display
102: input unit
109: display
291: communication unit
292: cache
301: host vehicle
302: adjacent leading vehicle
303: surrounding situation
304: primary cache
305: secondary cache
1002: notification device
1002b: center display
1004: input device
1004a: operating unit
1004b: operating unit
1006: speaker
1008: wireless device
1010: driving operating unit
1011: steering
1012: brake pedal
1013: accelerator pedal
1014: indicator switch
1020: detector
1021: location information acquisition unit
1022: sensor
1023: speed information acquisition unit
1024: map information acquisition unit
1030: autonomous driving control device
1031, 1041: controller 1032, 1042: storage unit
1033, 1043: input/output unit (I/O unit)
1040: driving assistance device
1050: operation input unit
1051: image output unit
1052: detection information input unit
1054: action information input unit
1055: command output unit
1060: image generator
1061: candidate determination unit
1062: determination unit
1063: instruction unit
1070: statistical information accumulation unit
1071: determination reference retaining unit
1072: statistical information accumulation unit
1073: statistical information accumulation unit
1080: first determination unit
1081: situation-adapted type determination unit
1082: second determination unit
1083: individually-adapted type determination unit
1084: priority determination unit
1100: main region
1102: sub-region
1103: autonomous driving information screen
1104: current action image
1106, 1106a, 1106b: planned action image
1108, 1108a, 1108b: time image
1109: time indicator
1110: current action candidate image
1112, 1112a, 1112b: planned action candidate image
1114: time display region
1116: selection frame
1118: execution button
1120: reservation button
1122: cancel time set image
1124: reserved action image
1126: limited time image
1128: action candidate display region
1130: priority display region
1132, 1132a, 1132b: priority image

The invention claimed is:

1. A driving assistance device comprising:
an action information input unit, which, in operation, acquires, from an autonomous driving controller that determines an action of a vehicle during autonomous driving of the vehicle, action information indicating a first action that the vehicle is caused to execute;
a detection information input unit, which, in operation, acquires, from a detector that detects a surrounding situation and a travel state of the vehicle, detection information indicating a detection result;
a candidate determination unit, which, in operation, determines, based on the detection information, at least one second action that the vehicle is caused to execute after the first action indicated by the action information, the first action and the at least one second action adjusting movement of the vehicle;
an image generator, which, in operation, generates a first image representing the first action indicated by the action information and a second image representing the at least one second action; and
an image output unit, which, in operation, outputs the first image and the second image to a display in the vehicle, wherein
the at least one second action includes a plurality of second actions,
the candidate determination unit, in operation, determines the plurality of second actions and determines a priority order of each of the plurality of second actions,
the image generator, in operation, generates a plurality of third images representing the plurality of second actions,
the image output unit, in operation, outputs the plurality of third images according to priority orders to the display in the vehicle to display the plurality of third images in a manner according to the priority orders.

2. The driving assistance device according to claim 1, further comprising:
an accumulation unit, which, in operation, accumulates statistical information indicating relevance between the surrounding situation and the travel state of the vehicle and the action of the vehicle,
wherein the candidate determination unit, in operation, determines the at least one second action based on the statistical information and the detection information.

3. The driving assistance device according to claim 1, further comprising:
a communication interface, which, in operation, communicates with, through a communication network, an accumulation unit, provided outside of the vehicle, configured to accumulate statistical information indicating relevance between the surrounding situation and the travel state of the vehicle and the action of the vehicle,
wherein the candidate determination unit, in operation, accesses the statistical information in the accumulation unit through the communication interface, and determines the at least one second action based on the statistical information and the detection information.

4. The driving assistance device according to claim 1, wherein
the image generator, in operation, generates an additional image representing a time until the at least one second action is executed, and
the image output unit, in operation, outputs the additional image to the display in the vehicle, and displays the second image including the additional image.

5. The driving assistance device according to claim 1, further comprising:
a command output unit, which, in operation, outputs, to the autonomous driving controller, a command to cause the vehicle to execute the at least one second action, after the first image and the second image are displayed on the display in the vehicle for a predetermined time.

6. The driving assistance device according to of claim 1, further comprising:
an operation signal input unit, which, in operation, receives an operation instruction for designating the action of the vehicle; and
a command output unit, which, in operation, outputs, to the autonomous driving controller, a command to cause the vehicle to execute the at least one second action, when the operation instruction is not received within a predetermined time for which the first image and the second image are displayed on the display in the vehicle.

7. The driving assistance device according to claim 1, further comprising:
an operation signal input unit, which, in operation, receives an operation instruction for designating the action of the vehicle; and
a command output unit, which, in operation, outputs, to the autonomous driving controller, a command to cause the vehicle to execute the at least one second action, when an operation instruction for selecting the second image is received within a predetermined time for which the first image and the second image are displayed on the display in the vehicle.

8. The driving assistance device according to of claim 1, further comprising:
a command output unit,
wherein, in response to an operation for designating the at least one second action being input, the image output unit outputs, to the display, an inquiry image for designating execution or reservation of the at least one second action, and
in response to an operation for designating execution being input while the inquiry image is displayed, the command output unit outputs, to the autonomous driving controller at a first timing, a command to cause the vehicle to execute the at least one second action, and
in response to an operation for designating reservation being input while the inquiry image is displayed, the command output unit outputs the command to the autonomous driving controller at a second timing later than the first timing.

9. The driving assistance device according to claim 8, wherein in response to the operation for designating the reservation being input while the inquiry image is displayed, the image output unit outputs, to the display, a fourth image representing that the at least one second action is currently reserved.

10. The driving assistance device according to claim 5, wherein after the command is output to the autonomous driving controller, the action information input unit acquires first action information indicating a first action which has been updated according to the command.

11. The driving assistance device according to claim 1, further comprising:
an operation input unit, which, in operation, receives an operation instruction for designating an action of the vehicle to be executed during autonomous driving of the vehicle,
wherein, in response to an operation instruction for selecting the second image being received within a predetermined time for which the first image and the second image are displayed on the display in the vehicle, the image generator generates an inquiry image making an inquiry to a driver of the vehicle as to whether to immediately execute or to execute after a predetermined time the at least one second action represented by the second image which has been selected, and
the image output unit, in operation, outputs the inquiry image to the display.

12. The driving assistance device according to claim 11, further comprising:
a command output unit,
wherein, in response to the operation input unit receiving an operation instruction indicating that immediate execution of the at least one second action represented by the second image is selected in the inquiry image, the command output unit transmits, to the autonomous driving controller, a control command to cause the vehicle to immediately execute the at least one second action represented by the second image in place of the first action represented by the first image.

13. The driving assistance device according to claim 11, further comprising:
a command output unit,
wherein, in response to the operation input unit receiving an operation instruction indicating that execution of the at least one second action represented by the second image after a predetermined time is selected in the inquiry image, the command output unit transmits, to the autonomous driving controller, a control command to cause the vehicle to execute the at least one second action represented by the second image after a predetermined time.

14. The driving assistance device according to of claim 1, wherein the image output unit outputs the first image and the second image to the display in the vehicle to display the first image and the second image within a fixed field of view of the driver of the vehicle.

15. The driving assistance device according to claim 1 wherein the image output unit outputs the first image and the second image to the display in the vehicle at the same time.

16. A driving control device comprising:
an autonomous driving controller, which, in operation, determines an action of a vehicle during autonomous driving of the vehicle;
a detection information input unit, which, in operation, acquires, from a detector that detects a surrounding situation and a travel state of the vehicle, detection information indicating a detection result;
a candidate determination unit, which, in operation, determines, based on the detection information, at least one second action that the vehicle can be caused to execute after a first action that the autonomous driving controller causes the vehicle to execute, the first action and the at least one second action adjusting movement of the vehicle;
an image generator, which, in operation, generates a first image representing the first action and a second image representing the second action; and
an image output unit, which, in operation, outputs the first image and the second image to a display in the vehicle, wherein
the at least one second action includes a plurality of second actions,
the candidate determination unit, in operation, determines the plurality of second actions and determines a priority order of each of the plurality of second actions,
the image generator, in operation, generates a plurality of third images representing the plurality of second actions,
the image output unit, in operation, outputs the plurality of third images to the display in the vehicle to display the plurality of third images in a manner according to priority orders.

17. The driving control device according to claim 16, wherein the image output unit outputs the first image and the second image to the display in the vehicle to display the first image and the second image within a fixed field of view of a driver of the vehicle.

18. A driving assistance method executed by a computer, the method comprising:
acquiring, from an autonomous driving controller that determines an action of a vehicle during autonomous driving of the vehicle, action information indicating a first action that the vehicle is caused to execute;
acquiring, from a detector that detects a surrounding situation and a travel state of the vehicle, detection information indicating a detection result;
determining, based on the detection information, at least one second action that the vehicle can be caused to execute after the first action indicated by the action information, the first action and the at least one second action adjusting movement of the vehicle, the at least one second action including a plurality of second actions;

determining a priority order of each of the plurality of second actions;

generating a first image representing the first action indicated by the action information and a second image representing the second action; and generating a plurality of third images representing the plurality of second actions;

outputting the first image, the second image, and the plurality of third images to a display in the vehicle; and displaying the plurality of third images in a manner according to priority orders.

19. The driving assistance method according to claim 18, further comprising:

displaying the first image and the second image within a fixed field of view of a driver of the vehicle.

* * * * *